(12) United States Patent
Clerckx et al.

(10) Patent No.: US 8,401,104 B2
(45) Date of Patent: Mar. 19, 2013

(54) CODEBOOK DESIGN METHOD FOR MULTIPLE INPUT MULTIPLE OUTPUT SYSTEM AND METHOD FOR USING THE CODEBOOK

(75) Inventors: Bruno Clerckx, Yongin-si (KR); David Mazzarese, Suwon-si (KR); Ki Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 12/581,218

(22) Filed: Oct. 19, 2009

(65) Prior Publication Data

US 2010/0104032 A1 Apr. 29, 2010

Related U.S. Application Data

(60) Provisional application No. 61/106,664, filed on Oct. 20, 2008, provisional application No. 61/119,057, filed on Dec. 2, 2008, provisional application No. 61/141,441, filed on Dec. 30, 2008.

(30) Foreign Application Priority Data

Sep. 1, 2009 (KR) ........................ 10-2009-0081906

(51) Int. Cl.
*H04L 1/02* (2006.01)
*H04L 27/28* (2006.01)
(52) U.S. Cl. ........................................ 375/267; 375/260
(58) Field of Classification Search .................. 375/267, 375/299, 346–347, 358; 455/68–69, 101
See application file for complete search history.

(56) References Cited

U.S. PATENT DOCUMENTS

| 7,139,328 | B2 * | 11/2006 | Thomas et al. | 375/299 |
|---|---|---|---|---|
| 7,809,074 | B2 * | 10/2010 | Kotecha et al. | 375/267 |
| 7,912,141 | B2 * | 3/2011 | She et al. | 375/267 |
| 7,949,064 | B2 * | 5/2011 | Lin et al. | 375/267 |
| 7,957,701 | B2 * | 6/2011 | Alexiou et al. | 455/69 |
| 8,155,169 | B2 * | 4/2012 | Kent et al. | 375/146 |
| 2008/0094281 | A1 * | 4/2008 | Teng et al. | 342/368 |
| 2008/0095258 | A1 | 4/2008 | She et al. | |
| 2008/0165868 | A1 | 7/2008 | Kent et al. | |
| 2008/0165870 | A1 | 7/2008 | Kent et al. | |
| 2008/0192852 | A1 | 8/2008 | Kent et al. | |
| 2008/0192853 | A1 | 8/2008 | Kent et al. | |
| 2009/0274230 | A1 * | 11/2009 | Heath et al. | 375/260 |

FOREIGN PATENT DOCUMENTS

| KR | 100715582 | 4/2007 |
|---|---|---|
| KR | 1020080073665 | 8/2008 |
| KR | 1020080073680 | 8/2008 |

OTHER PUBLICATIONS

Korean Institute of Information Technology, "Codebook Based Multiuser MIMO Precoding with Limited Feedback," Journal of Korean Institute of Information Technology, Jun. 2007, pp. 151-157 (as provided: pp. 1-13).

* cited by examiner

*Primary Examiner* — Khanh C Tran
(74) *Attorney, Agent, or Firm* — NSIP Law

(57) ABSTRACT

A multiple input multiple output (MIMO) communication method using a codebook is provided. The MIMO communication method may use one or more codebooks and the codebooks may change according to a transmission rank, a channel state of a user terminal, and/or a number of feedback bits.

4 Claims, 4 Drawing Sheets

CODEBOOK DESIGN METHOD FOR MULTIPLE INPUT MULTIPLE OUTPUT SYSTEM AND METHOD FOR USING THE CODEBOOK

CROSS-REFERENCE TO RELATED APPLICATIONS

This application claims the benefit under 35 U.S.C. §119(e) of a U.S. Provisional Application No. 61/106,664, filed on Oct. 20, 2008, a U.S. Provisional Application No. 61/119,057, filed on Dec. 2, 2008, and a U.S. Provisional Application No. 61/141,441, filed on Dec. 30, 2008, in the United States Patent and Trademark Office, and the benefit under 35 U.S.C. §119(a) of a Korean Patent Application No. 10-2009-0081906, filed on Sep. 1, 2009, in the Korean Intellectual Property Office, the entire disclosures of which are incorporated herein by reference for all purposes.

BACKGROUND

1. Field

The following description relates to a design method of a codebook that is used in, for example, a multiple input multiple output (MIMO) communication system, and a technology to use the codebook.

2. Description of the Related Art

Researches are being conducted to provide various types of multimedia services and to support high quality and high speed of data transmission in a wireless communication environment. Technologies associated with a multiple input multiple output (MIMO) communication system using multiple channels are in rapid development.

In a MIMO communication system, a base station and terminals may use a codebook in order to securely and efficiently manage a channel environment. A particular space may be quantized into a plurality of codewords. The plurality of codewords that is generated by quantizing the particular space may be stored in the base station and the terminals. The codewords may be a vector or a matrix according to the dimension of a channel matrix.

For example, a terminal may select a matrix or a vector corresponding to channel information from matrices or vectors included in a codebook, based on a channel that is formed between the base station and the terminal. The base station may also receive the selected matrix or vector based on the codebook to thereby recognize the channel information. The selected matrix or vector may be used where the base station performs beamforming or transmits a transmission signal via multiple antennas.

SUMMARY

In one general aspect, provided herein is a multiple input multiple output (MIMO) communication system, the system comprising a terminal to feed back feedback data using a codebook, and a base station to access a memory storing the codebook, and to precode a data stream that the base station desires to transmit using the codebook.

Other features and aspects will be apparent from the following detailed description, the drawings, and the claims.

Figure 1:
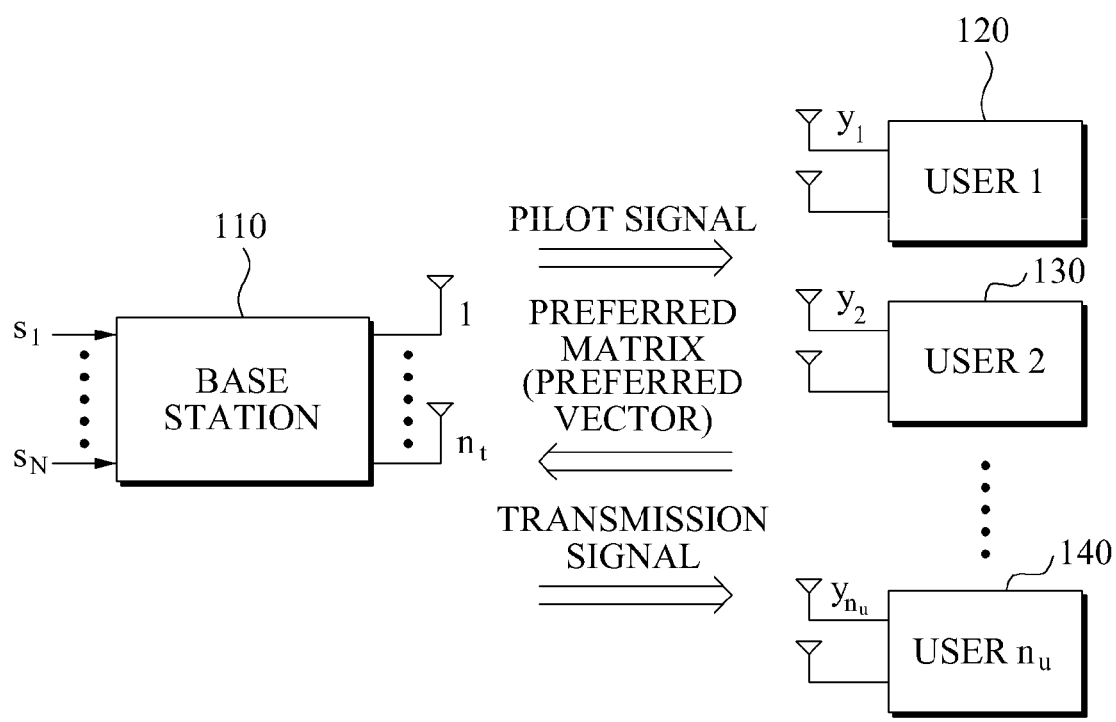
FIG. 1 illustrates an exemplary multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

Hereinafter, exemplary embodiments will be described with reference to the accompanying drawings.

FIG. 1 illustrates an exemplary multiple input multiple output (MIMO) communication system. The MIMO communication system may be a closed-loop MIMO communication system or an open-loop MIMO communication system.

Referring to FIG. 1, the exemplary MIMO communication system includes a base station 110 and a plurality of users, for example, user 1, user 2, and user $n_u$, represented by reference numerals 120, 130, and 140, respectively. While FIG. 1 shows an example of a multi-user MIMO communication system, it is understood that the disclosed systems, apparatuses, and/or methods may be applicable to a single user MIMO communication system. Herein, the term "closed-loop" may indicate that the users (user 1, user 2, user $n_u$) 120, 130, and 140 may feedback data to the base station 110. The feedback data may contain channel information and the base station 110 may generate a transmission signal based on the feedback data. The codebook described herein may be applicable to an open-loop MIMO communication system as well as the closed-loop MIMO communication system.

One or more antennas may be installed in the base station 110. A single antenna or a plurality of antennas may be installed in the users 120, 130, and/or 140. A channel may be formed between the base station 110 and the users 120, 130, and/or 140. Signals may be transmitted and received via each formed channel.

The base station 110 may transmit a single data stream or at least two data streams a user. For example, the base station 110 may adopt a spatial division multiplex access (SDMA) scheme or SDM scheme. The base station 110 may select a precoding matrix from codeword matrices included in a codebook and generate a transmission signal using the selected precoding matrix.

For example, the base station 110 may transmit pilot signals to the users 120, 130, and/or 140 via downlink channels. The pilot signals may be well known to the base station 110 and the users 120, 130, and/or 140.

A terminal corresponding to a user, for example, user 120, 130, or 140, may perform receiving a signal transmitted from the base station 110. The terminal may estimate a channel that is formed between the base station 110 and the terminal using a pilot signal. The terminal may select at least one matrix or vector from a codebook and feed back information associated with the selected at least one matrix or vector. The codebook may be updated according to a channel state. The codebook may be designed according to descriptions that will be made later with reference to FIGS. 2 through 4.

A channel estimator of the terminal may estimate the channel formed between the base station 110 and the terminal using the pilot signal. A terminal corresponding to a user, for example, user 120, 130, or 140 may select, as a vector, any one vector from vectors that are included in a pre-stored codebook. The terminal may select, as a codeword matrix, any one matrix from matrices that are included in the codebook.

For example, the terminal may select, as the vector or the codeword matrix, any one vector or any one matrix from $2^B$ vectors or $2^B$ matrices according to an achievable data transmission rate or a signal-to-interference and noise ratio (SINR). In this example, B denotes a number of feedback bits. A terminal may determine its own preferred transmission rank. The transmission rank may correspond to a number of data streams.

A feedback unit of the terminal may feedback to the base station 110, information associated with the selected vector or selected codeword matrix, hereinafter, referred to as channel information or feedback data. Information associated with the codeword matrix is also referred to as matrix information (PMI) or precoding matrix information (PMI). The channel information or the feedback data used herein may include channel state information, channel quality information, and/or channel direction information.

An information receiver of the base station 110 may receive channel information and/or feedback data of the users 120, 130, and/or 140, and determine a precoding matrix based on the received channel information and/or the feedback data. The base station 110 may select one or more of the users (user 1, user 2, user $n_u$) 120, 130, and 140 according to various types of selection algorithms, for example, a semi-orthogonal user selection (SUS) algorithm, a greedy user selection (GUS) algorithm, and the like.

The same codebook as the codebook that is stored in a memory the users 120, 130, and/or 140 may be pre-stored in a memory of the base station 110. The base station 110 may determine the precoding matrix based on matrices included in the pre-stored codebook using the channel information that is fed back from the users 120, 130, and/or 140. The base station 110 may determine the precoding matrix to maximize a total data transmission rate, such as a sum rate. The MIMO communication method described herein may achieve an efficient sum rate using an optimized codebook.

The base station 110 may precode data streams, for example, data streams $S_1$ and $S_N$, based on the determined precoding matrix to generate a transmission signal. A process of generating the transmission signal by the base station 110 is referred to as "beamforming." Beamforming is a signal processing technique used in sensor arrays for directional signal transmission or reception. This spatial selectivity is achieved by using adaptive or fixed receive/transmit beam patterns.

Generally, precoding is beamforming to support transmission in a radio system, for example, a multi-layer transmission in MIMO radio systems. Conventional beamforming considers linear single-layer precoding so that the same signal is emitted from each of the transmit antennas with appropriate weighting such that the signal power is maximized at the receiver output. When the receiver has multiple antennas, the single-layer beamforming cannot simultaneously maximize the signal level at all of the receive antennas and so precoding is used for multi-layer beamforming in order to maximize the throughput performance of a multiple receive antenna system. In precoding, the multiple streams of the signals are emitted from the transmit antennas with independent and appropriate weighting per each antenna such that the link throughput may be maximized at the receiver output. Precoding may be performed in a unitary fashion, in a semi-unitary fashion, or in a non-unitary fashion.

A channel environment between the base station 110 and the users 120, 130, and/or 140 may be variable. Where the base station 110 and the users 120, 130, and/or 140 use a fixed codebook, it may be difficult to adaptively cope with the varying channel environment. Although it will be described in detail later, the base station 110 and the users 120, 130, and/or 140 may adaptively cope with the varying channel environment to thereby update the codebook.

The base station 110 may generate a new precoding matrix using the updated codebook. For example, the base station 110 may update a previous precoding matrix to the new precoding matrix using the updated codebook.

Figure 2:
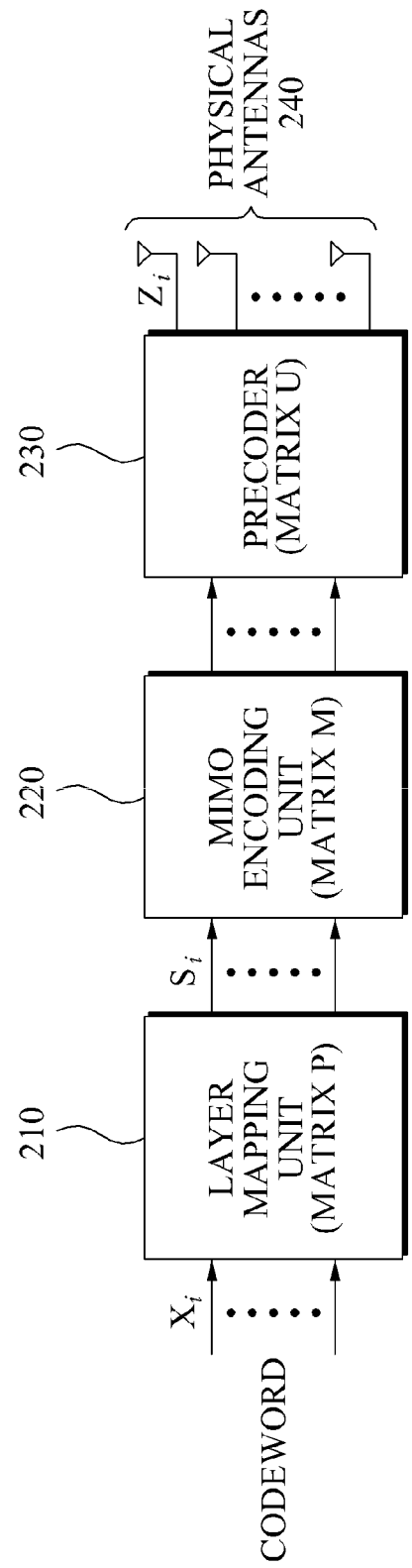
FIG. 2 is a block diagram illustrating an exemplary configuration of a base station.

FIG. 2 illustrates an exemplary configuration of a base station.

Referring to FIG. 2, the exemplary base station includes a layer mapping unit 210, a MIMO encoding unit 220, a precoder 230, and $Z_t$ physical antennas 240.

At least one codeword for at least one user may be mapped to at least one layer. Where the dimension of codeword X is $N_c \times 1$, the layer mapping unit 210 may map the codeword X to the at least one layer using a matrix P with the dimension of $N_s \times N_c$. In this example, $N_s$ denotes a number of layers or a number of effective antennas. Accordingly, it is possible to acquire the following Equation 1:

$$s = Px \tag{1}$$

The MIMO encoding unit 220 may perform space-time modulation for S using a matrix function M with the dimension of $N_s \times N_s$. The MIMO encoding unit 220 may perform space-frequency block coding, spatial multiplexing, and the like, according to a transmission rank.

The precoder 230 may precode outputs, for example, output data streams of the MIMO encoding unit 220 to generate the transmission signal to be transmitted via the physical antennas 240. The dimension or the number of outputs, for example, the data streams of the MIMO encoding unit 220, may indicate the transmission rank. The precoder 230 may generate the transmission signal using a precoding matrix U with the dimension of $N_t \times N_s$. Accordingly, it is possible to acquire the following Equation 2:

$$z = UM(s) \tag{2}$$

As described herein, W denotes the precoding matrix and R denotes the transmission rank or the number of effective antennas. In this example, the dimension of the precoding matrix W is $N_t \times R$. Where the MIMO encoding unit 220 uses spatial multiplexing, Z may be given by the following Equation 3:

$$z = WB = \begin{bmatrix} u_{11} & u_{1R} \\ \vdots & \vdots \\ u_{Nt1} & u_{NtR} \end{bmatrix} \begin{bmatrix} s_1 \\ \vdots \\ s_R \end{bmatrix}. \tag{3}$$

Referring to the above Equation 3, the precoding matrix W may also be referred to as a weighting matrix. The dimension of the precoding matrix W may be determined according to the transmission rank and the number of physical antennas. For example, where the number $N_t$ of physical antennas is four and the transmission rank is 2, the precoding matrix W may be given by the following Equation 4:

$$W = \begin{bmatrix} w_{11} & w_{12} \\ w_{21} & w_{22} \\ w_{31} & w_{32} \\ w_{41} & w_{42} \end{bmatrix}. \quad (4)$$

Codebook Properties

The codebook used in a closed-loop MIMO communication system or an open-loop MIMO communication system may include one or more matrices and/or one or more vectors. A precoding matrix or a precoding vector may be determined based on the one or more matrices and/or the one or more vectors included in the codebook.

A first example of a codebook used in a single user MIMO communication system or a multi-user MIMO communication system where the number of physical antennas of the base station is four, is shown in the following Equation 5:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix}, \quad (5)$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix},$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix},$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix},$$

-continued $$W_5 = \text{diag}(1, 1, 1, -1) * DFT = 0.5 * \begin{bmatrix} 1 & 1 & 1 & 1 \\ 1 & j & -1 & -j \\ 1 & -1 & 1 & -1 \\ -1 & j & 1 & -j \end{bmatrix},$$

and $$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}.$$

In this example, a rotation matrix is $$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix},$$

and a quadrature phase shift keying (QPSK) discrete Fourier transform (DFT) matrix is $$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

diag(a, b, c, d) is a 4×4 matrix, and diagonal elements of diag(a, b, c, d) are a, b, c, and d, and all the remaining elements are zero.

16 matrices included in the 4-bit codebook for the single user MIMO communication system may be determined according to the transmission rank, as given by the following Table 1:

| Transmit Codebook Index | Transmission Rank 1 | Transmission Rank 2 | Transmission Rank 3 | Transmission Rank 4 |
|---|---|---|---|---|
| 1 | $C_{1,1} = W1(;,2)$ | $C_{1,2} = W1(;,1\ 2)$ | $C_{1,3} = W1(;,1\ 2\ 3)$ | $C_{1,4} = W1(;,1\ 2\ 3\ 4)$ |
| 2 | $C_{2,1} = W1(;,3)$ | $C_{2,2} = W1(;,1\ 3)$ | $C_{2,3} = W1(;,1\ 2\ 4)$ | $C_{2,4} = W2(;,1\ 2\ 3\ 4)$ |
| 3 | $C_{3,1} = W1(;,4)$ | $C_{3,2} = W1(;,1\ 4)$ | $C_{3,3} = W1(;,1\ 3\ 4)$ | $C_{3,4} = W3(;,1\ 2\ 3\ 4)$ |
| 4 | $C_{4,1} = W2(;,2)$ | $C_{4,2} = W1(;,2\ 3)$ | $C_{4,3} = W1(;,2\ 3\ 4)$ | $C_{4,4} = W4(;,1\ 2\ 3\ 4)$ |
| 5 | $C_{5,1} = W2(;,3)$ | $C_{5,2} = W1(;,2\ 4)$ | $C_{5,3} = W2(;,1\ 2\ 3)$ | $C_{5,4} = W5(;,1\ 2\ 3\ 4)$ |
| 6 | $C_{6,1} = W2(;,4)$ | $C_{6,2} = W1(;,3\ 4)$ | $C_{6,3} = W2(;,1\ 2\ 4)$ | $C_{6,4} = W6(;,1\ 2\ 3\ 4)$ |
| 7 | $C_{7,1} = W3(;,1)$ | $C_{7,2} = W2(;,1\ 3)$ | $C_{7,3} = W2(;,1\ 3\ 4)$ | n/a |
| 8 | $C_{8,1} = W4(;,1)$ | $C_{8,2} = W2(;,1\ 4)$ | $C_{8,3} = W2(;,2\ 3\ 4)$ | n/a |
| 9 | $C_{9,1} = W5(;,1)$ | $C_{9,2} = W2(;,2\ 3)$ | $C_{9,3} = W3(;,1\ 2\ 3)$ | n/a |
| 10 | $C_{10,1} = W5(;,2)$ | $C_{10,2} = W2(;,2\ 4)$ | $C_{10,3} = W3(;,1\ 3\ 4)$ | n/a |
| 11 | $C_{11,1} = W5(;,3)$ | $C_{11,2} = W3(;,1\ 3)$ | $C_{11,3} = W4(;,1\ 2\ 3)$ | n/a |
| 12 | $C_{12,1} = W5(;,4)$ | $C_{12,2} = W3(;,1\ 4)$ | $C_{12,3} = W4(;,1\ 3\ 4)$ | n/a |
| 13 | $C_{13,1} = W6(;,1)$ | $C_{13,2} = W4(;,1\ 3)$ | $C_{13,3} = W5(;,1\ 2\ 3)$ | n/a |

-continued

| Transmit Codebook Index | Transmission Rank 1 | Transmission Rank 2 | Transmission Rank 3 | Transmission Rank 4 |
|---|---|---|---|---|
| 14 | $C_{14,1} = W6(;,2)$ | $C_{14,2} = W4(;,1\ 4)$ | $C_{14,3} = W5(;,1\ 3\ 4)$ | n/a |
| 15 | $C_{15,1} = W6(;,3)$ | $C_{15,2} = W5(;,1\ 3)$ | $C_{15,3} = W6(;,1\ 2\ 4)$ | n/a |
| 16 | $C_{16,1} = W6(;,4)$ | $C_{16,2} = W6(;,2\ 4)$ | $C_{16,3} = W6(;,2\ 3\ 4)$ | n/a |

Referring to the above Table 1, where the transmission rank is 4, the precoding matrix may be generated based on, for example, $W_1(;,1\ 2\ 3\ 4)$, $W_2(;,1\ 2\ 3\ 4)$, $W_3(;,1\ 2\ 3\ 4)$, $W_4(;,1\ 2\ 3\ 4)$, $W_5(;,1\ 2\ 3\ 4)$, and $W_6(;,1\ 2\ 3\ 4)$. In this example, $W_k(;,n\ m\ o\ p)$ denotes a matrix that includes an $n^{th}$ column vector, an $m^{th}$ column vector, an $o^{th}$ column vector, and a $p^{th}$ column vector of $W_k$.

Where the transmission rank is 3, the precoding matrix may be generated based on, for example, $W_1(;,1\ 2\ 3)$, $W_1(;,1\ 2\ 4)$, $W_1(;,1\ 3\ 4)$, $W_1(;,2\ 3\ 4)$, $W_2(;,1\ 2\ 3)$, $W_2(;,1\ 2\ 4)$, $W_2(;,1\ 3\ 4)$, $W_2(;,2\ 3\ 4)$, $W_3(;,1\ 2\ 3)$, $W_3(;,1\ 3\ 4)$, $W_4(;,1\ 2\ 3)$, $W_4(;,1\ 3\ 4)$, $W_5(;,1\ 2\ 3)$, $W_5(;,1\ 3\ 4)$, $W_6(;,1\ 2\ 4)$, and $W_6(;,2\ 3\ 4)$. In this example, $W_k(;,n\ m\ o)$ denotes a matrix that includes the $n^{th}$ column vector, the $m^{th}$ column vector, and the $o^{th}$ column vector of $W_k$.

Where the transmission rank is 2, the precoding matrix may be generated based on, for example, $W_1(;,1\ 2)$, $W_1(;,1\ 3)$, $W_1(;,1\ 4)$, $W_1(;,2\ 3)$, $W_1(;,2\ 4)$, $W_1(;,3\ 4)$, $W_2(;,1\ 3)$, $W_2(;,1\ 4)$, $W_2(;,2\ 3)$, $W_2(;,2\ 4)$, $W_3(;,1\ 3)$, $W_3(;,1\ 4)$, $W_4(;,1\ 3)$, $W_4(;,1\ 4)$, $W_5(;,1\ 3)$, and $W_6(;,2\ 4)$. In this example, $W_k(;,n\ m)$ denotes a matrix that includes the $n^{th}$ column vector and the $m^{th}$ column vector of $W_k$.

Where the transmission rank is 1, the precoding matrix may be generated based on, for example, $W_1(;,2)$, $W_1(;,3)$, $W_1(;,4)$, $W_2(;,2)$, $W_2(;,3)$, $W_2(;,4)$, $W_3(;,1)$, $W_4(;,1)$, $W_5(;,1)$, $W_5(;,2)$, $W_5(;,3)$, $W_5(;,4)$, $W_6(;,1)$, $W_6(;,2)$, $W_6(;,3)$, and $W_6(;,4)$. In this example, $W_k(;,n)$ denotes the $n^{th}$ column vector of $W_k$.

The codewords included in the above Table 1 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 03536 + 0.3536i \\ 0 + 0.5000i \\ -0.3536 + 0.3536i \end{matrix}$$

-continued $$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

$$C_{16,1} = \begin{matrix} 0.5000 \\ 0.3536 - 0.3536i \\ 0 - 0.5000i \\ -0.3536 - 0.3536i \end{matrix}$$

$$C_{1,2} = \begin{matrix} 0.5000 & 0.5000 \\ 0.5000 & -0.5000 \\ 0.5000 & 0.5000 \\ 0.5000 & -0.5000 \end{matrix}$$

$$C_{2,2} = \begin{matrix} 0.5000 & -0.5000 \\ 0.5000 & -0.5000 \\ 0.5000 & 0.5000 \\ 0.5000 & 0.5000 \end{matrix}$$

$$C_{3,2} = \begin{matrix} 0.5000 & -0.5000 \\ 0.5000 & 0.5000 \\ 0.5000 & 0.5000 \\ 0.5000 & -0.5000 \end{matrix}$$

$$C_{4,2} = \begin{matrix} 0.5000 & -0.5000 \\ -0.5000 & -0.5000 \\ 0.5000 & 0.5000 \\ -0.5000 & 0.5000 \end{matrix}$$

$$C_{5,2} = \begin{matrix} 0.5000 & -0.5000 \\ -0.5000 & 0.5000 \\ 0.5000 & 0.5000 \\ -0.5000 & -0.5000 \end{matrix}$$

$$C_{6,2} = \begin{matrix} -0.5000 & -0.5000 \\ -0.5000 & 0.5000 \\ 0.5000 & 0.5000 \\ 0.5000 & -0.5000 \end{matrix}$$

$$C_{7,2} = \begin{matrix} 0.5000 & -0.5000 \\ 0 + 0.5000i & 0 - 0.5000i \\ 0.5000 & 0.5000 \\ 0 + 0.5000i & 0 + 0.5000i \end{matrix}$$

$$C_{8,2} = \begin{matrix} 0.5000 & -0.5000 \\ 0 + 0.5000i & 0 + 0.5000i \\ 0.5000 & 0.5000 \\ 0 + 0.5000i & 0 - 0.5000i \end{matrix}$$

$$C_{9,2} = \begin{matrix} 0.5000 & -0.5000 \\ 0 - 0.5000i & 0 - 0.5000i \\ 0.5000 & 0.5000 \\ 0 - 0.5000i & 0 + 0.5000i \end{matrix}$$

$$C_{10,2} = \begin{matrix} 0.5000 & -0.5000 \\ 0 - 0.5000i & 0 + 0.5000i \\ 0.5000 & 0.5000 \\ 0 - 0.5000i & 0 - 0.5000i \end{matrix}$$

$$C_{11,2} = \begin{matrix} 0.5000 & -0.5000 \\ 0.5000 & 0 - 0.5000i \\ 0.5000 & 0.5000 \\ 0.5000 & 0 + 0.5000i \end{matrix}$$

$$C_{12,2} = \begin{matrix} 0.5000 & -0.5000 \\ 0.5000 & 0 + 0.5000i \\ 0.5000 & 0.5000 \\ 0.5000 & 0 - 0.5000i \end{matrix}$$

$$C_{13,2} = \begin{matrix} 0.5000 & -0.5000 \\ 0 + 0.5000i & -0.5000 \\ 0.5000 & 0.5000 \\ 0 + 0.5000i & 0.5000 \end{matrix}$$

$$C_{14,2} = \begin{matrix} 0.5000 & -0.5000 \\ 0 + 0.5000i & 0.5000 \\ 0.5000 & 0.5000 \\ 0 + 0.5000i & -0.5000 \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

$$C_{16,2} = \begin{matrix} 0.5000 & 0.5000 \\ -0.3536 + 0.3536i & 0.3536 - 0.3536i \\ 0 - 0.5000i & 0 - 0.5000i \\ 0.3536 + 0.3536i & -0.3536 - 0.3536i \end{matrix}$$

$$C_{1,3} = \begin{matrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{matrix}$$

$$C_{2,3} = \begin{matrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{matrix}$$

$$C_{3,3} = \begin{matrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{matrix}$$

$$C_{4,3} = \begin{matrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{matrix}$$

$$C_{5,3} = \begin{matrix} 0.5000 & 0.5000 & -0.5000 \\ 0+0.5000i & 0-0.5000i & 0-0.5000i \\ 0.5000 & 0.5000 & 0.5000 \\ 0+0.5000i & 0-0.5000i & 0+0.5000i \end{matrix}$$

$$C_{6,3} = \begin{matrix} 0.5000 & 0.5000 & -0.5000 \\ 0+0.5000i & 0-0.5000i & 0+0.5000i \\ 0.5000 & 0.5000 & 0.5000 \\ 0+0.5000i & 0-0.5000i & 0-0.5000i \end{matrix}$$

$$C_{7,3} = \begin{matrix} 0.5000 & -0.5000 & -0.5000 \\ 0+0.5000i & 0-0.5000i & 0+0.5000i \\ 0.5000 & 0.5000 & 0.5000 \\ 0+0.5000i & 0+0.5000i & 0-0.5000i \end{matrix}$$

$$C_{8,3} = \begin{matrix} 0.5000 & -0.5000 & -0.5000 \\ 0-0.5000i & 0-0.5000i & 0+0.5000i \\ 0.5000 & 0.5000 & 0.5000 \\ 0-0.5000i & 0+0.5000i & 0-0.5000i \end{matrix}$$

$$C_{9,3} = \begin{matrix} 0.5000 & 0.5000 & -0.5000 \\ 0.5000 & -0.5000 & 0-0.5000i \\ 0.5000 & 0.5000 & 0.5000 \\ 0.5000 & -0.5000 & 0+0.5000i \end{matrix}$$

$$C_{10,3} = \begin{matrix} 0.5000 & -0.5000 & -0.5000 \\ 0.5000 & 0-0.5000i & 0+0.5000i \\ 0.5000 & 0.5000 & 0.5000 \\ 0.5000 & 0+0.5000i & 0-0.5000i \end{matrix}$$

$$C_{11,3} = \begin{matrix} 0.5000 & 0.5000 & -0.5000 \\ 0+0.5000i & 0-0.5000i & -0.5000 \\ 0.5000 & 0.5000 & 0.5000 \\ 0+0.5000i & 0-0.5000i & 0.5000 \end{matrix}$$

$$C_{12,3} = \begin{matrix} 0.5000 & -0.5000 & -0.5000 \\ 0+0.5000i & -0.5000 & 0.5000 \\ 0.5000 & 0.5000 & 0.5000 \\ 0+0.5000i & 0.5000 & -0.5000 \end{matrix}$$

$$C_{13,3} = \begin{matrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{matrix}$$

$$C_{14,3} = \begin{matrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{matrix}$$

$$C_{15,3} = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

$$C_{16,3} = \begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

$$C_{1,4} = \begin{matrix} 0.5000 & 0.5000 & -0.5000 & -0.5000 \\ 0.5000 & -0.5000 & -0.5000 & 0.5000 \\ 0.5000 & 0.5000 & 0.5000 & 0.5000 \\ 0.5000 & -0.5000 & 0.5000 & -0.5000 \end{matrix}$$

$$C_{2,4} = \begin{matrix} 0.5000 & 0.5000 & -0.5000 & -0.5000 \\ 0+0.5000i & 0-0.5000i & 0-0.5000i & 0+0.5000i \\ 0.5000 & 0.5000 & 0.5000 & 0.5000 \\ 0+0.5000i & 0-0.5000i & 0+0.5000i & 0-0.5000i \end{matrix}$$

$$C_{3,4} = \begin{matrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{matrix}$$

$$C_{4,4} = \begin{matrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{matrix}$$

$$C_{5,4} = \begin{matrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{matrix}$$

-continued $$C_{6,4} = \begin{matrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{matrix}$$

For the first example, where the number of physical antennas of the base station is four, the codebook used in the multi-user MIMO communication system according to an exemplary embodiment may be designed by the following Equation 6:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} \quad (6)$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

Codewords included in the codebook for the multi-user MIMO communication system may be expressed using a transmission rank as given by the following Table 2:

| Transmit Codebook Index | codeword used at the mobile station for quantization |
|---|---|
| 1 | $M_1 = W3(:,1)$ |
| 2 | $M_2 = W3(:,2)$ |
| 3 | $M_3 = W3(:,3)$ |
| 4 | $M_4 = W3(:,4)$ |
| 5 | $M_5 = W6(:,1)$ |
| 6 | $M_6 = W6(:,2)$ |
| 7 | $M_7 = W6(:,3)$ |
| 8 | $M_8 = W6(:,4)$ |

Referring to the above Table 2, where a transmission rank of each of users is one, the precoding matrix may be constructed by combining $W_3(:,1)$, $W_3(:,2)$, $W_3(:,3)$, $W_3(:,4)$, $W_6(:,1)$, $W_6(:,2)$, $W_6(:,3)$, and $W_6(:,4)$. In this example, $W_k(:,n)$ denotes the $n^{th}$ column vector of $W_k$.

The codewords included in the above Table 2 may be expressed equivalent as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} -0.5000 \\ 0-0.5000i \\ 0.5000 \\ 0+0.5000i \end{matrix}$$

$$M_4 = \begin{matrix} -0.5000 \\ 0+0.5000i \\ 0.5000 \\ 0-0.5000i \end{matrix}$$

$$M_5 = \begin{matrix} 0.5000 \\ 0.3536+0.3536i \\ 0+0.5000i \\ -0.3536+0.3536i \end{matrix}$$

$$M_6 = \begin{matrix} 0.5000 \\ -0.3536+0.3536i \\ 0-0.5000i \\ 0.3536+0.3536i \end{matrix}$$

$$M_7 = \begin{matrix} 0.5000 \\ -0.3536-0.3536i \\ 0+0.5000i \\ 0.3536-0.3536i \end{matrix}$$

$$M_8 = \begin{matrix} 0.5000 \\ 0.3536-0.3536i \\ 0-0.5000i \\ -0.3536-0.3536i \end{matrix}$$

In this example, the codebook used in the multi-user MIMO communication system performing non-unitary precoding has a base station that includes four physical antennas. Codewords included in the codebook used in the multi-user MIMO communication system performing non-unitary precoding may be given by the following Table 3. In the multi-user MIMO communication system, a rank of each of users is 1:

| Transmit Codebook Index | Rank 1 |
|---|---|
| 1 | $C_{1,1} = W1(:,2)$ |
| 2 | $C_{2,1} = W1(:,3)$ |
| 3 | $C_{3,1} = W1(:,4)$ |

-continued

| Transmit Codebook Index | Rank 1 |
|---|---|
| 4 | $C_{4,1}=W2(:,2)$ |
| 5 | $C_{5,1}=W2(:,3)$ |
| 6 | $C_{6,1}=W2(:,4)$ |
| 7 | $C_{7,1}=W3(:,1)$ |
| 8 | $C_{8,1}=W4(:,1)$ |
| 9 | $C_{9,1}=W5(:,1)$ |
| 10 | $C_{10,1}=W5(:,2)$ |
| 11 | $C_{11,1}=W5(:,3)$ |
| 12 | $C_{12,1}=W5(:,4)$ |
| 13 | $C_{13,1}=W6(:,1)$ |
| 14 | $C_{14,1}=W6(:,2)$ |
| 15 | $C_{15,1}=W6(:,3)$ |
| 16 | $C_{16,1}=W6(:,4)$ |

The codewords included in the above Table 3 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 03536 + 0.3536i \\ 0 + 0.5000i \\ -0.3536 + 0.3536i \end{matrix}$$

$$C_{14,1} = \begin{matrix} 0.5000 \\ -03536 + 0.3536i \\ 0 - 0.5000i \\ 0.3536 + 0.3536i \end{matrix}$$

$$C_{15,1} = \begin{matrix} 0.5000 \\ -03536 - 0.3536i \\ 0 + 0.5000i \\ 0.3536 - 0.3536i \end{matrix}$$

$$C_{16,1} = \begin{matrix} 0.5000 \\ 03536 - 0.3536i \\ 0 - 0.5000i \\ -0.3536 - 0.3536i \end{matrix}$$

Illustrated below is a second example of a codebook used in a single user MIMO communication system or a multi-user MIMO communication system where a number of physical antennas of a base station is four.

In this example, a rotation matrix $U_{rot}$ and a QPSK DFT matrix may be defined as follows:

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}$$

and $$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix}.$$

Also, diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & j & -j \\ 1 & 1 & -1 & -1 \\ j & -j & -j & j \end{bmatrix}$$

-continued $$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & 1 & -1 \\ 1 & 1 & -1 & -1 \\ j & -j & -1 & 1 \end{bmatrix}$$

-continued $$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

When the number of physical antennas of the base station is four, matrices or codewords included in the codebook used in the single user MIMO communication system according to the second example may be given by the following Table 4:

| Transmit Codebook Index | Rank 1 | Rank 2 | Rank 3 | Rank 4 |
|---|---|---|---|---|
| 1 | $C_{1,1}$=W1(:,2) | $C_{1,2}$=W1(:,2 1) | $C_{1,3}$=W1(:,1 2 3) | $C_{1,4}$=W1(:,1 2 3 4) |
| 2 | $C_{2,1}$=W1(:,3) | $C_{2,2}$=W1(:,3 1) | $C_{2,3}$=W1(:,1 2 4) | $C_{2,4}$=W2(:,1 2 3 4) |
| 3 | $C_{3,1}$=W1(:,4) | $C_{3,2}$=W1(:,4 1) | $C_{3,3}$=W1(:,1 3 4) | $C_{3,4}$=W3(:,1 2 3 4) |
| 4 | $C_{4,1}$=W2(:,2) | $C_{4,2}$=W1(:,2 3) | $C_{4,3}$=W1(:,2 3 4) | $C_{4,4}$=W4(:,1 2 3 4) |
| 5 | $C_{5,1}$=W2(:,3) | $C_{5,2}$=W1(:,2 4) | $C_{5,3}$=W2(:,1 2 3) | $C_{5,4}$=W5(:,1 2 3 4) |
| 6 | $C_{6,1}$=W2(:,4) | $C_{6,2}$=W1(:,3 4) | $C_{6,3}$=W2(:,1 2 4) | $C_{6,4}$=W6(:,1 2 3 4) |
| 7 | $C_{7,1}$=W3(:,1) | $C_{7,2}$=W2(:,3 1) | $C_{7,3}$=W2(:,1 3 4) | n/a |
| 8 | $C_{8,1}$=W4(:,1) | $C_{8,2}$=W2(:,4 1) | $C_{8,3}$=W2(:,2 3 4) | n/a |
| 9 | $C_{9,1}$=W5(:,1) | $C_{9,2}$=W2(:,2 3) | $C_{9,3}$=W5(:,1 2 3) | n/a |
| 10 | $C_{10,1}$=W5(:,2) | $C_{10,2}$=W2(:,2 4) | $C_{10,3}$=W5(:,1 2 4) | n/a |
| 11 | $C_{11,1}$=W5(:,3) | $C_{11,2}$=W3(:,3 1) | $C_{11,3}$=W5(:,1 3 4) | n/a |
| 12 | $C_{12,1}$=W5(:,4) | $C_{12,2}$=W3(:,4 1) | $C_{12,3}$=W5(:,2 3 4) | n/a |
| 13 | $C_{13,1}$=W6(:,1) | $C_{13,2}$=W4(:,3 1) | $C_{13,3}$=W6(:,1 2 3) | n/a |
| 14 | $C_{14,1}$=W6(:,2) | $C_{14,2}$=W4(:,4 1) | $C_{14,3}$=W6(:,1 2 4) | n/a |
| 15 | $C_{15,1}$=W6(:,3) | $C_{15,2}$=W5(:,1 3) | $C_{15,3}$=W6(:,1 3 4) | n/a |
| 16 | $C_{16,1}$=W6(:,4) | $C_{16,2}$=W6(:,2 4) | $C_{16,3}$=W6(:,2 3 4) | n/a |

The codewords included in the above Table 4 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} 0.5000 \\ 0.5000 \\ -0.5000 \\ -0.5000 \end{matrix}$$

$$C_{3,1} = \begin{matrix} 0.5000 \\ -0.5000 \\ -0.5000 \\ 0.5000 \end{matrix}$$

-continued $$C_{4,1} = \begin{matrix} 0.5000 \\ 0 - 0.5000i \\ 0.5000 \\ 0 - 0.5000i \end{matrix}$$

$$C_{5,1} = \begin{matrix} 0.5000 \\ 0 + 0.5000i \\ -0.5000 \\ 0 - 0.5000i \end{matrix}$$

$$C_{6,1} = \begin{matrix} 0.5000 \\ 0 - 0.5000i \\ -0.5000 \\ 0 + 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 03536 + 0.3536i \\ 0 + 0.5000i \\ -0.3536 + 0.3536i \end{matrix}$$

-continued $$C_{14,1} = \begin{matrix} 0.5000 \\ -03536 + 0.3536i \\ 0 - 0.5000i \\ 0.3536 + 0.3536i \end{matrix}$$

$$C_{15,1} = \begin{matrix} 0.5000 \\ -03536 - 0.3536i \\ 0 + 0.5000i \\ 0.3536 - 0.3536i \end{matrix}$$

$$C_{16,1} = \begin{matrix} 0.5000 \\ 03536 - 0.3536i \\ 0 - 0.5000i \\ -0.3536 - 0.3536i \end{matrix}$$

$$C_{1,2} = \begin{matrix} 0.5000 & 0.5000 \\ -0.5000 & 0.5000 \\ 0.5000 & 0.5000 \\ -0.5000 & 0.5000 \end{matrix}$$

$$C_{2,2} = \begin{matrix} 0.5000 & 0.5000 \\ 0.5000 & 0.5000 \\ -0.5000 & 0.5000 \\ -0.5000 & 0.5000 \end{matrix}$$

$$C_{3,2} = \begin{matrix} 0.5000 & 0.5000 \\ -0.5000 & 0.5000 \\ -0.5000 & 0.5000 \\ 0.5000 & 0.5000 \end{matrix}$$

$$C_{4,2} = \begin{matrix} 0.5000 & 0.5000 \\ -0.5000 & 0.5000 \\ 0.5000 & -0.5000 \\ -0.5000 & -0.5000 \end{matrix}$$

$$C_{5,2} = \begin{matrix} 0.5000 & 0.5000 \\ -0.5000 & -0.5000 \\ 0.5000 & -0.5000 \\ -0.5000 & 0.5000 \end{matrix}$$

$$C_{6,2} = \begin{matrix} 0.5000 & 0.5000 \\ 0.5000 & -0.5000 \\ -0.5000 & -0.5000 \\ -0.5000 & 0.5000 \end{matrix}$$

$$C_{7,2} = \begin{matrix} 0.5000 & 0.5000 \\ 0 + 0.5000i & 0 + 0.5000i \\ -0.5000 & 0.5000 \\ 0 - 0.5000i & 0 + 0.5000i \end{matrix}$$

$$C_{8,2} = \begin{matrix} 0.5000 & 0.5000 \\ 0 - 0.5000i & 0 + 0.5000i \\ -0.5000 & 0.5000 \\ 0 + 0.5000i & 0 + 0.5000i \end{matrix}$$

$$C_{9,2} = \begin{bmatrix} 0.5000 & 0.5000 \\ 0-0.5000i & 0+0.5000i \\ 0.5000 & -0.5000 \\ 0-0.5000i & 0-0.5000i \end{bmatrix}$$

$$C_{10,2} = \begin{bmatrix} 0.5000 & 0.5000 \\ 0-0.5000i & 0-0.5000i \\ 0.5000 & -0.5000 \\ 0-0.5000i & 0+0.5000i \end{bmatrix}$$

$$C_{11,2} = \begin{bmatrix} 0.5000 & 0.5000 \\ 0+0.5000i & 0.5000 \\ -0.5000 & 0.5000 \\ 0-0.5000i & 0.5000 \end{bmatrix}$$

$$C_{12,2} = \begin{bmatrix} 0.5000 & 0.5000 \\ 0-0.5000i & 0.5000 \\ -0.5000 & 0.5000 \\ 0+0.5000i & 0.5000 \end{bmatrix}$$

$$C_{13,2} = \begin{bmatrix} 0.5000 & 0.5000 \\ 0.5000 & 0+0.5000i \\ -0.5000 & 0.5000 \\ -0.5000 & 0+0.5000i \end{bmatrix}$$

$$C_{14,2} = \begin{bmatrix} 0.5000 & 0.5000 \\ -0.5000 & 0+0.5000i \\ -0.5000 & 0.5000 \\ 0.5000 & 0+0.5000i \end{bmatrix}$$

$$C_{15,2} = \begin{bmatrix} 0.5000 & 0.5000 \\ 0.5000 & -0.5000 \\ 0.5000 & 0.5000 \\ -0.5000 & 0.5000 \end{bmatrix}$$

$$C_{16,2} = \begin{bmatrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{bmatrix}$$

$$C_{1,3} = \begin{bmatrix} 0.5000 & 0.5000 & 0.5000 \\ 0.5000 & -0.5000 & 0.5000 \\ 0.5000 & 0.5000 & -0.5000 \\ 0.5000 & -0.5000 & -0.5000 \end{bmatrix}$$

$$C_{2,3} = \begin{bmatrix} 0.5000 & 0.5000 & 0.5000 \\ 0.5000 & -0.5000 & -0.5000 \\ 0.5000 & 0.5000 & -0.5000 \\ 0.5000 & -0.5000 & 0.5000 \end{bmatrix}$$

-continued $$C_{3,3} = \begin{bmatrix} 0.5000 & 0.5000 & 0.5000 \\ 0.5000 & 0.5000 & -0.5000 \\ 0.5000 & -0.5000 & -0.5000 \\ 0.5000 & -0.5000 & 0.5000 \end{bmatrix}$$

$$C_{4,3} = \begin{bmatrix} 0.5000 & 0.5000 & 0.5000 \\ -0.5000 & 0.5000 & -0.5000 \\ 0.5000 & -0.5000 & -0.5000 \\ -0.5000 & -0.5000 & 0.5000 \end{bmatrix}$$

$$C_{5,3} = \begin{bmatrix} 0.5000 & 0.5000 & 0.5000 \\ 0+0.5000i & 0-0.5000i & 0+0.5000i \\ 0.5000 & 0.5000 & -0.5000 \\ 0+0.5000i & 0-0.5000i & 0-0.5000i \end{bmatrix}$$

$$C_{6,3} = \begin{bmatrix} 0.5000 & 0.5000 & 0.5000 \\ 0+0.5000i & 0-0.5000i & 0-0.5000i \\ 0.5000 & 0.5000 & -0.5000 \\ 0+0.5000i & 0-0.5000i & 0+0.5000i \end{bmatrix}$$

$$C_{7,3} = \begin{bmatrix} 0.5000 & 0.5000 & 0.5000 \\ 0+0.5000i & 0+0.5000i & 0-0.5000i \\ 0.5000 & -0.5000 & -0.5000 \\ 0+0.5000i & 0-0.5000i & 0+0.5000i \end{bmatrix}$$

$$C_{8,3} = \begin{bmatrix} 0.5000 & 0.5000 & 0.5000 \\ 0-0.5000i & 0+0.5000i & 0-0.5000i \\ 0.5000 & -0.5000 & -0.5000 \\ 0-0.5000i & 0-0.5000i & 0+0.5000i \end{bmatrix}$$

$$C_{9,3} = \begin{bmatrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{bmatrix}$$

$$C_{10,3} = \begin{bmatrix} 0.5000 & 0.5000 & 0.5000 \\ 0.5000 & 0+0.5000i & 0-0.5000i \\ 0.5000 & -0.5000 & -0.5000 \\ -0.5000 & 0+0.5000i & 0-0.5000i \end{bmatrix}$$

$$C_{11,3} = \begin{bmatrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{bmatrix}$$

$$C_{12,3} = \begin{bmatrix} 0.5000 & 0.5000 & 0.5000 \\ 0+0.5000i & -0.5000 & 0-0.5000i \\ -0.5000 & 0.5000 & -0.5000 \\ 0+0.5000i & 0.5000 & 0-0.5000i \end{bmatrix}$$

$$C_{13,3} = \begin{matrix} 0.5000 & 0.5000 & 0.5000 \\ 0.3536+0.3536i & -0.3536+0.3536i & -0.3536-0.3536i \\ 0+5000i & 0-0.5000i & 0+0.5000i \\ -0.3536+0.3536i & 0.3536+0.3536i & 0.3536-0.3536i \end{matrix}$$

$$C_{14,3} = \begin{matrix} 0.5000 & 0.5000 & 0.5000 \\ 0.3536+0.3536i & -0.3536+0.3536i & 0.3536-0.3536i \\ 0+5000i & 0-0.5000i & 0-0.5000i \\ -0.3536+0.3536i & 0.3536+0.3536i & -0.3536-0.3536i \end{matrix}$$

$$C_{15,3} = \begin{matrix} 0.5000 & 0.5000 & 0.5000 \\ 0.3536+0.3536i & -0.3536-0.3536i & 0.3536-0.3536i \\ 0+5000i & 0+0.5000i & 0-0.5000i \\ -0.3536+0.3536i & 0.3536-0.3536i & -0.3536-0.3536i \end{matrix}$$

$$C_{16,3} = \begin{matrix} 0.5000 & 0.5000 & 0.5000 \\ -0.3536+0.3536i & -0.3536-0.3536i & 0.3536-0.3536i \\ 0-5000i & 0+0.5000i & 0-0.5000i \\ 0.3536+0.3536i & 0.3536-0.3536i & -0.3536-0.3536i \end{matrix}$$

$$C_{1,4} = \begin{matrix} 0.5000 & 0.5000 & 0.5000 & 0.5000 \\ 0.5000 & -0.5000 & 0.5000 & -0.5000 \\ 0.5000 & 0.5000 & -0.5000 & -0.5000 \\ 0.5000 & -0.5000 & -0.5000 & 0.5000 \end{matrix}$$

$$C_{2,4} = \begin{matrix} 0.5000 & 0.5000 & 0.5000 & 0.5000 \\ 0+0.5000i & 0-0.5000i & 0+0.5000i & 0-0.5000i \\ 0.5000 & 0.5000 & -0.5000 & -0.5000 \\ 0+0.5000i & 0-0.5000i & 0-0.5000i & 0+0.5000i \end{matrix}$$

$$C_{3,4} = \begin{matrix} 0.5000 & 0.5000 & 0.5000 & 0.5000 \\ 0.5000 & -0.5000 & 0+0.5000i & 0-0.5000i \\ 0.5000 & 0.5000 & -0.5000 & -0.5000 \\ 0.5000 & -0.5000 & 0-0.5000i & 0+0.5000i \end{matrix}$$

$$C_{4,4} = \begin{matrix} 0.5000 & 0.5000 & 0.5000 & 0.5000 \\ 0+0.5000i & 0-0.5000i & 0.5000 & -0.5000 \\ 0.5000 & 0.5000 & -0.5000 & -0.5000 \\ 0+0.5000i & 0-0.5000i & -0.5000 & 0.5000 \end{matrix}$$

$$C_{5,4} = \begin{matrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{matrix}$$

$$C_{6,4} = \begin{matrix} 0.5000 & 0.5000 & 0.5000 & 0.5000 \\ 0.3536+0.3536i & -0.3536+0.3536i & -0.3536-0.3536i & 0.3536-0.3536i \\ 0+5000i & 0-0.5000i & 0+0.5000i & 0-0.5000i \\ -0.3536+0.3536i & 0.3536+0.3536i & 0.3536-0.3536i & -0.3536-0.3536i \end{matrix}$$

For the second example, where the number of physical antennas of the base station is four, the codebook used in the multi-user MIMO communication system according to the second example, may be designed by combining subsets of two matrices, for example, $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_6 = \mathrm{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

When the number of physical antennas of the base station is four, the matrices or the codewords included in the codebook used in the multi-user MIMO communication system according to the second example may be given by the following Table 5:

| Transmit Codebook Index | Rank 1 |
| --- | --- |
| 1 | $M_1$=W3(:,1) |
| 2 | $M_2$=W3(:,2) |
| 3 | $M_3$=W3(:,3) |
| 4 | $M_4$=W3(:,4) |
| 5 | $M_5$=W6(:,1) |
| 6 | $M_6$=W6(:,2) |
| 7 | $M_7$=W6(:,3) |
| 8 | $M_8$=W6(:,4) |

The codewords included in the above Table 5 may be expressed equivalently as follows:

$$M_1 = \begin{matrix} 0.5000 \\ 0.5000 \\ 0.5000 \\ 0.5000 \end{matrix}$$

-continued $$M_2 = \begin{matrix} 0.5000 \\ -0.5000 \\ 0.5000 \\ -0.5000 \end{matrix}$$

$$M_3 = \begin{matrix} -0.5000 \\ 0 - 0.5000i \\ 0.5000 \\ 0 + 0.5000i \end{matrix}$$

$$M_4 = \begin{matrix} -0.5000 \\ 0 + 0.5000i \\ 0.5000 \\ 0 - 0.5000i \end{matrix}$$

$$M_5 = \begin{matrix} 0.5000 \\ 0.3536 + 0.3536i \\ 0 + 0.5000i \\ -0.3536 + 0.3536i \end{matrix}$$

$$M_6 = \begin{matrix} 0.5000 \\ -0.3536 + 0.3536i \\ 0 - 0.5000i \\ 0.3536 + 0.3536i \end{matrix}$$

$$M_7 = \begin{matrix} 0.5000 \\ -0.3536 - 0.3536i \\ 0 + 0.5000i \\ 0.3536 - 0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

In this example, the codebook used in the multi-user MIMO communication system performing non-unitary precoding has a base station including four physical antennas.

Codewords included in the codebook used in the multi-user MIMO communication system performing non-unitary precoding may be given by the following Table 6:

| Transmit Codebook Index | Transmission Rank 1 |
|---|---|
| 1 | $C_{1,1}$=W1(:,2) |
| 2 | $C_{2,1}$=W1(:,3) |
| 3 | $C_{3,1}$=W1(:,4) |
| 4 | $C_{4,1}$=W2(:,2) |
| 5 | $C_{5,1}$=W2(:,3) |
| 6 | $C_{6,1}$=W2(:,4) |
| 7 | $C_{7,1}$=W3(:,1) |
| 8 | $C_{8,1}$=W4(:,1) |
| 9 | $C_{9,1}$=W5(:,1) |
| 10 | $C_{10,1}$=W5(:,2) |
| 11 | $C_{11,1}$=W5(:,3) |
| 12 | $C_{12,1}$=W5(:,4) |
| 13 | $C_{13,1}$=W6(:,1) |
| 14 | $C_{14,1}$=W6(:,2) |
| 15 | $C_{15,1}$=W6(:,3) |
| 16 | $C_{16,1}$=W6(:,4) |

The codewords included in the above Table 6 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} -0.5000 \\ 0 - 0.5000i \\ 0.5000 \\ 0 + 0.5000i \end{matrix}$$

$$C_{6,1} = \begin{matrix} -0.5000 \\ 0 + 0.5000i \\ 0.5000 \\ 0 - 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 03536 + 0.3536i \\ 0 + 0.5000i \\ -0.3536 + 0.3536i \end{matrix}$$

$$C_{14,1} = \begin{matrix} 0.5000 \\ -03536 + 0.3536i \\ 0 - 0.5000i \\ 0.3536 + 0.3536i \end{matrix}$$

$$C_{15,1} = \begin{matrix} 0.5000 \\ -03536 - 0.3536i \\ 0 + 0.5000i \\ 0.3536 - 0.3536i \end{matrix}$$

$$C_{16,1} = \begin{matrix} 0.5000 \\ 03536 - 0.3536i \\ 0 - 0.5000i \\ -0.3536 - 0.3536i \end{matrix}$$

A third example of a codebook used in a single user MIMO communication system or a multi-user MIMO communication system where the number of physical antennas of a base station is four is illustrated below.

In this example, a rotation matrix $U_{rot}$ and a QPSK DFT matrix may be defined as follows.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}$$

and $$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix}.$$

Also, diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix}$$

$$= 0.5 * \begin{bmatrix} 1 & 1 & -1 & -1 \\ 1 & -1 & -1 & 1 \\ 1 & 1 & 1 & 1 \\ 1 & -1 & 1 & -1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ j & -j & -j & j \\ 1 & 1 & 1 & 1 \\ j & -j & j & -j \end{bmatrix}$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix}$$

$$= 0.5 * \begin{bmatrix} 1 & 1 & -1 & -1 \\ j & -j & -1 & 1 \\ 1 & 1 & 1 & 1 \\ j & -j & 1 & -1 \end{bmatrix}$$

$$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the single user MIMO communication system according to the third example may be given by the following Table 7:

| Transmit Codebook Index | Rank 1 | Rank 2 | Rank 3 | Rank 4 |
|---|---|---|---|---|
| 1 | $C_{1,1}$=W1(:,2) | $C_{1,2}$=W1(:,12) | $C_{1,3}$=W1(:,1 2 3) | $C_{1,4}$=W1(:,1 2 3 4) |
| 2 | $C_{2,1}$=W1(:,3) | $C_{2,2}$=W1(:,13) | $C_{2,3}$=W1(:,1 2 4) | $C_{2,4}$=W2(:,1 2 3 4) |
| 3 | $C_{3,1}$=W1(:,4) | $C_{3,2}$=W1(:,14) | $C_{3,3}$=W1(:,1 3 4) | $C_{3,4}$=W3(:,1 2 3 4) |
| 4 | $C_{4,1}$=W2(:,2) | $C_{4,2}$=W1(:,23) | $C_{4,3}$=W1(:,2 3 4) | $C_{4,4}$=W4(:,1 2 3 4) |
| 5 | $C_{5,1}$=W2(:,3) | $C_{5,2}$=W1(:,24) | $C_{5,3}$=W2(:,1 2 3) | $C_{5,4}$=W5(:,1 2 3 4) |
| 6 | $C_{6,1}$=W2(:,4) | $C_{6,2}$=W1(:,34) | $C_{6,3}$=W2(:,1 2 4) | $C_{6,4}$=W6(:,1 2 3 4) |
| 7 | $C_{7,1}$=W3(:,1) | $C_{7,2}$=W2(:,13) | $C_{7,3}$=W2(:,1 3 4) | n/a |
| 8 | $C_{8,1}$=W4(:,1) | $C_{8,2}$=W2(:,14) | $C_{8,3}$=W2(:,2 3 4) | n/a |
| 9 | $C_{9,1}$=W5(:,1) | $C_{9,2}$=W2(:,23) | $C_{9,3}$=W5(:,1 2 3) | n/a |
| 10 | $C_{10,1}$=W5(:,2) | $C_{10,2}$=W2(:,24) | $C_{10,3}$=W5(:,1 2 4) | n/a |
| 11 | $C_{11,1}$=W5(:,3) | $C_{11,2}$=W3(:,13) | $C_{11,3}$=W5(:,1 3 4) | n/a |
| 12 | $C_{12,1}$=W5(:,4) | $C_{12,2}$=W3(:,14) | $C_{12,3}$=W5(:,2 3 4) | n/a |
| 13 | $C_{13,1}$=W6(:,1) | $C_{13,2}$=W4(:,13) | $C_{13,3}$=W6(:,1 2 3) | n/a |
| 14 | $C_{14,1}$=W6(:,2) | $C_{14,2}$=W4(:,14) | $C_{14,3}$=W6(:,1 2 4) | n/a |
| 15 | $C_{15,1}$=W6(:,3) | $C_{15,2}$=W5(:,13) | $C_{15,3}$=W6(:,1 3 4) | n/a |
| 16 | $C_{16,1}$=W6(:,4) | $C_{16,2}$=W6(:,24) | $C_{16,3}$=W6(:,2 3 4) | n/a |

The codewords included in the above Table 7 may be expressed equivalently as follows:

$$C_{1,1} = \begin{bmatrix} 0.5000 \\ -0.5000 \\ 0.5000 \\ -0.5000 \end{bmatrix}$$

$$C_{2,1} = \begin{bmatrix} -0.5000 \\ -0.5000 \\ 0.5000 \\ 0.5000 \end{bmatrix}$$

$$C_{3,1} = \begin{bmatrix} -0.5000 \\ 0.5000 \\ 0.5000 \\ -0.5000 \end{bmatrix}$$

$$C_{4,1} = \begin{bmatrix} 0.5000 \\ 0 - 0.5000i \\ 0.5000 \\ 0 - 0.5000i \end{bmatrix}$$

$$C_{5,1} = \begin{bmatrix} -0.5000 \\ 0 - 0.5000i \\ 0.5000 \\ 0 + 0.5000i \end{bmatrix}$$

$$C_{6,1} = \begin{bmatrix} -0.5000 \\ 0 + 0.5000i \\ 0.5000 \\ 0 - 0.5000i \end{bmatrix}$$

$$C_{7,1} = \begin{bmatrix} 0.5000 \\ 0.5000 \\ 0.5000 \\ 0.5000 \end{bmatrix}$$

$$C_{8,1} = \begin{bmatrix} 0.5000 \\ 0 + 0.5000i \\ 0.5000 \\ 0 + 0.5000i \end{bmatrix}$$

$$C_{9,1} = \begin{bmatrix} 0.5000 \\ 0.5000 \\ 0.5000 \\ -0.5000 \end{bmatrix}$$

$$C_{10,1} = \begin{bmatrix} 0.5000 \\ 0 + 0.5000i \\ -0.5000 \\ 0 + 0.5000i \end{bmatrix}$$

$$C_{11,1} = \begin{bmatrix} 0.5000 \\ -0.5000 \\ 0.5000 \\ 0.5000 \end{bmatrix}$$

$$C_{12,1} = \begin{bmatrix} 0.5000 \\ 0 - 0.5000i \\ -0.5000 \\ 0 - 0.5000i \end{bmatrix}$$

$$C_{13,1} = \begin{bmatrix} 0.5000 \\ 0.3536 + 0.3536i \\ 0 - 0.5000i \\ -0.3536 + 0.3536i \end{bmatrix}$$

$$C_{14,1} = \begin{bmatrix} 0.5000 \\ -0.3536 + 0.3536i \\ 0 - 0.5000i \\ 0.3536 + 0.3536i \end{bmatrix}$$

$$C_{15,1} = \begin{matrix} 0.5000 \\ -0.3536 - 0.3536i \\ 0 + 0.5000i \\ 0.3536 - 0.3536i \end{matrix}$$

$$C_{16,1} = \begin{matrix} 0.5000 \\ 0.3536 - 0.3536i \\ 0 - 0.5000i \\ -0.3536 - 0.3536i \end{matrix}$$

$$C_{1,2} = \begin{matrix} 0.5000 & 0.5000 \\ 0.5000 & -0.5000 \\ 0.5000 & 0.5000 \\ 0.5000 & -0.5000 \end{matrix}$$

$$C_{2,2} = \begin{matrix} 0.5000 & -0.5000 \\ 0.5000 & -0.5000 \\ 0.5000 & 0.5000 \\ 0.5000 & 0.5000 \end{matrix}$$

$$C_{3,2} = \begin{matrix} 0.5000 & -0.5000 \\ 0.5000 & 0.5000 \\ 0.5000 & 0.5000 \\ 0.5000 & -0.5000 \end{matrix}$$

$$C_{4,2} = \begin{matrix} 0.5000 & -0.5000 \\ -0.5000 & -0.5000 \\ 0.5000 & 0.5000 \\ -0.5000 & 0.5000 \end{matrix}$$

$$C_{5,2} = \begin{matrix} 0.5000 & -0.5000 \\ -0.5000 & 0.5000 \\ 0.5000 & 0.5000 \\ -0.5000 & -0.5000 \end{matrix}$$

$$C_{6,2} = \begin{matrix} -0.5000 & -0.5000 \\ -0.5000 & 0.5000 \\ 0.5000 & 0.5000 \\ 0.5000 & -0.5000 \end{matrix}$$

$$C_{7,2} = \begin{matrix} 0.5000 & -0.5000 \\ 0 + 0.5000i & 0 - 0.5000i \\ 0.5000 & 0.5000 \\ 0 + 0.5000i & 0 + 0.5000i \end{matrix}$$

$$C_{8,2} = \begin{matrix} 0.5000 & -0.5000 \\ 0 + 0.5000i & 0 + 0.5000i \\ 0.5000 & 0.5000 \\ 0 + 0.5000i & 0 - 0.5000i \end{matrix}$$

$$C_{9,2} = \begin{matrix} 0.5000 & -0.5000 \\ 0 - 0.5000i & 0 - 0.5000i \\ 0.5000 & 0.5000 \\ 0 - 0.5000i & 0 + 0.5000i \end{matrix}$$

$$C_{10,2} = \begin{matrix} 0.5000 & -0.5000 \\ 0 - 0.5000i & 0 + 0.5000i \\ 0.5000 & 0.5000 \\ 0 - 0.5000i & 0 - 0.5000i \end{matrix}$$

$$C_{11,2} = \begin{matrix} 0.5000 & -0.5000 \\ 0.5000 & 0 - 0.5000i \\ 0.5000 & 0.5000 \\ 0.5000 & 0 + 0.5000i \end{matrix}$$

$$C_{12,2} = \begin{matrix} 0.5000 & -0.5000 \\ 0.5000 & 0 + 0.5000i \\ 0.5000 & 0.5000 \\ 0.5000 & 0 - 0.5000i \end{matrix}$$

$$C_{13,2} = \begin{matrix} 0.5000 & -0.5000 \\ 0 + 0.5000i & -0.5000 \\ 0.5000 & 0.5000 \\ 0 + 0.5000i & 0.5000 \end{matrix}$$

$$C_{14,2} = \begin{matrix} 0.5000 & -0.5000 \\ 0 + 0.5000i & 0.5000 \\ 0.5000 & 0.5000 \\ 0 + 0.5000i & -0.5000 \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

$$C_{16,2} = \begin{matrix} 0.5000 & 0.5000 \\ -0.3536 + 0.3536i & 0.3536 - 0.3536i \\ 0 - 0.5000i & 0 - 0.5000i \\ 0.3536 + 0.3536i & -0.3536 - 0.3536i \end{matrix}$$

$$C_{1,3} = \begin{matrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{matrix}$$

$$C_{2,3} = \begin{matrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{matrix}$$

$$C_{3,3} = \begin{matrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{matrix}$$

$$C_{4,3} = \begin{matrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{matrix}$$

$$C_{5,3} = \begin{bmatrix} 0.5000 & 0.5000 & -0.5000 \\ 0+0.5000i & 0-0.5000i & 0-0.5000i \\ 0.5000 & 0.5000 & 0.5000 \\ 0+0.5000i & 0-0.5000i & 0+0.5000i \end{bmatrix}$$

$$C_{6,3} = \begin{bmatrix} 0.5000 & 0.5000 & -0.5000 \\ 0+0.5000i & 0-0.5000i & 0+0.5000i \\ 0.5000 & 0.5000 & 0.5000 \\ 0+0.5000i & 0-0.5000i & 0-0.5000i \end{bmatrix}$$

$$C_{7,3} = \begin{bmatrix} 0.5000 & -0.5000 & -0.5000 \\ 0+0.5000i & 0-0.5000i & 0+0.5000i \\ 0.5000 & 0.5000 & 0.5000 \\ 0+0.5000i & 0+0.5000i & 0-0.5000i \end{bmatrix}$$

$$C_{8,3} = \begin{bmatrix} 0.5000 & -0.5000 & -0.5000 \\ 0-0.5000i & 0-0.5000i & 0+0.5000i \\ 0.5000 & 0.5000 & 0.5000 \\ 0-0.5000i & 0+0.5000i & 0-0.5000i \end{bmatrix}$$

$$C_{9,3} = \begin{bmatrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{bmatrix}$$

$$C_{10,3} = \begin{bmatrix} 0.5000 & 0.5000 & 0.5000 \\ 0.5000 & 0+0.5000i & 0-0.5000i \\ 0.5000 & -0.5000 & -0.5000 \\ -0.5000 & 0+0.5000i & 0-0.5000i \end{bmatrix}$$

$$C_{11,3} = \begin{bmatrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{bmatrix}$$

$$C_{12,3} = \begin{bmatrix} 0.5000 & 0.5000 & 0.5000 \\ 0+0.5000i & -0.5000 & 0-0.5000i \\ -0.5000 & 0.5000 & -0.5000 \\ 0+0.5000i & 0.5000 & 0-0.5000i \end{bmatrix}$$

$$C_{13,3} = \begin{bmatrix} 0.5000 & 0.5000 & 0.5000 \\ 0.3536+0.3536i & -0.3536+0.3536i & -0.3536-0.3536i \\ 0+0.5000i & 0-0.5000i & 0+0.5000i \\ -0.3536+0.3536i & 0.3536+0.3536i & 0.3536-0.3536i \end{bmatrix}$$

$$C_{14,3} = \begin{bmatrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{bmatrix}$$

$$C_{15,3} = \begin{bmatrix} 0.5000 & 0.5000 & 0.5000 \\ 0.3536+0.3536i & -0.3536-0.3536i & 0.3536-0.3536i \\ 0+0.5000i & 0+0.5000i & 0-0.5000i \\ -0.3536+0.3536i & 0.3536-0.3536i & -0.3536-0.3536i \end{bmatrix}$$

$$C_{16,3} = \begin{bmatrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{bmatrix}$$

$$C_{1,4} = \begin{bmatrix} 0.5000 & 0.5000 & -0.5000 & -0.5000 \\ 0.5000 & -0.5000 & -0.5000 & 0.5000 \\ 0.5000 & 0.5000 & 0.5000 & 0.5000 \\ 0.5000 & -0.5000 & 0.5000 & -0.5000 \end{bmatrix}$$

$$C_{2,4} = \begin{bmatrix} 0.5000 & 0.5000 & -0.5000 & -0.5000 \\ 0+0.5000i & 0-0.5000i & 0-0.5000i & 0+0.5000i \\ 0.5000 & 0.5000 & 0.5000 & 0.5000 \\ 0+0.5000i & 0-0.5000i & 0+0.5000i & 0-0.5000i \end{bmatrix}$$

$$C_{3,4} = \begin{bmatrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{bmatrix}$$

$$C_{4,4} = \begin{bmatrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{bmatrix}$$

$$C_{5,4} = \begin{bmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{bmatrix}$$

-continued $$C_{6,4} = \begin{matrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{matrix}$$

For the third example, where the number of physical antennas of the base station is four, the codebook used in the multi-user MIMO communication system according to the third example may be designed by combining subsets of two matrices $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix}$$

$$= 0.5 * \begin{bmatrix} 1 & 1 & -1 & -1 \\ 1 & -1 & -j & j \\ 1 & 1 & 1 & 1 \\ 1 & -1 & j & -j \end{bmatrix}$$

$$W_6 = \mathrm{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

For example, where the number of physical antennas of the base station is four, the matrices or the codewords included in the codebook used in the multi-user MIMO communication system according to the third example may be expressed using a transmission rank, as given by the following Table 8:

| Transmit Codebook Index | Rank 1 |
|---|---|
| 1 | $M_1$=W3(:,1) |
| 2 | $M_2$=W3(:,2) |
| 3 | $M_3$=W3(:,3) |
| 4 | $M_4$=W3(:,4) |
| 5 | $M_5$=W6(:,1) |
| 6 | $M_6$=W6(:,2) |
| 7 | $M_7$=W6(:,3) |
| 8 | $M_8$=W6(:,4) |

The codewords included in the above Table 8 may be expressed equivalently as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} -0.5000 \\ 0-0.5000i \\ 0.5000 \\ 0+0.5000i \end{matrix}$$

$$M_4 = \begin{matrix} -0.5000 \\ 0+0.5000i \\ 0.5000 \\ 0-0.5000i \end{matrix}$$

$$M_5 = \begin{matrix} 0.5000 \\ 0.3536+0.3536i \\ 0+0.5000i \\ -0.3536+0.3536i \end{matrix}$$

$$M_6 = \begin{matrix} 0.5000 \\ -0.3536+0.3536i \\ 0-0.5000i \\ 0.3536+0.3536i \end{matrix}$$

$$M_7 = \begin{matrix} 0.5000 \\ -0.3536-0.3536i \\ 0+0.5000i \\ 0.3536-0.3536i \end{matrix}$$

$$M_8 = \begin{matrix} 0.5000 \\ 0.3536-0.3536i \\ 0-0.5000i \\ -0.3536-0.3536i \end{matrix}$$

In this example, the codebook used in the multi-user MIMO communication system performing non-unitary precoding has a base station that includes four physical antennas.

Codewords included in the codebook used in the multi-user MIMO communication system performing non-unitary precoding may be given by the following Table 9:

| Transmit Codebook Index | Transmission Rank 1 |
|---|---|
| 1 | $C_{1,1}$=W1(:,2) |
| 2 | $C_{2,1}$=W1(:,3) |
| 3 | $C_{3,1}$=W1(:,4) |

-continued

| Transmit Codebook Index | Transmission Rank 1 |
|---|---|
| 4 | $C_{4,1}=W2(;,2)$ |
| 5 | $C_{5,1}=W2(;,3)$ |
| 6 | $C_{6,1}=W2(;,4)$ |
| 7 | $C_{7,1}=W3(;,1)$ |
| 8 | $C_{8,1}=W4(;,1)$ |
| 9 | $C_{9,1}=W5(;,1)$ |
| 10 | $C_{10,1}=W5(;,2)$ |
| 11 | $C_{11,1}=W5(;,3)$ |
| 12 | $C_{12,1}=W5(;,4)$ |
| 13 | $C_{13,1}=W6(;,1)$ |
| 14 | $C_{14,1}=W6(;,2)$ |
| 15 | $C_{15,1}=W6(;,3)$ |
| 16 | $C_{16,1}=W6(;,4)$ |

The codewords included in the above Table 9 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} -0.5000 \\ -0.5000 \\ 0.5000 \\ 0.5000 \end{matrix}$$

$$C_{3,1} = \begin{matrix} -0.5000 \\ 0.5000 \\ 0.5000 \\ -0.5000 \end{matrix}$$

$$C_{4,1} = \begin{matrix} 0.5000 \\ 0-0.5000i \\ 0.5000 \\ 0-0.5000i \end{matrix}$$

$$C_{5,1} = \begin{matrix} -0.5000 \\ 0-0.5000i \\ 0.5000 \\ 0+0.5000i \end{matrix}$$

$$C_{6,1} = \begin{matrix} -0.5000 \\ 0+0.5000i \\ 0.5000 \\ 0-0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0+0.5000i \\ 0.5000 \\ 0+0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0+0.5000i \\ -0.5000 \\ 0+0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0-0.5000i \\ -0.5000 \\ 0-0.5000i \end{matrix}$$

$$C_{13,1} = \begin{matrix} 0.5000 \\ 0.3536+0.3536i \\ 0+0.5000i \\ -0.3536+0.3536i \end{matrix}$$

$$C_{14,1} = \begin{matrix} 0.5000 \\ -0.3536+0.3536i \\ 0-0.5000i \\ 0.3536+0.3536i \end{matrix}$$

$$C_{15,1} = \begin{matrix} 0.5000 \\ -0.3536-03536i \\ 0+0.5000i \\ 0.3536-0.3536i \end{matrix}$$

$$C_{16,1} = \begin{matrix} 0.5000 \\ 0.3536-0.3536i \\ 0-0.5000i \\ -0.3536-0.3536i \end{matrix}$$

A fourth example of a codebook used in a single user MIMO communication system or a multi-user MIMO communication system where a number of physical antennas of a base station is four, is illustrated below.

In this example, a rotation matrix $U_{rot}$ and a QPSK DFT matrix may be defined as follows.

$$U_{rot} = \frac{1}{\sqrt{2}} \begin{bmatrix} 1 & 0 & -1 & 0 \\ 0 & 1 & 0 & -1 \\ 1 & 0 & 1 & 0 \\ 0 & 1 & 0 & 1 \end{bmatrix}$$

and $$DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix}.$$

Also, diag(a, b, c, d) is a 4×4 matrix, and diagonal elements of diag(a, b, c, d) are a, b, c, and d, and all the remaining elements are zero.

Codewords $W_1$, $W_2$, $W_3$, $W_4$, $W_5$, and $W_6$ may be defined as follows:

$$W_1 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$W_2 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & j & -j \\ 1 & 1 & -1 & -1 \\ j & -j & -j & j \end{bmatrix}$$

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

$$W_4 = \frac{1}{\sqrt{2}} * U_{rot} * \begin{bmatrix} 1 & 1 & 0 & 0 \\ j & -j & 0 & 0 \\ 0 & 0 & 1 & 1 \\ 0 & 0 & 1 & -1 \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ j & -j & 1 & -1 \\ 1 & 1 & -1 & -1 \\ j & -j & -1 & 1 \end{bmatrix}$$

$$W_5 = \text{diag}(1, 1, 1, -1) * DFT$$

$$= 0.5 * \begin{bmatrix} 1 & 1 & 1 & 1 \\ 1 & j & -1 & -j \\ 1 & -1 & 1 & -1 \\ -1 & j & 1 & -j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

Where the number of physical antennas of the base station is four, the matrices or the codewords included in the codebook used in the single user MIMO communication system according to the fourth example may be given by the following Table 10:

| Transmit Codebook Index | Transmission Rank 1 | Transmission Rank 2 | Transmission Rank 3 | Transmission Rank 4 |
|---|---|---|---|---|
| 1 | $C_{1,1}$=W1(:,2) | $C_{1,2}$=W1(:,12) | $C_{1,3}$=W1(:,1 2 3) | $C_{1,4}$=W1(:,1 2 3 4) |
| 2 | $C_{2,1}$=W1(:,3) | $C_{2,2}$=W1(:,13) | $C_{2,3}$=W1(:,1 2 4) | $C_{2,4}$=W2(:,1 2 3 4) |
| 3 | $C_{3,1}$=W1(:,4) | $C_{3,2}$=W1(:,14) | $C_{3,3}$=W1(:,1 3 4) | $C_{3,4}$=W3(:,1 2 3 4) |
| 4 | $C_{4,1}$=W2(:,2) | $C_{4,2}$=W1(:,23) | $C_{4,3}$=W1(:,2 3 4) | $C_{4,4}$=W4(:,1 2 3 4) |
| 5 | $C_{5,1}$=W2(:,3) | $C_{5,2}$=W1(:,24) | $C_{5,3}$=W2(:,1 2 3) | $C_{5,4}$=W5(:,1 2 3 4) |
| 6 | $C_{6,1}$=W2(:,4) | $C_{6,2}$=W1(:,34) | $C_{6,3}$=W2(:,1 2 4) | $C_{6,4}$=W6(:,1 2 3 4) |
| 7 | $C_{7,1}$=W3(:,1) | $C_{7,2}$=W2(:,13) | $C_{7,3}$=W2(:,1 3 4) | n/a |
| 8 | $C_{8,1}$=W4(:,1) | $C_{8,2}$=W2(:,14) | $C_{8,3}$=W2(:,2 3 4) | n/a |
| 9 | $C_{9,1}$=W5(:,1) | $C_{9,2}$=W2(:,23) | $C_{9,3}$=W3(:,1 2 3) | n/a |
| 10 | $C_{10,1}$=W5(:,2) | $C_{10,2}$=W2(:,24) | $C_{10,3}$=W3(:,1 3 4) | n/a |
| 11 | $C_{11,1}$=W5(:,3) | $C_{11,2}$=W3(:,13) | $C_{11,3}$=W4(:,1 2 3) | n/a |
| 12 | $C_{12,1}$=W5(:,4) | $C_{12,2}$=W3(:,14) | $C_{12,3}$=W4(:,1 3 4) | n/a |
| 13 | $C_{13,1}$=W6(:,1) | $C_{13,2}$=W4(:,13) | $C_{13,3}$=W5(:,1 2 3) | n/a |
| 14 | $C_{14,1}$=W6(:,2) | $C_{14,2}$=W4(:,14) | $C_{14,3}$=W5(:,1 3 4) | n/a |
| 15 | $C_{15,1}$=W6(:,3) | $C_{15,2}$=W5(:,13) | $C_{15,3}$=W6(:,1 2 4) | n/a |
| 16 | $C_{16,1}$=W6(:,4) | $C_{16,2}$=W6(:,24) | $C_{16,3}$=W6(:,2 3 4) | n/a |

The codewords included in the above Table 10 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} 0.5000 \\ 0.5000 \\ -0.5000 \\ -0.5000 \end{matrix}$$

$$C_{3,1} = \begin{matrix} 0.5000 \\ -0.5000 \\ -0.5000 \\ 0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} 0.5000 \\ 0 + 0.5000i \\ -0.5000 \\ 0 - 0.5000i \end{matrix}$$

$$C_{6,1} = \begin{matrix} 0.5000 \\ 0 - 0.5000i \\ -0.5000 \\ 0 + 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

-continued $$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 0.3536 + 0.3536i \\ 0 + 0.5000i \\ -0.3536 + 0.3536i \end{matrix}$$

$$C_{14,1} = \begin{matrix} 0.5000 \\ -0.3536 + 0.3536i \\ 0 - 0.5000i \\ 0.3536 + 0.3536i \end{matrix}$$

$$C_{15,1} = \begin{matrix} 0.5000 \\ -0.3536 - 0.3536i \\ 0 + 0.5000i \\ 0.3536 - 0.3536i \end{matrix}$$

$$C_{16,1} = \begin{matrix} 0.5000 \\ 0.3536 - 0.3536i \\ 0 - 0.5000i \\ -0.3536 - 0.3536i \end{matrix}$$

$$C_{1,2} = \begin{matrix} 0.5000 & 0.5000 \\ -0.5000 & 0.5000 \\ 0.5000 & 0.5000 \\ -0.5000 & 0.5000 \end{matrix}$$

$$C_{2,2} = \begin{matrix} 0.5000 & 0.5000 \\ 0.5000 & 0.5000 \\ -0.5000 & 0.5000 \\ -0.5000 & 0.5000 \end{matrix}$$

$$C_{3,2} = \begin{matrix} 0.5000 & 0.5000 \\ -0.5000 & 0.5000 \\ -0.5000 & 0.5000 \\ 0.5000 & 0.5000 \end{matrix}$$

$$C_{4,2} = \begin{matrix} 0.5000 & 0.5000 \\ -0.5000 & 0.5000 \\ 0.5000 & -0.5000 \\ -0.5000 & -0.5000 \end{matrix}$$

$$C_{5,2} = \begin{matrix} 0.5000 & 0.5000 \\ -0.5000 & -0.5000 \\ 0.5000 & -0.5000 \\ -0.5000 & 0.5000 \end{matrix}$$

$$C_{6,2} = \begin{matrix} 0.5000 & 0.5000 \\ 0.5000 & -0.5000 \\ -0.5000 & -0.5000 \\ -0.5000 & 0.5000 \end{matrix}$$

$$C_{7,2} = \begin{matrix} 0.5000 & 0.5000 \\ 0+0.5000i & 0+0.5000i \\ -0.5000 & 0.5000 \\ 0-0.5000i & 0+0.5000i \end{matrix}$$

$$C_{8,2} = \begin{matrix} 0.5000 & 0.5000 \\ 0-0.5000i & 0+0.5000i \\ -0.5000 & 0.5000 \\ 0+0.5000i & 0+0.5000i \end{matrix}$$

$$C_{9,2} = \begin{matrix} 0.5000 & 0.5000 \\ 0-0.5000i & 0+0.5000i \\ 0.5000 & -0.5000 \\ 0-0.5000i & 0-0.5000i \end{matrix}$$

$$C_{10,2} = \begin{matrix} 0.5000 & 0.5000 \\ 0-0.5000i & 0-0.5000i \\ 0.5000 & -0.5000 \\ 0-0.5000i & 0+0.5000i \end{matrix}$$

$$C_{11,2} = \begin{matrix} 0.5000 & 0.5000 \\ 0+0.5000i & 0.5000 \\ -0.5000 & 0.5000 \\ 0-0.5000i & 0.5000 \end{matrix}$$

$$C_{12,2} = \begin{matrix} 0.5000 & 0.5000 \\ 0-0.5000i & 0.5000 \\ -0.5000 & 0.5000 \\ 0+0.5000i & 0.5000 \end{matrix}$$

$$C_{13,2} = \begin{matrix} 0.5000 & 0.5000 \\ 0.5000 & 0+0.5000i \\ -0.5000 & 0.5000 \\ -0.5000 & 0+0.5000i \end{matrix}$$

$$C_{14,2} = \begin{matrix} 0.5000 & 0.5000 \\ -0.5000 & 0+0.5000i \\ -0.5000 & 0.5000 \\ 0.5000 & 0+0.5000i \end{matrix}$$

$$C_{15,2} = \begin{matrix} 0.5000 & 0.5000 \\ 0.5000 & -0.5000 \\ 0.5000 & 0.5000 \\ -0.5000 & 0.5000 \end{matrix}$$

-continued $$C_{16,2} = \begin{matrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{matrix}$$

$$C_{1,3} = \begin{matrix} 0.5000 & 0.5000 & 0.5000 \\ 0.5000 & -0.5000 & 0.5000 \\ 0.5000 & 0.5000 & -0.5000 \\ 0.5000 & -0.5000 & -0.5000 \end{matrix}$$

$$C_{2,3} = \begin{matrix} 0.5000 & 0.5000 & 0.5000 \\ 0.5000 & -0.5000 & -0.5000 \\ 0.5000 & 0.5000 & -0.5000 \\ 0.5000 & -0.5000 & 0.5000 \end{matrix}$$

$$C_{3,3} = \begin{matrix} 0.5000 & 0.5000 & 0.5000 \\ 0.5000 & 0.5000 & -0.5000 \\ 0.5000 & -0.5000 & -0.5000 \\ 0.5000 & -0.5000 & 0.5000 \end{matrix}$$

$$C_{4,3} = \begin{matrix} 0.5000 & 0.5000 & 0.5000 \\ -0.5000 & 0.5000 & -0.5000 \\ 0.5000 & -0.5000 & -0.5000 \\ -0.5000 & -0.5000 & 0.5000 \end{matrix}$$

$$C_{5,3} = \begin{matrix} 0.5000 & 0.5000 & 0.5000 \\ 0+0.5000i & 0-0.5000i & 0+0.5000i \\ 0.5000 & 0.5000 & -0.5000 \\ 0+0.5000i & 0-0.5000i & 0-0.5000i \end{matrix}$$

$$C_{6,3} = \begin{matrix} 0.5000 & 0.5000 & 0.5000 \\ 0+0.5000i & 0-0.5000i & 0-0.5000i \\ 0.5000 & 0.5000 & -0.5000 \\ 0+0.5000i & 0-0.5000i & 0+0.5000i \end{matrix}$$

$$C_{7,3} = \begin{matrix} 0.5000 & 0.5000 & 0.5000 \\ 0+0.5000i & 0+0.5000i & 0-0.5000i \\ 0.5000 & -0.5000 & -0.5000 \\ 0+0.5000i & 0-0.5000i & 0+0.5000i \end{matrix}$$

$$C_{8,3} = \begin{matrix} 0.5000 & 0.5000 & 0.5000 \\ 0-0.5000i & 0+0.5000i & 0-0.5000i \\ 0.5000 & -0.5000 & -0.5000 \\ 0-0.5000i & 0-0.5000i & 0+0.5000i \end{matrix}$$

$$C_{9,3} = \begin{matrix} 0.5000 & 0.5000 & 0.5000 \\ 0.5000 & -0.5000 & 0+0.5000i \\ 0.5000 & 0.5000 & -0.5000 \\ 0.5000 & -0.5000 & 0-0.5000i \end{matrix}$$

$$C_{10,3} = \begin{bmatrix} 0.5000 & 0.5000 & 0.5000 \\ 0.5000 & 0+0.5000i & 0-0.5000i \\ 0.5000 & -0.5000 & -0.5000 \\ 0.5000 & 0-0.5000i & 0+0.5000i \end{bmatrix}$$

$$C_{11,3} = \begin{bmatrix} 0.5000 & 0.5000 & 0.5000 \\ 0+0.5000i & 0-0.5000i & 0.5000 \\ 0.5000 & 0.5000 & -0.5000 \\ 0+0.5000i & 0-0.5000i & -0.5000 \end{bmatrix}$$

$$C_{12,3} = \begin{bmatrix} 0.5000 & 0.5000 & 0.5000 \\ 0+0.5000i & 0.5000 & -0.5000 \\ 0.5000 & -0.5000 & -0.5000 \\ 0+0.5000i & -0.5000 & 0.5000 \end{bmatrix}$$

$$C_{13,3} = \begin{bmatrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{bmatrix}$$

$$C_{14,3} = \begin{bmatrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{bmatrix}$$

$$C_{15,3} = \begin{bmatrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{bmatrix}$$

$$C_{16,3} = \begin{bmatrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{bmatrix}$$

$$C_{1,4} = \begin{bmatrix} 0.5000 & 0.5000 & 0.5000 & 0.5000 \\ 0.5000 & -0.5000 & 0.5000 & -0.5000 \\ 0.5000 & 0.5000 & -0.5000 & -0.5000 \\ 0.5000 & -0.5000 & -0.5000 & 0.5000 \end{bmatrix}$$

$$C_{2,4} = \begin{bmatrix} 0.5000 & 0.5000 & 0.5000 & 0.5000 \\ 0+0.5000i & 0-0.5000i & 0+0.5000i & 0-0.5000i \\ 0.5000 & 0.5000 & -0.5000 & -0.5000 \\ 0+0.5000i & 0-0.5000i & 0-0.5000i & 0+0.5000i \end{bmatrix}$$

$$C_{3,4} = \begin{bmatrix} 0.5000 & 0.5000 & 0.5000 & 0.5000 \\ 0.5000 & -0.5000 & 0+0.5000i & 0-0.5000i \\ 0.5000 & 0.5000 & -0.5000 & -0.5000 \\ 0.5000 & -0.5000 & 0-0.5000i & 0+0.5000i \end{bmatrix}$$

$$C_{4,4} = \begin{bmatrix} 0.5000 & 0.5000 & 0.5000 & 0.5000 \\ 0+0.5000i & 0-0.5000i & 0.5000 & -0.5000 \\ 0.5000 & 0.5000 & -0.5000 & -0.5000 \\ 0+0.5000i & 0-0.5000i & -0.5000 & 0.5000 \end{bmatrix}$$

$$C_{5,4} = \begin{bmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{bmatrix}$$

$$C_{6,4} = \begin{bmatrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{bmatrix}$$

For the fourth example, where the number of physical antennas of the base station is four, the codebook used in the multi-user MIMO communication system according to the fourth example may be designed by combining subsets of two matrices $W_3$ and $W_6$ as follows:

$$W_3 = \frac{1}{\sqrt{2}} * U_{rot} * \begin{bmatrix} 1 & 1 & 0 & 0 \\ 1 & -1 & 0 & 0 \\ 0 & 0 & 1 & 1 \\ 0 & 0 & j & -j \end{bmatrix} * \begin{bmatrix} 1 & 0 & 0 & 0 \\ 0 & 1 & 0 & 0 \\ 0 & 0 & -1 & 0 \\ 0 & 0 & 0 & -1 \end{bmatrix}$$

$$= 0.5 * \begin{bmatrix} 1 & 1 & 1 & 1 \\ 1 & -1 & j & -j \\ 1 & 1 & -1 & -1 \\ 1 & -1 & -j & j \end{bmatrix}$$

$$W_6 = \text{diag}\left(1, \frac{(1+j)}{\sqrt{2}}, j, \frac{(-1+j)}{\sqrt{2}}\right) * DFT$$

$$= 0.5 * \begin{bmatrix} 1 & 1 & 1 & 1 \\ \frac{(1+j)}{\sqrt{2}} & \frac{(-1+j)}{\sqrt{2}} & \frac{(-1-j)}{\sqrt{2}} & \frac{(1-j)}{\sqrt{2}} \\ j & -j & j & -j \\ \frac{(-1+j)}{\sqrt{2}} & \frac{(1+j)}{\sqrt{2}} & \frac{(1-j)}{\sqrt{2}} & \frac{(-1-j)}{\sqrt{2}} \end{bmatrix}$$

Where the number of physical antennas of the base station is four, the matrices or the codewords included in the codebook used in the multi-user MIMO communication system according to the fourth example may be expressed using a transmission rank, as given by the following Table 11:

| Transmit Codebook Index | codeword used at the mobile station for quantization |
|---|---|
| 1 | $M_1 = W3(:,1)$ |
| 2 | $M_2 = W3(:,2)$ |
| 3 | $M_3 = W3(:,3)$ |
| 4 | $M_4 = W3(:,4)$ |
| 5 | $M_5 = W6(:,1)$ |
| 6 | $M_6 = W6(:,2)$ |

-continued

| Transmit Codebook Index | codeword used at the mobile station for quantization |
|---|---|
| 7 | $M_7 = W6(:,3)$ |
| 8 | $M_8 = W6(:,4)$ |

The codewords included in the above Table 11 may be expressed equivalently as follows:

$$M_1 = \begin{matrix} 0.5000 \\ 0.5000 \\ 0.5000 \\ 0.5000 \end{matrix}$$

$$M_2 = \begin{matrix} 0.5000 \\ -0.5000 \\ 0.5000 \\ -0.5000 \end{matrix}$$

$$M_3 = \begin{matrix} 0.5000 \\ 0 + 0.5000i \\ -0.5000 \\ 0 - 0.5000i \end{matrix}$$

$$M_4 = \begin{matrix} 0.5000 \\ 0 - 0.5000i \\ -0.5000 \\ 0 + 0.5000i \end{matrix}$$

$$M_5 = \begin{matrix} 0.5000 \\ 0.3536 + 0.3536i \\ 0 + 0.5000i \\ -0.3536 + 0.3536i \end{matrix}$$

$$M_6 = \begin{matrix} 0.5000 \\ -0.3536 + 0.3536i \\ 0 - 0.5000i \\ 0.3536 + 0.3536i \end{matrix}$$

$$M_7 = \begin{matrix} 0.5000 \\ -0.3536 - 0.3536i \\ 0 + 0.5000i \\ 0.3536 - 0.3536i \end{matrix}$$

$$M_8 = \begin{matrix} 0.5000 \\ 0.3536 - 0.3536i \\ 0 - 0.5000i \\ -0.3536 - 0.3536i \end{matrix}$$

In this example, the codebook used in the multi-user MIMO communication system performing non-unitary precoding has a base station that includes four physical antennas.

Codewords included in the codebook used in the multi-user MIMO communication system performing non-unitary precoding may be given by the following Table 12:

| Transmit Codebook Index | Transmission Rank 1 |
|---|---|
| 1 | $C_{1,1} = W1(:,2)$ |
| 2 | $C_{2,1} = W1(:,3)$ |
| 3 | $C_{3,1} = W1(:,4)$ |
| 4 | $C_{4,1} = W2(:,2)$ |
| 5 | $C_{5,1} = W2(:,3)$ |
| 6 | $C_{6,1} = W2(:,4)$ |
| 7 | $C_{7,1} = W3(:,1)$ |
| 8 | $C_{8,1} = W4(:,1)$ |
| 9 | $C_{9,1} = W5(:,1)$ |
| 10 | $C_{10,1} = W5(:,2)$ |
| 11 | $C_{11,1} = W5(:,3)$ |
| 12 | $C_{12,1} = W5(:,4)$ |
| 13 | $C_{13,1} = W6(:,1)$ |
| 14 | $C_{14,1} = W6(:,2)$ |
| 15 | $C_{15,1} = W6(:,3)$ |
| 16 | $C_{16,1} = W6(:,4)$ |

The codewords included in the above Table 12 may be expressed equivalently as follows:

$$C_{1,1} = \begin{matrix} 0.5000 \\ -0.5000 \\ 0.5000 \\ -0.5000 \end{matrix}$$

$$C_{2,1} = \begin{matrix} 0.5000 \\ 0.5000 \\ -0.5000 \\ -0.5000 \end{matrix}$$

$$C_{3,1} = \begin{matrix} 0.5000 \\ -0.5000 \\ -0.5000 \\ 0.5000 \end{matrix}$$

$$C_{4,1} = \begin{matrix} 0.5000 \\ 0 - 0.5000i \\ 0.5000 \\ 0 - 0.5000i \end{matrix}$$

$$C_{5,1} = \begin{matrix} 0.5000 \\ 0 + 0.5000i \\ -0.5000 \\ 0 - 0.5000i \end{matrix}$$

$$C_{6,1} = \begin{matrix} 0.5000 \\ 0 - 0.5000i \\ -0.5000 \\ 0 + 0.5000i \end{matrix}$$

$$C_{7,1} = \begin{matrix} 0.5000 \\ 0.5000 \\ 0.5000 \\ 0.5000 \end{matrix}$$

$$C_{8,1} = \begin{matrix} 0.5000 \\ 0 + 0.5000i \\ 0.5000 \\ 0 + 0.5000i \end{matrix}$$

$$C_{9,1} = \begin{matrix} 0.5000 \\ 0.5000 \\ 0.5000 \\ -0.5000 \end{matrix}$$

$$C_{10,1} = \begin{matrix} 0.5000 \\ 0 + 0.5000i \\ -0.5000 \\ 0 + 0.5000i \end{matrix}$$

$$C_{11,1} = \begin{matrix} 0.5000 \\ -0.5000 \\ 0.5000 \\ 0.5000 \end{matrix}$$

$$C_{12,1} = \begin{matrix} 0.5000 \\ 0 - 0.5000i \\ -0.5000 \\ 0 - 0.5000i \end{matrix}$$

$$C_{13,1} = \begin{matrix} 0.5000 \\ 03536 + 0.3536i \\ 0 + 0.5000i \\ -0.3536 + 0.3536i \end{matrix}$$

$$C_{14,1} = \begin{matrix} 0.5000 \\ -03536 + 0.3536i \\ 0 - 0.5000i \\ 0.3536 + 0.3536i \end{matrix}$$

$$C_{15,1} = \begin{matrix} 0.5000 \\ -03536 - 0.3536i \\ 0 + 0.5000i \\ 0.3536 - 0.3536i \end{matrix}$$

$$C_{16,1} = \begin{matrix} 0.5000 \\ 03536 - 0.3536i \\ 0 - 0.5000i \\ -0.3536 - 0.3536i \end{matrix}$$

Various examples of codebooks and codewords according to a transmission rank and a number of antennas of a base station in a single user MIMO communication system and a multi-user MIMO communication system, have been described above. The aforementioned codewords may be modified using various types of schemes or shapes, and thus are not limited to the aforementioned examples. A similar codebook, or an equivalent codebook may be obtained by changing the phase of the columns of the codewords, for example, by multiplying the columns of the codewords by a complex exponential. As another example, one may multiply the columns of the codewords by '−1'.

In some embodiments, the performance or the properties of the codebook may not change when the phases of the columns of the codewords have been changed. Accordingly, it is understood that a codebook generated by changing the phases of the columns of the codewords may be the same as a codebook including the original codewords prior to the changing of the phases. Also, it is understood that a codebook generated by swapping columns of the original codewords of a codebook may be the same as the codebook including the original codewords prior to the swapping. Specific values that are included in the codebook generated by changing the phases of the columns of the original codewords, or in the codebook generated by swapping the columns of the original codewords, will be omitted herein for conciseness.

A fifth example of a codebook used in a single user MIMO communication system where the number of physical antennas of a base station is eight is shown in the following Equation 7:

$$W_0 = \frac{1}{\sqrt{8}} \begin{bmatrix} 1 & 1 & 1 & 1 & 1 & 1 & 1 & 1 \\ 1 & e^{j\pi/4} & e^{j\pi/2} & e^{j3\pi/4} & e^{j\pi} & e^{j5\pi/4} & e^{j3\pi/2} & e^{j7\pi/4} \\ 1 & e^{j\pi/2} & e^{j\pi} & e^{j3\pi/2} & 1 & e^{j\pi/2} & e^{j\pi} & e^{j3\pi/2} \\ 1 & e^{j3\pi/4} & e^{j3\pi/2} & e^{j\pi/4} & e^{j\pi} & e^{j7\pi/4} & e^{j\pi/2} & e^{j5\pi/4} \\ 1 & e^{j\pi} & 1 & e^{j\pi} & 1 & e^{j\pi} & 1 & e^{j\pi} \\ 1 & e^{j5\pi/4} & e^{j\pi/2} & e^{j7\pi/4} & e^{j\pi} & e^{j\pi/4} & e^{j3\pi/2} & e^{j3\pi/4} \\ 1 & e^{j6\pi/4} & e^{j\pi} & e^{j\pi/2} & 1 & e^{j3\pi/2} & e^{j\pi} & e^{j\pi/2} \\ 1 & e^{j7\pi/4} & e^{j3\pi/2} & e^{j5\pi/4} & e^{j\pi} & e^{j3\pi/4} & e^{j\pi/2} & e^{j\pi/4} \end{bmatrix}. \quad (7)$$

Matrices included in the codebook for the single user MIMO communication system may be determined using a transmission rank, as given by the following Table 13:

| Transmit Codebook Index | Transmission Rank 1 | Transmission Rank 2 | Transmission Rank 3 | Transmission Rank 4 |
|---|---|---|---|---|
| 1 | C1,1 = W0(;,1) | C1,2 = W0(;,1 2) | C1,3 = W0(;,1 2 3) | C1,4 = W0(;,1 2 3 4) |
| 2 | C2,1 = W0(;,2) | C2,2 = W0(;,3 4) | C2,3 = W0(;,3 4 5) | C2,4 = W0(;,3 4 5 6) |
| 3 | C3,1 = W0(;,3) | C3,2 = W0(;,5 6) | C3,3 = W0(;,5 6 7) | C3,4 = W0(;,5 6 7 8) |
| 4 | C4,1 = W0(;,4) | C4,2 = W0(;,7 8) | C4,3 = W0(;,7 8 1) | C4,4 = W0(;,7 8 1 2) |
| 5 | C5,1 = W0(;,5) | C5,2 = W0(;,1 3) | C5,3 = W0(;,1 3 5) | C5,4 = W0(;,1 3 5 7) |

-continued

| Transmit Codebook Index | Transmission Rank 1 | Transmission Rank 2 | Transmission Rank 3 | Transmission Rank 4 |
|---|---|---|---|---|
| 6 | C6,1 = W0(:,6) | C6,2 = W0(:,2 4) | C6,3 = W0(:,2 4 6) | C6,4 = W0(:,2 4 6 8) |
| 7 | C7,1 = W0(:,7) | C7,2 = W0(:,5 7) | C7,3 = W0(:,5 7 1) | C7,4 = W0(:,5 7 1 4) |
| 8 | C8,1 = W0(:,8) | C8,2 = W0(:,6 8) | C8,3 = W0(:,6 8 2) | C8,4 = W0(:,6 8 2 3) |

Referring to the above Table 13, where the transmission rank is 4, the precoding matrix may be generated based on, for example, $W_0(:,1\ 2\ 3\ 4)$, $W_0(:,3\ 4\ 5\ 6)$, $W_0(:,5\ 6\ 7\ 8)$, $W_0(:,7\ 8\ 1\ 2)$, $W_0(:,1\ 3\ 5\ 7)$, $W_0(:,2\ 4\ 6\ 8)$, $W_0(:,5\ 7\ 1\ 4)$, and $W_0(:,6\ 8\ 2\ 3)$. In this example, $W_k(:,n\ m\ o\ p)$ denotes a matrix that includes an $n^{th}$ column vector, an $m^{th}$ column vector, an $o^{th}$ column vector, and a $p^{th}$ column vector of $W_k$.

Where the transmission rank is 3, the precoding matrix may be generated based on, for example, $W_0(:,1\ 2\ 3)$, $W_0(:,3\ 4\ 5)$, $W_0(:,5\ 6\ 7)$, $W_0(:,7\ 8\ 1)$, $W_0(:,1\ 3\ 5)$, $W_0(:,2\ 4\ 6)$, $W_o(:,5\ 7\ 1)$, and $W_0(:,6\ 8\ 2)$. In this example, $W_k(:,n\ m\ o)$ denotes a matrix that includes the $n^{th}$ column vector, the $m^{th}$ column vector, and the $o^{th}$ column vector of $W_k$.

Where the transmission rank is 2, the precoding matrix may be generated based on, for example, $W_0(:,1\ 2)$, $W_0(:,3\ 4)$, $W_0(:,5\ 6)$, $W_0(:,7\ 8)$, $W_0(:,1\ 3)$, $W_0(:,2\ 4)$, $W_0(:,5\ 7)$, and $W_0(:,6\ 8)$. In this example, $W_k(:,n\ m)$ denotes a matrix that includes the $n^{th}$ column vector and the $m^{th}$ column vector of $W_k$.

Where the transmission rank is 1, the precoding matrix may be generated based on, for example, $W_0(:,1)$, $W_0(:,2)$, $W_0(:,3)$, $W_0(:,4)$, $W_0(:,5)$, $W_0(:,6)$, $W_0(:,7)$, and $W_0(:,8)$. In this example, $W_k(:,n)$ denotes the $n^{th}$ column vector of $W_k$.

Design of a 6-Bit Codebook

According to an increase in a number of elements, for example, matrices or vectors, included in a codebook, a feedback overhead may increase whereas a quantization error may decrease. The above tables disclose 4-bit codebooks, each including a plurality of elements. Hereinafter, 6-bit codebooks, including a plurality of elements, for example, 64 elements, will be discussed.

1. First Scheme to Design a 6-Bit Codebook:

In this example, it is assumed that the number of physical antennas of a base station is four, a single user MIMO communication system uses the 4-bit codebooks disclosed in the above Table 1, and a multi-user MIMO communication system uses the codebooks disclosed in the above Table 2:

(1) Operation 1:

The following 4-bit codebook corresponding to the transmission rank 1 may be obtained from the 4-bit codebook disclosed in the above Table 1. In this example, the 4-bit codebook corresponding to the transmission rank 1, disclosed in the above Table 1, is referred to as a base codebook. The base codebook may be expressed using a language according to a numerical analysis program, for example, MATLAB®, manufactured by MathWorks Inc. of Natick, Mass. The numerical analysis language may be, for example, as follows:

```
rotation_matrix=1/sqrt(2)*[1,0,-1,0;0,1,0,-1;1,0,1,0;0,1,0,1];
W(:,:,1)=1/sqrt(2)*rotation_matrix*[1,1,0,0;1,-1,0,0;0,0,1,1;0,0,1,-1];
W(:,:,2)=1/sqrt(2)*rotation_matrix*[1,1,0,0;1i,-1i,0,0;0,0,1,1;0,0,1i,-1i];
W(:,:,3)=1/sqrt(2)*rotation_matrix*[1,1,0,0;1,-1,0,0;0,0,1,1;0,0,1i,-1i];
W(:,:,4)=1/sqrt(2)*rotation_matrix*[1,1,0,0;1i,-1i,0,0;0,0,1,1;0,0,1,-1];
DFT=1/sqrt(4)*[1,1,1,1;1,1i,-1,-1i;1,-1,1,-1;1,-1i,-1,1i];
W(:,:,5)=diag([1,1,1,-1])*DFT;
W(:,:,6)=diag([1,(1+1i)/sqrt(2),1i,(-1+1i)/sqrt(2)])*DFT;
base_cbk(:,1:4)=W(:,[1:4],1);
base_cbk(:,5:8)=W(:,[1:4],2);
base_cbk(:,9:12)=W(:,[1:4],5);
base_cbk(:,13:16)=W(:,[1:4],6);
```

In this example, 'rotation_matrix' denotes a rotation matrix $U_{rot}$, 'sqrt(x)' denotes $\sqrt{x}$, and 'DFT' denotes a QPSK DFT matrix. 'base_cbk(:,a:b)' denotes an $a^{th}$ element or vector, through a $b^{th}$ element or vector of the base codebook. 'W(:,[x:y],k)' denotes a column $x^{th}$ through a $y^{th}$ element among elements of $W_k$. For example, 'base_cbk(:,1:4)' denotes first, second, third, and fourth columns of the base codebook. 'W(:,[1:4],1)' denotes first, second, third, and fourth columns of $W_1$.

(2) Operation 2:

A local codebook local_cbk may be defined, for example, as follows:

| local_cbk= | | | |
|---|---|---|---|
| [0.2778+0.4157i | 0.2778+0.4157i | 0.2778+0.4157i | 0.2778+0.4157i |
| −0.0975+0.4904i | −0.4904−0.0975i | 0.0975−0.4904i | 0.4904+0.0975i |
| −0.0975+0.4904i | 0.0975−0.4904i | −0.0975+0.4904i | 0.0975−0.4904i |
| 0.4904+0.0975i | 0.0975−0.4904i | −0.4904−0.0975i | −0.0975+0.4904i]; |

(3) Operation 3:

The local codebook local_cbk may be scaled to obtain a localized codebook localized_cbk. An exemplary scaling process is as follows:

```
r=abs(local_cbk);
phase_local_cbk=local_cbk./r;
alpha= 0.5960
```

In this example, abs(local_cbk) denotes a magnitude of the local codebook local_cbk. The localized codebook localized_cbk may be expressed as follows:

```
localized_cbk=
[sqrt(1-alpha^2*(1-(r(1,1))^2))*phase_local_cbk(1,1),sqrt(1-
alpha^2*(1-(r(1,2))^2))*phase_local_cbk(1,2),sqrt(1-
alpha^2*(1-(r(1,3))^2))*phase_local_cbk(1,3),sqrt(1-
alpha^2*(1-(r(1,4))^2))*phase_local_cbk(1,4);...
alpha*r(2,1)*phase_local_cbk(2,1),alpha*r(2,2)*
phase_local_cbk(2,2),alpha*r(2,3)*phase_local_cb
k(2,3),alpha*r(2,4)*phase_local_cbk(2,4);...
alpha*r(3,1)*phase_local_cbk(3,1),alpha*r(3,2)*
phase_local_cbk(3,2),alpha*r(3,3)*phase_local_cb
k(3,3),alpha*r(3,4)*phase_local_cbk(3,4);...
alpha*r(4,1)*phase_local_cbk(4,1),alpha*r(4,2)*
phase_local_cbk(4,2),alpha*r(4,3)*phase_local_cb
k(4,3),alpha*r(4,4)*phase_local_cbk(4,4)];
```

Where the localized codebook localized_cbk is calculated through the aforementioned process, vectors of the localized codebook localized_cbk may be normalized, for example, through the following exemplary process:

```
for k=1:size(localized_cbk,2)
        localized_cbk(:,k)=localized_cbk(:,k)/norm(localized_cbk(:,k));
    end
```

(4) Operation 4:
A final codebook final_cbk may be obtained by rotating the normalized localized codebook localized_cbk around the base codebook, for example, through the following exemplary process:

```
for k=1:16
    [U,S,V]=svd(base_cbk(:,k)); %, where a singular value decomposition (SVD) is performed
with respect to the elements of the base codebook.
    R=U'*V; % U'*V*base_cbk(:,1,k)=[1;0;0;0]. % , where R denotes a rotation matrix that rotates
the normalized localized codebook localized_cbk around the base codebook.
    rotated_localized=R'*localized_cbk(:,1:3);%, where rotated_localized is obtained by rotating
localized_cbk, and only first three vectors of localized_cbk are rotated.
    final_cbk(:,(k-1)*4+1:k*4)=[base_cbk(:,k),rotated_localized]; %, where the base codebook is
maintained as a centroid and the base codebook is included in a final 6-bit codebook
        end;
```

The final 6-bit codebook final_cbk_opt may be generated as follows through the aforementioned operations 1 through 4. The final 6-bit codebook final_cbk_opt may include 64 column vectors.

final_cbk_opt =

Columns 1 through 4

| | | | |
|---|---|---|---|
| 0.5000 | 0.3260 + 0.6774$i$ | 0.1499 + 0.0347$i$ | 0.0918 + 0.3270$i$ |
| 0.5000 | 0.3254 + 0.1709$i$ | 0.5009 + 0.3071$i$ | 0.1311 + 0.6387$i$ |
| 0.5000 | 0.3254 + 0.1709$i$ | 0.1505 + 0.5412$i$ | 0.2473 + 0.0541$i$ |
| 0.5000 | −0.0250 + 0.4051$i$ | 0.1505 + 0.5412$i$ | 0.4815 + 0.4045$i$ |

Columns 5 through 8

| | | | |
|---|---|---|---|
| 0.5000 | 0.0918 + 0.3270$i$ | 0.3841 + 0.3851$i$ | 0.3260 + 0.6774$i$ |
| −0.5000 | −0.1311 − 0.6387$i$ | 0.0056 − 0.3076$i$ | −0.3254 − 0.1709$i$ |
| 0.5000 | 0.2473 + 0.0541$i$ | 0.2285 + 0.6580$i$ | 0.3254 + 0.1709$i$ |
| −0.5000 | −0.4815 − 0.4045$i$ | −0.3448 − 0.0735$i$ | 0.0250 − 0.4051$i$ |

Columns 9 through 12

| | | | |
|---|---|---|---|
| −0.5000 | −0.0918 − 0.3270$i$ | −0.0337 − 0.6193$i$ | −0.4422 − 0.0928$i$ |
| −0.5000 | −0.2473 − 0.0541$i$ | −0.4621 − 0.5019$i$ | −0.2479 − 0.5606$i$ |
| 0.5000 | 0.1311 + 0.6387$i$ | 0.2280 + 0.1515$i$ | 0.2479 + 0.5606$i$ |
| 0.5000 | 0.4815 + 0.4045$i$ | 0.2280 + 0.1515$i$ | 0.0137 + 0.2102$i$ |

Columns 13 through 16

| | | | |
|---|---|---|---|
| −0.5000 | −0.4422 − 0.0928$i$ | −0.3841 − 0.3851$i$ | −0.0918 − 0.3270$i$ |
| 0.5000 | 0.2479 + 0.5606$i$ | −0.0056 + 0.3076$i$ | 0.2473 + 0.0541$i$ |
| 0.5000 | 0.2479 + 0.5606$i$ | 0.3448 + 0.0735$i$ | 0.1311 + 0.6387$i$ |
| −0.5000 | −0.0137 − 0.2102$i$ | −0.2285 − 0.6580$i$ | −0.4815 − 0.4045$i$ |

Columns 17 through 20

| | | | |
|---|---|---|---|
| 0.5000 | 0.3841 + 0.3851$i$ | 0.0918 + 0.3270$i$ | 0.337 + 0.6193$i$ |
| 0 + 0.5000$i$ | −0.3076 − 0.0056$i$ | −0.0541 + 0.2473$i$ | −0.5019 + 0.4621$i$ |
| 0.5000 | 0.3448 + 0.0735$i$ | 0.1311 + 0.6387$i$ | 0.2280 + 0.1515$i$ |
| 0 + 0.5000$i$ | −0.6580 + 0.2285$i$ | −0.4045 + 0.4815$i$ | −0.1515 + 0.2280$i$ |

-continued

Columns 21 through 24

| | | | |
|---|---|---|---|
| 0.5000 | 0.0337 + 0.6193i | 0.4422 + 0.0928i | 0.3841 + 0.3851i |
| 0 − 0.5000i | 0.5019 − 0.4621i | 0.5606 − 0.2479i | 0.3076 + 0.0056i |
| 0.5000 | 0.2280 + 0.1515i | 0.2479 + 0.5606i | 0.3448 + 0.0735i |
| 0 − 0.5000i | 0.1515 − 0.2280i | 0.2102 − 0.0137i | 0.6580 − 0.2285i |

Columns 25 through 28

| | | | |
|---|---|---|---|
| −0.5000 | −0.3841 − 0.3851i | −0.3260 − 0.6774i | −0.1499 − 0.0347i |
| 0 − 0.5000i | 0.3076 + 0.0056i | 0.1709 − 0.3254i | 0.3071 − 0.5009i |
| 0.5000 | 0.2285 + 0.6580i | 0.3254 + 0.1709i | 0.1505 + 0.5412i |
| 0 + 0.5000i | −0.0735 + 0.3448i | −0.4051 − 0.0250i | −0.5412 + 0.1505i |

Columns 29 through 32

| | | | |
|---|---|---|---|
| −0.5000 | −0.1499 − 0.0347i | −0.0918 − 0.3270i | −0.3841 − 0.3851i |
| 0 + 0.5000i | −0.3071 + 0.5009i | −0.6387 + 0.1311i | −0.3076 − 0.0056i |
| 0.5000 | 0.1505 + 0.5412i | 0.2473 + 0.0541i | 0.2285 + 0.6580i |
| 0 − 0.5000i | 0.5412 − 0.1505i | 0.4045 − 0.4815i | 0.0735 − 0.3448i |

Columns 33 through 36

| | | | |
|---|---|---|---|
| 0.5000 | 0.0337 + 0.6193i | 0.0918 + 0.3270i | 0.3841 + 0.3851i |
| 0.5000 | 0.2280 + 0.1515i | 0.4815 + 0.4045i | 0.2285 + 0.6580i |
| 0.5000 | 0.2280 + 0.1515i | 0.1311 + 0.6387i | 0.3448 + 0.0735i |
| −0.5000 | −0.4621 − 05019i | −0.2473 − 0.0541i | 0.0056 − 0.3076i |

Columns 37 through 40

| | | | |
|---|---|---|---|
| 0.5000 | 0.4422 + 0.0928i | 0.0337 + 0.6193i | 0.0918 + 0.3270i |
| 0 + 0.5000i | −0.2102 + 0.0137i | −0.1515 + 0.2280i | −0.4045 + 0.4815i |
| −0.5000 | −0.2479 − 0.5606i | −0.2280 − 0.1515i | −0.1311 − 06387i |
| 0 + 0.5000i | −0.5606 + 0.2479i | −0.5019 + 0.4621i | −0.0541 + 0.2473i |

Columns 41 through 44

| | | | |
|---|---|---|---|
| 0.5000 | 0.3841 + 0.3851i | 0.4422 + 0.0928i | 0.0337 + 0.6193i |
| −0.5000 | −0.2285 − 0.6580i | −0.0137 − 0.2102i | −0.2280 − 01515i |
| 0.5000 | 0.3448 + 0.0735i | 0.2479 + 0.5606i | 0.2280 + 0.1515i |
| 0.5000 | −0.0056 + 0.3076i | 0.2479 + 0.5606i | 0.4621 + 0.5019i |

Columns 45 through 48

| | | | |
|---|---|---|---|
| 0.5000 | 0.0918 + 0.3270i | 0.3841 + 0.3851i | 0.4422 + 0.0928i |
| 0 − 0.5000i | 0.4045 − 0.4815i | 0.6580 − 0.2285i | 0.2102 − 0.0137i |
| −0.5000 | −0.1311 − 0.6387i | −0.3448 − 0.0735i | −0.2479 − 0.5606i |
| 0 − 0.5000i | 0.0541 − 0.2473i | 0.3076 + 0.0056i | 0.5606 − 0.2479i |

Columns 49 through 52

| | | | |
|---|---|---|---|
| 0.5000 | 0.3841 + 0.3851i | −0.1560 + 0.4926i | 0.3841 + 0.3851i |
| 0.3536 + 0.3536i | 0.0022 + 0.1690i | 0.0837 + 0.4175i | −0.1140 + 0.7536i |
| 0 + 0.5000i | −0.3076 − 0.0056i | −0.4597 + 0.3989i | −0.3076 − 0.0056i |
| −0.3536 + 0.3536i | −0.7536 − 0.1140i | −0.4175 + 0.0837i | −0.1690 + 0.0022i |

Columns 53 through 56

| | | | |
|---|---|---|---|
| 0.5000 | 0.3396 + 0.1614i | 0.3841 + 0.3851i | −0.1560 + 0.4926i |
| −0.3536 + 0.3536i | −03400 − 0.3060i | −0.1690 + 0.0022i | −0.4175 + 0.0837i |
| 0 − 0.5000i | 0.3493 − 0.5641i | 0.3076 + 0.0056i | 0.4597 − 0.3989i |
| 0.3536 + 0.3536i | −0.3060 + 0.3400i | −0.1140 + 0.7536i | 0.0837 + 0.4175i |

Columns 57 through 60

| | | | |
|---|---|---|---|
| 0.5000 | 0.3841 + 0.3851i | 0.3396 + 0.1614i | 0.3841 + 0.3851i |
| −0.3536 − 0.3536i | 0.1140 − 0.7536i | 0.3060 − 0.3400i | −0.0022 − 0.1690i |
| 0 + 0.5000i | −0.3076 − 0.0056i | −0.3493 + 0.5641i | −0.3076 − 0.0056i |
| 0.3536 − 0.3536i | 0.1690 − 0.0022i | 0.3400 + 0.3060i | 0.7536 + 0.1140i |

Columns 61 through 64

| | | | |
|---|---|---|---|
| 0.5000 | −0.1560 + 0.4926i | 03841 + 0.3851i | 0.3396 + 0.1614i |
| 0.3536 − 0.3536i | 0.4175 − 0.0837i | 0.7536 + 0.1140i | 0.3400 + 0.3060i |
| 0 − 0.5000i | 0.4597 − 0.3989i | 0.3076 + 0.0056i | 0.3493 − 0.5641i |
| −0.3536 − 0.3536i | −0.0837 − 0.4175i | −0.0022 − 0.1690i | 0.3060 − 0.3400i |

2. Second Scheme to Design a 6-Bit Codebook:

(1) Operation 1:

Like the first scheme to design the 6-bit codebook, a base codebook may be designed, for example, as follows:

```
rotation_matrix=1/sqrt(2)*[1,0,-1,0;0,1,0,-1;1,0,1,0;0,1,0,1];
W(:,:,1)=1/sqrt(2)*rotation_matrix*[1,1,0,0;1,-1,0,0;0,0,1,1;0,0,1,-1];
W(:,:,2)=1/sqrt(2)*rotation_matrix*[1,1,0,0;1i,-1i,0,0;0,0,1,1;0,0,1i,-1i];
W(:,:,3)=1/sqrt(2)*rotation_matrix*[1,1,0,0;1,-1,0,0;0,0,1,1;0,0,1i,-1i];
W(:,:,4)=1/sqrt(2)*rotation_matrix*[1,1,0,0;1i,-1i,0,0;0,0,1,1;0,0,1,-1];
DFT=1/sqrt(4)*[1,1,1,1;1,1i,-1,-1i;1,-1,1,-1;1,-1i,-1,1i];
W(:,:,5)=diag([1,1,1,-1])*DFT;
W(:,:,6)=diag([1,(1+1i)/sqrt(2),1i,(-1+1i)/sqrt(2)])*DFT;
base_cbk(:,1:4)=W(:,[1:4],1);
base_cbk(:,5:8)=W(:,[1:4],2);
base_cbk(:,9:12)=W(:,[1:4],5);
base_cbk(:,13:16)=W(:,[1:4],6);
```

(2) Operation 2:

A local codebook local_cbk may be defined, for example, as follows:

$$local\_cbk = \begin{bmatrix} 0.2778+ & 0.2778+ & 0.2778+ & 0.2778+ \\ 0.4157i & 0.4157i & 0.4157i & 0.4157i \\ 0.0000+ & -0.5000+ & -0.0000- & 0.5000- \\ 0.5000i & 0.0000i & 0.5000i & 0.0000i \\ -0.2778+ & 0.2778- & -0.2778+ & 0.2778- \\ 0.4157i & 0.4157i & 0.4157i & 0.4157i \\ 0.5000 & 0-0.5000i & -0.5000 & 0+0.5000i \end{bmatrix};$$

(3) Operation 3:

The local codebook local_cbk may be scaled to obtain a localized codebook localized_cbk. An exemplary scaling process is as follows:

```
r=abs(local_cbk);
phase_local_cbk=local_cbk./r;
alpha=0.5716
```

The localized codebook localized_cbk may be expressed, for example, as follows:

```
localized_cbk=
[sqrt(1-alpha^2*(1-(r(1,1))^2))*phase_local_cbk(1,1),sqrt(1-
alpha^2*(1-(r(1,2))^2))*phase_local_cbk(1,2),sqrt(1-
alpha^2*(1-(r(1,3))^2))*phase_local_cbk(1,3),sqrt(1-
alpha^2*(1-(r(1,4))^2))*phase_local_cbk(1,4);...
alpha*r(2,1)*phase_local_cbk(2,1),alpha*r(2,2)*
phase_local_cbk(2,2),alpha*r(2,3)*phase_local_cb
k(2,3),alpha*r(2,4)*phase_local_cbk(2,4);...
alpha*r(3,1)*phase_local_cbk(3,1),alpha*r(3,2)*
phase_local_cbk(3,2),alpha*r(3,3)*phase_local_cb
k(3,3),alpha*r(3,4)*phase_local_cbk(3,4);...
alpha*r(4,1)*phase_local_cbk(4,1),alpha*r(4,2)*
phase_local_cbk(4,2),alpha*r(4,3)*phase_local_cb
k(4,3),alpha*r(4,4)*phase_local_cbk(4,4)];
```

Where the localized codebook localized_cbk is calculated through the aforementioned process, vectors of the localized codebook localized_cbk may be normalized, for example, through the following exemplary process:

```
for k=1:size(localized_cbk,2)
  localized_cbk(:,k)=localized_cbk(:,k)/norm(localized_cbk(:,k));
end
```

(4) Operation 4:

A final codebook final_cbk may be obtained by rotating the normalized localized codebook localized_cbk around the base codebook, for example, through the following exemplary process:

```
R=U'*V; % U'*V*base_cbk(:,1,k)=[1;0;0;0]. %, where R denotes
a rotation matrix that rotates the normalized localized codebook
localized_cbk around the base codebook.
  rotated_localized=R'*localized_cbk(:,1:3);%, where
rotated_localized is obtained by rotating
localized_cbk, and only first three vectors of
localized_cbk are rotated.
  final_cbk(:,(k-1)*4+1:k*4)=[base_cbk(:,k),rotated_localized];
%, where the base codebook is maintained as a centroid and the base
codebook is included in a final 6-bit codebook.
  end;
```

The final 6-bit codebook final_cbk_opt may be generated as follows through the aforementioned operations 1 through 4. The final 6-bit codebook final_cbk_opt may include 64 column vectors.

final_cbk_opt =

Columns 1 through 4

| 0.5000 | 0.3049 + 0.6229i | 0.1779 + 0.0995i | 0.0919 + 0.3371i |
| 0.5000 | 0.2626 + 0.1626i | 0.5060 + 0.2740i | 0.1673 + 0.6390i |
| 0.5000 | 0.4213 + 0.2108i | 0.0614 + 0.5116i | 0.3261 + 0.1156i |
| 0.5000 | −0.0232 + 0.4484i | 0.2202 + 0.5598i | 0.4531 + 0.3532i |

Columns 5 through 8

| 0.5000 | 0.0919 + 03371i | 0.4637 + 0.3853i | 0.3049 + 0.6229i |
| −0.5000 | −0.1673 − 06390i | −0.0297 − 03692i | −0.2626 − 0.1626i |
| 0.5000 | 0.3261 + 0.1156i | 0.1567 + 0.6069i | 0.4213 + 0.2108i |
| −0.5000 | −0.4531 − 0.3532i | −0.3155 − 0.0834i | 0.0232 − 0.4484i |

Columns 9 through 12

| −0.5000 | −0.1779 − 0.3853i | −0.0191 − 0.6229i | −0.4637 − 0.0995i |
| −0.5000 | −0.2202 − 0.0834i | −0.4531 − 0.4484i | −0.3155 − 0.5598i |
| 0.5000 | 0.0614 + 0.6069i | 0.3261 + 0.2108i | 0.1567 + 0.5116i |
| 0.5000 | 0.5060 + 0.3692i | 0.1673 + 0.1626i | 0.0297 + 0.2740i |

Columns 13 through 16

| −0.5000 | −0.4637 − 0.0995i | −0.3049 − 03371i | −0.1779 − 03853i |
| 0.5000 | 0.3155 + 0.5598i | −0.0232 + 0.3532i | 0.2202 + 0.0834i |
| 0.5000 | 0.1567 + 0.5116i | 0.4213 + 0.1156i | 0.0614 + 0.6069i |
| −0.5000 | −0.0297 − 0.2740i | −0.2626 − 0.6390i | −0.5060 − 0.3692i |

Columns 17 through 20

| | | | |
|---|---|---|---|
| 0.5000 | 0.3049 + 0.3371$i$ | 0.1779 + 0.3853$i$ | 0.0191 + 06229$i$ |
| 0 + 0.5000$i$ | −0.3532 − 0.0232$i$ | −0.0834 + 0.2202$i$ | −0.4484 + 0.4531$i$ |
| 0.5000 | 0.4213 + 0.1156$i$ | 0.0614 + 0.6069$i$ | 0.3261 + 0.2108$i$ |
| 0 + 0.5000$i$ | −0.6390 + 0.2626$i$ | −0.3692 + 0.5060$i$ | −0.1626 + 0.1673$i$ |

Columns 21 through 24

| | | | |
|---|---|---|---|
| 0.5000 | 0.0191 + 0.6229$i$ | 0.4637 + 0.0995$i$ | 0.3049 + 0.3371$i$ |
| 0 − 0.5000$i$ | 0.4484 − 0.4531$i$ | 0.5598 − 0.3155$i$ | 0.3532 + 0.0232$i$ |
| 0.5000 | 0.3261 + 0.2108$i$ | 0.1567 + 0.5116$i$ | 0.4213 + 0.1156$i$ |
| 0 − 0.5000$i$ | 0.1626 − 0.1673$i$ | 0.2740 − 0.0297$i$ | 0.6390 − 0.2626$i$ |

Columns 25 through 28

| | | | |
|---|---|---|---|
| −0.5000 | −0.4637 − 0.3853$i$ | −0.3049 − 0.6229$i$ | −0.1779 − 0.0995$i$ |
| 0 − 0.5000$i$ | 0.3692 − 0.0297$i$ | 0.1626 − 0.2626$i$ | 0.2740 − 0.5060$i$ |
| 0.5000 | 0.1567 + 0.6069$i$ | 0.4213 + 0.2108$i$ | 0.0614 + 0.5116$i$ |
| 0 + 0.5000$i$ | −0.0834 + 0.3155$i$ | −0.4484 − 0.0232$i$ | −0.5598 + 0.2202$i$ |

Columns 33 through 36

| | | | |
|---|---|---|---|
| 0.5000 | 0.0191 + 0.6229$i$ | 0.1779 + 0.3853$i$ | 0.3049 + 0.3371$i$ |
| 0.5000 | 0.1673 + 0.1626$i$ | 0.5060 + 0.3692$i$ | 0.2626 + 0.6390$i$ |
| 0.5000 | 0.3261 + 0.2108$i$ | 0.0614 + 0.6069$i$ | 0.4213 + 0.1156$i$ |
| −0.5000 | −0.4531 − 0.4484$i$ | −0.2202 − 0.0834$i$ | 0.0232 − 0.3532$i$ |

Columns 37 through 40

| | | | |
|---|---|---|---|
| 0.5000 | 0.4637 + 0.0995$i$ | 0.0191 + 0.6229$i$ | 0.1779 + 0.3853$i$ |
| 0 + 0.5000$i$ | −0.2740 + 0.0297$i$ | −0.1626 + 0.1673$i$ | −0.3692 + 0.5060$i$ |
| −0.5000 | −0.1567 − 0.5116$i$ | −0.3261 − 0.2108$i$ | −0.0614 − 0.6069$i$ |
| 0 + 0.5000$i$ | −0.5598 + 0.3155$i$ | −0.4484 + 0.4531$i$ | −0.0834 + 0.2202$i$ |

Columns 41 through 44

| | | | |
|---|---|---|---|
| 0.5000 | 0.3049 + 0.3371$i$ | 0.4637 + 0.0995$i$ | 0.0191 + 0.6229$i$ |
| −0.5000 | −0.2626 − 0.6390$i$ | −0.0297 − 0.2740$i$ | −0.1673 − 0.1626$i$ |
| 0.5000 | 0.4213 + 0.1156$i$ | 0.1567 + 0.5116$i$ | 0.3261 + 0.2108$i$ |
| 0.5000 | −0.0232 + 0.3532$i$ | 0.3155 + 0.5598$i$ | 0.4531 + 0.4484$i$ |

Columns 45 through 48

| | | | |
|---|---|---|---|
| 0.5000 | 0.1779 + 0.3853$i$ | 0.3049 + 0.3371$i$ | 0.4637 + 0.0995$i$ |
| 0 − 0.5000$i$ | 0.3692 − 0.5060$i$ | 0.6390 − 0.2626$i$ | 0.2740 − 0.0297$i$ |
| −0.5000 | −0.0614 − 0.6069$i$ | −0.4213 − 0.1156$i$ | −0.1567 − 0.5116$i$ |
| 0 − 0.5000$i$ | 0.0834 − 0.2202$i$ | 0.3532 + 0.0232$i$ | 0.5598 − 0.3155$i$ |

Columns 49 through 52

| | | | |
|---|---|---|---|
| 0.5000 | 0.3602 + 0.4406$i$ | −0.0795 + 0.4839$i$ | 0.3602 + 0.4406$i$ |
| 0.03536 + 0.3536$i$ | −0.0754 + 0.1870$i$ | 0.0965 + 0.3794$i$ | −0.0754 + 0.7586$i$ |
| 0 + 0.5000$\iota$ | −0.2289 + 0.0434$i$ | −0.5609 + 0.3720$i$ | −0.2289 + 0.0434$i$ |
| −0.3536 + 0.3536$i$ | −0.7586 − 0.0754$i$ | −0.3794 + 0.0965$i$ | −0.1870 − 0.0754$i$ |

Columns 53 through 56

| | | | |
|---|---|---|---|
| 0.5000 | 0.3247 + 0.0797$i$ | 0.3602 + 0.4406$i$ | −0.0795 + 0.4839$i$ |
| −0.03536 + 0.3536$i$ | −0.3794 − 0.2846$i$ | −0.1870 − 0.0754$i$ | −0.3794 + 0.0965$i$ |
| 0 − 0.5000$i$ | 0.4262 − 0.5068$i$ | 0.2289 − 0.0434$i$ | 0.5609 − 0.3720$i$ |
| 0.3536 + 0.3536$i$ | −0.2846 + 0.3794$i$ | −0.0754 + 0.7586$i$ | 0.0965 + 0.3794$i$ |

Columns 57 through 60

| | | | |
|---|---|---|---|
| 0.5000 | 0.3602 + 0.4406$i$ | 0.3247 + 0.0797$i$ | 0.3602 + 0.4406$i$ |
| −0.03536 − 0.3536$i$ | 0.0754 − 0.7586$i$ | 0.2846 − 0.3794$i$ | 0.0754 − 0.1870$i$ |
| 0 + 0.5000$i$ | −0.2289 + 0.0434$i$ | −0.4262 + 0.5068$i$ | −0.2289 + 0.0434$i$ |
| 0.3536 − 0.3536$i$ | 0.1870 + 0.0754$i$ | 0.3794 + 0.2846$i$ | 0.7586 + 0.0754$i$ |

Columns 61 through 64

| | | | |
|---|---|---|---|
| 0.5000 | −0.0795 + 0.4839$i$ | 0.3602 + 0.4406$i$ | 0.3247 + 0.0797$i$ |
| 0.03536 − 0.3536$i$ | 0.3794 − 0.0965$i$ | 0.7586 + 0.0754$i$ | 0.3794 + 0.2846$i$ |
| 0 − 0.5000$i$ | 0.5609 − 0.3720$i$ | 0.2289 − 0.0434$i$ | 0.4262 − 0.5068$i$ |
| −0.3536 − 0.3536$i$ | −0.0965 − 0.3794$i$ | 0.0754 − 0.1870$i$ | 0.2846 − 0.3794$i$ |

-continued

Columns 29 through 32

| | | | |
|---|---|---|---|
| −0.5000 | −0.1779 − 0.0995$i$ | −0.0191 − 0.3371$i$ | −0.4637 − 0.3853$i$ |
| 0 + 0.5000$i$ | −0.2740 + 0.5060$i$ | −0.6390 + 0.1673$i$ | −0.3692 + 0.0297$i$ |
| 0.5000 | 0.0614 + 0.5116$i$ | 0.3261 + 0.1156$i$ | 0.1567 + 0.6069$i$ |
| 0 − 0.5000$i$ | 0.5598 − 0.2202$i$ | 0.3532 − 0.4531$i$ | 0.0834 − 03155$i$ |

3. Third Scheme to Design a 6-Bit Codebook:

(1) Operation 1:

The following 4-bit codebook corresponding to the transmission rank 1 may be obtained from the 4-bit codebook disclosed in the above Table 1. In this example, the 4-bit codebook corresponding to the transmission rank 1, disclosed in the above Table 1, is referred to as a base codebook:

base_cbk(:,1:16)=[$C_{1,1}$ ... $C_{16,1}$] with $C_{i,1}$ taken from table 1

(2) Operation 2:

Eight vectors included in two DFT matrices may be added to the base codebook of operation 1, so that the base codebook may include 24 vectors. An exemplary process for adding the vectors to the base codebook is as follows:

```
Nmat=4;% number of DFT matrices
        indexmat = repmat(0:3,4,1);
        DFT_mat = exp(j*2*pi*indexmat.*(indexmat')/4)/sqrt(4);
        for counter = 1:Nmat
                offsnow = exp(j*2*pi*(0:(3))*(counter-1)/(4*Nmat));
                Rnow = diag(offsnow);
                Wbis(1:4,1:4,counter) = Rnow*DFT_mat;
        end;
        % rank 1
        % 8 more precoders
        base_cbk(:,17:20)=Wbis(:,[1:4],2);
        base_cbk(:,21:24)=Wbis(:,[1:4],4);
```

As shown in 'base_cbk(:,17:20)=Wbis(:,[1:4],2);' and 'base_cbk(:,21:24)=Wbis(:,[1:4],4);', 24 vectors may be included in the base codebook.

A local codebook local_cbk may be defined, for example, as follows:

$$local\_cbk = \begin{bmatrix} 0.0975+ & 0.0975+ & 0.0975+ & 0.0975+ \\ 0.4904i & 0.4904i & 0.4904i & 0.4904i \\ -0.4904+ & -0.0975- & 0.4904- & 0.0975+ \\ 0.0975i & 0.4904i & 0.0975i & 0.4904i \\ -0.4904+ & 0.4904- & -0.4904+ & 0.4904- \\ 0.0975i & 0.0975i & 0.0975i & 0.0975i \\ 0.3536+ & 0.3536- & -0.3536- & -0.3536+ \\ 0.3536i & 0.3536i & -0.3536i & 0.3536i \end{bmatrix};$$

(3) Operation 3:

The local codebook local_cbk may be scaled to obtain the localized codebook localized_cbk. An exemplary scaling process is as follows:

```
r=abs(local_cbk);
phase_local_cbk=local_cbk./r;
alpha=0.9835;
```

Here, the localized codebook localized_cbk may be expressed, for example, as follows:

```
localized_cbk=
[sqrt(1-alpha^2*(1-(r(1,1))^2))*phase_local_cbk(1,1),sqrt(1-
alpha^2*(1-(r(1,2))^2))*phase_local_cbk(1,2),sqrt(1-
alpha^2*(1-(r(1,3))^2))*phase_local_cbk(1,3),sqrt(1-
alpha^2*(1-(r(1,4))^2))*phase_local_cbk(1,4);...
alpha*r(2,1)*phase_local_cbk(2,1),alpha*r(2,2)*
phase_local_cbk(2,2),alpha*r(2,3)*phase_local_cb
k(2,3),alpha*r(2,4)*phase_local_cbk(2,4);...
alpha*r(3,1)*phase_local_cbk(3,1),alpha*r(3,2)*
phase_local_cbk(3,2),alpha*r(3,3)*phase_local_cb
k(3,3),alpha*r(3,4)*phase_local_cbk(3,4);...
alpha*r(4,1)*phase_local_cbk(4,1),alpha*r(4,2)*
phase_local_cbk(4,2),alpha*r(4,3)*phase_local_cb
k(4,3),alpha*r(4,4)*phase_local_cbk(4,4)];
```

Where the localized codebook localized_cbk is calculated through the aforementioned process, vectors of the localized codebook localized_cbk may be normalized, for example, through the following exemplary process:

```
for k=1:size(localized_cbk,2)
        localized_cbk(:,k)=localized_cbk(:,k)/
        norm(localized_cbk(:,k));
end
```

(4) Operation 4:

A final codebook final_cbk may be obtained by rotating the normalized localized codebook localized_cbk around the base codebook, for example, through the following exemplary process:

```
for k=1:24
        [U,S,V]=svd(base_cbk(:,k));
        R=U'*V; % U'*V*base_cbk(:,1,k)=[1;0;0;0]
        if k<=16
                rotated_localized=R'*localized_cbk(:,1:2);%,
where only first two vectors of
localized_cbk are rotated and the base codebook is maintained as a
centroid.
                final_cbk_rank{1}(:,1,(k-1)*3+1:k*3)=
        [base_cbk(:,k),rotated_localized];
                else
                        rotated_localized=R'*localized_cbk(:,1);%,
where only first two vectors of localized_cbk are rotated, and the
base codebook is maintained as a centroid.
                        final_cbk_rank{1}(:,1,16*3+(k-17)*2+1:16*3+(k-
16)*2)=[base_cbk(:,k),rotated_localized];
                end
        end;
```

6 bits of final rank 1 codebook may be given, for example, by final_cbk_rank{1}.

A final rank 2 codebook, a final rank 3 codebook, and/or a final rank 4 codebook may also be obtained based on the final rank 1 codebook. For example, unitary matrices including columns of the final rank 1 codebook, different from the first 16 vectors of the base codebook, may be obtained. Thus, a total of 48 unitary matrices may be obtained. A total of 54 matrices may be obtained if $W_1$ through $W_6$, are added to the 48 unitary matrices. The 54 matrices may become elements of the final rank 4 codebook.

The final rank 2 codebook may be obtained by taking the first two columns from the 48 unitary matrices, and taking 16 matrices or codewords from the 4-bit rank 2 codebook disclosed in the above Table 1.

The final rank 3 codebook may be obtained by taking the second through the fourth columns from the 48 unitary matrices, and taking 16 matrices or codewords from the 4-bit rank 3 codebook disclosed in the above Table 1.

6 bits of the final rank 1 codebook, the final rank 2 codebook, the final rank 3 codebook, and the final rank 4 codebook may be expressed, for example, as follows:

Final Rank 1 Codebook:

$$V1(:,:,1) = \begin{matrix} 0.5000 \\ 0.5000 \\ 0.5000 \\ 0.5000 \end{matrix}$$

$$V1(:,:,2) = \begin{array}{c} -0.2573 + 0.5267i \\ 0.4306 + 0.2510i \\ 0.4306 + 0.2510i \\ -0.3995 - 0.0009i \end{array}$$

$$V1(:,:,3) = \begin{array}{c} 0.4182 - 0.2060i \\ 0.2693 + 0.5849i \\ -0.3088 + 0.1985i \\ -0.1743 + 0.4504i \end{array}$$

$$V1(:,:,4) = \begin{array}{c} 0.5000 \\ -0.5000 \\ 0.5000 \\ -0.5000 \end{array}$$

$$V1(:,:,5) = \begin{array}{c} -0.1228 + 0.0831i \\ 0.4892 - 0.2949i \\ 0.4754 + 0.1031i \\ -0.3409 - 0.5467i \end{array}$$

$$V1(:,:,6) = \begin{array}{c} 0.1663 + 0.6240i \\ 0.0064 + 0.1030i \\ -0.3928 + 0.4752i \\ -0.4372 - 0.0316i \end{array}$$

$$V1(:,:,7) = \begin{array}{c} -0.5000 \\ -0.5000 \\ 0.5000 \\ 0.5000 \end{array}$$

$$V1(:,:,8) = \begin{array}{c} 0.1228 - 0.0831i \\ -0.4754 - 0.1031i \\ -0.4892 + 0.2949i \\ 0.3409 + 0.5467i \end{array}$$

$$V1(:,:,9) = \begin{array}{c} 0.4119 - 0.2376i \\ 0.0073 - 0.7328i \\ 0.3791 + 0.1546i \\ 0.2445 - 0.0972i \end{array}$$

$$V1(:,:,10) = \begin{array}{c} -0.5000 \\ 0.5000 \\ 0.5000 \\ -0.5000 \end{array}$$

$$V1(:,:,11) = \begin{array}{c} -0.7073 - 0.3349i \\ -0.2125 + 0.3788i \\ -0.2125 + 0.3788i \\ 0.0779 + 0.0648i \end{array}$$

$$V1(:,:,12) = \begin{array}{c} -0.0318 - 0.3722i \\ -0.0512 - 0.1869i \\ 0.5269 + 0.1995i \\ 0.3031 - 0.6431i \end{array}$$

$$V1(:,:,13) = \begin{array}{c} 0.5000 \\ 0 + 0.5000i \\ 0.5000 \\ 0 + 0.5000i \end{array}$$

$$V1(:,:,14) = \begin{array}{c} 0.0318 + 0.3722i \\ 0.1869 - 0.0512i \\ 0.5269 + 0.1995i \\ -0.6431 - 0.3031i \end{array}$$

$$V1(:,:,15) = \begin{array}{c} -0.1228 + 0.0831i \\ -0.1031 + 0.4754i \\ -0.4892 + 0.2949i \\ -0.5467 + 0.3409i \end{array}$$

$$V1(:,:,16) = \begin{array}{c} 0.5000 \\ 0 - 0.5000i \\ 0.5000 \\ 0 - 0.5000i \end{array}$$

$$V1(:,:,17) = \begin{array}{c} -0.4119 + 0.2376i \\ 0.7328 + 0.0073i \\ 0.3791 + 0.1546i \\ -0.0972 - 0.2445i \end{array}$$

$$V1(:,:,18) = \begin{array}{c} 0.7073 + 0.3349i \\ 0.3788 + 0.2125i \\ -0.2125 + 0.3788i \\ -0.0648 + 0.0779i \end{array}$$

$$V1(:,:,19) = \begin{array}{c} -0.5000 \\ 0 - 0.5000i \\ 0.5000 \\ 0 + 0.5000i \end{array}$$

$$V1(:,:,20) = \begin{array}{c} -0.1663 - 0.6240i \\ -0.1030 + 0.0064i \\ -0.3928 + 0.4752i \\ -0.0316 + 0.4372i \end{array}$$

$$V1(:,:,21) = \begin{array}{c} 0.2473 - 0.5267i \\ 0.2510 - 04306i \\ 0.4306 + 0.2510i \\ 0.0009 - 0.3995i \end{array}$$

$$V1(:,:,22) = \begin{array}{c} -0.5000 \\ 0 + 0.5000i \\ 0.5000 \\ 0 - 0.5000i \end{array}$$

$$V1(:,:,23) = \begin{array}{c} -0.4182 + 0.2060i \\ -0.5849 + 0.2693i \\ -0.3088 + 0.1985i \\ 0.4504 + 0.1743i \end{array}$$

$$V1(:,:,24) = \begin{matrix} 0.1228 - 0.0831i \\ -0.2949 - 0.4892i \\ 0.4754 + 0.1031i \\ 0.5467 - 0.3409i \end{matrix}$$

$$V1(:,:,25) = \begin{matrix} 0.5000 \\ 0.5000 \\ 0.5000 \\ -0.5000 \end{matrix}$$

$$V1(:,:,26) = \begin{matrix} -0.6051 + 0.1790i \\ 0.3147 + 0.1351i \\ 0.3147 + 0.1351i \\ -0.1801 - 0.5787i \end{matrix}$$

$$V1(:,:,27) = \begin{matrix} 0.0704 + 0.1417i \\ 0.1534 + 0.7008i \\ -0.4248 + 0.3144i \\ -0.4053 + 0.1292i \end{matrix}$$

$$V1(:,:,28) = \begin{matrix} 0.5000 \\ 0 + 0.5000i \\ -0.5000 \\ 0 + 0.5000i \end{matrix}$$

$$V1(:,:,29) = \begin{matrix} 0.5141 + 0.2763i \\ 0.2189 + 0.1095i \\ 0.2769 - 0.3593i \\ -0.6111 - 0.1423i \end{matrix}$$

$$V1(:,:,30) = \begin{matrix} -0.6051 + 0.1790i \\ -0.1351 + 0.3147i \\ -0.3147 - 0.1351i \\ -0.5787 + 0.1801i \end{matrix}$$

$$V1(:,:,31) = \begin{matrix} 0.5000 \\ -0.5000 \\ 0.5000 \\ 0.5000 \end{matrix}$$

$$V1(:,:,32) = \begin{matrix} 0.2250 + 0.4308i \\ 0.3732 - 0.4108i \\ 0.5913 + 0.2190i \\ -0.2387 - 0.0328i \end{matrix}$$

$$V1(:,:,33) = \begin{matrix} 0.5141 + 0.2763i \\ -0.1095 + 0.2189i \\ -0.2769 + 0.3593i \\ -0.1423 + 0.6111i \end{matrix}$$

$$V1(:,:,34) = \begin{matrix} 0.5000 \\ 0 - 0.5000i \\ -0.5000 \\ 0 - 0.5000i \end{matrix}$$

$$V1(:,:,35) = \begin{matrix} 0.0704 + 0.1417i \\ 0.7008 - 0.1534i \\ 0.4248 - 0.3144i \\ -0.1292 - 0.4053i \end{matrix}$$

$$V1(:,:,36) = \begin{matrix} 0.2250 + 0.4308i \\ 0.4108 + 0.3732i \\ -0.5913 - 0.2190i \\ -0.0328 + 0.2387i \end{matrix}$$

$$V1(:,:,37) = \begin{matrix} 0.5000 \\ 0.3536 + 0.3536i \\ 0 + 0.5000i \\ -0.3536 + 03536i \end{matrix}$$

$$V1(:,:,38) = \begin{matrix} -0.0376 + 0.4566i \\ 0.2688 + 0.1481i \\ 0.1588 - 0.0744i \\ -0.5917 - 0.5613i \end{matrix}$$

$$V1(:,:,39) = \begin{matrix} -0.4472 - 0.1208i \\ -0.0781 + 0.4936i \\ -0.6133 - 0.0191i \\ -0.3591 + 0.1738i \end{matrix}$$

$$V1(:,:,40) = \begin{matrix} 0.5000 \\ -0.3536 + 0.3536i \\ 0 - 0.5000i \\ 0.3536 + 0.3536i \end{matrix}$$

$$V1(:,:,41) = \begin{matrix} 0.4535 + 0.1524i \\ 0.1943 - 0.1220i \\ 0.7044 - 0.2811i \\ -0.3738 - 0.0597i \end{matrix}$$

$$V1(:,:,42) = \begin{matrix} -0.0376 + 0.4566i \\ -0.1481 + 0.2688i \\ -0.1588 + 0.0744i \\ -0.5613 + 0.5917i \end{matrix}$$

$$V1(:,:,43) = \begin{matrix} 0.5000 \\ -0.3536 - 0.3536i \\ 0 + 0.5000i \\ 0.3536 - 0.3536i \end{matrix}$$

$$V1(:,:,44) = \begin{matrix} 0.2356 + 0.5396i \\ 0.6510 - 0.4238i \\ 0.1311 + 0.0167i \\ -0.0198 - 0.1791i \end{matrix}$$

$$V1(:,:,45) = \begin{matrix} 0.4535 + 0.1524i \\ 0.1220 + 0.1943i \\ -0.7044 + 0.2811i \\ -0.0597 + 0.3738i \end{matrix}$$

$$V1(:,:,46) = \begin{matrix} 0.5000 \\ 0.3536 - 0.3536i \\ 0 - 0.5000i \\ -0.3536 - 0.3536i \end{matrix}$$

$$V1(:,:,47) = \begin{matrix} -0.4472 - 0.1208i \\ 0.4936 + 0.0781i \\ 0.6133 + 0.0191i \\ -0.1738 - 0.3591i \end{matrix}$$

$$V1(:,:,48) = \begin{matrix} 0.2356 + 0.5396i \\ 0.4238 + 0.6510i \\ -0.1311 - 0.0167i \\ -0.1791 + 0.0198i \end{matrix}$$

$$V1(:,:,49) = \begin{matrix} 0.5000 \\ 0.4619 + 0.1913i \\ 0.3536 + 0.3536i \\ 0.1913 + 0.4619i \end{matrix}$$

$$V1(:,:,50) = \begin{matrix} -0.0628 + 0.5038i \\ 0.3646 + 0.2226i \\ 0.2517 + 0.1533i \\ -0.6562 - 0.2058i \end{matrix}$$

$$V1(:,:,51) = \begin{matrix} 0.5000 \\ -0.1913 + 0.4619i \\ -0.3536 - 0.3536i \\ 0.4619 - 0.1913i \end{matrix}$$

$$V1(:,:,52) = \begin{matrix} 0.4184 + 0.4842i \\ 0.1085 - 0.0629i \\ 0.5948 - 0.4538i \\ -0.0601 - 0.1068i \end{matrix}$$

$$V1(:,:,53) = \begin{matrix} 0.5000 \\ -0.4619 - 0.1913i \\ 0.3536 + 0.3536i \\ -0.1913 - 0.4619i \end{matrix}$$

$$V1(:,:,54) = \begin{matrix} -0.1083 + 0.4189i \\ 0.6032 - 0.3824i \\ 0.2610 + 0.1225i \\ -0.0597 - 0.4649i \end{matrix}$$

$$V1(:,:,55) = \begin{matrix} 0.5000 \\ 0.1913 - 0.4619i \\ -0.3536 - 0.3536i \\ -0.4619 + 0.1913i \end{matrix}$$

$$V1(:,:,56) = \begin{matrix} -0.0430 - 0.3791i \\ 0.5314 - 0.0969i \\ 0.5001 - 0.1416i \\ -0.3832 - 0.3817i \end{matrix}$$

$$V1(:,:,57) = \begin{matrix} 0.5000 \\ 0.1913 + 0.4619i \\ -0.3536 + 0.3536i \\ -0.4619 - 0.1913i \end{matrix}$$

$$V1(:,:,58) = \begin{matrix} -0.0197 + 0.5406i \\ 0.1681 + 0.0640i \\ 0.2143 - 0.3250i \\ -0.2387 - 0.6830i \end{matrix}$$

$$V1(:,:,59) = \begin{matrix} 0.5000 \\ -0.4619 + 0.1913i \\ 0.3536 - 0.3536i \\ -0.1913 + 0.4619i \end{matrix}$$

$$V1(:,:,60) = \begin{matrix} 0.1819 - 0.0589i \\ 0.3368 - 0.1998i \\ 0.6565 - 0.0556i \\ -0.5241 - 0.3183i \end{matrix}$$

$$V1(:,:,61) = \begin{matrix} 0.5000 \\ -0.1913 - 0.4619i \\ -0.3536 + 0.3536i \\ 0.4619 + 0.1913i \end{matrix}$$

$$V1(:,:,62) = \begin{matrix} 0.5307 + 0.2465i \\ 0.6357 - 0.3878i \\ 0.1539 - 0.1260i \\ -0.2499 - 0.0328i \end{matrix}$$

$$V1(:,:,63) = \begin{matrix} 0.5000 \\ 0.4619 - 0.1913i \\ 0.3536 - 0.3536i \\ 0.1913 - 0.4619i \end{matrix}$$

$$V1(:,:,64) = \begin{matrix} -0.4886 + 0.2995i \\ 0.4671 + 0.2039i \\ 0.5829 + 0.1869i \\ -0.1465 - 0.1250i \end{matrix}$$

Final Rank 2 Codebook:

$$V2(:,:,1) = \begin{matrix} 0.5000 & 0.5000 \\ 0.5000 & -0.5000 \\ 0.5000 & 0.5000 \\ 0.5000 & -0.5000 \end{matrix}$$

$$V2(:,:,2) = \begin{bmatrix} -0.2573 + 0.5267i & -0.4516 - 0.0164i \\ 0.4306 + 0.2510i & -0.3631 - 0.4030i \\ 0.4306 + 0.2510i & 0.4237 + 0.2733i \\ -0.3995 - 0.0009i & 0.2522 + 0.4286i \end{bmatrix}$$

$$V2(:,:,3) = \begin{bmatrix} 0.4182 - 0.2060i & 0.7071 - 0.3537i \\ 0.2693 + 0.5849i & -0.1549 - 0.4387i \\ -0.3088 + 0.1985i & 0.3107 - 0.1994i \\ -0.1743 + 0.4504i & -0.1065 + 0.1039i \end{bmatrix}$$

$$V2(:,:,4) = \begin{bmatrix} 0.5000 & -0.5000 \\ 0.5000 & -0.5000 \\ 0.5000 & 0.5000 \\ 0.5000 & 0.5000 \end{bmatrix}$$

$$V2(:,:,5) = \begin{bmatrix} -0.1228 + 0.0831i & 0.1911 + 0.1844i \\ 0.4892 - 0.2949i & -0.6076 - 0.2220i \\ 0.4754 + 0.1031i & 0.0935 - 0.1294i \\ -0.3409 - 0.5467i & 0.3520 - 0.6014i \end{bmatrix}$$

$$V2(:,:,6) = \begin{bmatrix} 0.1663 + 0.6240i & -0.4390 - 0.0177i \\ 0.0064 + 0.1030i & -0.2573 - 0.1623i \\ -0.3928 + 0.4752i & 0.4550 + 0.6115i \\ -0.4372 - 0.0316i & 0.0477 - 0.3623i \end{bmatrix}$$

$$V2(:,:,7) = \begin{bmatrix} 0.5000 & -0.5000 \\ 0.5000 & 0.5000 \\ 0.5000 & 0.5000 \\ 0.5000 & -0.5000 \end{bmatrix}$$

$$V2(:,:,8) = \begin{bmatrix} 0.1228 - 0.0831i & -0.8432 - 0.1719i \\ -0.4754 - 0.1031i & 0.0004 - 0.0643i \\ -0.4892 + 0.2949i & 0.0542 + 0.3715i \\ 0.3409 + 0.5467i & -0.2612 + 0.2147i \end{bmatrix}$$

$$V2(:,:,9) = \begin{bmatrix} 0.4119 - 0.2376i & 0.2307 - 0.3523i \\ 0.0073 - 0.7328i & -0.1995 - 0.0992i \\ 0.3791 + 0.1546i & -0.6261 + 0.4891i \\ 0.2445 - 0.0972i & -0.3749 - 0.0349i \end{bmatrix}$$

$$V2(:,:,10) = \begin{bmatrix} 0.5000 & -0.5000 \\ -0.5000 & -0.5000 \\ 0.5000 & 0.5000 \\ -0.5000 & 0.5000 \end{bmatrix}$$

$$V2(:,:,11) = \begin{bmatrix} -0.7073 - 0.3349i & -0.3380 - 0.1860i \\ -0.2125 + 0.3788i & -0.2536 - 0.2825i \\ -0.2125 + 0.3788i & 0.6905 - 0.2237i \\ 0.0779 + 0.0648i & -0.3771 + 0.1950i \end{bmatrix}$$

$$V2(:,:,12) = \begin{bmatrix} -0.0318 - 0.3722i & 0.5870 + 0.5837i \\ -0.0512 - 0.1869i & 0.1353 - 0.0302i \\ 0.5269 + 0.1995i & 0.1672 - 0.4033i \\ 0.3031 - 0.6431i & 0.1619 - 0.2805i \end{bmatrix}$$

$$V2(:,:,13) = \begin{bmatrix} 0.5000 & -0.5000 \\ -0.5000 & 0.5000 \\ 0.5000 & 0.5000 \\ -0.5000 & -0.5000 \end{bmatrix}$$

$$V2(:,:,14) = \begin{bmatrix} 0.0318 + 0.3722i & 0.2910 + 0.0846i \\ 0.1869 - 0.0512i & -0.5838 - 0.6826i \\ 0.5269 + 0.1995i & -0.1084 + 0.1034i \\ -0.6431 - 0.3031i & 0.0232 - 0.2799i \end{bmatrix}$$

$$V2(:,:,15) = \begin{bmatrix} -0.1228 + 0.0831i & 0.4864 + 0.1062i \\ -0.1031 + 0.4754i & -0.3579 + 0.0709i \\ -0.4892 + 0.2949i & 0.3743 - 0.4217i \\ -0.5467 + 0.3409i & -0.2104 + 0.5067i \end{bmatrix}$$

$$V2(:,:,16) = \begin{bmatrix} -0.5000 & -0.5000 \\ -0.5000 & 0.5000 \\ 0.5000 & 0.5000 \\ 0.5000 & -0.5000 \end{bmatrix}$$

$$V2(:,:,17) = \begin{bmatrix} -0.4119 + 0.2376i & -0.3475 + 0.0349i \\ 0.7328 + 0.0073i & -0.3183 + 0.2743i \\ 0.3791 + 0.1546i & 0.3910 - 0.0682i \\ -0.0972 - 0.2445i & -0.5729 + 0.4644i \end{bmatrix}$$

$$V2(:,:,18) = \begin{bmatrix} 0.7073 + 0.3349i & 0.3580 + 0.4230i \\ 0.3788 + 0.2125i & -0.5016 - 0.3133i \\ -0.2125 + 0.3788i & 0.4516 - 0.0120i \\ -0.0648 + 0.0779i & 0.2277 - 0.2953i \end{bmatrix}$$

$$V2(:,:,19) = \begin{bmatrix} 0.5000 & -0.5000 \\ 0 + 0.5000i & 0 - 0.5000i \\ 0.5000 & 0.5000 \\ 0 + 0.5000i & 0 + 0.5000i \end{bmatrix}$$

$$V2(:,:,20) = \begin{bmatrix} -0.1663 - 0.6240i & -0.0285 - 0.3000i \\ -0.1030 + 0.0064i & -0.0146 + 0.4747i \\ -0.3928 + 0.4752i & 0.1862 + 0.2754i \\ -0.0316 + 0.4372i & -0.4436 - 0.6134i \end{bmatrix}$$

$$V2(:,:,21) = \begin{bmatrix} 0.2573 - 0.5267i & 0.4288 + 0.0624i \\ 0.2510 - 0.4306i & -0.2155 - 0.5900i \\ 0.4306 + 0.2510i & 0.0071 - 0.1770i \\ 0.0009 - 0.3995i & 0.1913 + 0.5913i \end{bmatrix}$$

$$V2(:,:,22) = \begin{bmatrix} 0.5000 & -0.5000 \\ 0 + 0.5000i & 0 + 0.5000i \\ 0.5000 & 0.5000 \\ 0 + 0.5000i & 0 - 0.5000i \end{bmatrix}$$

$$V2(:,:,23) = \begin{bmatrix} -0.4182 + 0.2060i & -0.0368 - 0.04444i \\ -0.5849 + 0.2693i & 0.0931 + 0.1023i \\ -0.3088 + 0.1985i & 0.6755 + 0.2582i \\ 0.4504 + 0.1743i & 0.1401 + 0.6595i \end{bmatrix}$$

$$V2(:,:,24) = \begin{matrix} 0.1228 - 0.0831i & 0.5267 + 0.1302i \\ -0.2949 - 0.4892i & -0.3082 + 0.1349i \\ 0.4754 + 0.1031i & -0.5798 - 0.2378i \\ 0.5467 - 0.3409i & 0.4428 + 0.0607i \end{matrix}$$

$$V2(:,:,25) = \begin{matrix} 0.5000 & -0.5000 \\ 0 - 0.5000i & 0 - 0.5000i \\ 0.5000 & 0.5000 \\ 0 - 0.5000i & 0 + 0.5000i \end{matrix}$$

$$V2(:,:,26) = \begin{matrix} -0.6051 + 0.1790i & -0.2867 + 0.4568i \\ 0.3147 + 0.1351i & -0.3377 + 0.4028i \\ 0.3147 + 0.1351i & -0.4367 - 0.4408i \\ -0.1801 - 0.5787i & 0.2118 - 0.0548i \end{matrix}$$

$$V2(:,:,27) = \begin{matrix} 0.0704 + 0.1417i & 0.4489 - 0.4294i \\ 0.1534 + 0.7008i & 0.0676 - 0.2514i \\ -0.4248 + 0.3144i & -0.0562 - 0.3389i \\ -0.4053 + 0.1292i & -0.6352 + 0.1576i \end{matrix}$$

$$V2(:,:,28) = \begin{matrix} 0.5000 & -0.5000 \\ 0 - 0.5000i & 0 + 0.5000i \\ 0.5000 & 0.5000 \\ 0 - 0.5000i & 0 - 0.5000i \end{matrix}$$

$$V2(:,:,29) = \begin{matrix} 0.5141 + 0.2763i & 0.0224 - 0.0857i \\ 0.2189 + 0.1095i & 0.4370 + 0.0749i \\ 0.2769 - 0.3593i & 0.0927 - 0.6134i \\ -0.6111 - 0.1423i & 0.6031 - 0.2167i \end{matrix}$$

$$V2(:,:,30) = \begin{matrix} -0.6051 + 0.1790i & -0.2021 + 0.2515i \\ -0.1351 + 0.3147i & -0.2703 - 0.8413i \\ -0.3147 - 0.1351i & -0.3054 - 0.0715i \\ -0.5787 + 0.1801i & 0.1019 + 0.0787i \end{matrix}$$

$$V2(:,:,31) = \begin{matrix} 0.5000 & -0.5000 \\ 0.5000 & 0 - 0.5000i \\ 0.5000 & 0.5000 \\ 0.5000 & 0 + 0.5000i \end{matrix}$$

$$V2(:,:,32) = \begin{matrix} 0.2250 + 0.4308i & -0.0056 + 0.0131i \\ 0.3732 - 0.4108i & 0.0211 + 0.5772i \\ 0.5913 + 0.2190i & 0.6155 - 0.2919i \\ -0.2387 - 0.0328i & 0.3534 - 0.2780i \end{matrix}$$

$$V2(:,:,33) = \begin{matrix} 0.5141 + 0.2763i & 0.0913 - 0.3481i \\ -0.1095 + 0.2189i & -0.5047 + 0.4712i \\ -0.2769 + 0.3593i & 0.0947 - 0.5855i \\ -0.1423 + 0.6111i & -0.0727 + 0.1915i \end{matrix}$$

$$V2(:,:,34) = \begin{matrix} 0.5000 & -0.5000 \\ 0.5000 & 0 + 0.5000i \\ 0.5000 & 0.5000 \\ 0.5000 & 0 - 0.5000i \end{matrix}$$

$$V2(:,:,35) = \begin{matrix} 0.0704 + 0.1417i & 0.2602 - 0.3335i \\ 0.7008 - 0.1534i & 0.3267 - 0.3041i \\ 0.4248 - 0.3144i & 0.1781 + 0.6675i \\ -0.1292 - 0.4053i & -0.1799 + 0.3348i \end{matrix}$$

$$V2(:,:,36) = \begin{matrix} 0.2250 + 0.4308i & -0.1449 - 0.3470i \\ 0.4108 + 0.3732i & -0.0692 + 0.7493i \\ -0.5913 - 0.2190i & -0.1504 + 0.4516i \\ -0.0328 + 0.2387i & 0.1073 - 0.2330i \end{matrix}$$

$$V2(:,:,37) = \begin{matrix} 0.5000 & -0.5000 \\ 0 + 0.5000i & -0.5000 \\ 0.5000 & 0.5000 \\ 0 + 0.5000i & 0.5000 \end{matrix}$$

$$V2(:,:,38) = \begin{matrix} -0.0376 + 0.4566i & -0.6780 - 0.3635i \\ 0.2688 + 0.1481i & 0.1160 + 0.0644i \\ 0.1588 - 0.0744i & -0.3301 + 0.2541i \\ -0.5917 - 0.5613i & -0.4384 + 0.1574i \end{matrix}$$

$$V2(:,:,39) = \begin{matrix} -0.4472 - 0.1208i & 0.2383 + 0.0963i \\ -0.0781 + 0.4936i & 0.2810 + 0.0700i \\ -0.6133 - 0.0191i & 0.2857 - 0.4528i \\ -0.3591 + 0.1738i & -0.4779 + 0.5788i \end{matrix}$$

$$V2(:,:,40) = \begin{matrix} 0.5000 & -0.5000 \\ 0 + 0.5000i & 0.5000 \\ 0.5000 & 0.5000 \\ 0 + 0.5000i & -0.5000 \end{matrix}$$

$$V2(:,:,41) = \begin{matrix} 0.4535 + 0.1524i & 0.6361 - 0.0379i \\ 0.1943 - 0.1220i & -0.3164 + 0.0577i \\ 0.7044 - 0.2811i & 0.0562 + 0.0352i \\ -0.3738 - 0.0597i & 0.6782 - 0.1616i \end{matrix}$$

$$V2(:,:,42) = \begin{matrix} -0.0376 + 0.4566i & -0.6004 - 0.0993i \\ -0.1481 + 0.2688i & -0.4515 - 0.2985i \\ -0.1588 + 0.0744i & -0.1174 + 0.2648i \\ -0.5613 + 0.5917i & 0.3667 + 0.3441i \end{matrix}$$

$$V2(:,:,43) = \begin{matrix} 0.5000 & 0.5000 \\ 0.5000 & -0.5000 \\ 0.5000 & 0.5000 \\ -0.5000 & 0.5000 \end{matrix}$$

$$V2(:,:,44) = \begin{matrix} 0.2356 + 0.5396i & -0.2530 + 0.3209i \\ 0.6510 - 0.4238i & -0.2885 - 0.0485i \\ 0.1311 + 0.0167i & -0.0415 - 0.7379i \\ -0.0198 - 0.1791i & 0.1649 - 0.4171i \end{matrix}$$

$$V2(:,:,45) = \begin{bmatrix} 0.4535+0.1524i & 0.2821-0.1279i \\ 0.1220+0.1943i & -0.0004-0.0348i \\ -0.7044+0.2811i & -0.2923+0.0831i \\ -0.0597+0.3738i & -0.0749-0.8971i \end{bmatrix}$$

$$V2(:,:,46) = \begin{bmatrix} 0.5000 & 0.5000 \\ -0.3536+0.3536i & 0.3536-0.3536i \\ 0-0.5000i & 0-0.5000i \\ 0.3536+0.3536i & -0.3536-0.3536i \end{bmatrix}$$

$$V2(:,:,47) = \begin{bmatrix} -0.4472-0.1208i & -0.4748+0.1205i \\ 0.4936+0.0781i & 0.2258+0.2637i \\ 0.6133+0.0191i & -0.2650+0.3289i \\ -0.1738-0.3591i & -0.2798+0.6188i \end{bmatrix}$$

$$V2(:,:,48) = \begin{bmatrix} 0.2356+0.5396i & -0.0180-0.6214i \\ 0.4238+0.6510i & -0.0262+0.4269i \\ -0.1311-0.0167i & 0.1087+0.3811i \\ -0.1791+0.0198i & -0.5069+0.1291i \end{bmatrix}$$

$$V2(:,:,49) = \begin{bmatrix} 0.5000 & 0.0906-0.2217i \\ 0.4619+0.1913i & -0.3471+0.3239i \\ 0.3536+0.3536i & -0.2568+0.4202i \\ 0.1913+0.4619i & 0.6329-0.2724i \end{bmatrix}$$

$$V2(:,:,50) = \begin{bmatrix} -0.0628+0.5038i & -0.2542-0.0969i \\ 0.3646+0.2226i & 0.1965+0.0675i \\ 0.2517+0.1533i & 0.8534+0.0091i \\ -0.6562-0.2058i & 0.3805+0.0988i \end{bmatrix}$$

$$V2(:,:,51) = \begin{bmatrix} 0.5000 & -0.0310+0.3127i \\ -0.1913+0.4619i & -0.4944-0.1906i \\ -0.3536-0.3536i & 0.0394+0.1700i \\ 0.4619-0.1913i & -0.1337-0.7565i \end{bmatrix}$$

$$V2(:,:,52) = \begin{bmatrix} 0.4184+0.4842i & 0.0769+0.4899i \\ 0.1085-0.0629i & 0.0623-0.0897i \\ 0.5948-0.4538i & -0.4402+0.1739i \\ -0.0601-0.1068i & -0.7025-0.1568i \end{bmatrix}$$

$$V2(:,:,53) = \begin{bmatrix} 0.5000 & -0.1844+0.1638i \\ -0.4619-0.1913i & 0.3389-0.3843i \\ 0.3536+0.3536i & 0.4409-0.5467i \\ -0.1913-0.4619i & -0.1168-0.4120i \end{bmatrix}$$

$$V2(:,:,54) = \begin{bmatrix} -0.1083+0.4189i & -0.1461+0.1056i \\ 0.6032-0.3824i & 0.1171-0.2010i \\ 0.2610+0.1225i & -0.9157-0.2359i \\ -0.0597-0.4649i & -0.0670-0.1213i \end{bmatrix}$$

$$V2(:,:,55) = \begin{bmatrix} 0.5000 & 0.5295+0.2225i \\ 0.1913-0.4619i & 0.0632+0.0938i \\ -0.3536-0.3536i & -0.3442+0.5791i \\ -0.4619+0.1913i & 0.1494-0.4256i \end{bmatrix}$$

$$V2(:,:,56) = \begin{bmatrix} -0.0430-0.3791i & -0.2534+0.0743i \\ 0.5314-0.0969i & -0.0802+0.0767i \\ 0.5001-0.1416i & -0.3092+0.6079i \\ -0.3832-0.3817i & -0.6565-0.1479i \end{bmatrix}$$

$$V2(:,:,57) = \begin{bmatrix} 0.5000 & -0.4933+0.2493i \\ 0.1913+0.4619i & -0.0119-0.1919i \\ -0.3536+0.3536i & 0.2792+0.2603i \\ -0.4619-0.1913i & -0.5616-0.4432i \end{bmatrix}$$

$$V2(:,:,58) = \begin{bmatrix} -0.0197+0.5406i & 0.5987+0.4276i \\ 0.1681+0.0640i & -0.2253+0.0427i \\ 0.2143-0.3250i & -0.1122+0.5394i \\ -0.2387-0.6830i & 0.2949-0.1252i \end{bmatrix}$$

$$V2(:,:,59) = \begin{bmatrix} 0.5000 & -0.1299-0.1774i \\ -0.4619+0.1913i & -0.7371-0.3712i \\ 0.3536-0.3536i & -0.1244-0.1207i \\ -0.1913+0.4619i & 0.4090-0.2705i \end{bmatrix}$$

$$V2(:,:,60) = \begin{bmatrix} 0.1819-0.0589i & -0.3263-0.7161i \\ 0.3368-0.1998i & -0.0538+0.0491i \\ 0.6565-0.0556i & 0.2749-0.2169i \\ -0.5241-0.3183i & 0.4347-0.2526i \end{bmatrix}$$

$$V2(:,:,61) = \begin{bmatrix} 0.5000 & -0.3550+0.4986i \\ -0.1913-0.4619i & -0.5979-0.4466i \\ -0.3536+0.3536i & 0.2014+0.0225i \\ 0.4619+0.1913i & -0.1636-0.0232i \end{bmatrix}$$

$$V2(:,:,62) = \begin{bmatrix} 0.5307+0.2465i & 0.4315+0.2977i \\ 0.6357-0.3878i & -0.3022+0.0611i \\ 0.1539-0.1260i & -0.4238-0.3362i \\ -0.249-0.0328i & 0.3188-0.4857i \end{bmatrix}$$

$$V2(:,:,63) = \begin{bmatrix} 0.5000 & 0.6135-0.5466i \\ 0.4619-0.1913i & -0.3336+0.1681i \\ 0.3536-0.3536i & 0.0923+0.1646i \\ 0.1913-0.4619i & 0.2389+0.3044i \end{bmatrix}$$

$$V2(:,:,64) = \begin{bmatrix} -0.4886+0.2995i & -0.0643+0.2882i \\ 0.4671+0.2039i & 0.1360-0.4277i \\ 0.5829+0.1869i & -0.4682+0.3860i \\ -0.1465-0.1250i & -0.2986-0.5040i \end{bmatrix}$$

Final Rank 3 Codebook:

$$V3(:,:,1) = \begin{bmatrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{bmatrix}$$

$$V3(:,:,2) = \begin{bmatrix} -0.4516 - 0.0164i & -0.1786 + 0.5269i & -0.2985 - 0.2313i \\ -0.3631 - 0.4030i & -0.3685 - 0.1544i & 0.1966 + 0.5090i \\ 0.4237 + 0.2733i & -0.5798 - 0.0933i & -0.1123 - 0.3741i \\ 0.2522 + 0.4286i & -0.3685 + 0.2240i & 0.0615 + 0.6351i \end{bmatrix}$$

$$V3(:,:,3) = \begin{bmatrix} 0.7071 - 0.3537i & -0.0971 + 0.0208i & -0.2518 - 0.2904i \\ -0.1549 - 0.4387i & -0.4646 - 0.3323i & 0.1746 + 0.1101i \\ 0.3107 - 0.1994i & -0.1616 + 0.7129i & 0.4094 + 0.1641i \\ -0.1065 + 0.1039i & -0.1624 + 0.3212i & -0.7503 - 0.2284i \end{bmatrix}$$

$$V3(:,:,4) = \begin{bmatrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{bmatrix}$$

$$V3(:,:,5) = \begin{bmatrix} 0.1911 + 0.1844i & -0.2742 - 0.7346i & 0.4333 - 0.3239i \\ -0.6076 - 0.2220i & 0.1147 - 0.2232i & -0.0716 - 0.4327i \\ 0.0935 - 0.1294i & -0.2568 - 0.4393i & -0.3198 + 0.6137i \\ 0.3520 - 0.6014i & 0.1308 - 0.2148i & -0.1887 - 0.0218i \end{bmatrix}$$

$$V3(:,:,6) = \begin{bmatrix} -0.4390 - 0.0177i & 0.1890 + 0.1915i & 0.5399 - 0.1614i \\ -0.2573 - 0.1623i & 0.5097 - 0.7079i & -0.1643 + 0.3299i \\ 0.4550 + 0.6115i & 0.1352 - 0.1381i & -0.0396 - 0.0100i \\ 0.0477 - 0.3623i & -0.0601 - 0.3545i & 0.1275 - 0.7271i \end{bmatrix}$$

$$V3(:,:,7) = \begin{bmatrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{bmatrix}$$

$$V3(:,:,8) = \begin{bmatrix} -0.8432 + 0.1719i & 0.1018 + 0.2933i & 0.3119 - 0.2093i \\ 0.0004 - 0.0643i & 0.6544 - 0.1493i & 0.3891 + 0.3966i \\ 0.0542 + 0.3715i & -0.5068 + 0.3662i & 0.2327 + 0.2963i \\ -0.2612 + 0.2147i & 0.1621 - 0.1894i & -0.3150 + 0.5560i \end{bmatrix}$$

$$V3(:,:,9) = \begin{bmatrix} 0.2307 - 0.3523i & -0.3946 + 0.2222i & 0.3873 + 0.4914i \\ -0.1995 - 0.0992i & 0.1664 - 0.1501i & -0.5320 + 0.2829i \\ -0.6261 + 0.4891i & 0.1146 + 0.2907i & 0.0580 + 0.3166i \\ -0.3749 - 0.0349i & -0.2411 - 0.7674i & 0.3196 - 0.1994i \end{bmatrix}$$

$$V3(:,:,10) = \begin{bmatrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{bmatrix}$$

$$V3(:,:,11) = \begin{bmatrix} -0.3380 - 0.1860i & 0.2936 - 0.0670i & 0.1233 + 0.3645i \\ -0.2536 - 0.2825i & -0.4027 + 0.1913i & -0.6695 + 0.1424i \\ 0.6905 - 0.2237i & 0.4699 + 0.1884i & -0.0830 + 0.162i \\ -0.3771 + 0.1950i & 0.6721 + 0.0505i & -0.4095 - 0.4330i \end{bmatrix}$$

$$V3(:,:,12) = \begin{bmatrix} 0.5870 + 0.5837i & 0.1694 - 0.3686i & -0.1020 - 0.0171i \\ 0.1353 - 0.0302i & 0.2036 + 0.5782i & -0.5358 + 0.5295i \\ 0.1672 - 0.4033i & 0.4862 - 0.2843i & -0.3698 - 0.1949i \\ 0.1619 - 0.2805i & 0.0806 + 0.3688i & 0.4237 - 0.2601i \end{bmatrix}$$

$$V3(:,:,13) = \begin{bmatrix} 0.5000 & 0.5000 & -0.5000 \\ 0 + 0.5000i & 0 - 0.5000i & 0 - 0.5000i \\ 0.5000 & 0.5000 & 0.5000 \\ 0 + 0.5000i & 0 - 0.5000i & 0 + 0.5000i \end{bmatrix}$$

$$V3(:,:,14) = \begin{bmatrix} 0.2910 + 0.0846i & 0.0464 + 0.0232i & -0.8617 + 0.1530i \\ -0.5838 - 0.6826i & 0.1164 + 0.0920i & -0.3062 - 0.1997i \\ -0.1084 + 0.1034i & -06815 - 0.4049i & 0.0000 - 0.01781i \\ 0.0232 - 0.2799i & -0.4827 - 0.3376i & -0.1746 + 0.1956i \end{bmatrix}$$

$$V3(:,:,15) = \begin{bmatrix} 0.4864 + 0.1062i & -0.5138 + 0.1606i & 0.6091 + 0.2633i \\ -0.3579 + 0.0709i & 0.2824 - 0.4495i & 0.5834 - 0.0898i \\ 0.3743 - 0.4217i & -0.1744 - 0.4396i & -0.3251 - 0.1626i \\ -0.2104 + 0.5067i & -0.1120 + 0.4384i & -0.2030 - 0.1946i \end{bmatrix}$$

$$V3(:,:,16) = \begin{bmatrix} 0.5000 & 0.5000 & -0.5000 \\ 0 + 0.5000i & 0 - 0.5000i & 0 + 0.5000i \\ 0.5000 & 0.5000 & 0.5000 \\ 0 + 0.5000i & 0 - 0.5000i & 0 - 0.5000i \end{bmatrix}$$

$$V3(:,:,17) = \begin{bmatrix} -0.3475 + 0.0349i & -0.5492 + 0.0805i & 0.4831 - 0.3324i \\ -0.3183 + 0.2743i & 0.0020 - 0.0107i & 0.5026 + 0.1833i \\ 0.3910 - 0.0682i & -0.6621 - 0.4101i & -0.2328 - 0.1188i \\ -0.5729 + 0.4644i & -0.2236 - 0.1878i & -0.5285 + 0.1492i \end{bmatrix}$$

$$V3(:,:,18) = \begin{bmatrix} 0.3580 + 0.4230i & 0.2367 + 0.0128i & 0.0222 - 0.1544i \\ -0.5016 - 0.3133i & 0.2038 - 0.2663i & -0.4319 + 0.4031i \\ 0.4516 - 0.0120i & -0.3421 - 0.6404i & -0.0186 + 0.2825i \\ 0.2277 - 0.2953i & 0.5298 + 0.1531i & 0.5491 + 0.4950i \end{bmatrix}$$

$$V3(:,:,19) = \begin{bmatrix} 0.500 & -0.5000 & -0.5000 \\ 0 + 0.5000i & 0 - 0.5000i & 0 + 0.5000i \\ 0.5000 & 0.5000 & 0.5000 \\ 0 + 0.5000i & 0 + 0.5000i & 0 - 0.5000i \end{bmatrix}$$

$$V3(:,:,20) = \begin{bmatrix} -0.0285 - 0.3000i & 0.2482 - 0.1368i & -0.3683 + 0.5255i \\ -0.0146 + 0.4747i & 0.8444 + 0.1708i & 0.1466 - 0.0063i \\ 0.1862 + 0.2754i & -0.1088 + 0.1084i & -0.6599 + 0.2244i \\ -0.4436 - 0.6134i & 0.3812 - 0.0925i & -0.1957 - 0.2063i \end{bmatrix}$$

-continued $$V3(:,:,21) = \begin{matrix} 0.4288 + 0.0624i & -0.4668 + 0.1127i & -0.4182 + 0.2512i \\ -0.2155 - 0.5900i & 0.4068 - 0.1439i & -0.2850 - 0.2995i \\ 0.0071 - 0.1770i & 0.2316 - 0.2993i & 0.0461 + 0.7582i \\ 0.1913 + 0.5913i & 0.6629 + 0.0244i & 0.0964 + 0.0693i \end{matrix}$$

$$V3(:,:,22) = \begin{matrix} 0.5000 & -0.5000 & -0.5000 \\ 0 - 0.5000i & 0 - 0.5000i & 0 + 0.5000i \\ 0.5000 & 0.5000 & 0.5000 \\ 0 - 0.5000i & 0 + 0.5000i & 0 - 0.5000i \end{matrix}$$

$$V3(:,:,23) = \begin{matrix} -0.0368 - 0.0444i & -0.1903 + 0.2671i & 0.4025 - 0.7140i \\ 0.0931 + 0.1023i & 0.3098 - 0.6795i & -0.0892 + 0.0221i \\ 0.6755 + 0.2582i & -0.0591 + 0.4709i & -0.0849 + 0.3313i \\ 0.1401 + 0.6595i & 0.3082 - 0.1202i & 0.4248 - 0.1494i \end{matrix}$$

$$V3(:,:,24) = \begin{matrix} 0.5267 + 0.1302i & -0.3106 - 0.1437i & 0.7407 - 0.1338i \\ -0.3082 + 0.1349i & -0.4197 - 0.5805i & -0.1306 - 0.1743i \\ -0.5798 - 0.2378i & -0.5074 + 0.1972i & 0.2367 + 0.1351i \\ 0.4428 + 0.0607i & -0.2678 + 0.0417i & -0.5235 + 0.1939i \end{matrix}$$

$$V3(:,:,25) = \begin{matrix} 0.5000 & 0.5000 & -0.5000 \\ 0.5000 & -0.5000 & 0 - 0.5000i \\ 0.5000 & 0.5000 & 0.5000 \\ 0.5000 & -0.5000 & 0 + 0.5000i \end{matrix}$$

$$V3(:,:,26) = \begin{matrix} -0.2867 + 0.4568i & -0.0929 + 0.0656i & -0.1384 - 0.5281i \\ -0.3377 + 0.4028i & 0.6771 - 0.3179i & 0.2166 + 0.0016i \\ -0.4367 - 0.4408i & -0.1123 - 0.3181i & -0.5156 - 0.3436i \\ 0.2118 - 0.0548i & 0.5502 + 0.1048i & -0.5105 - 0.1021i \end{matrix}$$

$$V3(:,:,27) = \begin{matrix} 0.4489 - 0.4294i & 0.4657 + 0.4116i & 0.2255 + 0.3897i \\ 0.0676 - 0.2514i & -0.5317 - 0.2639i & 0.1962 + 0.1631i \\ -0.0562 - 0.3389i & -0.0047 + 0.3844i & -0.1563 - 0.6561i \\ -0.6352 + 0.1576i & -0.0225 + 0.3362i & 0.3199 + 0.4182i \end{matrix}$$

$$V3(:,:,28) = \begin{matrix} 0.5000 & -0.5000 & -0.5000 \\ 0.5000 & 0 - 0.5000i & 0 + 0.5000i \\ 0.5000 & 0.5000 & 0.5000 \\ 0.5000 & 0 + 0.5000i & 0 - 0.5000i \end{matrix}$$

$$V3(:,:,29) = \begin{matrix} 0.0224 - 0.0857i & -0.3110 + 0.4440i & 0.3131 - 0.5095i \\ 0.4370 + 0.0749i & 0.5479 + 0.3445i & 0.3368 + 0.4595i \\ 0.0927 - 0.6134i & -0.4211 + 0.0796i & -0.0820 + 0.4679i \\ 0.6031 - 0.2167i & -0.1108 + 0.3020i & -0.0056 - 0.3033i \end{matrix}$$

$$V3(:,:,30) = \begin{matrix} -0.2021 + 0.2515i & -0.1048 + 0.3295i & 0.4277 + 0.4419i \\ -0.2703 - 0.8413i & 0.2200 + 0.2221i & -0.0633 - 0.0093i \\ -0.3054 - 0.0715i & -0.4718 - 0.1404i & 0.2258 - 0.7007i \\ 0.1019 + 0.0787i & 0.3731 - 0.6334i & -0.2723 - 0.0393i \end{matrix}$$

$$V3(:,:,31) = \begin{matrix} 0.5000 & 0.5000 & -0.5000 \\ 0 + 0.5000i & 0 - 0.5000i & -0.5000 \\ 0.5000 & 0.5000 & 0.5000 \\ 0 + 0.5000i & 0 - 0.5000i & 0.5000 \end{matrix}$$

$$V3(:,:,32) = \begin{matrix} -0.0056 + 0.0131i & 0.0379 - 0.7861i & 0.2371 + 0.2967i \\ 0.0211 + 0.5772i & 0.4481 - 0.2070i & 0.0255 - 0.3378i \\ 0.6155 - 0.2919i & 0.1617 + 0.2064i & -0.2637 - 0.0051i \\ 0.3534 - 0.2780i & 0.2588 + 0.0366i & 0.7632 - 0.2983i \end{matrix}$$

$$V3(:,:,33) = \begin{matrix} 0.0913 - 0.3481i & 0.5632 + 0.2802i & -0.1951 - 0.3100i \\ -0.5047 + 0.4712i & -0.0240 - 0.0899i & -0.2776 - 0.6145i \\ 0.0947 - 0.5855i & -0.3176 - 0.3672i & -0.4474 - 0.0811i \\ -0.0727 + 0.1915i & 0.4510 - 0.3955i & 0.2488 + 0.3775i \end{matrix}$$

$$V3(:,:,34) = \begin{matrix} 0.5000 & -0.5000 & -0.5000 \\ 0 + 0.5000i & -0.5000 & 0.5000 \\ 0.5000 & 0.5000 & 0.5000 \\ 0 + 0.5000i & 0.5000 & -0.5000 \end{matrix}$$

$$V3(:,:,35) = \begin{matrix} 0.2602 - 0.3335i & 0.1575 - 0.6399i & 0.5258 + 0.2920i \\ 0.3267 - 0.3041i & -0.2930 + 0.2159i & -0.2319 + 0.3158i \\ 0.1781 + 0.6675i & 0.1266 - 0.0025i & 0.4330 - 0.1995i \\ -0.1799 + 0.3348i & -0.3623 - 0.5347i & -0.3289 + 0.3863i \end{matrix}$$

$$V3(:,:,36) = \begin{matrix} -0.1449 - 0.3470i & -0.3069 - 0.2742i & -0.4090 + 0.5345i \\ -0.0692 + 0.7493i & 0.0914 + 0.0688i & -0.3010 - 0.1486i \\ -0.1504 + 0.4516i & 0.1108 - 0.0595i & -0.1821 + 0.5717i \\ 0.1073 - 0.2330i & 0.4107 + 0.7956i & -0.1571 + 0.2230i \end{matrix}$$

$$V3(:,:,37) = \begin{matrix} 0.5000 & 0.5000 & 0.5000 \\ 0.5000 & 0 + 0.5000i & -0.5000 \\ 0.5000 & -0.5000 & 0.5000 \\ -0.5000 & 0 + 0.5000i & 0.5000 \end{matrix}$$

$$V3(:,:,38) = \begin{matrix} -0.6780 - 0.3635i & 0.0238 - 0.3004i & -0.2666 - 0.1906i \\ 0.1160 + 0.0644i & 0.7450 + 0.3155i & -0.4820 + 0.0363i \\ -0.3301 + 0.2541i & 0.4517 - 0.0242i & 0.6746 - 0.3688i \\ -0.4384 + 0.1574i & 0.1584 + 0.1580i & -0.2294 + 0.1232i \end{matrix}$$

$$V3(:,:,39) = \begin{matrix} 0.2383 + 0.0963i & -0.0567 - 0.0816i & 0.8144 + 0.2149i \\ 0.2810 + 0.0700i & -0.5121 + 0.5153i & -0.1356 + 0.3467i \\ 0.2857 - 0.4528i & 0.4309 + 0.0872i & -0.3612 + 0.1144i \\ -0.4779 + 0.5788i & 0.3586 + 0.3748i & -0.0135 - 0.0906i \end{matrix}$$

$$V3(:,:,40) = \begin{matrix} 0.5000 & 0.5000 & 0.5000 \\ 0.5000 & -0.5000 & 0-0.5000i \\ 0.5000 & 0.5000 & -0.5000 \\ -0.5000 & 0.5000 & 0-0.5000i \end{matrix}$$

$V3(:,:,41) =$ $$\begin{matrix} 0.6361-0.0379i & 0.0303+0.1370i & -0.3832+0.4456i \\ -0.3164+0.0577i & 0.8288+0.2462i & -0.2979-0.0876i \\ 0.0562+0.0352i & -0.1507-0.2734i & 0.0430-0.5667i \\ 0.6782-0.1616i & 0.3675-0.0175i & 0.1704-0.4541i \end{matrix}$$

$V3(:,:,42) =$ $$\begin{matrix} -0.6004-0.0993i & 0.1028-0.0939i & 0.6203+0.1250i \\ -0.4515-0.2985i & -0.0297+0.3112i & -0.5456-0.4663i \\ -0.1174+0.2648i & -0.8756+0.2308i & -0.0070+0.2556i \\ 0.3667+0.3441i & 0.1195-0.2205i & -0.0920-0.1031i \end{matrix}$$

$$V3(:,:,43) = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

$V3(:,:,44) =$ $$\begin{matrix} -0.2530+0.3209i & -0.4814+0.3797i & -0.1906-0.2722i \\ -0.2885-0.0485i & -0.4053-0.3563i & 0.1239+0.0673i \\ -0.0415-0.7379i & -0.0707+0.5502i & 0.3560-0.0416i \\ 0.1649-0.4171i & -0.1172-0.1069i & -0.7392-0.4413i \end{matrix}$$

$V3(:,:,45) =$ $$\begin{matrix} 0.2821-0.1279i & -0.5649+0.3170i & 0.3752+0.3388i \\ -0.0004-0.0348i & 0.5468-0.3850i & 0.6392+0.3007i \\ -0.2923+0.0831i & -0.2695+0.2250i & 0.4521-0.0693i \\ -0.0749-0.8971i & -0.0004-0.0994i & -0.1722-0.0816i \end{matrix}$$

$V3(:,:,46) =$ $$\begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

$$V3(:,:,47) = \begin{matrix} -0.4748+0.1205i & -0.1361+0.1678i & 0.6410+0.2967i \\ 0.2258+0.2637i & -0.0187-0.5564i & 0.4803+0.2985i \\ -0.265+0.3289i & -0.3000+0.5816i & -0.0870+0.0961i \\ -0.2798+0.6188i & -0.1970-0.4199i & -0.3841-0.1305i \end{matrix}$$

$V3(:,:,48) =$ $$\begin{matrix} -0.0180-0.6214i & -0.4511+0.0275i & 0.2056+0.1427i \\ -0.0262+0.4269i & 0.2038-0.1591i & -0.3709-0.0966i \\ 0.1087+0.3811i & -0.7745+0.3487i & -0.2829-0.1551i \\ -0.5069+0.1291i & -0.0765-0.0408i & -0.2182+0.7993i \end{matrix}$$

$V3(:,:,49) =$ $$\begin{matrix} 0.0906-0.2217i & 0.1089-0.3913i & 0.6994+0.1962i \\ -0.3471+0.3239i & -0.5370-0.3087i & -0.3246+0.1888i \\ -0.2568+0.4202i & 0.3284+0.4249i & 0.2167-0.4149i \\ 0.6329-0.2724i & -0.3826+0.1289i & -0.0824-0.3247i \end{matrix}$$

$V3(:,:,50) =$ $$\begin{matrix} -0.2542-0.0969i & 0.6056-0.2040i & -0.2829-0.4240i \\ 0.1965+0.0675i & -0.4536-0.0227i & 0.2347-0.7163i \\ 0.8534+0.0091i & 0.3944+0.0214i & 0.0241+0.1682i \\ 0.3805+0.0988i & -0.1788-0.4443i & -0.2841-0.2500i \end{matrix}$$

$$V3(:,:,51) = \begin{matrix} -0.0310+0.3127i & -0.4192+0.2451i & -0.6324+0.1246i \\ -0.4944-0.1906i & 0.1428+0.6550i & -0.0352+0.1364i \\ 0.0394+0.1700i & 0.4123+0.2162i & -0.4882-0.5143i \\ -0.1337-0.7565i & 0.2889-0.1209i & -0.2467-0.0313i \end{matrix}$$

$V3(:,:,52) =$ $$\begin{matrix} 0.0769+0.4899i & 0.3574-0.2210i & -0.2987-0.2809i \\ 0.0623-0.0897i & 0.7253-0.1454i & 0.4881+0.4323i \\ -0.4402+0.1739i & -0.0113+0.3414i & 0.2179-0.2281i \\ -0.7025-0.1568i & 0.1428-0.3730i & -0.4909+0.2576i \end{matrix}$$

$V3(:,:,53) =$ $$\begin{matrix} -0.1844+0.1638i & -0.6587+0.3087i & -0.1539-0.3692i \\ 0.3389-0.3843i & -0.2949+0.3309i & 0.4206-0.3378i \\ 0.4409-0.5467i & -0.1139+0.1683i & -0.1714+0.4313i \\ -0.1168-0.4120i & -0.2644-0.4039i & -0.5775-0.0090i \end{matrix}$$

$V3(:,:,54) =$ $$\begin{matrix} -0.1461+0.1056i & 0.2135+0.2312i & -0.6745+0.4757i \\ 0.1171-0.2010i & 0.0162+0.6417i & -0.1534+0.0178i \\ -0.9157-0.2359i & -0.0474-0.0483i & 0.1159-0.0681i \\ -0.0670-0.1213i & -0.6245-0.3072i & -0.2668+0.4534i \end{matrix}$$

$$V3(:,:,55) = \begin{matrix} 0.5295+0.2225i & -0.1373-0.3127i & -0.4137+0.3638i \\ 0.0632+0.0938i & 0.1078+0.6964i & -0.4209-0.2518i \\ -0.3442+0.5791i & -0.4500-0.0778i & -0.1048+0.2769i \\ 0.1494-0.4256i & -0.4187-0.0536i & -0.5783-0.1840i \end{matrix}$$

$V3(:,:,56) =$ $$\begin{matrix} -0.2534+0.0743i & -0.3840+0.2583i & -0.2059-0.7267i \\ -0.0802+0.0767i & 0.0963+0.7666i & 0.2344+0.2101i \\ -0.3092+0.6079i & -0.0022-0.4149i & -0.2681+0.1439i \\ -0.6565-0.1479i & -0.1295+0.0072i & 0.1480+0.4646i \end{matrix}$$

$V3(:,:,57) =$ $$\begin{matrix} -0.4933+0.2493i & -0.1093-0.6284i & -0.1925-0.0244i \\ -0.0119-0.1919i & -0.4573-0.0414i & 0.6333+0.3179i \\ 0.2792+0.2603i & -0.2294-0.3536i & 0.0703-0.6494i \\ -0.5616-0.4432i & -0.4520+0.0189i & -0.1228-0.1357i \end{matrix}$$

-continued $$V3(:,:,58) = \begin{bmatrix} 0.5987+0.4276i & 0.1110+0.0636i & 0.3849+0.0409i \\ -0.2253+0.0427i & 0.9463-0.0868i & -0.0474+0.0990i \\ -0.1122+0.5394i & 0.0270+0.1660i & 0.0832-0.7139i \\ 0.2949-0.1252i & 0.1828+0.1374i & 0.5310+0.1992i \end{bmatrix}$$

$$V3(:,:,59) = \begin{bmatrix} -0.1299-0.1774i & 0.0635+0.6372i & -0.1454-0.5201i \\ -0.7371-0.3712i & 0.1343-0.0486i & 0.0889-0.2013i \\ -0.1244-0.1207i & -0.2344-0.6779i & 0.0211-0.4528i \\ 0.4090-0.2705i & 0.0763-0.2220i & -0.6105-0.2859i \end{bmatrix}$$

$$V3(:,:,60) = \begin{bmatrix} -0.3263-0.7161i & -0.0074-0.1928i & -0.3735+0.4091i \\ -0.0538+0.0491i & -0.7846+0.2480i & -0.2825-0.2907i \\ 0.2749-0.2169i & 0.0684+0.2639i & 0.5764+0.1916i \\ 0.4347-0.2526i & -0.4391-0.1363i & 0.2853+0.2800i \end{bmatrix}$$

$$V3(:,:,61) = \begin{bmatrix} -0.3550+0.4986i & 0.2360-0.2295i & 0.3696+0.3610i \\ -0.5979-0.4466i & -0.1015-0.0709i & 0.4087-0.1032i \\ 0.2014+0.0225i & -0.1794+0.3659i & 0.6567+0.3341i \\ -0.1636-0.0232i & -0.8345+0.1176i & -0.0448-0.1024i \end{bmatrix}$$

$$V3(:,:,62) = \begin{bmatrix} 0.4315+0.2977i & 0.5279-0.2633i & -0.0096-0.1863i \\ -0.3022+0.611i & 0.0004+0.3129i & 0.4461+0.2312i \\ -0.4238-0.3362i & 0.4544+0.2155i & -0.6006-0.2328i \\ 0.3188-0.4857i & 0.5285+0.1480i & 0.2559+0.4820i \end{bmatrix}$$

$$V3(:,:,63) = \begin{bmatrix} 0.6135-0.5466i & 0.1363+0.0107i & -0.0265-0.2357i \\ -0.3336+0.1681i & 0.3619+0.5204i & 0.4467-0.0956i \\ 0.0923+0.1646i & -0.3085-0.5415i & 0.4468+0.3555i \\ 0.2389+0.3044i & -0.1937+0.3920i & -0.5692+0.2917i \end{bmatrix}$$

$$V3(:,:,64) = \begin{bmatrix} -0.0643+0.2882i & 0.7408-0.0532i & -0.0130-0.1806i \\ 0.1360-0.4277i & 0.4029+0.4160i & -0.4410-0.0947i \\ -0.4682+0.3860i & 0.0628+0.1030i & 0.4010-0.2857i \\ -0.2986-0.5040i & -0.0741-0.3049i & -0.0166-0.7218i \end{bmatrix}$$

Final Rank 4 Codebook:

$$V4(:,:,1) = \begin{bmatrix} 0.5000 & 0.5000 & -0.5000 & -0.5000 \\ 0.5000 & -0.5000 & -0.5000 & 0.5000 \\ 0.5000 & 0.5000 & 0.5000 & 0.5000 \\ 0.5000 & -0.5000 & 0.5000 & -0.5000 \end{bmatrix}$$

$$V4(:,:,2) = \begin{bmatrix} 0.5000 & 0.5000 & -0.5000 & -0.5000 \\ 0+0.5000i & 0-0.5000i & 0-0.5000i & 0+0.5000i \\ 0.5000 & 0.5000 & 0.5000 & 0.5000 \\ 0+0.5000i & 0-0.5000i & 0+0.5000i & 0-0.5000i \end{bmatrix}$$

$$V4(:,:,3) = \begin{bmatrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{bmatrix}$$

$$V4(:,:,4) = \begin{bmatrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{bmatrix}$$

$$V4(:,:,5) = \begin{bmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{bmatrix}$$

$$V4(:,:,6) = \begin{bmatrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{bmatrix}$$

$$V4(:,:,7) = \begin{bmatrix} -0.2573+0.5267i & -0.4516-0.0164i & -0.1786+0.5269i & -0.2985-0.2313i \\ 0.4306+0.2510i & -0.3631-0.4030i & -0.3685-0.1544i & 0.1966+0.5090i \\ 0.4306+0.2510i & 0.4237+0.2733i & -0.5798-0.0933i & -0.1123-0.3741i \\ -0.3995-0.0009i & 0.2522+0.4286i & -0.3685+0.2240i & 0.0615+0.6351i \end{bmatrix}$$

$$V4(:,:,8) = \begin{bmatrix} 0.4182-0.2060i & 0.7071-0.3537i & -0.0971+0.0208i & -0.2518-0.2904i \\ 0.2693+0.5849i & -0.1549-0.4387i & -0.4646-0.3323i & 0.1746+0.1101i \\ -0.3088+0.1985i & 0.3107-0.1994i & -0.1616+0.7129i & 0.4094+0.1641i \\ -0.1743+0.4504i & -0.1065+0.1039i & -0.1624+0.3212i & -0.7503-0.2284i \end{bmatrix}$$

$V4(:,:,9) =$ $$\begin{matrix} -0.1228+0.0831i & 0.1911+0.1844i & -0.2742-0.7346i & 0.4333-0.3239i \\ 0.4892-0.2949i & -0.6076-0.2220i & 0.1147-0.2232i & -0.0716-0.4327i \\ 0.4754+0.1031i & 0.0935-0.1294i & -0.2568-0.4393i & -0.3198+0.6137i \\ -0.3409-0.5467i & 0.3520-0.6014i & 0.1308-0.2148i & -0.1887-0.0218i \end{matrix}$$

$V4(:,:,10) =$ $$\begin{matrix} 0.1663+0.6240i & -0.4390-0.0177i & 0.1890+0.1915i & 0.5399-0.1614i \\ 0.0064+0.1030i & -0.2573-0.1623i & 0.5097-0.7079i & -0.1643+0.3299i \\ -0.3928+0.4752i & 0.4550+0.6115i & 0.1352-0.1381i & -0.0396-0.0100i \\ -0.4732-0.0316i & 0.0477-0.3623i & -0.0601-03545i & 0.1275-0.7271i \end{matrix}$$

$V4(:,:,11) =$ $$\begin{matrix} 0.1228-0.0831i & -0.0832i+0.1719i & 0.1018+0.2933i & 0.3119-0.2093i \\ -0.4754-0.1031i & 0.0004-0.0643i & 0.6544-0.1493i & 0.3891+0.3966i \\ -0.4892+0.2949i & 0.0542+0.3715i & -0.5068+0.3662i & 0.2327+0.2963i \\ 0.3409+0.5467i & -0.2612+0.2147i & 0.1621-0.1894i & -0.3150+0.5560i \end{matrix}$$

$V4(:,:12) =$ $$\begin{matrix} 0.4119-0.2376i & 0.2307-0.3523i & -0.3946+0.2222i & 0.3873+0.4914i \\ 0.0073-0.7328i & -0.1995-0.0992i & 0.1664-0.1501i & -0.5320+0.2829i \\ 0.3791+0.1546i & -0.6261+0.4891i & 0.1146+0.2907i & 0.0580+0.3166i \\ 0.2445-0.0972i & -0.3749-0.0349i & -0.2411-0.7674i & 0.3196-0.1994i \end{matrix}$$

$V4(:,:,13) = \begin{matrix} -0.7073-0.3349i & -0.3380-0.1860i & 0.2936-0.0670i & 0.1233+0.3645i \\ -0.2125+0.3788i & -0.2536-0.2825i & -0.4027+0.1913i & -0.6695+0.1424i \\ -0.2125+0.3788i & 0.6905-0.2237i & 0.4699+0.1884i & -0.0830+0.1462i \\ 0.0779+0.0648i & -0.3771+0.1950i & 0.6721+0.0505i & -0.4095-0.4330i \end{matrix}$ $V4(:,:,14) = \begin{matrix} -0.0318-0.3722i & 0.5870+0.5837i & 0.1694-03686i & -0.1020-0.0171i \\ -0.0512-0.1869i & 0.1353-0.0302i & 0.2036+0.5782i & -0.5358+0.5295i \\ 0.5269+0.1995i & 0.1672-0.4033i & 0.4862-0.2843i & -0.3698-0.1949i \\ 0.3031-0.6431i & 0.1619-0.2805i & 0.0806+0.3688i & 0.4237-0.2601i \end{matrix}$ $V4(:,:,15) = \begin{matrix} 0.0318+0.3722i & 0.2910+0.0846i & 0.0464+0.0232i & -0.8617+0.1530i \\ 0.1869-0.0512i & -0.5838-0.6826i & 0.1164+0.0920i & -0.3062-0.1997i \\ 0.5269+0.1995i & -0.1084+0.1034i & -0.6815-0.4049i & -0.0000-0.1781i \\ -0.6431-0.3031i & 0.0232-0.2799i & -0.4827-0.3376i & -0.1746+0.1956i \end{matrix}$ $V4(:,:,16) = \begin{matrix} -0.1228+0.0831i & 0.4864+0.1062i & -0.5138+0.1606i & 0.6091+0.2633i \\ -0.1031+0.4754i & -0.3579+0.0709i & 0.2824-0.4495i & 0.5834-0.0898i \\ -0.4892+0.2949i & 0.3743-0.4217i & -0.1744-0.4396i & -0.3251-0.1626i \\ -0.5467+0.3409i & -0.2104+0.5067i & -0.1120+0.4384i & -0.2030-0.1946i \end{matrix}$ $V4(:,:,17) = \begin{matrix} -0.4119+0.2376i & -0.3475+0.0349i & -0.5492+0.0805i & 0.4831-0.3324i \\ 0.7328+0.0073i & -0.3183+0.2743i & 0.0020-0.0107i & 0.5026+0.1833i \\ 0.3791+0.1546i & 0.3910-0.0682i & -0.6621-0.4101i & -0.2328-0.1188i \\ -0.0972-0.2445i & -0.5729+0.4644i & -0.2236-0.1878i & -0.5285+0.1492i \end{matrix}$ -continued $$V4(:,:,18) = \begin{matrix} 0.7073 + 0.3349i & 0.3580 + 0.4230i & 0.2367 + 0.0128i & 0.0222 - 0.1544i \\ 0.3788 + 0.2125i & -0.5016 - 0.3133i & 0.2038 - 0.2663i & -0.4319 + 0.4031i \\ -0.2125 + 0.3788i & 0.4516 - 0.0120i & -0.3421 - 0.6404i & -0.0186 + 0.2825i \\ -0.0648 + 0.0779i & 0.2277 - 0.2953i & 0.5298 + 0.1531i & 0.5491 + 0.4950i \end{matrix}$$

$$V4(:,:,19) = \begin{matrix} -0.1663 - 0.6240i & -0.0285 - 0.3000i & 0.2482 - 0.1368i & -0.3683 + 0.5255i \\ -0.1030 + 0.0064i & -0.0146 + 0.4747i & 0.8444 + 0.1708i & 0.1466 - 0.0063i \\ -0.3928 + 0.4752i & 0.1862 + 0.2754i & -0.1088 + 0.1084i & -0.6599 + 0.2244i \\ -0.0316 + 0.4372i & -0.4436 - 0.6134i & 0.3812 - 0.0925i & -0.1957 - 0.2063i \end{matrix}$$

$$V4(:,:,20) = \begin{matrix} 0.2573 - 0.5267i & 0.4288 + 0.0624i & -0.4668 + 0.1127i & -0.4182 + 0.2512i \\ 0.2510 - 0.4306i & -0.2155 - 0.5900i & 0.4068 - 0.1439i & -0.2850 - 0.29955i \\ 0.4306 + 0.2510i & 0.0071 - 0.1770i & 0.2316 - 0.2993i & 0.0461 + 0.7582i \\ 0.0009 - 0.3995i & 0.1913 + 0.5913i & 0.6629 + 0.0244i & 0.0964 + 0.0693i \end{matrix}$$

$V4(:,:,21) =$ $$\begin{matrix} -0.4182 + 0.2060i & -0.0368 - 0.0444i & -0.1903 + 0.2671i & 0.4025 - 0.7140i \\ -0.5849 + 0.2693i & 0.0931 + 0.1023i & 0.3098 - 0.6795i & -0.0892 + 0.0221i \\ -0.3088 + 0.1985i & 0.6755 + 0.2582i & -0.0591 + 04709i & -0.0849 + 0.3313i \\ 0.4504 + 0.1743i & 01401 + 0.6595i & 03082 - 0.1202i & 0.4248 - 0.1494i \end{matrix}$$

$V4(:,:,22) =$ $$\begin{matrix} 0.1228 - 0.0831i & 0.5267 + 0.1302i & -0.3106 - 0.1437i & 0.7407 - 0.1338i \\ -0.2949 - 0.4892i & -0.3082 + 0.1349i & -0.4197 - 0.5805i & -0.1306 - 0.1743i \\ 0.4754 + 0.1031i & -0.5798 - 0.2378i & -0.5074 + 0.1972i & 0.2367 + 0.1351i \\ 0.5467 - 0.3409i & 0.4428 + 0.0607i & -0.2678 + 0.0417i & -0.5235 + 0.1939i \end{matrix}$$

$V4(:,:,23) =$ $$\begin{matrix} -0.6051 + 0.1790i & -0.2867 + 0.4568i & -0.0929 + 0.0656i & -0.1384 - 0.5281i \\ 0.3147 + 0.1351i & -0.3377 + 0.4028i & 0.6771 - 0.3179i & 0.2166 + 0.0016i \\ 0.3147 + 0.1351i & -0.4367 - 0.4408i & -0.1123 - 0.3181i & -0.5156 - 0.3436i \\ -0.1801 - 0.5787i & 0.2118 - 0.0548i & 0.5502 + 0.1048i & -0.5105 - 0.1021i \end{matrix}$$

$V4(:,:,24) =$ $$\begin{matrix} 0.0704 + 0.1417i & 0.4489 - 0.4294i & 0.4657 + 0.4116i & 0.2255 + 0.3897i \\ 0.1534 + 0.7008i & 0.0676 - 0.2514i & -0.5317 - 0.2639i & 0.1962 + 0.1631i \\ -0.4248 + 0.3144i & -0.0562 - 03389i & -0.0047 + 0.3844i & -0.1563 - 0.6561i \\ -0.4053 + 0.1292i & -0.6352 + 0.1576i & -0.0225 + 0.3362i & 0.3199 + 0.4182i \end{matrix}$$

$V4(:,:,25) =$ $$\begin{matrix} 0.5141 + 0.2763i & 0.0224 - 0.0857i & -0.3110 + 0.4440i & 0.3131 - 0.5095i \\ 0.2189 + 0.1095i & 0.4370 + 0.0749i & 0.5479 + 0.3445i & 0.3368 + 0.4595i \\ 0.2769 - 0.3593i & 0.0927 - 0.6134i & -0.4211 + 0.0796i & -0.0820 + 0.4679i \\ -0.6111 - 0.1423i & 0.6031 - 0.2167i & -0.1108 + 0.3020i & -0.0056 - 0.3033i \end{matrix}$$

$V4(:,:,26) =$ $$\begin{matrix} -0.6051 + 0.1790i & -0.2021 + 0.2515i & -0.1048 + 0.3295i & 0.4277 + 0.4419i \\ -0.1351 + 0.3147i & -0.2703 - 0.8413i & 0.2200 + 0.2221i & -0.0633 - 0.0093i \\ -0.3147 - 0.1351i & -0.3054 - 0.0715i & -0.4718 - 0.1404i & 0.2258 - 0.7007i \\ -0.5787 + 0.1801i & 0.1019 + 0.0787i & 0.3731 - 0.6334i & -0.2723 - 0.0393i \end{matrix}$$

-continued $V4(:,:,27) =$

| | | | |
|---|---|---|---|
| $0.2250 + 0.4308i$ | $-0.0056 + 0.0131i$ | $0.0379 - 0.7861i$ | $0.2371 - 0.2967i$ |
| $0.3732 - 0.4108i$ | $0.0211 + 0.5772i$ | $0.4481 - 0.2070i$ | $0.0255 - 0.3378i$ |
| $0.5913 + 0.2190i$ | $0.6155 - 0.2919i$ | $0.1617 + 0.2064i$ | $-0.2637 - 0.0051i$ |
| $-0.2387 - 0.0328i$ | $0.3534 - 0.2780i$ | $0.2588 + 0.0366i$ | $0.7632 - 0.2983i$ |

$V4(:,:,28) =$

| | | | |
|---|---|---|---|
| $0.5141 + 0.2763i$ | $0.0913 - 0.3481i$ | $0.5632 + 0.2802i$ | $-0.1951 - 0.3100i$ |
| $-0.1095 + 0.2189i$ | $-0.5047 + 0.4712i$ | $-0.0240 - 0.0899i$ | $-0.2776 - 0.6145i$ |
| $-0.2769 + 0.3593i$ | $0.0947 - 0.5855i$ | $-0.3176 - 0.3672i$ | $-0.4474 - 0.0811i$ |
| $-0.1423 + 0.6111i$ | $-0.0727 + 0.1915i$ | $0.4510 - 0.3955i$ | $0.2488 + 0.3775i$ |

$V4(:,:,29) =$

| | | | |
|---|---|---|---|
| $0.0704 + 0.1417i$ | $0.2602 - 0.3335i$ | $0.1575 - 0.6399i$ | $0.5258 + 0.2920i$ |
| $0.7008 - 0.1534i$ | $0.3267 - 0.3041i$ | $-0.2930 + 0.2159i$ | $-0.2319 + 0.3158i$ |
| $0.4248 - 0.3144i$ | $0.1781 + 0.6675i$ | $0.1266 - 0.0025i$ | $0.4330 - 0.1995i$ |
| $-0.1292 - 0.4053i$ | $-0.1799 + 0.3348i$ | $-0.3623 - 0.5347i$ | $-0.3289 + 0.3863i$ |

$V4(:,:,30) =$

| | | | |
|---|---|---|---|
| $0.2250 + 0.4308i$ | $-0.1449 - 0.3470i$ | $-0.3069 - 0.2742i$ | $-0.4090 + 0.5345i$ |
| $0.4108 + 0.3732i$ | $-0.0692 + 0.7493i$ | $0.0914 + 0.0688i$ | $-0.3010 - 0.1486i$ |
| $-0.5913 - 0.2190i$ | $-0.1504 + 0.4516i$ | $0.1108 - 0.0595i$ | $-0.1821 + 0.5717i$ |
| $-0.0328 + 0.2387i$ | $0.1073 - 0.2330i$ | $0.4107 + 0.7956i$ | $-0.1571 + 0.2230i$ |

$V4(:,:,31) =$

| | | | |
|---|---|---|---|
| $-0.0376 + 0.4566i$ | $-0.6780 - 0.3635i$ | $0.0238 - 0.3004i$ | $-0.2666 - 0.1906i$ |
| $0.2688 + 0.1481i$ | $0.1160 + 0.0644i$ | $0.7450 + 0.3155i$ | $-0.4820 + 0.0363i$ |
| $0.1588 - 0.0744i$ | $-0.3301 + 0.2541i$ | $0.4517 - 0.0242i$ | $0.6746 - 0.3688i$ |
| $-0.5917 - 0.5613i$ | $-0.4384 + 0.1574i$ | $0.1584 + 0.1580i$ | $-0.2294 + 0.1232i$ |

$V4(:,:,32) =$

| | | | |
|---|---|---|---|
| $-0.4472 - 0.1208i$ | $0.2383 + 0.0963i$ | $-0.0567 - 0.0816i$ | $0.8144 + 0.2149i$ |
| $-0.0781 + 0.4936i$ | $0.2810 + 0.0700i$ | $-0.5121 + 0.5153i$ | $-0.1356 + 0.3467i$ |
| $-0.6133 - 0.0191i$ | $0.2857 - 0.4528i$ | $0.4309 + 0.0872i$ | $-0.3612 + 0.1144i$ |
| $-0.3591 + 0.1738i$ | $-0.4779 + 0.5788i$ | $0.3586 + 0.3748i$ | $-0.0135 - 0.0906i$ |

$V4(:,:,33) =$

| | | | |
|---|---|---|---|
| $0.4535 + 0.1524i$ | $0.6361 - 0.0379i$ | $0.0303 + 0.1370i$ | $-0.3832 + 0.4456i$ |
| $0.1943 - 0.1220i$ | $-0.3164 + 0.0577i$ | $0.8288 + 0.2462i$ | $-0.2979 - 0.0876i$ |
| $0.7044 - 0.2811i$ | $0.0562 + 0.0352i$ | $-0.1507 - 0.2734i$ | $0.0430 - 0.56671i$ |
| $-0.3738 - 0.0597i$ | $0.6782 - 0.1616i$ | $0.3675 - 0.0175i$ | $0.1704 - 0.4541i$ |

$V4(:,:,34) =$

| | | | |
|---|---|---|---|
| $-0.0376 + 0.4566i$ | $-0.6004 - 0.0993i$ | $0.1028 - 0.0939i$ | $0.6203 + 0.1250i$ |
| $-0.1481 + 0.2688i$ | $-0.4515 - 0.2985i$ | $-0.0297 + 0.3112i$ | $-0.5456 - 0.4663i$ |
| $-0.1588 + 0.0744i$ | $-0.1174 + 0.2648i$ | $-0.8756 + 0.2308i$ | $-0.0070 + 0.2556i$ |
| $-0.5613 + 0.5917i$ | $0.3667 + 0.3441i$ | $0.1195 - 0.2205i$ | $-0.0920 - 0.1031i$ |

$V4(:,:,35) =$ $$\begin{aligned}
&0.2356 + 0.5396i &&-0.2530 + 0.3209i &&-0.4814 + 0.3797i &&-0.1906 - 0.2722i \\
&0.6510 - 0.4238i &&-0.2885 - 0.0485i &&-0.4053 - 0.3563i &&0.1239 + 0.0673i \\
&0.1311 + 0.0167i &&-0.0415 - 0.7379i &&-0.0707 + 0.5502i &&0.3560 - 0.0416i \\
&-0.0198 - 0.1791i &&0.1649 - 0.4171i &&-0.1172 - 0.1069i &&-0.7392 - 0.4413i
\end{aligned}$$

$V4(:,:,36) =$ $$\begin{aligned}
&0.4535 + 0.1524i &&0.2821 - 0.1279i &&-0.5649 + 0.3170i &&0.3753 + 0.3388i \\
&0.1220 + 0.1943i &&-0.0004 - 0.0348i &&0.5468 - 0.3850i &&0.6392 + 0.3007i \\
&-0.7044 + 0.2811i &&-0.2923 + 0.0831i &&-0.2695 + 0.2250i &&0.4521 - 0.0693i \\
&-0.0597 + 0.3738i &&-0.0749 - 0.8971i &&-0.0004 - 0.0994i &&-0.1722 - 0.0816i
\end{aligned}$$

$V4(:,:,37) =$ $$\begin{aligned}
&-0.4472 - 0.1208i &&-0.4748 + 0.1205i &&-0.1361 + 0.1678i &&0.6410 + 0.2967i \\
&0.4936 + 0.0781i &&0.2258 + 0.2637i &&-0.0187 - 0.5564i &&0.4803 + 0.2985i \\
&0.6133 + 0.0191i &&-0.2650 + 0.3289i &&-0.3000 + 0.5816i &&-0.0870 + 0.0961i \\
&-0.1738 - 0.3591i &&-0.2798 + 0.6188i &&-0.1970 - 0.4199i &&-0.3841 - 0.1305i
\end{aligned}$$

$V4(:,:,38) =$ $$\begin{aligned}
&0.2356 + 0.5396i &&-0.0180 - 0.6214i &&-0.4511 + 0.0275i &&0.2056 + 0.1427i \\
&0.4238 + 0.6510i &&-0.0262 + 0.4269i &&0.2038 - 0.1591i &&-0.3709 - 0.0966i \\
&-0.1311 - 0.1671i &&0.1087 + 0.3811i &&-0.7745 + 0.3487i &&-0.2829 - 0.1551i \\
&-0.1791 + 0.0198i &&-0.5069 + 0.1291i &&-0.0765 - 0.0408i &&-0.2182 + 0.7993i
\end{aligned}$$

$V4(:,:,39) =$ $$\begin{aligned}
&0.5000 &&0.0906 - 0.2217i &&0.1089 - 0.3913i &&0.6994 + 0.1962i \\
&0.4619 + 0.1913i &&-0.3471 + 0.3239i &&-0.5370 - 0.3087i &&-0.3246 + 0.1888i \\
&0.3536 + 0.3536i &&-0.2568 + 0.4202i &&0.3284 + 0.4249i &&0.2167 - 0.4149i \\
&0.1913 + 0.4619i &&0.6329 - 0.2724i &&-0.3826 + 0.1289i &&-0.0824 - 0.3247i
\end{aligned}$$

$V4(:,:,40) =$ $$\begin{aligned}
&-0.0628 + 0.5038i &&-0.2542 - 0.0969i &&0.6056 - 0.2040i &&-0.2829 - 0.4240i \\
&0.3646 + 0.2226i &&0.1965 + 0.0675i &&-0.4536 - 0.0227i &&0.2347 - 0.7163i \\
&0.2517 + 0.1533i &&0.8534 + 0.0091i &&0.3944 + 0.0214i &&0.0241 + 0.1682i \\
&-0.6562 - 0.2058i &&0.3805 + 0.0988i &&-0.1788 - 0.4443i &&-0.2841 - 0.2500i
\end{aligned}$$

$V4(:,:,41) =$ $$\begin{aligned}
&0.5000 &&-0.0310 + 0.3127i &&-0.4192 + 0.2451i &&-0.6324 + 0.1246i \\
&-0.1913 + 0.4619i &&-0.4944 - 0.1906i &&0.1428 + 0.6550i &&-0.0352 + 0.1364i \\
&-0.3536 - 0.3536i &&0.0394 + 0.1700i &&0.4123 + 0.2162i &&-0.4882 - 0.5143i \\
&0.4619 - 0.1913i &&-0.1337 - 0.7565i &&0.2889 - 0.1209i &&-0.2467 - 0.0313i
\end{aligned}$$

$V4(:,:,42) =$ $$\begin{aligned}
&0.4184 + 0.4842i &&0.0769 + 0.4899i &&0.3574 - 0.2210i &&-0.2987 - 0.2809i \\
&0.1085 - 0.0629i &&0.0623 - 0.0897i &&0.7253 - 0.1454i &&0.4881 + 0.4323i \\
&0.5948 - 0.4538i &&-0.4402 + 0.1739i &&-0.0113 + 0.3414i &&0.2179 - 0.2281i \\
&-0.0601 - 0.1068i &&-0.7025 - 0.1568i &&0.1428 - 0.3730i &&-0.4909 + 0.2576i
\end{aligned}$$

-continued $V4(:,:,43) =$

| 0.5000 | −0.1844 + 0.1638$i$ | −0.6587 + 0.3087$i$ | −0.1539 − 0.3692$i$ |
| --- | --- | --- | --- |
| −0.4619 − 0.1913$i$ | 0.3389 − 0.3843$i$ | −0.2949 + 0.3309$i$ | 0.4206 − 0.3378$i$ |
| 0.3536 + 0.3536$i$ | 0.4409 − 0.5467$i$ | −0.1139 + 0.1683$i$ | −0.1714 + 0.4313$i$ |
| −0.1913 − 0.4619$i$ | −0.1168 − 0.4120$i$ | −0.2644 − 0.4039$i$ | −0.5775 − 0.0090$i$ |

$V4(:,:,44) =$

| −0.1083 + 0.4189$i$ | −0.1461 + 0.1056$i$ | 0.2135 + 0.2312$i$ | −0.6745 + 0.4757$i$ |
| --- | --- | --- | --- |
| 0.6032 − 0.3824$i$ | 0.1171 − 0.2010$i$ | 0.0162 + 0.6417$i$ | −0.1534 + 0.0178$i$ |
| 0.2610 + 0.1225$i$ | −0.9157 − 0.2359$i$ | −0.0474 − 0.0483$i$ | 0.1159 − 0.0681$i$ |
| −0.0597 − 0.4649$i$ | −0.0670 − 0.1213$i$ | −0.6245 − 0.3072$i$ | −0.2668 + 0.4534$i$ |

$V4(:,:,45) =$

| 0.5000 | 0.5295 + 0.2225$i$ | −0.1373 − 0.3127$i$ | −0.4137 + 0.3638$i$ |
| --- | --- | --- | --- |
| 0.1913 − 0.4619$i$ | 0.0632 + 0.0938$i$ | 0.1078 + 0.6964$i$ | −0.4209 − 0.2518$i$ |
| −0.3536 − 0.3536$i$ | −0.3442 + 0.5791$i$ | −0.4500 − 0.0778$i$ | −0.1048 + 0.2769$i$ |
| −0.4619 + 0.1913$i$ | 0.1494 − 0.4256$i$ | −0.4187 − 0.0536$i$ | −0.5783 − 0.1840$i$ |

$V4(:,:,46) =$

| −0.0430 − 0.3791$i$ | −0.2534 + 0.0743$i$ | −0.3840 + 0.2583$i$ | −0.2059 − 0.7267$i$ |
| --- | --- | --- | --- |
| 0.5314 − 0.0969$i$ | −0.0802 + 0.0767$i$ | 0.0963 + 0.7666$i$ | 0.2344 + 0.2101$i$ |
| 0.5001 − 0.1416$i$ | −0.3092 + 0.6079$i$ | −0.0022 − 0.4149$i$ | −0.2681 + 0.1439$i$ |
| −0.3832 − 0.3817$i$ | −0.6565 − 0.1479$i$ | −0.1295 + 0.0072$i$ | 0.1480 + 0.4646$i$ |

$V4(:,:,47) =$

| 0.5000 | −0.4933 + 0.2493$i$ | −0.1093 − 0.6284$i$ | −0.1925 − 0.0244$i$ |
| --- | --- | --- | --- |
| 0.1913 + 0.4619$i$ | −0.0119 − 0.1919$i$ | −0.4573 − 0.0414$i$ | 0.6333 + 0.3179$i$ |
| −0.3536 + 0.3536$i$ | 0.2792 + 0.2603$i$ | −0.2294 − 0.3536$i$ | 0.0703 − 0.6494$i$ |
| −0.4619 − 0.1913$i$ | −0.5616 − 0.4432$i$ | −0.4520 + 0.0189$i$ | −0.1228 − 0.1357$i$ |

$V4(:,:,48) =$

| −0.0197 + 0.5406$i$ | 0.5987 + 0.4276$i$ | 0.1110 + 0.0636$i$ | 0.3849 + 0.0409$i$ |
| --- | --- | --- | --- |
| 0.1681 + 0.0640$i$ | −0.2253 + 0.0427$i$ | 0.9463 − 0.0868$i$ | −0.0474 + 0.0990$i$ |
| 0.2143 − 0.3250$i$ | −0.1122 + 0.5394$i$ | 0.0270 + 0.1660$i$ | 0.0832 − 0.7139$i$ |
| −0.2387 − 0.6830$i$ | 0.2949 − 0.1252$i$ | 0.1828 + 0.1374$i$ | 0.5310 + 0.1992$i$ |

$V4(:,:,49) =$

| 0.5000 | −0.1299 − 0.1774$i$ | 0.0635 + 0.6372$i$ | −0.1454 − 0.5201$i$ |
| --- | --- | --- | --- |
| −0.4619 + 0.1913$i$ | −0.7371 − 0.3712$i$ | 0.1343 − 0.0486$i$ | 0.0889 − 0.2013$i$ |
| 0.3536 − 0.3536$i$ | −0.1244 − 0.1207$i$ | −0.2344 − 0.6779$i$ | 0.0211 − 0.4528$i$ |
| −0.1913 + 0.4619$i$ | 0.4090 − 0.2705$i$ | 0.0763 − 0.2220$i$ | −0.6105 − 0.2859$i$ |

$V4(:,:,50) =$

| 0.1819 − 0.0589$i$ | −0.3263 − 0.7161$i$ | −0.0074 − 0.1928$i$ | −0.3735 + 0.4091$i$ |
| --- | --- | --- | --- |
| 0.3368 − 0.1998$i$ | −0.0538 + 0.0491$i$ | −0.7846 + 0.2480$i$ | −0.2825 − 0.2907$i$ |
| 0.6565 − 0.0556$i$ | 0.2749 − 0.2169$i$ | 0.0684 + 0.2639$i$ | 0.5764 + 0.1916$i$ |
| −0.5241 − 0.3183$i$ | 0.4347 − 0.2526$i$ | −0.4391 − 0.1363$i$ | 0.2853 + 0.2800$i$ |

-continued $$V4(:,:,51) = \begin{matrix} 0.5000 & -0.3550 + 0.4986i & 0.2360 - 0.2295i & 0.3696 + 0.3610i \\ -0.1913 - 0.4619i & -0.5979 - 0.4466i & -0.1015 - 0.0709i & 0.4087 - 0.1032i \\ -0.3536 + 0.3536i & 0.2014 + 0.0225i & -0.1794 + 0.3659i & 0.6567 + 0.3341i \\ 0.4619 + 0.1913i & -0.1636 - 0.0232i & -0.8345 + 0.1176i & -0.0448 - 0.1024i \end{matrix}$$

$$V4(:,:,52) = \begin{matrix} 0.5307 + 0.2465i & 0.4315 + 0.2977i & 0.5279 - 0.2633i & -0.0096 - 0.1863i \\ 0.6357 - 0.3878i & -0.3022 + 0.0611i & 0.0004 + 0.3129i & 0.4461 + 0.2312i \\ 0.1539 - 0.1260i & -0.4238 - 0.3362i & 0.4544 + 0.2155i & -0.6006 - 0.2328i \\ -0.2499 - 0.0328i & 0.3188 - 0.4857i & 0.5285 + 0.1480i & 0.2559 + 0.4820i \end{matrix}$$

$$V4(:,:,53) = \begin{matrix} 0.5000 & 0.6135 - 0.5466i & 0.1363 + 0.0107i & -0.0265 - 0.2357i \\ 0.4619 - 0.1913i & -0.3336 + 0.1681i & 0.3619 + 0.5204i & 0.4467 - 0.0956i \\ 0.3536 - 0.3536i & 0.0923 + 0.1646i & -0.3085 - 0.5415i & 0.4468 + 0.3555i \\ 0.1913 - 0.4619i & 0.2389 + 0.3044i & -0.1937 + 0.3920i & -0.5692 + 0.2917i \end{matrix}$$

$$V4(:,:,54) = \begin{matrix} -0.4886 + 0.2995i & -0.0643 + 0.2882i & 0.7408 - 0.0532i & -0.0130 - 0.1806i \\ 0.4671 + 0.2039i & 0.1360 - 0.4277i & 0.4029 + 0.4160i & -0.4410 - 0.0947i \\ 0.5829 + 0.1869i & -0.4682 + 0.3860i & 0.0628 + 0.1030i & 0.4010 - 0.2857i \\ -0.1465 - 0.1250i & -0.2986 - 0.5040i & -0.0741 - 0.3049i & -0.0166 - 0.7218i \end{matrix}$$

The $1^{st}$, $4^{th}$, $7^{th}$, $10^{th}$, $13^{th}$, $16^{th}$, $19^{th}$, $22^{nd}$, $25^{th}$, $28^{th}$, $31^{st}$, $34^{th}$, $37^{th}$, $40^{th}$, $43^{rd}$, and $46^{th}$ codewords in each of the 6-bit final rank 1 codebook, the final rank 2 codebook, and the final rank 3 codebook are equal to the 16 codewords included in each of the 4-bit rank codebook, the rank 2 codebook, and the rank 3 codebook, disclosed in the above Table 1.

The 6-bit final rank 1 codebook, the final rank 2 codebook, and the final rank 3 codebook may be obtained using column subsets of the rank 4 codebook. Accordingly, the 6-bit final rank 1 codebook, the final rank 2 codebook, the final rank 3 codebook, and the final rank 4 codebook may be expressed as a function of V4, as given by the following Table 14, and may also be expressed using various types of schemes:

| Transmit Codebook Index | Transmission Rank 1 | Transmission Rank 2 | Transmission Rank 3 | Transmission Rank 4 |
|---|---|---|---|---|
| 1 | V4(:,2,1) | V4(:,[1,2],1) | V4(:,[1,2,3],1) | V4(:,:,1) |
| 2 | V4(:,1,7) | V4(:,[1,2],7) | V4(:,[2,3,4],7) | V4(:,:,2) |
| 3 | V4(:,1,8) | V4(:,[1,2],8) | V4(:,[2,3,4],8) | V4(:,:,3) |
| 4 | V4(:,3,1) | V4(:,[1,3],1) | V4(:,[1,2,4],1) | V4(:,:,4) |
| 5 | V4(:,1,9) | V4(:,[1,2],9) | V4(:,[2,3,4],9) | V4(:,:,5) |
| 6 | V4(:,1,10) | V4(:,[1,2],10) | V4(:,[2,3,4],10) | V4(:,:,6) |
| 7 | V4(:,4,1) | V4(:,[1,4],1) | V4(:,[1,3,4],1) | V4(:,:,7) |
| 8 | V4(:,1,11) | V4(:,[1,2],11) | V4(:,[2,3,4],11) | V4(:,:,8) |
| 9 | V4(:,1,12) | V4(:,[1,2],12) | V4(:,[2,3,4],12) | V4(:,:,9) |
| 10 | V4(:,2,2) | V4(:,[2,3],1) | V4(:,[2,3,4],1) | V4(:,:,10) |
| 11 | V4(:,1,13) | V4(:,[1,2],13) | V4(:,[2,3,4],13) | V4(:,:,11) |
| 12 | V4(:,1,14) | V4(:,[1,2],14) | V4(:,[2,3,4],14) | V4(:,:,12) |
| 13 | V4(:,3,2) | V4(:,[2,4],1) | V4(:,[1,2,3],2) | V4(:,:,13) |
| 14 | V4(:,1,15) | V4(:,[1,2],15) | V4(:,[2,3,4],15) | V4(:,:,14) |
| 15 | V4(:,1,16) | V4(:,[1,2],16) | V4(:,[2,3,4],16) | V4(:,:,15) |
| 16 | V4(:,4,2) | V4(:,[3,4],1) | V4(:,[1,2,4],2) | V4(:,:,16) |
| 17 | V4(:,1,17) | V4(:,[1,2],17) | V4(:,[2,3,4],17) | V4(:,:,17) |
| 18 | V4(:,1,18) | V4(:,[1,2],18) | V4(:,[2,3,4],18) | V4(:,:,18) |
| 19 | V4(:,1,3) | V4(:,[1,3],2) | V4(:,[1,3,4],2) | V4(:,:,19) |
| 20 | V4(:,1,19) | V4(:,[1,2],19) | V4(:,[2,3,4],19) | V4(:,:,20) |
| 21 | V4(:,1,20) | V4(:,[1,2],20) | V4(:,[2,3,4],20) | V4(:,:,21) |
| 22 | V4(:,1,4) | V4(:,[1,4],2) | V4(:,[2,3,4],2) | V4(:,:,22) |
| 23 | V4(:,1,21) | V4(:,[1,2],21) | V4(:,[2,3,4],21) | V4(:,:,23) |
| 24 | V4(:,1,22) | V4(:,[1,2],22) | V4(:,[2,3,4],22) | V4(:,:,24) |
| 25 | V4(:,1,5) | V4(:,[2,3],2) | V4(:,[1,2,3],3) | V4(:,:,25) |
| 26 | V4(:,1,23) | V4(:,[1,2],23) | V4(:,[2,3,4],23) | V4(:,:,26) |
| 27 | V4(:,1,24) | V4(:,[1,2],24) | V4(:,[2,3,4],24) | V4(:,:,27) |
| 28 | V4(:,2,5) | V4(:,[2,4],2) | V4(:,[1,3,4],3) | V4(:,:,28) |
| 29 | V4(:,1,25) | V4(:,[1,2],25) | V4(:,[2,3,4],25) | V4(:,:,29) |
| 30 | V4(:,1,26) | V4(:,[1,2],26) | V4(:,[2,3,4],26) | V4(:,:,30) |
| 31 | V4(:,3,5) | V4(:,[1,3],3) | V4(:,[1,2,3],4) | V4(:,:,31) |
| 32 | V4(:,1,27) | V4(:,[1,2],27) | V4(:,[2,3,4],27) | V4(:,:,32) |
| 33 | V4(:,1,28) | V4(:,[1,2],28) | V4(:,[2,3,4],28) | V4(:,:,33) |
| 34 | V4(:,4,5) | V4(:,[1,4],3) | V4(:,[1,3,4],4) | V4(:,:,34) |
| 35 | V4(:,1,29) | V4(:,[1,2],29) | V4(:,[2,3,4],29) | V4(:,:,35) |
| 36 | V4(:,1,30) | V4(:,[1,2],30) | V4(:,[2,3,4],30) | V4(:,:,36) |
| 37 | V4(:,1,6) | V4(:,[1,3],4) | V4(:,[1,2,3],5) | V4(:,:,37) |
| 38 | V4(:,1,31) | V4(:,[1,2],31) | V4(:,[2,3,4],31) | V4(:,:,38) |
| 39 | V4(:,1,32) | V4(:,[1,2],32) | V4(:,[2,3,4],32) | V4(:,:,39) |
| 40 | V4(:,2,6) | V4(:,[1,4],4) | V4(:,[1,3,4],5) | V4(:,:,40) |
| 41 | V4(:,1,33) | V4(:,[1,2],33) | V4(:,[2,3,4],33) | V4(:,:,41) |
| 42 | V4(:,1,34) | V4(:,[1,2],34) | V4(:,[2,3,4],34) | V4(:,:,42) |
| 43 | V4(:,3,6) | V4(:,[1,3],5) | V4(:,[1,2,4],6) | V4(:,:,43) |
| 44 | V4(:,1,35) | V4(:,[1,2],35) | V4(:,[2,3,4],35) | V4(:,:,44) |
| 45 | V4(:,1,36) | V4(:,[1,2],36) | V4(:,[2,3,4],36) | V4(:,:,45) |
| 46 | V4(:,4,6) | V4(:,[2,4],6) | V4(:,[2,3,4],6) | V4(:,:,46) |
| 47 | V4(:,1,37) | V4(:,[1,2],37) | V4(:,[2,3,4],37) | V4(:,:,47) |
| 48 | V4(:,1,38) | V4(:,[1,2],38) | V4(:,[2,3,4],38) | V4(:,:,48) |
| 49 | V4(:,1,39) | V4(:,[1,2],39) | V4(:,[2,3,4],39) | V4(:,:,49) |
| 50 | V4(:,1,40) | V4(:,[1,2],40) | V4(:,[2,3,4],40) | V4(:,:,50) |
| 51 | V4(:,1,41) | V4(:,[1,2],41) | V4(:,[2,3,4],41) | V4(:,:,51) |
| 52 | V4(:,1,42) | V4(:,[1,2],42) | V4(:,[2,3,4],42) | V4(:,:,52) |

-continued

| Transmit Codebook Index | Transmission Rank 1 | Transmission Rank 2 | Transmission Rank 3 | Transmission Rank 4 |
|---|---|---|---|---|
| 53 | V4(:,1,43) | V4(:,[1,2],43) | V4(:,[2,3,4],43) | V4(:,:,53) |
| 54 | V4(:,1,44) | V4(:,[1,2],44) | V4(:,[2,3,4],44) | V4(:,:,54) |
| 55 | V4(:,1,45) | V4(:,[1,2],45) | V4(:,[2,3,4],45) | |
| 56 | V4(:,1,46) | V4(:,[1,2],46) | V4(:,[2,3,4],46) | |
| 57 | V4(:,1,47) | V4(:,[1,2],47) | V4(:,[2,3,4],47) | |
| 58 | V4(:,1,48) | V4(:,[1,2],48) | V4(:,[2,3,4],48) | |
| 59 | V4(:,1,49) | V4(:,[1,2],49) | V4(:,[2,3,4],49) | |
| 60 | V4(:,1,50) | V4(:,[1,2],50) | V4(:,[2,3,4],50) | |
| 61 | V4(:,1,51) | V4(:,[1,2],51) | V4(:,[2,3,4],51) | |
| 62 | V4(:,1,52) | V4(:,[1,2],52) | V4(:,[2,3,4],52) | |
| 63 | V4(:,1,53) | V4(:,[1,2],53) | V4(:,[2,3,4],53) | |
| 64 | V4(:,1,54) | V4(:,[1,2],54) | V4(:,[2,3,4],54) | |

4. Fourth Scheme to Design a 6-Bit Codebook (1) Operation 1:

The following 4-bit codebook corresponding to the transmission rank 1 may be obtained from the 4-bit codebook disclosed in the above Table 1. Here, the 4-bit codebook corresponding to the transmission rank 1 disclosed in the above Table 1 is referred to as a base codebook.

$$\text{base\_cbk}(:,1:16) = [C_{1,1} \ldots C_{16,1}] \text{ with } C_{i,1} \text{ taken from table 1}$$

(2) Operation 2:

A local codebook local_cbk may be defined, for example, as follows:

$$\text{local\_cbk} = \begin{bmatrix} 0.0975 + 0.4904i & 0.0975 + 0.4904i & 0.0975 + 0.4904i & 0.0975 + 0.4904i \\ -0.4904 + 0.0975i & -0.0975 - 0.4904i & 0.4904 - 0.0975i & 0.0975 + 0.4904i \\ -0.4904 + 0.0975i & 0.4904 - 0.0975i & -0.4904 + 0.0975i & 0.4904 - 0.0975i \\ 0.3536 + 0.3536i & 0.3536 - 0.3536i & -0.3536 - 0.3536i & -0.3536 + 0.3536i \end{bmatrix};$$

(3) Operation 3:

```
r=abs(local_cbk);
phase_local_cbk=local_cbk./r;
alpha=0.9835;
```

A localized codebook localized_cbk may be expressed, for example, as follows:

```
localized_cbk=
[sqrt(1-alpha^2*(1-(r(1,1))^2))*phase_local_cbk(1,1),sqrt(1-alpha^2*(1-
(r(1,2))^2))*phase_local_cbk(1,2),sqrt(1-alpha^2*(1-(r(1,3))^2))*phase_local_cbk(1,3),sqrt(1-
alpha^2*(1-r(1,4))^2))*phase_local_cbk(1,4);...
alpha*r(2,1)*phase_local_cbk(2,1),alpha*r(2,2)*phase_local_cbk(2,2),alpha*r(2,3)*phase_local_cb
k(2,3),alpha*r(2,4)*phase_local_cbk(2,4);...
alpha*r(3,1)*phase_local_cbk(3,1),alpha*r(3,2)*phase_local_cbk(3,2),alpha*r(3,3)*phase_local_cb
k(3,3),alpha*r(3,4)*phase_local_cbk(3,4);...
alpha*r(4,1)*phase_local_cbk(4,1),alpha*r(4,2)*phase_local_cbk(4,2),alpha*r(4,3)*phase_local_cb
k(4,3),alpha*r(4,4)*phase_local_cbk(4,4)];
```

Where the localized codebook localized_cbk is calculated through the aforementioned process, vectors of the localized codebook localized_cbk may be normalized, for example, through the following exemplary process:

```
for k=1:size(localized_cbk,2)
        localized_cbk(:,k)=localized_cbk(:,k)/norm(localized_cbk(:,k));
    end
```

(4) Operation 4:

A final codebook final_cbk may be obtained by rotating the normalized localized codebook localized_cbk around the base codebook, for example, through the following exemplary process:

```
for k=1:16
    [U,S,V]=svd(base_cbk(:,k)); %, where an SVD is performed with respect to the
elements of the base codebook.
    R=U'*V; % U'*V*base_cbk(:,1,k)=[1;0;0;0]. % , where R denotes a rotation matrix
that rotates the normalized localized codebook localized_cbk around the base codebook.
    rotated_localized=R'*localized_cbk(:,1:3);%, where only first three vectors of
localized_cbk are rotated.
    final_cbk(:,(k-1)*4+1:k*4)=[base_cbk(:,k),rotated_localized];%, where the base
codebook is maintained as a centroid and the base codebook is included in a final 6-bit codebook.
end;
```

Six bits of the final rank 1 codebook may be given by final_cbk. A final rank 2 codebook, a final rank 3 codebook, and a final rank 4 codebook may also be obtained based on the final rank 1 codebook. For example, unitary matrices including columns of the final rank 1 codebook, different from the first 16 vectors of the base codebook, may be obtained. A total of 48 unitary matrices may be obtained. A total of 54 matrices may be obtained including $W_1$ through $W_6$, and the 48 unitary matrices.

The final rank 2 codebook may be obtained by taking the first two columns from the 48 unitary matrices, and by taking 16 matrices or codewords from the 4-bit rank 2 codebook disclosed in the above Table 1.

The final rank 3 codebook may be obtained by taking the second through the fourth columns from the 48 unitary matrices, and by taking 16 matrices or codewords from the 4-bit rank 3 codebook disclosed in the above Table 1.

Six bits of the final rank 1 codebook, the final rank 2 codebook, the final rank 3 codebook, and the final rank 4 codebook may be expressed as follows:

Final Rank 1 Codebook:

$$V1(:,:,1) = \begin{matrix} 0.5000 \\ 0.5000 \\ 0.5000 \\ 0.5000 \end{matrix}$$

$$V1(:,:,2) = \begin{matrix} 0.3260 + 0.6774i \\ 0.3254 + 0.1709i \\ 0.3254 + 0.1709i \\ -0.0250 + 0.4051i \end{matrix}$$

$$V1(:,:,3) = \begin{matrix} 0.1499 + 0.0347i \\ 0.5009 + 0.3071i \\ 0.1505 + 0.5412i \\ 0.1505 + 0.5412i \end{matrix}$$

$$V1(:,:,4) = \begin{matrix} 0.0918 + 0.3270i \\ 0.1311 + 0.6387i \\ 0.3473 + 0.0541i \\ 0.4815 + 0.4045i \end{matrix}$$

$$V1(:,:,5) = \begin{matrix} 0.5000 \\ -0.5000 \\ 0.5000 \\ -0.5000 \end{matrix}$$

$$V1(:,:,6) = \begin{matrix} 0.0918 + 0.3270i \\ -0.1311 - 0.6387i \\ 0.2473 + 0.0541i \\ -0.4815 - 0.4045i \end{matrix}$$

$$V1(:,:,7) = \begin{matrix} 0.3841 + 0.3851i \\ 0.0056 - 0.3076i \\ 0.2285 + 0.6580i \\ -0.3448 - 0.0735i \end{matrix}$$

$$V1(:,:,8) = \begin{matrix} 0.3260 + 0.6774i \\ -0.3254 - 0.1709i \\ 0.3254 + 0.1709i \\ 0.0250 - 0.4051i \end{matrix}$$

$$V1(:,:,9) = \begin{matrix} -0.5000 \\ -0.5000 \\ 0.5000 \\ 0.5000 \end{matrix}$$

$$V1(:,:,10) = \begin{matrix} -0.0918 - 0.3270i \\ -0.2473 - 0.0541i \\ 0.1311 + 0.6387i \\ 0.4815 + 0.4045i \end{matrix}$$

$$V1(:,:,11) = \begin{matrix} -0.0337 - 0.6193i \\ -0.4621 - 0.5019i \\ 0.2280 + 0.1515i \\ 0.2280 + 0.1515i \end{matrix}$$

$$V1(:,:,12) = \begin{matrix} -0.4422 - 0.0928i \\ -0.2479 - 0.5606i \\ 0.2479 + 0.5606i \\ 0.0137 + 0.2102i \end{matrix}$$

$$V1(:,:,13) = \begin{array}{l} -0.5000 \\ 0.5000 \\ 0.5000 \\ -0.5000 \end{array}$$

$$V1(:,:,14) = \begin{array}{l} -0.4422 - 0.0928i \\ 0.2479 + 0.5606i \\ 0.2479 + 0.5606i \\ -0.0137 - 0.2102i \end{array}$$

$$V1(:,:,15) = \begin{array}{l} -0.3841 - 0.3851i \\ -0.0056 + 0.3076i \\ 0.3448 + 0.0735i \\ -0.2285 - 0.6580i \end{array}$$

$$V1(:,:,16) = \begin{array}{l} -0.0918 - 0.3270i \\ 0.2473 + 0.0541i \\ 0.1311 + 0.6387i \\ -0.4815 - 0.4045i \end{array}$$

$$V1(:,:,17) = \begin{array}{l} 0.5000 \\ 0 + 0.5000i \\ 0.5000 \\ 0 + 0.5000i \end{array}$$

$$V1(:,:,18) = \begin{array}{l} 0.3841 + 0.3851i \\ -0.3076 - 0.0056i \\ 0.3448 + 0.0735i \\ -0.6580 + 0.2285i \end{array}$$

$$V1(:,:,19) = \begin{array}{l} 0.0918 + 0.3270i \\ -0.0541 + 0.2473i \\ 0.1311 + 0.6387i \\ -0.4045 + 0.4815i \end{array}$$

$$V1(:,:,20) = \begin{array}{l} 0.0337 + 0.6193i \\ -0.5019 + 0.4621i \\ 0.2280 + 0.1515i \\ -0.1515 + 0.2280i \end{array}$$

$$V1(:,:,21) = \begin{array}{l} 0.5000 \\ 0 - 0.5000i \\ 0.5000 \\ 0 - 0.5000i \end{array}$$

$$V1(:,:,22) = \begin{array}{l} 0.0337 + 0.6193i \\ 0.5019 - 0.4621i \\ 0.2280 + 0.1515i \\ 0.1515 - 0.2280i \end{array}$$

$$V1(:,:,23) = \begin{array}{l} 0.4422 + 0.0928i \\ 0.5606 - 0.2479i \\ 0.2479 + 0.5606i \\ 0.2102 - 0.0137i \end{array}$$

$$V1(:,:,24) = \begin{array}{l} 0.3841 + 0.3851i \\ 0.3076 + 0.0056i \\ 0.3448 + 0.0735i \\ 0.6580 - 0.2285i \end{array}$$

$$V1(:,:,25) = \begin{array}{l} -0.5000 \\ 0 - 0.5000i \\ 0.5000 \\ 0 + 0.5000i \end{array}$$

$$V1(:,:,26) = \begin{array}{l} -0.3841 - 0.3851i \\ 0.3076 + 0.0056i \\ 0.2285 + 0.6580i \\ -0.0735 + 0.3448i \end{array}$$

$$V1(:,:,27) = \begin{array}{l} -0.3260 - 0.6774i \\ 0.1709 - 0.3254i \\ 0.3254 + 0.1709i \\ -0.4051 - 0.0250i \end{array}$$

$$V1(:,:,28) = \begin{array}{l} -0.1499 - 0.0347i \\ 0.3017 - 0.5009i \\ 0.1505 + 0.5412i \\ -0.5412 + 0.1505i \end{array}$$

$$V1(:,:,29) = \begin{array}{l} -0.5000 \\ 0 + 0.5000i \\ 0.5000 \\ 0 - 0.5000i \end{array}$$

$$V1(:,:,30) = \begin{array}{l} -0.1499 - 0.0347i \\ -0.3071 + 0.5009i \\ 0.1505 + 0.5412i \\ 0.5412 - 0.1505i \end{array}$$

$$V1(:,:,31) = \begin{array}{l} -0.0918 - 0.3270i \\ -0.6387 + 0.1311i \\ 0.2473 + 0.0541i \\ 0.4045 - 0.4815i \end{array}$$

$$V1(:,:,32) = \begin{array}{l} -0.3841 - 0.3851i \\ -0.3076 - 0.0056i \\ 0.2285 + 0.6580i \\ 0.0735 - 0.3448i \end{array}$$

$$V1(:,:,33) = \begin{array}{l} 0.5000 \\ 0.5000 \\ 0.5000 \\ -0.5000 \end{array}$$

$$V1(:,:,34) = \begin{matrix} 0.0337 + 0.6193i \\ 0.2280 + 0.1515i \\ 0.2280 + 0.1515i \\ -0.4621 - 0.5019i \end{matrix}$$

$$V1(:,:,35) = \begin{matrix} 0.0918 + 0.3270i \\ 0.4815 + 0.4045i \\ 0.1311 + 0.6387i \\ -0.2473 + 0.0541i \end{matrix}$$

$$V1(:,:,36) = \begin{matrix} 0.3841 + 0.3851i \\ 0.2285 + 0.6580i \\ 0.3448 + 0.0735i \\ 0.0056 - 0.3076i \end{matrix}$$

$$V1(:,:,37) = \begin{matrix} 0.5000 \\ 0 + 0.5000i \\ -0.5000 \\ 0 + 0.5000i \end{matrix}$$

$$V1(:,:,38) = \begin{matrix} 0.4422 + 0.0928i \\ -0.2102 + 0.0137i \\ -0.2479 - 0.5606i \\ -0.5606 + 0.2479i \end{matrix}$$

$$V1(:,:,39) = \begin{matrix} 0.0337 + 0.6193i \\ -0.1515 + 0.2280i \\ -0.2280 - 0.1515i \\ -0.5019 + 0.4621i \end{matrix}$$

$$V1(:,:,40) = \begin{matrix} 0.0918 + 0.3270i \\ -0.4045 + 0.4815i \\ -0.1311 - 0.6387i \\ -0.0541 + 0.2473i \end{matrix}$$

$$V1(:,:,41) = \begin{matrix} 0.5000 \\ -0.5000 \\ 0.5000 \\ 0.5000 \end{matrix}$$

$$V1(:,:,42) = \begin{matrix} 0.3841 + 0.3851i \\ -0.2285 - 0.6580i \\ 0.3448 + 0.0735i \\ -0.0056 + 0.3076i \end{matrix}$$

$$V1(:,:,43) = \begin{matrix} 0.4422 + 0.0928i \\ -0.0137 - 0.2102i \\ 0.2479 + 0.5606i \\ 0.2470 + 0.5606i \end{matrix}$$

$$V1(:,:,44) = \begin{matrix} 0.0337 + 0.6193i \\ -0.2280 - 0.1515i \\ 0.2280 + 0.1515i \\ 0.4621 + 0.5019i \end{matrix}$$

$$V1(:,:,45) = \begin{matrix} 0.5000 \\ 0 - 0.5000i \\ -0.5000 \\ 0 - 0.5000i \end{matrix}$$

$$V1(:,:,46) = \begin{matrix} 0.0918 + 0.3270i \\ 0.4045 - 0.4815i \\ -0.1311 - 0.6387i \\ 0.0541 - 0.2473i \end{matrix}$$

$$V1(:,:,47) = \begin{matrix} 0.3841 + 0.3851i \\ 0.6580 - 0.2285i \\ -0.3448 - 0.0735i \\ 0.3076 + 0.0056i \end{matrix}$$

$$V1(:,:,48) = \begin{matrix} 0.4422 + 0.0928i \\ 0.2102 - 0.0137i \\ -0.2479 - 0.5606i \\ 0.5606 - 0.2479i \end{matrix}$$

$$V1(:,:,49) = \begin{matrix} 0.5000 \\ 0.3536 + 0.3536i \\ 0 + 0.5000i \\ -0.3536 + 0.3536i \end{matrix}$$

$$V1(:,:,50) = \begin{matrix} 0.3841 + 0.3851i \\ 0.0022 + 0.1690i \\ -0.3076 - 0.0056i \\ -0.7536 - 0.1140i \end{matrix}$$

$$V1(:,:,51) = \begin{matrix} -0.1560 + 0.4926i \\ 0.0837 + 0.4175i \\ -0.4597 + 0.3989i \\ -0.4175 + 0.0837i \end{matrix}$$

$$V1(:,:,52) = \begin{matrix} 0.3841 + 0.3851i \\ -0.1140 + 0.7536i \\ -0.3076 - 0.0056i \\ -0.1690 + 0.0022i \end{matrix}$$

$$V1(:,:,53) = \begin{matrix} 0.5000 \\ -0.3536 + 0.3536i \\ 0 - 0.5000i \\ 0.3536 + 0.3536i \end{matrix}$$

$$V1(:,:,54) = \begin{matrix} 0.3396 + 0.1614i \\ -0.3400 - 0.3060i \\ 0.3493 - 0.5641i \\ -0.3060 + 0.3400i \end{matrix}$$

$$V1(:,:,55) = \begin{matrix} 0.3841 + 0.3851i \\ -0.1690 + 0.0022i \\ 0.3076 + 0.0056i \\ -0.1140 + 0.7536i \end{matrix}$$

$$V1(:,:,56) = \begin{matrix} -0.1560 + 0.4926i \\ -0.4175 + 0.0837i \\ 0.4597 - 0.3989i \\ 0.0837 + 0.4175i \end{matrix}$$

$$V1(:,:,57) = \begin{matrix} 0.5000 \\ -0.3536 - 0.3536i \\ 0 + 0.5000i \\ 0.3536 - 0.3536i \end{matrix}$$

$$V1(:,:,58) = \begin{matrix} 0.3841 + 0.3851i \\ 0.1140 - 0.7536i \\ -0.3076 - 0.0056i \\ 0.1690 - 0.0022i \end{matrix}$$

$$V1(:,:,59) = \begin{matrix} 0.3396 + 0.1614i \\ 0.3060 - 0.3400i \\ -0.3493 + 0.5641i \\ 0.3400 + 0.3060i \end{matrix}$$

$$V1(:,:,60) = \begin{matrix} 0.3841 + 0.3851i \\ -0.0022 - 0.1690i \\ -0.3076 - 0.0056i \\ 0.7536 + 0.1140i \end{matrix}$$

$$V1(:,:,61) = \begin{matrix} 0.5000 \\ 0.3536 - 0.3536i \\ 0. - 0.5000i \\ -0.3536 - 0.3536i \end{matrix}$$

$$V1(:,:,62) = \begin{matrix} -0.1560 + 0.4926i \\ 0.4175 - 0.0837i \\ 0.4597 - 0.3989i \\ -0.0837 - 0.4175i \end{matrix}$$

$$V1(:,:,63) = \begin{matrix} 0.3841 + 0.3851i \\ 0.7536 + 0.1140i \\ 0.3076 + 0.0056i \\ -0.0022 - 0.1690i \end{matrix}$$

$$V1(:,:,64) = \begin{matrix} 0.3396 + 0.1614i \\ 0.3400 + 0.3060i \\ 0.3493 - 0.5641i \\ 0.3060 - 0.3400i \end{matrix}$$

Final Rank 2 Codebook:

$$V2(:,:,1) = \begin{matrix} 0.5000 & 0.5000 \\ 0.5000 & -0.5000 \\ 0.5000 & 0.5000 \\ 0.5000 & -0.5000 \end{matrix}$$

$$V2(:,:,2) = \begin{matrix} 0.3260 + 0.6774i & 0.4688 + 0.2170i \\ 0.3254 + 0.1709i & -0.2948 - 0.0700i \\ 0.3254 + 0.1709i & -0.4598 - 0.2965i \\ -0.0250 + 0.4051i & -0.5846 - 0.0154i \end{matrix}$$

$$V2(:,:,3) = \begin{matrix} 0.1499 + 0.0347i & -0.4377 + 0.4498i \\ 0.5009 + 0.3071i & -0.1173 + 0.2079i \\ 0.1505 + 0.5412i & -0.2098 + 0.2390i \\ 0.1505 + 0.5412i & 0.6133 - 0.26821i \end{matrix}$$

$$V2(:,:,4) = \begin{matrix} 0.0918 + 0.3270i & 0.4585 - 0.3521i \\ 0.1311 + 0.6387i & -0.5369 + 0.2492i \\ 0.2473 + 0.0541i & -0.1391 + 0.3154i \\ 0.4815 + 0.4045i & 0.2872 - 0.3378i \end{matrix}$$

$$V2(:,:,5) = \begin{matrix} 0.5000 & -0.5000 \\ 0.5000 & -0.5000 \\ 0.5000 & 0.5000 \\ 0.5000 & 0.5000 \end{matrix}$$

$$V2(:,:,6) = \begin{matrix} 0.0918 + 0.3270i & -0.7326 - 0.3303i \\ -0.1311 - 0.6387i & -0.1521 + 0.1245i \\ 0.2473 + 0.0541i & 0.0048 - 0.3893i \\ -0.4815 - 0.4045i & -0.3093 - 0.2615i \end{matrix}$$

$$V2(:,:,7) = \begin{matrix} 0.3841 + 0.3851i & -0.4259 - 06865i \\ 0.0056 - 0.3076i & 0.0000 - 0.0163i \\ 0.2285 + 0.6580i & -0.0029 + 0.5625i \\ -0.3448 - 0.0735i & -0.1664 + 0.0538i \end{matrix}$$

$$V2(:,:,8) = \begin{matrix} 0.3260 + 0.6774i & -0.2522 + 0.2830i \\ -0.3254 - 0.1709i & -0.2511 + 0.3562i \\ 0.3254 + 0.1709i & -0.6354 - 0.2810i \\ 0.0250 - 0.4051i & -0.2798 - 0.3246i \end{matrix}$$

$$V2(:,:,9) = \begin{matrix} 0.5000 & -0.5000 \\ 0.5000 & 0.5000 \\ 0.5000 & 0.5000 \\ 0.5000 & -0.5000 \end{matrix}$$

$$V2(:,:,10) = \begin{matrix} -0.0918 - 0.3270i & 0.4517 - 0.1172i \\ -0.2473 - 0.0541i & -0.3568 + 0.3992i \\ 0.1311 + 0.6387i & 0.0918 + 0.4242i \\ 0.4815 + 0.4045i & -0.3837 - 0.3999i \end{matrix}$$

$$V2(:,:,11) = \begin{matrix} -0.0337 - 0.6193i & 0.3983 + 0.5597i \\ -0.4621 - 0.5019i & -0.5583 + 0.0724i \\ 0.2280 + 0.1515i & 0.2543 + 0.2747i \\ 0.2280 + 0.1515i & -0.0069 + 0.2664i \end{matrix}$$

$$V2(:,:,12) = \begin{matrix} -0.4422 - 0.0928i & 0.3609 + 0.0743i \\ -0.2479 - 0.5606i & -0.0447 - 0.2624i \\ 0.2479 + 0.5606i & 0.2646 - 02157i \\ 0.0137 + 0.2102i & -0.7438 + 0.3516i \end{matrix}$$

$$V2(:,:,13) = \begin{matrix} 0.5000 & -0.5000 \\ -0.5000 & -0.5000 \\ 0.5000 & 0.5000 \\ -0.5000 & 0.5000 \end{matrix}$$

$$V2(:,:,14) = \begin{matrix} 0.4422 - 0.0928i & -0.4197 + 0.4817i \\ 0.2479 + 0.5606i & -0.2858 - 0.0562i \\ 0.2479 + 0.5606i & -0.0712 + 0.2154i \\ -0.0137 - 0.2102i & 0.1024 + 0.6671i \end{matrix}$$

$$V2(:,:,15) = \begin{matrix} -0.3841 - 0.3851i & 0.3849 + 0.1986i \\ -0.0056 + 0.3076i & -0.1824 - 0.0094i \\ 0.3448 + 0.0735i & 0.2254 + 0.6795i \\ -0.2285 - 0.6580i & -0.5154 + 0.0292i \end{matrix}$$

$$V2(:,:,16) = \begin{matrix} -0.0918 - 0.3270i & 0.6638 - 0.4917i \\ 0.2473 + 0.0541i & -0.1566 - 0.1262i \\ 0.1311 + 0.6387i & -0.0029 - 0.3366i \\ -0.4815 - 0.4045i & -0.3978 + 0.0753i \end{matrix}$$

$$V2(:,:,17) = \begin{matrix} 0.5000 & -0.5000 \\ -0.5000 & 0.5000 \\ 0.5000 & 0.5000 \\ -0.5000 & -0.5000 \end{matrix}$$

$$V2(:,:,18) = \begin{matrix} 0.3841 + 0.3851i & 0.2420 - 0.2055i \\ -0.3076 - 0.0056i & -0.5655 - 0.6754i \\ 0.3448 + 0.0735i & 0.0981 + 0.0467i \\ -0.6580 + 0.2285i & 0.3298 - 0.0517i \end{matrix}$$

$$V2(:,:,19) = \begin{matrix} 0.0918 + 0.3270i & -0.2841 - 0.7969i \\ -0.0541 + 0.2473i & 0.0227 + 0.2058i \\ 0.1311 + 0.6387i & 0.2505 + 0.3816i \\ -0.4045 + 0.4815i & -0.0898 - 0.1576i \end{matrix}$$

$$V2(:,:,20) = \begin{matrix} 0.0337 + 0.6193i & 0.3344 - 0.1640i \\ -0.5019 + 0.4621i & -0.1475 + 0.2641i \\ 0.2280 + 0.1515i & -0.1383 + 0.3182i \\ -0.1515 + 0.2280i & -0.3105 - 0.7437i \end{matrix}$$

$$V2(:,:,21) = \begin{matrix} -0.5000 & -0.5000 \\ -0.5000 & 0.5000 \\ 0.5000 & 0.5000 \\ 0.5000 & -0.5000 \end{matrix}$$

$$V2(:,:,22) = \begin{matrix} 0.0337 + 0.6193i & 0.4332 + 0.1612i \\ 0.5019 - 0.4621i & -0.2499 + 0.4647i \\ 0.2280 + 0.1515i & 0.1294 + 0.5446i \\ 0.1515 - 0.2280i & 0.3535 - 0.2640i \end{matrix}$$

$$V2(:,:,23) = \begin{matrix} 0.4422 + 0.0928i & 0.5948 - 0.2086i \\ 0.5606 - 0.2479i & -0.6101 + 0.1811i \\ 0.2479 + 0.5606i & -0.1244 + 0.3625i \\ 0.2102 - 0.0137i & -0.1261 + 0.1870i \end{matrix}$$

$$V2(:,:,24) = \begin{matrix} 0.3841 + 0.3851i & -0.7276 + 0.3231i \\ 0.3076 + 0.0056i & 0.0623 - 0.3109i \\ 0.3448 + 0.0735i & -0.0316 - 0.3607i \\ 0.6580 - 0.2285i & 0.1496 - 0.3350i \end{matrix}$$

$$V2(:,:,25) = \begin{matrix} 0.5000 & -0.5000 \\ 0 + 0.5000i & 0 - 0.5000i \\ 0.5000 & 0.5000 \\ 0 + 0.5000i & 0 + 0.5000i \end{matrix}$$

$$V2(:,:,26) = \begin{matrix} -0.3841 - 0.3851i & 0.2650 + 0.1831i \\ 0.3076 + 0.0056i & 0.0741 + 0.1142i \\ 0.2285 + 0.5680i & 0.3746 + 0.4660i \\ -0.0735 + 0.3448i & -0.0601 - 0.7188i \end{matrix}$$

$$V2(:,:,27) = \begin{matrix} -0.3260 - 0.6774i & 0.4170 + 0.2673i \\ 0.1709 - 0.3254i & -0.0605 + 0.0504i \\ 0.3254 + 0.1709i & 0.3145 + 0.3209i \\ -0.4051 - 0.0250i & -0.4946 + 0.5495i \end{matrix}$$

$$V2(:,:,28) = \begin{matrix} -0.1499 - 0.0347i & -0.1568 + 0.5108i \\ 0.3071 - 0.5009i & -0.2476 + 0.2774i \\ 0.1505 + 0.5412i & 0.1736 - 0.2279i \\ -0.5412 + 0.1505i & -0.6443 - 0.2811i \end{matrix}$$

$$V2(:,:,29) = \begin{matrix} 0.5000 & -0.5000 \\ 0 + 0.5000i & 0 + 0.5000i \\ 0.5000 & 0.5000 \\ 0 + 0.5000i & 0 - 0.5000i \end{matrix}$$

$$V2(:,:,30) = \begin{matrix} -0.1499 - 0.0347i & -0.4915 + 0.5944i \\ -0.3071 + 0.5009i & -0.1046 - 0.3964i \\ 0.1505 + 0.5412i & 0.2288 + 0.3710i \\ 0.5412 - 0.1505i & -0.2089 + 0.0583i \end{matrix}$$

$$V2(:,:,31) = \begin{matrix} -0.0918 - 0.3270i & 0.0849 - 0.1823i \\ -0.6387 + 0.1311i & -0.1210 - 0.0233i \\ 0.2473 + 0.0541i & 0.4127 - 0.7969i \\ 0.4045 - 0.4815i & -0.0136 + 0.3727i \end{matrix}$$

$$V2(:,:,32) = \begin{matrix} -0.3841 - 0.3851i & 0.4828 - 0.2545i \\ -0.3076 - 0.0056i & -0.1939 + 0.1069i \\ 0.2285 + 0.6580i & 0.3116 + 0.2702i \\ 0.0735 - 0.3448i & -0.4258 + 0.5492i \end{matrix}$$

$$V2(:,:,33) = \begin{matrix} 0.5000 & -0.5000 \\ 0 - 0.5000i & 0 - 0.5000i \\ 0.5000 & 0.5000 \\ 0 - 0.5000i & 0 + 0.5000i \end{matrix}$$

$$V2(:,:,34) = \begin{bmatrix} 0.0337 + 0.6193i & -0.3283 - 0.4339i \\ 0.2280 + 0.1515i & -0.3886 - 0.2987i \\ 0.2280 + 0.1515i & 0.2457 - 0.2337i \\ -0.4621 - 0.5019i & -0.4861 - 0.3354i \end{bmatrix}$$

$$V2(:,:,35) = \begin{bmatrix} 0.0918 + 0.3270i & -0.0348 + 0.4484i \\ 0.4815 + 0.4045i & -0.4400 + 0.2694i \\ 0.1311 + 0.6387i & 0.3429 - 0.0049i \\ -0.2473 - 0.0541i & 0.1991 + 0.06118i \end{bmatrix}$$

$$V2(:,:,36) = \begin{bmatrix} 0.3841 + 0.3851i & -0.2360 - 0.2973i \\ 0.2285 + 0.6580i & 0.0315 - 0.2366i \\ 0.3448 + 0.0735i & 0.7285 + 0.0791i \\ 0.0056 - 0.3076i & 0.4097 - 0.3067i \end{bmatrix}$$

$$V2(:,:,37) = \begin{bmatrix} 0.5000 & -0.5000 \\ 0 - 0.5000i & 0 + 0.5000i \\ 0.5000 & 0.5000 \\ 0 - 0.5000i & 0 - 0.5000i \end{bmatrix}$$

$$V2(:,:,38) = \begin{bmatrix} 0.4422 + 0.0928i & -0.5245 - 0.3774i \\ -0.2102 + 0.0137i & -0.0522 + 0.4805i \\ -0.2479 - 0.5606i & 0.1023 + 0.0593i \\ -0.5606 + 0.2479i & -0.5756 - 0.0591i \end{bmatrix}$$

$$V2(:,:,39) = \begin{bmatrix} 0.0337 + 0.6193i & 0.1953 - 0.3057i \\ -0.1515 + 0.2280i & -0.2685 - 0.1895i \\ -0.2280 - 0.1515i & -0.7779 - 0.3721i \\ -0.5019 + 0.4621i & -0.0216 - 0.1283i \end{bmatrix}$$

$$V2(:,:,40) = \begin{bmatrix} 0.0918 + 0.3270i & -0.6035 - 0.3342i \\ -0.4045 + 0.4815i & -0.1428 + 0.4838i \\ -0.1311 - 0.6387i & -0.1927 + 0.1626i \\ -0.0541 + 0.2473i & -0.3638 - 0.2714i \end{bmatrix}$$

$$V2(:,:,41) = \begin{bmatrix} 0.5000 & -0.5000 \\ 0.5000 & 0 - 0.5000i \\ 0.5000 & 0.5000 \\ 0.5000 & 0 + 0.5000i \end{bmatrix}$$

$$V2(:,:,42) = \begin{bmatrix} 0.3841 + 0.3851i & 0.1371 + 0.7838i \\ -0.2285 - 0.6580i & -0.0956 + 0.3657i \\ 0.3448 + 0.0735i & -0.1099 - 0.0181i \\ -0.0056 + 0.3076i & 0.3423 - 0.3074i \end{bmatrix}$$

$$V2(:,:,43) = \begin{bmatrix} 0.4422 + 0.0928i & -0.0860 - 0.2241i \\ -0.0137 - 0.2102i & -0.6015 + 0.2527i \\ 0.2479 + 0.5606i & -0.4157 - 0.2206i \\ 0.2479 + 0.5606i & 0.1543 + 0.5211i \end{bmatrix}$$

$$V2(:,:,44) = \begin{bmatrix} 0.0337 + 0.6193i & -0.1081 + 0.4460i \\ -0.2280 - 0.1515i & -0.3567 - 0.5167i \\ 0.2280 + 0.1515i & -0.2354 - 0.1914i \\ 0.4621 + 0.5019i & -0.1985 - 0.5136i \end{bmatrix}$$

$$V2(:,:,45) = \begin{bmatrix} 0.5000 & -0.5000 \\ 0.5000 & 0 + 0.5000i \\ 0.5000 & 0.5000 \\ 0.5000 & 0 - 0.5000i \end{bmatrix}$$

$$V2(:,:,46) = \begin{bmatrix} 0.0918 + 0.3270i & -0.5060 + 0.1443i \\ 0.4045 - 0.4815i & -0.4682 - 0.5571i \\ -0.1313 - 0.6387i & 0.4345 + 0.0089i \\ 0.0541 - 0.2473i & -0.0309 + 0.0618i \end{bmatrix}$$

$$V2(:,:,47) = \begin{bmatrix} 0.3841 + 0.3851i & 0.0427 + 0.4037i \\ 0.6580 - 0.2285i & -0.3221 + 0.3130i \\ -0.3448 - 0.0735i & -0.0724 + 0.1313i \\ 0.3076 + 0.0056i & 0.3259 - 0.7104i \end{bmatrix}$$

$$V2(:,:,48) = \begin{bmatrix} 0.4422 + 0.0928i & -0.1512 + 0.0220i \\ 0.2102 - 0.0137i & -0.5297 - 0.2125i \\ -0.2479 - 0.5606i & 0.3488 + 0.2574i \\ 0.5606 - 0.2479i & 0.5345 - 0.4211i \end{bmatrix}$$

$$V2(:,:,49) = \begin{bmatrix} 0.5000 & -0.5000 \\ 0 + 0.5000i & -0.5000 \\ 0.5000 & 0.5000 \\ 0 + 0.5000i & 0.5000 \end{bmatrix}$$

$$V2(:,:,50) = \begin{bmatrix} 0.3841 + 0.3851i & 0.3899 + 0.5099i \\ 0.0022 + 0.1690i & -0.2642 - 0.2730i \\ -0.3076 - 0.0056i & 0.0634 + 0.5454i \\ -0.7536 - 0.1140i & 0.3743 - 0.0464i \end{bmatrix}$$

$$V2(:,:,51) = \begin{bmatrix} -0.1560 + 0.4926i & 0.1996 + 0.3349i \\ 0.0837 + 0.4175i & 0.1647 + 0.4478i \\ -0.4597 + 0.3989i & 0.0029 - 0.0825i \\ -0.4175 + 0.0837i & 0.6245 - 0.4727i \end{bmatrix}$$

$$V2(:,:,52) = \begin{bmatrix} 0.3841 + 0.3851i & 0.4945 - 0.2660i \\ -0.1140 + 0.7536i & -0.4531 - 0.0810i \\ -0.3076 - 0.0056i & 0.2295 + 0.4493i \\ -0.1690 + 0.0022i & 0.0234 - 0.4666i \end{bmatrix}$$

$$V2(:,:,53) = \begin{bmatrix} 0.5000 & -0.5000 \\ 0 + 0.5000i & 0.5000 \\ 0.5000 & 0.5000 \\ 0 + 0.5000i & -0.5000 \end{bmatrix}$$

$$V2(:,:,54) = \begin{bmatrix} 0.3396 + 0.1614i & -0.0891 - 0.1737i \\ -0.3400 - 0.3060i & -0.2160 + 0.0403i \\ 0.3493 - 0.5641i & 0.3530 + 0.5446i \\ -0.3060 + 0.3400i & 0.1657 + 0.6818i \end{bmatrix}$$

$$V2(:,:,55) = \begin{bmatrix} 0.3841 + 0.3851i & 0.3162 - 0.1330i \\ -0.1690 + 0.0022i & -0.2451 + 0.4651i \\ 0.3076 + 0.0056i & 0.1535 - 0.5047i \\ -0.1140 + 0.7536i & -0.4972 - 0.2836i \end{bmatrix}$$

$$V2(:,:,56) = \begin{matrix} -0.1560 + 0.4926i & 0.1157 + 0.3948i \\ -0.4175 + 0.0837i & 0.2814 - 0.3175i \\ 0.4597 - 0.3989i & 0.4393 + 0.0781i \\ 0.0837 + 0.4175i & 0.3704 - 0.5609i \end{matrix}$$

$$V2(:,:,57) = \begin{matrix} 0.5000 & 0.5000 \\ 0.5000 & -0.5000 \\ 0.5000 & 0.5000 \\ -0.5000 & 0.5000 \end{matrix}$$

$$V2(:,:,58) = \begin{matrix} 0.3841 + 0.3851i & -0.6183 - 0.3893i \\ 0.1140 - 0.7536i & 0.0439 - 0.4301i \\ -0.3076 - 0.0056i & -0.3231 + 0.0445i \\ 0.1690 - 0.0022i & -0.2461 - 0.3351i \end{matrix}$$

$$V2(:,:,59) = \begin{matrix} 0.3396 + 0.1614i & 0.3566 - 0.2418i \\ 0.3060 - 0.3400i & -0.1924 + 0.0246i \\ -0.3493 + 0.5641i & -0.5527 + 0.1626i \\ 0.3400 + 0.3060i & -0.4030 - 0.5315i \end{matrix}$$

$$V2(:,:,60) = \begin{matrix} 0.3841 + 0.3851i & 0.0072 + 0.6080i \\ -0.0022 - 0.1690i & -0.1531 - 0.3405i \\ -0.3076 - 0.0056i & 0.4820 + 0.4643i \\ 0.7536 + 0.1140i & -0.1738 - 0.1132i \end{matrix}$$

$$V2(:,:,61) = \begin{matrix} 0.5000 & 0.5000 \\ -0.3536 + 03536i & 0.3536 - 0.3536i \\ 0 - 0.5000i & 0 - 0.5000i \\ 0.3536 + 0.3536i & -0.3536 - 0.3536i \end{matrix}$$

$$V2(:,:,62) = \begin{matrix} -0.1560 + 0.4926i & -0.4387 - 0.0343i \\ 0.4175 - 0.0837i & 0.5062 - 0.5972i \\ 0.4597 - 0.3989i & -0.2611 + 0.2853i \\ -0.0837 - 0.4175i & -0.0591 + 0.2011i \end{matrix}$$

$$V2(:,:,63) = \begin{matrix} 0.3841 + 0.3851i & -0.0757 - 0.5813i \\ 0.7536 + 0.1140i & 0.1019 + 0.2454i \\ 0.3076 + 0.0056i & 0.5989 + 0.2606i \\ -0.0022 - 0.1690i & -0.3284 + 0.2264i \end{matrix}$$

$$V2(:,:,64) = \begin{matrix} 0.3396 + 0.1614i & 0.2711 - 0.7070i \\ 0.3400 + 0.3060i & -0.4123 - 0.1234i \\ 0.3493 - 0.5641i & 0.4714 - 0.0224i \\ 0.3060 - 0.3400i & -0.0617 - 0.1224i \end{matrix}$$

Final Rank 3 Codebook:

$$V3(:,:,1) = \begin{matrix} 0.5000 & 0.5000 & -0.5000 \\ 0.5000 & -0.5000 & -0.5000 \\ 0.5000 & 0.5000 & 0.5000 \\ 0.5000 & -0.5000 & 0.5000 \end{matrix}$$

$$V3(:,:,2) = \begin{matrix} 0.4688 + 0.2170i & 0.3008 + 0.0981i & 0.1395 - 0.2201i \\ -0.2948 - 0.0700i & -0.1167 + 0.7005i & -0.4967 + 0.1489i \\ -0.4598 - 0.2965i & -0.1297 + 0.0716i & 0.7351 + 0.0569i \\ -0.5846 - 0.0154i & 0.3317 - 0.5135i & -0.3430 - 0.0437i \end{matrix}$$

$$V3(:,:,3) = \begin{matrix} -0.4377 + 0.4498i & 0.2079 + 0.3012i & -0.4172 - 0.5239i \\ -0.1173 + 0.2079i & 0.4297 + 0.2345i & 0.4687 + 0.3722i \\ -0.2098 + 0.2390i & -0.2835 - 0.7076i & -0.0338 - 0.0330i \\ 0.6133 - 0.2682i & 0.1669 + 0.1324i & -0.1311 - 0.4169i \end{matrix}$$

$$V3(:,:,4) = \begin{matrix} 0.4585 - 0.3521i & 0.4797 - 0.5371i & 0.1760 - 0.0285i \\ -0.5369 + 0.2492i & 0.2256 + 0.0214i & 0.0252 - 0.4154i \\ -0.1391 + 0.3154i & -0.1147 - 0.1411i & 0.7276 + 0.5046i \\ 0.2872 - 0.3378i & -0.2334 + 0.5852i & 0.0121 + 0.1041i \end{matrix}$$

$$V3(:,:,5) = \begin{matrix} 0.5000 & 0.5000 & -0.5000 \\ 0.5000 & -0.5000 & 0.5000 \\ 0.5000 & 0.5000 & 0.5000 \\ 0.5000 & -0.5000 & -0.5000 \end{matrix}$$

$$V3(:,:,6) = \begin{matrix} -0.7326 - 0.3303i & 0.1180 - 0.0570i & 0.3116 - 0.3531i \\ -0.1521 + 0.1245i & -0.3996 - 0.1865i & 0.5845 - 0.0141i \\ 0.0048 - 0.3893i & -0.8009 - 0.0266i & -0.3599 - 0.1123i \\ -0.3093 - 0.2615i & 0.1996 - 0.3262i & -0.5417 + 0.0279i \end{matrix}$$

$$V3(:,:,7) = \begin{matrix} -0.4259 - 0.6865i & 0.1888 - 0.1148i & 0.0505 - 0.0112i \\ 0.0000 - 0.0163i & 0.5849 + 0.0396i & 0.1477 + 0.7346i \\ -0.0029 + 0.5625i & 0.2943 + 0.2161i & 0.2547 - 0.0108i \\ -0.1664 + 0.0538i & 0.6828 - 0.0892i & -0.3558 - 0.4943i \end{matrix}$$

$$V3(:,:,8) = \begin{matrix} -0.2522 + 0.2830i & 0.0842 - 0.4310i & 0.0964 + 0.2984i \\ -0.2511 + 0.3562i & -0.5001 - 0.4577i & -0.4236 - 0.1898i \\ -0.6354 - 0.2810i & -0.3335 + 0.3466i & -0.1484 - 0.2414i \\ -0.2798 - 0.3246i & -0.1512 - 0.1513i & 0.0306 + 0.7778i \end{matrix}$$

$$V3(:,:,9) = \begin{matrix} 0.5000 & -0.5000 & -0.5000 \\ 0.5000 & -0.5000 & 0.5000 \\ 0.5000 & 0.5000 & 0.5000 \\ 0.5000 & 0.5000 & -0.5000 \end{matrix}$$

$$V3(:,:,10) = \begin{matrix} 0.4517 - 0.1172i & -0.0439 + 0.5591i & 0.3594 - 0.4725i \\ -0.3568 + 0.3992i & -0.4696 - 0.0932i & -0.2384 - 0.6026i \\ 0.0918 + 0.4242i & 0.4085 - 0.0481i & 0.3325 - 0.3269i \\ -0.3837 - 0.3999i & -0.3005 + 0.4437i & -0.0155 - 0.1000i \end{matrix}$$

$$V3(:,:,11) = \begin{matrix} 0.3983 + 0.5597i & -0.1922 - 0.0358i & -0.2096 + 0.2475i \\ -0.5583 + 0.0724i & 0.2420 - 0.0149i & 0.3931 - 0.0653i \\ 0.2543 + 0.2747i & 0.7756 - 0.0378i & 0.3367 + 0.2619i \\ -0.0069 + 0.2664i & -0.5242 + 0.1589i & 0.7417 + 0.0629i \end{matrix}$$

$V3(:,:,12) =$ $$\begin{bmatrix} 0.3609+0.0743i & -0.6309-0.1183i & 0.2159-0.4488i \\ -0.0447-0.2624i & -0.3156+0.2879i & -0.0988+0.6010i \\ 0.2646-0.2157i & -0.3493-0.1821i & 0.3113+0.5056i \\ -0.7438+0.3516i & -0.4975-0.0539i & -0.1643+0.0375i \end{bmatrix}$$

$V3(:,:,13) = \begin{bmatrix} 0.5000 & -0.5000 & -0.5000 \\ -0.5000 & -0.5000 & 0.5000 \\ 0.5000 & 0.5000 & 0.5000 \\ -0.5000 & 0.5000 & -0.5000 \end{bmatrix}$ $V3(:,:,14) =$ $$\begin{bmatrix} -0.4197+0.4817i & 0.0820+0.2932i & 0.5394+0.0634i \\ -0.2858-0.0562i & 0.0717-0.5527i & 0.3834+0.2860i \\ -0.0712+0.2154i & -0.2709+0.6053i & -0.2652+0.2505i \\ 0.1024+0.6671i & -0.0386-0.3943i & -0.3941+0.4333i \end{bmatrix}$$

$V3(:,:,15) =$ $$\begin{bmatrix} 0.3849+0.1986i & -0.5420-0.2820i & 0.3395+0.1672i \\ -0.1824-0.0094i & 0.1989+0.1166i & 0.6694+0.6089i \\ 0.2254+0.6795i & -0.1979+0.5597i & -0.0690+0.0775i \\ -0.5154+0.0292i & 0.0915+0.4612i & 0.1367-0.0921i \end{bmatrix}$$

$V3(:,:,16) =$ $$\begin{bmatrix} 0.6638-0.4917i & -0.0134-0.1109i & 0.3780+0.2166i \\ -0.1566-0.1262i & 0.0722-0.9308i & -0.1132+0.1055i \\ -0.0029-0.3366i & -0.1758+0.1916i & -0.1479+0.6100i \\ -0.3978+0.0753i & 0.2200-0.0040i & -0.0224+0.6259i \end{bmatrix}$$

$V3(:,:,17) = \begin{bmatrix} 0.5000 & 0.5000 & -0.5000 \\ 0+0.5000i & 0-0.5000i & 0-0.5000i \\ 0.5000 & 0.5000 & 0.5000 \\ 0+0.5000i & 0-0.5000i & 0+0.5000i \end{bmatrix}$ $V3(:,:,18) =$ $$\begin{bmatrix} 0.2420-0.2055i & -0.1388+0.6904i & 0.3273+0.0199i \\ -0.5655-0.6754i & -0.2104+0.2029i & -0.1634+0.1312i \\ 0.0981+0.0467i & 0.1060+0.1310i & -0.7933+0.4542i \\ 0.3298-0.0517i & 0.5748+0.2447i & -0.0516+0.1018i \end{bmatrix}$$

$V3(:,:,19) =$ $$\begin{bmatrix} -0.2841-0.7969i & 0.3713-0.0745i & 0.0639+0.1460i \\ 0.0227+0.2058i & 0.5630-0.0230i & -0.0999-0.7520i \\ 0.2505+0.3816i & 0.1527-0.2390i & 0.3715+0.3849i \\ -0.0898-0.1576i & -0.6437-0.2105i & 0.0144-0.3358i \end{bmatrix}$$

$V3(:,:,20) =$ $$\begin{bmatrix} 0.3344-0.1640i & -0.2485+0.4791i & 0.4000+0.1590i \\ -0.1475+0.2641i & 0.5893+0.1330i & -0.1383-0.2427i \\ -0.1383+0.3182i & -0.4811+0.3240i & -0.1561-0.4493i \\ -0.3105-0.7437i & -0.0811-0.0251i & -0.4817+0.1909i \end{bmatrix}$$

$V3(:,:,21) = \begin{bmatrix} 0.5000 & 0.5000 & -0.5000 \\ 0+0.5000i & 0-0.5000i & 0+0.5000i \\ 0.5000 & 0.5000 & 0.5000 \\ 0+0.5000i & 0-0.5000i & 0-0.5000i \end{bmatrix}$ $V3(:,:,22) =$ $$\begin{bmatrix} 0.4332+0.1612i & -0.4077-0.0486i & 0.4750+0.0865i \\ -0.2499+0.4647i & -0.3727-0.1094i & 0.2747+0.1727i \\ 0.1294+0.5446i & 0.6827-0.1403i & 0.1161-0.3354i \\ 0.3535-0.2640i & 0.4328+0.0863i & 0.3135+0.6613i \end{bmatrix}$$

$V3(:,:,23) =$ $$\begin{bmatrix} 0.5948-0.2086i & -0.6155+0.0029i & 0.0246+0.1384i \\ -0.6101+0.1811i & -0.2226-0.2992i & 0.0747+0.2731i \\ -0.1244+0.3625i & 0.0659+0.6219i & 0.2542+0.1473i \\ -0.1261+0.1870i & -0.1866+0.2370i & -0.7184-0.5456i \end{bmatrix}$$

$V3(:,:,24) =$ $$\begin{bmatrix} -0.7276+0.3231i & -0.0746+0.0002i & 0.1968+0.1617i \\ 0.0623-0.3109i & 0.7114+0.3826i & 0.3902+0.0102i \\ -0.0316-0.3607i & -0.4356+0.1774i & 0.0838-0.7186i \\ 0.1496-0.3350i & -0.1859-0.2936i & -0.1918+0.4718i \end{bmatrix}$$

$V3(:,:,25) = \begin{bmatrix} 0.5000 & -0.5000 & -0.5000 \\ 0+0.5000i & 0-0.5000i & 0+0.5000i \\ 0.5000 & 0.5000 & 0.5000 \\ 0+0.5000i & 0+0.5000i & 0-0.5000i \end{bmatrix}$ $V3(:,:,26) =$ $$\begin{bmatrix} 0.2560+0.1831i & 0.2046+0.4515i & 0.2200+0.5535i \\ 0.0741+0.1142i & -0.2010+0.6413i & 0.4491-0.4832i \\ 0.3746+0.4660i & 0.2087+0.1370i & -0.2423+0.1904i \\ -0.0601-0.7188i & -0.1085+0.4782i & -0.2656+0.2110i \end{bmatrix}$$

$V3(:,:,27) =$ $$\begin{bmatrix} 0.4170+0.2673i & 0.0729-0.3667i & -0.1258+0.1841i \\ -0.0605+0.0504i & -0.2440+0.1836i & 0.8489+0.2116i \\ 0.3145+0.3209i & -0.6599-0.3142i & -0.0292-0.3579i \\ -0.4946+0.5495i & -0.3770+0.3011i & -0.2007+0.1251i \end{bmatrix}$$

$V3(:,:,28) =$ $$\begin{bmatrix} -0.1568+0.5108i & -0.6900+0.1066i & 0.4419+0.0901i \\ -0.2476+0.2774i & 0.3823-0.1521i & 0.3815-0.4492i \\ 0.1736-0.2279i & -0.1974-0.4946i & 0.3241-0.4623i \\ -0.6443-0.2811i & 0.0584+0.2373i & 0.0318-0.3599i \end{bmatrix}$$

$V3(:,:,29) = \begin{bmatrix} 0.5000 & -0.5000 & -0.5000 \\ 0-0.5000i & 0.-5000i & 0+0.5000i \\ 0.5000 & 0.5000 & 0.5000 \\ 0-0.5000i & 0+0.5000i & 0-0.5000i \end{bmatrix}$ $V3(:,:,30) =$ $$\begin{bmatrix} -0.4915+0.5944i & 0.0644-0.0145i & -0.1689-0.5903i \\ -0.1046-0.3964i & -0.5642+0.0031i & -0.3416-0.2274i \\ 0.2288+0.3710i & -0.2561-0.0135i & 0.6471-0.0998i \\ -0.2089+0.0583i & -0.4070-0.6677i & -0.1176+0.1097i \end{bmatrix}$$

$V3(:,:,31) = \begin{matrix} 0.0849-0.1823i & 0.5488+0.2367i & -0.3534-0.6018i \\ -0.1210-0.0233i & -0.2347-0.3498i & 0.3248-0.5261i \\ 0.4127-0.7969i & -0.2180-0.2794i & -0.0107-0.0700i \\ -0.0136+0.3727i & -0.3369-0.4757i & -0.2087-0.2866i \end{matrix}$ $V3(:,:,32) = \begin{matrix} 0.4828-0.2545i & 0.2119+0.3871i & -0.3824-0.2556i \\ -0.1939+0.1069i & -0.3495+0.6691i & 0.1365+0.5175i \\ 0.3116+0.2702i & -0.1220+0.2056i & -0.5361-0.0030i \\ -0.4258+0.5492i & 0.4208+0.0338i & -0.4460+0.1251i \end{matrix}$ $V3(:,:,33) = \begin{matrix} 0.5000 & 0.5000 & -0.5000 \\ 0.5000 & -0.5000 & 0-0.5000i \\ 0.5000 & 0.5000 & 0.5000 \\ 0.5000 & -0.5000 & 0+0.5000i \end{matrix}$ $V3(:,:,34) = \begin{matrix} -0.3283-0.4339i & -0.2690+0.1335i & -0.4536-0.1528i \\ -0.3886-0.2987i & 0.0982-0.6284i & 0.5255+0.0653i \\ 0.2457-0.23371i & -0.3618+0.5436i & 0.6122+0.0946i \\ -0.4861-0.3354i & -0.2060+0.1911i & 0.0216+0.3261i \end{matrix}$ $V3(:,:,35) = \begin{matrix} -0.0348+0.4484i & -0.4669-0.6204i & 0.2685+0.0858i \\ -0.4400+0.2694i & 0.0511+0.4386i & -0.1700+0.3385i \\ 0.3429-0.0049i & 0.4475-0.0066i & 0.1480-0.4849i \\ 0.1991+0.6118i & 0.0419+0.0073i & -0.6988-0.1782i \end{matrix}$ $V3(:,:,36) = \begin{matrix} -0.2360-0.2973i & 0.3316+0.2303i & 0.0526+0.6279i \\ 0.0315-0.2366i & -0.3698-0.2862i & 0.3197-0.3701i \\ 0.7285+0.0791i & 0.5225+0.0720i & -0.0255-0.2448i \\ 0.4097-0.3067i & -0.4142+0.4106i & 0.5048+0.2198i \end{matrix}$ $V3(:,:,37) = \begin{matrix} 0.5000 & -0.5000 & -0.5000 \\ 0.5000 & 0-0.5000i & 0+0.5000i \\ 0.5000 & 0.5000 & 0.5000 \\ 0.5000 & 0+0.5000i & 0-0.5000i \end{matrix}$ $V3(:,:,38) = \begin{matrix} -0.5245-0.3774i & -0.5623-0.0655i & 0.2278+0.0771i \\ -0.0522+0.4805i & -0.1132-0.5413i & 0.6451-0.0046i \\ 0.1023+0.0593i & -0.5232-0.2730i & -0.4236+0.2873i \\ -0.5756-0.0591i & 0.0088-0.1592i & -0.3254-0.3977i \end{matrix}$ $V3(:,:,39) = \begin{matrix} 0.1953-0.3057i & -0.5062+0.0964i & 0.4500+0.1253i \\ -0.2685-0.1895i & 0.6204+0.3044i & 0.1623+0.5596i \\ -0.7779-0.3721i & -0.3442-0.2479i & -0.0309+0.0263i \\ -0.0216-0.1283i & 0.2771+0.0109i & -0.1897-0.6361i \end{matrix}$ $V3(:,:,40) = \begin{matrix} -0.6035-0.3342i & -0.3380-0.3706i & -0.0686+0.3905i \\ -0.1428+0.4838i & -0.1430-0.1006i & -0.3957-0.4036i \\ -0.1927+0.1626i & -0.0874+0.0678i & -0.6478+0.2818i \\ -0.3638-0.2714i & 0.3209+0.7763i & -0.1557-0.0019i \end{matrix}$ $V3(:,:,41) = \begin{matrix} 0.5000 & 0.5000 & -0.5000 \\ 0+0.5000i & 0-0.5000i & -0.5000 \\ 0.5000 & 0.5000 & 0.5000 \\ 0+0.5000i & 0-0.5000i & 0.5000 \end{matrix}$ $V3(:,:,42) = \begin{matrix} 0.1371+0.7838i & 0.2479+0.0123i & -0.0008-0.0975i \\ -0.0956+0.3657i & 0.2440+0.34471i & -0.4391-0.0271i \\ -0.1099-0.0181i & -0.2141+0.1937i & -0.2988+0.8311i \\ 0.3423-0.3074i & 0.2247+0.7913i & -0.0349-0.1254i \end{matrix}$ $V3(:,:,43) = \begin{matrix} -0.0860-0.2241i & 0.5338-0.0441i & -0.1033+0.6639i \\ -0.6015+0.2527i & -0.4372+0.3957i & -0.1471+0.4008i \\ -0.4157-0.2206i & 0.0012+0.2819i & 0.4969-0.2768i \\ 0.1543+0.5211i & -0.3515-0.4030i & -0.0551+0.1997i \end{matrix}$ $V3(:,:,44) = \begin{matrix} -0.1081+0.4460i & 0.0435-0.3239i & -0.1491+0.5251i \\ -0.3567-0.5167i & -0.1969-0.3585i & 0.3858+0.4634i \\ -0.2354-0.1914i & 0.2532+0.7745i & 0.0863+0.4020i \\ -0.1985-0.5136i & 0.0895-0.2322i & -0.0884-0.4019i \end{matrix}$ $V3(:,:,45) = \begin{matrix} 0.5000 & -0.5000 & -0.5000 \\ 0+0.5000i & -0.5000 & 0.5000 \\ 0.5000 & 0.5000 & 0.5000 \\ 0+0.5000i & 0.5000 & -0.5000 \end{matrix}$ $V3(:,:,46) = \begin{matrix} -0.5060+0.1443i & 0.5534-0.3836i & -0.1155-0.3757i \\ -0.4682-0.5571i & -0.1369-0.0572i & -0.2290+0.0234i \\ 0.4345+0.0089i & 0.5727-0.1978i & -0.1012-0.0932i \\ -0.0309+0.0618i & -0.2903-0.2707i & 0.7177-0.5085i \end{matrix}$ $V3(:,:,47) = \begin{matrix} 0.0427+0.4037i & 0.1038+0.3577i & 0.5172+0.3648i \\ -0.3221+0.3130i & -0.3384-0.3674i & -0.2477+0.0474i \\ -0.0724+0.1313i & -0.0231-0.7092i & 0.5412+0.2385i \\ 0.3259-0.7104i & -0.3205-0.0747i & 0.1184+0.4148i \end{matrix}$ $V3(:,:,48) = \begin{matrix} -0.1512+0.0220i & -0.5578+0.3060i & -0.4803+0.4790i \\ -0.5297-0.2125i & -0.4245+0.2405i & 0.3258-0.5345i \\ 0.3488+0.2574i & -0.5660-0.2718i & -0.0021-0.2051i \\ 0.5345-0.4211i & 0.1552+0.1767i & -0.1657-0.2802i \end{matrix}$ $$V3(:,:,49) = \begin{matrix} 0.5000 & 0.5000 & 0.5000 \\ 0.5000 & 0+0.5000i & -0.5000 \\ 0.5000 & -0.5000 & 0.5000 \\ -0.5000 & 0+0.5000i & 0.5000 \end{matrix}$$

$$V3(:,:,50) = \begin{matrix} 0.3899+0.5099i & 0.1239+0.3480i & -0.3212+0.2294i \\ -0.2642-0.2730i & -0.0709+0.7215i & 0.4401+0.3283i \\ 0.0634+0.5454i & -0.0400-0.3119i & 0.5426+0.4590i \\ 0.3743-0.0464i & 0.3735+0.3156i & -0.1921-0.0291i \end{matrix}$$

$$V3(:,:,51) = \begin{matrix} 0.1996+0.3349i & 0.3567-0.6608i & 0.1085+0.0728i \\ 0.1647+0.4478i & -0.0991+0.3844i & -0.5490-0.3633i \\ 0.0029-0.0825i & -0.4340+0.1941i & -0.0351+0.6288i \\ 0.6245-0.4727i & 0.1497+0.1732i & 0.1381-0.3657i \end{matrix}$$

$$V3(:,:,52) = \begin{matrix} 0.4945-0.2660i & -0.4949+0.3789i & -0.0039-0.0184i \\ -0.4531-0.0810i & 0.2332+0.1714i & -0.0493-0.3478i \\ 0.2295+0.4493i & 0.2178+0.6234i & -0.4191+0.1977i \\ 0.0234-0.4666i & -0.0755-0.2931i & -0.8112+0.0581i \end{matrix}$$

$$V3(:,:,53) = \begin{matrix} 0.5000 & 0.5000 & 0.5000 \\ 0.5000 & -0.5000 & 0.-0.5000i \\ 0.5000 & 0.5000 & -0.5000 \\ -0.5000 & 0.5000 & 0-0.5000i \end{matrix}$$

$$V3(:,:,54) = \begin{matrix} -0.0891-0.1737i & -0.5874+0.0189i & 0.4181+0.5480i \\ -0.2160+0.0403i & -04608-0.5955i & 0.2155-0.3594i \\ 0.3530+0.5446i & -0.2058-0.0338i & -0.2629+0.1610i \\ 0.1657+0.6818i & 0.1876-0.0948i & 0.4723+0.1766i \end{matrix}$$

$$V3(:,:,55) = \begin{matrix} 0.3162-0.1330i & -0.5287-0.1679i & 0.1564+0.5043i \\ -0.2451+0.4651i & 0.2831+0.1482i & 0.4827+0.6000i \\ 0.1535-0.5047i & 0.7325-0.1862i & 0.0058+0.2362i \\ -0.4972-0.2836i & 0.0497+0.1282i & 0.1692-0.2094i \end{matrix}$$

$$V3(:,:,56) = \begin{matrix} 0.1157+0.3948i & 0.5787-0.3292i & 0.2943-0.1843i \\ 0.2814-0.3175i & 0.2525-0.2620i & -0.5641+0.4338i \\ 0.4393+0.0781i & 0.3512+0.0363i & 0.2819+0.4758i \\ 0.3704-0.5609i & 0.1336+0.5309i & 0.1521-0.2100i \end{matrix}$$

$$V3(:,:,57) = \begin{matrix} 0.5000 & 0.5000 & 0.5000 \\ 0.3536+0.3536i & -0.3536+0.3536i & 0.3536-0.3536i \\ 0+0.5000i & 0-0.5000i & 0-0.5000i \\ -0.3536+0.3536i & 0.3536+0.3536i & -0.3536-0.3536i \end{matrix}$$

$$V3(:,:,58) = \begin{matrix} -0.6183-0.3893i & -0.3104-0.0769i & 0.2262-0.1301i \\ 0.0439-0.4301i & 0.0424-0.0174i & 0.4717-0.0872i \\ -0.3231+0.0445i & -0.0056+0.4980i & 0.2818+0.6867i \\ -0.2461-0.3351i & 0.7828+0.1865i & -0.3883+0.0121i \end{matrix}$$

$$V3(:,:,59) = \begin{matrix} 0.3566-0.2418i & 0.0169-0.4765i & -0.5447-0.3859i \\ -0.1924+0.0246i & -0.3480+0.4512i & 0.0113-0.6545i \\ -0.5527+0.1626i & -0.3128-0.0721i & -0.3061-0.1765i \\ -0.4030-0.5315i & 0.5097+0.2917i & 0.0150+0.0288i \end{matrix}$$

$$V3(:,:,60) = \begin{matrix} 0.0072+0.6080i & 0.0164+0.4489i & 0.2019+0.3032i \\ -0.1531-0.34051i & -0.1388+0.8192i & 0.0946-0.3643i \\ 0.4820+0.4643i & -0.2314+0.1231i & -0.4842-0.3928i \\ -0.1738-0.1132i & -0.1247-0.1538i & -0.4937-0.3051i \end{matrix}$$

$$V3(:,:,61) = \begin{matrix} 0.5000 & 0.5000 & 0.5000 \\ -0.3536+0.3536i & -0.3536-0.3536i & 0.3536-0.3536i \\ 0-0.5000i & 0+0.5000i & 0-0.5000i \\ 0.3536+0.3536i & 0.3536-0.3536i & -0.3536-0.3536i \end{matrix}$$

$$V3(:,:,62) = \begin{matrix} -0.4387-0.0343i & 0.5100-0.0764i & 0.2952+0.4317i \\ 0.5062-0.5972i & 0.2808-0.2160i & 0.1570+0.2361i \\ -0.2611+0.2853i & -0.1195+0.0730i & -0.1784+0.6546i \\ -0.0591+0.2011i & 0.7066-0.2995i & -0.3568-0.2417i \end{matrix}$$

$$V3(:,:,63) = \begin{matrix} -0.0757-0.5813i & 0.1457-0.0933i & -0.5106+0.2643i \\ 0.1019+0.2454i & 0.3241+0.2186i & 0.2092-0.3897i \\ 0.5989+0.2606i & -0.5728-0.0137i & -0.1198+0.3689i \\ -0.3284+0.2264i & -0.1976+0.0678i & -0.5620-0.0868i \end{matrix}$$

$$V3(:,:,64) = \begin{matrix} 0.2711-0.7070i & -0.2911+0.2527i & -0.1768+0.3248i \\ -0.4123-0.1234i & 0.0110-0.0641i & -0.4612-0.6234i \\ 0.4714-0.0224i & 0.3098+0.2417i & 0.0189-0.4271i \\ -0.0617-0.1224i & -0.4468-0.7023i & 0.2720-0.0718i \end{matrix}$$

Final Rank 4 Codebook:

$$V4(:,:,1) = \begin{matrix} 0.5000 & 0.5000 & -0.5000 & -0.5000 \\ 0.5000 & -0.5000 & -0.5000 & 0.5000 \\ 0.5000 & 0.5000 & 0.5000 & 0.5000 \\ 0.5000 & -0.5000 & 0.5000 & -0.5000 \end{matrix}$$

$$V4(:,:,2) = \begin{matrix} 0.5000 & 0.5000 & -0.5000 & -0.5000 \\ 0+0.5000i & 0-0.5000i & 0-0.5000i & 0+0.5000i \\ 0.5000 & 0.5000 & 0.5000 & 0.5000 \\ 0+0.5000i & 0-0.5000i & 0+0.5000i & 0-0.5000i \end{matrix}$$

-continued $$V4(:,:,3) = \begin{pmatrix} 0.5000 & 0.5000 & -0.5000 & -0.5000 \\ 0.5000 & -0.5000 & 0-0.5000i & 0+0.5000i \\ 0.5000 & 0.5000 & 0.5000 & 0.5000 \\ 0.5000 & -0.5000 & 0+0.5000i & 0-0.5000i \end{pmatrix}$$

$$V4(:,:,4) = \begin{pmatrix} 0.5000 & 0.5000 & -0.5000 & -0.5000 \\ 0+0.5000i & 0-0.5000i & -0.5000 & 0.5000 \\ 0.5000 & 0.5000 & 0.5000 & 0.5000 \\ 0+0.5000i & 0-0.5000i & 0.5000 & -0.5000 \end{pmatrix}$$

$$V4(:,:,5) = \begin{pmatrix} 0.5000 & 0.5000 & 0.5000 & 0.5000 \\ 0.5000 & 0+0.5000i & -0.5000 & 0-0.5000i \\ 0.5000 & -0.5000 & 0.5000 & -0.5000 \\ -0.5000 & 0+0.5000i & 0.5000 & 0-0.5000i \end{pmatrix}$$

$V4(:,:,6) =$ $$\begin{pmatrix} 0.5000 & 0.5000 & 0.5000 & 0.5000 \\ 0.3536+0.3536i & -0.3536+0.3536i & -0.3536-0.3536i & 0.3536-0.3536i \\ 0+0.5000i & 0-0.5000i & 0+0.5000i & 0-0.5000i \\ -0.3536+0.3536i & 0.3536+0.3536i & 0.3536-0.3536i & -0.3536-0.3536i \end{pmatrix}$$

$V4(:,:,7) =$ $$\begin{pmatrix} 0.3260+0.6774i & 0.4688+0.2170i & 0.3008+0.0981i & 0.1395-0.2201i \\ 0.3254+0.1709i & -0.2948-0.0700i & -0.1167+0.7005i & -0.4967+0.1489i \\ 0.3254+0.1709i & -0.4598-0.2965i & -0.1297+0.0716i & 0.7351+0.0569i \\ -0.0250+0.4051i & -0.5846-0.0154i & 0.3317-0.5135i & -0.3430-0.0437i \end{pmatrix}$$

$V4(:,:,8) =$ $$\begin{pmatrix} 0.1499+0.0347i & -0.4377+0.4498i & 0.2079+0.3012i & -0.4172-0.5239i \\ 0.5009+0.3071i & -0.1173+0.2079i & 0.4297+0.2345i & 0.4687+0.3722i \\ 0.1505+0.5412i & -0.2098+0.2390i & -0.2835-0.7076i & -0.0338-0.0330i \\ 0.1505+0.5412i & 0.6133-0.2682i & 0.1669+0.1324i & -0.1311-0.4169i \end{pmatrix}$$

$V4(:,:,9) =$ $$\begin{pmatrix} 0.0918+0.3270i & 0.4585-0.3521i & 0.4797-0.5371i & 0.1760-0.0285i \\ 0.1311+0.6387i & -0.5369+0.2492i & 0.2256+0.0214i & 0.0252-0.4154i \\ 0.2473+0.0541i & -0.1391+0.3154i & -0.1147-0.1411i & 0.7276+0.5046i \\ 0.4815+0.4045i & 0.2872-0.3378i & -0.2334+0.5852i & 0.0121+0.1041i \end{pmatrix}$$

$V4(:,:,10) =$ $$\begin{pmatrix} 0.0918+0.3270i & -0.7326-0.3303i & 0.1180-0.0570i & 0.3116-0.3531i \\ -0.1311-0.6387i & -0.1521+0.1245i & -0.3996-0.1865i & 0.5845-0.0141i \\ 0.2473+0.0541i & 0.0048-0.3893i & -0.8009-0.0266i & -0.3599-0.1123i \\ -0.4815-0.4045i & -0.3093-0.2615i & 0.1996-0.3262i & -0.5417+0.0279i \end{pmatrix}$$

$V4(:,:,11) =$ $$\begin{pmatrix} 0.3841+0.3851i & -0.4259-0.6865i & 0.1888-0.1148i & 0.0505-0.0112i \\ 0.0056-0.3076i & 0.0000-0.0163i & 0.5849+0.0396i & 0.1477+0.7346i \\ 0.2285+0.6580i & -0.0029+0.5625i & 0.2943+0.2161i & 0.2547-0.0108i \\ -0.3448-0.0735i & -0.1664+0.0538i & 0.6828-0.0892i & -0.3558-0.4943i \end{pmatrix}$$

$V4(:,:,12) =$ $$\begin{pmatrix} 0.3260+0.6774i & -0.2522+0.2830i & 0.0842-0.4310i & 0.0964+0.2984i \\ -0.3254-0.1709i & -0.2511+0.3562i & -0.5001-0.4577i & -0.4236-0.1898i \\ 0.3254+0.1709i & -0.6354-0.2810i & -0.3335+0.4366i & -0.1484-0.2414i \\ 0.0250-0.4051i & -0.2798-0.3246i & -0.1512-0.1513i & 0.0306+0.7778i \end{pmatrix}$$

$V4(:,:,13) =$ $$\begin{pmatrix} -0.0918 - 0.3270i & 0.4517 - 0.1172i & -0.0439 + 0.5591i & 0.3594 - 0.4725i \\ -0.2473 - 0.0541i & -0.3568 + 0.3992i & -0.4696 - 0.0932i & -0.2384 - 0.6026i \\ 0.1311 + 0.6387i & 0.0918 + 0.4242i & 0.4085 - 0.0481i & 0.3325 - 0.3269i \\ 0.4815 + 0.4045i & -0.3837 - 0.3999i & -0.3005 + 0.4437i & -0.0155 - 0.1000i \end{pmatrix}$$

$V4(:,:,14) =$ $$\begin{pmatrix} -0.0337 - 0.6193i & 0.3983 + 0.5597i & -0.1922 - 0.0358i & -0.2096 + 0.2475i \\ -0.4621 - 0.5019i & -0.5583 + 0.0724i & 0.2420 - 0.0149i & 0.3931 - 0.0653i \\ 0.2280 + 0.1515i & 0.2543 + 0.2747i & 0.7756 - 0.0378i & 0.3367 + 0.2619i \\ 0.2280 + 0.1515i & -0.0069 + 0.2664i & -0.5242 + 0.1589i & 0.7417 + 0.0629i \end{pmatrix}$$

$V4(:,:,15) =$ $$\begin{pmatrix} -0.4422 - 0.0928i & 0.3609 + 0.0743i & -0.6309 - 0.1183i & 0.2159 - 0.4488i \\ -0.2479 - 0.5606i & -0.0447 - 0.2624i & -0.3156 + 0.2879i & -0.0988 + 0.6010i \\ 0.2479 + 0.5606i & 0.2646 - 0.2157i & -0.3493 - 0.1821i & 0.3113 + 0.5056i \\ 0.0137 + 0.2102i & -0.7438 + 0.3516i & -0.4975 - 0.0539i & -0.1643 + 0.0375i \end{pmatrix}$$

$V4(:,:,16) =$ $$\begin{pmatrix} -0.4422 - 0.0928i & -0.4197 + 0.4817i & 0.0820 + 0.2932i & 0.5394 + 0.0634i \\ 0.2479 + 0.5606i & -0.2858 - 0.0562i & 0.0717 - 0.5527i & 0.3834 + 0.2860i \\ 0.2479 + 0.5606i & -0.0712 + 0.2154i & -0.2709 + 0.6053i & -0.2652 + 0.2505i \\ -0.0137 - 0.2102i & 0.1024 + 0.6671i & -0.0386 - 0.3943i & -0.3941 + 0.4333i \end{pmatrix}$$

$V4(:,:,17) =$ $$\begin{pmatrix} -0.3841 - 0.3851i & 0.3849 + 0.1986i & -0.5420 - 0.2820i & 0.3395 + 0.1672i \\ -0.0056 + 0.3076i & -0.1824 - 0.0094i & 0.1989 + 0.1166i & 0.6694 + 0.6089i \\ 0.3448 + 0.0735i & 0.2254 + 0.6795i & -0.1979 + 0.5597i & -0.0690 + 0.0775i \\ -0.2285 - 0.6580i & -0.5154 + 0.0292i & 0.0915 + 0.4612i & 0.1367 - 0.0921i \end{pmatrix}$$

$V4(:,:,18) =$ $$\begin{pmatrix} -0.0918 - 0.3270i & 0.6638 - 0.4917i & -0.0134 - 0.1109i & 0.3780 + 0.2166i \\ 0.2473 + 0.0541i & -0.1566 - 0.1262i & 0.0722 - 0.9308i & -0.1132 + 0.1055i \\ 0.1311 + 0.6387i & -0.0029 - 0.3366i & -0.1758 + 0.1916i & -0.1479 + 0.6100i \\ -0.4815 - 0.4045i & -0.3978 + 0.0753i & 0.2200 - 0.0040i & -0.0224 + 0.6259i \end{pmatrix}$$

$V4(:,:,19) =$ $$\begin{pmatrix} 0.3841 + 0.3851i & 0.2420 - 0.2055i & -0.1388 + 0.6904i & 0.3273 + 0.0199i \\ -0.3076 - 0.0056i & -0.5655 - 0.6754i & -0.2104 + 0.2029i & -0.1634 + 0.1312i \\ 0.3448 + 0.0735i & 0.0981 + 0.0467i & 0.1060 + 0.1310i & -0.7933 + 0.4542i \\ -0.6580 + 0.2285i & 0.3298 - 0.0517i & 0.5748 + 0.2447i & -0.0516 + 0.1018i \end{pmatrix}$$

$V4(:,:,20) =$ $$\begin{pmatrix} 0.0918 + 0.3270i & -0.2841 - 0.7969i & 0.3713 - 0.0745i & 0.0639 + 0.1460i \\ -0.0541 + 0.2473i & 0.0227 + 0.2058i & 0.5630 - 0.0230i & -0.0999 - 0.7520i \\ 0.1311 + 0.6387i & 0.2505 + 0.3816i & 0.1527 - 0.2390i & 0.3715 + 0.3849i \\ -0.4045 + 0.4815i & -0.0898 - 0.1576i & -0.6437 - 0.2105i & 0.0144 - 0.3358i \end{pmatrix}$$

$V4(:, :, 21) =$ $$\begin{matrix} 0.0337 + 0.6193i & 0.3344 - 0.1640i & -0.2485 + 0.4791i & 0.4000 + 0.1590i \\ -0.5019 + 0.4621i & -0.1475 + 0.2641i & 0.5893 + 0.1330i & -0.1383 - 0.2427i \\ 0.2280 + 0.1515i & -0.1383 + 0.3182i & -0.4811 + 0.3240i & -0.5161 - 0.4493i \\ -0.1515 + 0.2280i & -0.3105 - 0.7437i & -0.0811 - 0.0251i & -0.4817 + 0.1909i \end{matrix}$$

$V4(:, :, 22) =$ $$\begin{matrix} 0.0337 + 0.6193i & 0.4332 + 0.1612i & -0.4077 - 0.0486i & 0.4750 + 0.0865i \\ 0.5019 - 0.4621i & -0.2499 + 0.4647i & -0.3727 - 0.1094i & 0.2747 + 0.1727i \\ 0.2280 + 0.1515i & 0.1294 + 0.5446i & 0.6827 - 0.1403i & 0.1161 - 0.3354i \\ 0.1515 - 0.2280i & 0.3535 - 0.2640i & 0.4328 + 0.0863i & 0.3135 + 0.6613i \end{matrix}$$

$V4(:, :, 23) =$ $$\begin{matrix} 0.4422 + 0.0928i & 0.5948 - 0.2086i & -0.6155 + 0.0029i & 0.0246 + 0.1384i \\ 0.5606 - 0.2479i & -0.6101 + 0.1811i & -0.2226 - 0.2992i & 0.0747 + 0.2731i \\ 0.2479 + 0.5606i & -0.1244 + 0.3625i & 0.0659 + 0.6219i & 0.2542 + 0.1473i \\ 0.2102 - 0.0137i & -0.1261 + 0.1870i & -0.1866 + 0.2370i & -0.7184 - 0.5456i \end{matrix}$$

$V4(:, :, 24) =$ $$\begin{matrix} 0.3841 + 0.3851i & -0.7276 + 0.3231i & -0.0746 + 0.0002i & 0.1968 + 0.1617i \\ 0.3076 + 0.0056i & 0.0623 - 0.3109i & 0.7114 + 0.3826i & 0.3902 + 0.0102i \\ 0.3448 + 0.0735i & -0.0316 - 0.3607i & -0.4356 + 0.1774i & 0.0838 - 0.7186i \\ 0.6580 - 0.2285i & 0.1496 - 0.3350i & -0.1859 - 0.2936i & -0.1918 + 0.4718i \end{matrix}$$

$V4(:, :, 25) =$ $$\begin{matrix} -0.3841 - 0.3851i & 0.2650 + 0.1831i & 0.2046 + 0.4515i & 0.2200 + 0.5535i \\ 0.3076 + 0.0056i & 0.0741 + 0.1142i & -0.2010 + 0.6413i & 0.4491 - 0.4832i \\ 0.2285 + 0.6580i & 0.3746 + 0.4660i & 0.2087 + 0.1370i & -0.2423 + 0.1904i \\ -0.0735 + 0.3448i & -0.0601 - 0.7188i & -0.1085 + 0.4782i & -0.2656 + 0.2110i \end{matrix}$$

$V4(:, :, 26) =$ $$\begin{matrix} -0.3260 - 0.6774i & 0.4170 + 0.2673i & 0.0729 - 0.3667i & -0.1258 + 0.1841i \\ 0.1709 - 0.3254i & -0.0605 + 0.0504i & -0.2440 + 0.1836i & 0.8489 + 0.2116i \\ 0.3254 + 0.1709i & 0.3145 + 0.3209i & -0.6599 - 0.3142i & -0.0292 - 0.3579i \\ -0.4051 - 0.0250i & -0.4946 + 0.5495i & -0.3770 + 0.3011i & -0.2007 + 0.1251i \end{matrix}$$

$V4(:, :, 27) =$ $$\begin{matrix} -0.1499 - 0.0347i & -0.1568 + 0.5108i & -0.6900 + 0.1066i & 0.4419 + 0.0901i \\ 0.3071 - 0.5009i & -0.2476 + 0.2774i & 0.3823 - 0.1521i & 0.3815 - 0.4492i \\ 0.1505 + 0.5412i & 0.1736 - 0.2279i & -0.1974 - 0.4916i & 0.3241 - 0.4623i \\ -0.5412 + 0.1505i & -0.6443 - 0.2811i & 0.0584 + 0.2373i & 0.0318 - 0.3599i \end{matrix}$$

$V4(:, :, 28) =$ $$\begin{matrix} -0.1499 - 0.0347i & -0.4915 + 0.5944i & 0.0644 - 0.0145i & -0.1689 - 0.5903i \\ -0.3071 + 0.5009i & -0.1046 - 0.3964i & -0.5642 + 0.0031i & -0.3416 - 0.2274i \\ 0.1505 + 0.5412i & 0.2288 + 0.3710i & -0.2561 - 0.0135i & 0.6471 - 0.0998i \\ 0.5412 - 0.1505i & -0.2089 + 0.0583i & -0.4070 - 0.6677i & -0.1176 + 0.1097i \end{matrix}$$

$V4(:,:,29) =$ $$\begin{pmatrix} -0.0918 - 0.3270i & 0.0849 - 0.1823i & 0.5488 + 0.2367i & -0.3534 - 0.6018i \\ -0.6387 + 0.1311i & -0.1210 - 0.0233i & -0.2347 - 0.3498i & 0.3248 - 0.5261i \\ 0.2473 + 0.0541i & 0.4127 - 0.7969i & -0.2180 - 0.2794i & -0.0107 - 0.0700i \\ 0.4045 - 0.4815i & -0.0136 + 0.3727i & -0.3369 - 0.4757i & -0.2087 - 0.2866i \end{pmatrix}$$

$V4(:,:,30) =$ $$\begin{pmatrix} -0.3841 - 0.3851i & 0.4828 - 0.2545i & 0.2119 + 0.3871i & -0.3824 - 0.2556i \\ -0.3076 - 0.0056i & -0.1939 + 0.1069i & -0.3495 + 0.6691i & 0.1365 + 0.5175i \\ 0.2285 + 0.6580i & 0.3116 + 0.2702i & -0.1220 + 0.2056i & -0.5361 - 0.0030i \\ 0.0735 - 0.3448i & -0.4258 + 0.5492i & 0.4208 + 0.0338i & -0.4460 + 0.1251i \end{pmatrix}$$

$V4(:,:,31) =$ $$\begin{pmatrix} 0.0337 + 0.6193i & -0.3283 - 0.4339i & -0.2690 + 0.1335i & -0.4536 - 0.1528i \\ 0.2280 + 0.1515i & -0.3886 - 0.2987i & 0.0982 - 0.6284i & 0.5255 + 0.0653i \\ 0.2280 + 0.1515i & 0.2457 - 0.2337i & -0.3618 + 0.5436i & 0.6122 + 0.0946i \\ -0.4621 - 0.5019i & -0.4861 - 0.3354i & -0.2060 + 0.1911i & 0.0216 + 0.3261i \end{pmatrix}$$

$V4(:,:,32) =$ $$\begin{pmatrix} 0.0918 + 0.3270i & -0.0348 + 0.4484i & 0.4669 - 0.6204i & 0.2685 + 0.0858i \\ 0.4815 + 0.4045i & -0.4400 + 0.2694i & 0.0511 + 0.4386i & -0.1700 + 0.3385i \\ 0.1311 + 0.6387i & 0.3429 - 0.0049i & 0.4475 - 0.0066i & 0.1480 - 0.4849i \\ -0.2473 - 0.0541i & 0.1991 + 0.6118i & 0.0419 + 0.0073i & -0.6988 - 0.1782i \end{pmatrix}$$

$V4(:,:,33) =$ $$\begin{pmatrix} 0.3841 + 0.3851i & -0.2360 - 0.2973i & 0.3316 + 0.2303i & 0.0526 + 0.6279i \\ 0.2285 + 0.6580i & 0.0315 - 0.2366i & -0.3698 - 0.2862i & 0.3197 - 0.3701i \\ 0.3448 + 0.0735i & 0.7285 + 0.0791i & 0.5225 + 0.0720i & -0.0255 - 0.2448i \\ 0.0056 - 0.3076i & 0.4097 - 0.3067i & -0.4142 + 0.4106i & 0.5048 + 0.2198i \end{pmatrix}$$

$V4(:,:,34) =$ $$\begin{pmatrix} 0.4422 + 0.0928i & -0.5245 - 0.3774i & -0.5623 - 0.0655i & 0.2278 + 0.0771i \\ -0.2102 + 0.0137i & -0.0522 + 0.4805i & -0.1132 - 0.5413i & 0.6451 - 0.0046i \\ -0.2479 - 0.5606i & 0.1023 + 0.0593i & -0.5232 - 0.2730i & -0.4236 + 0.2873i \\ -0.5606 + 0.2479i & -0.5756 - 0.0591i & 0.0088 - 0.1592i & -0.3254 - 0.3977i \end{pmatrix}$$

$V4(:,:,35) =$ $$\begin{pmatrix} 0.0337 + 0.6193i & 0.1953 - 0.3057i & -0.5062 + 0.0964i & 0.4500 + 0.1253i \\ -0.1515 + 0.2280i & -0.2685 - 0.1895i & 0.6204 + 0.3044i & 0.1623 + 0.5596i \\ -0.2280 - 0.1515i & -0.7779 - 0.3721i & -0.3442 - 0.2479i & -0.0309 + 0.0263i \\ -0.5019 + 0.4621i & -0.0216 - 0.1283i & 0.2771 + 0.0109i & -0.1897 - 0.6361i \end{pmatrix}$$

$V4(:,:,36) =$ $$\begin{pmatrix} 0.0918 + 0.3270i & -0.6035 - 0.3342i & -0.3380 - 0.3706i & -0.0686 + 0.3905i \\ -0.4045 + 0.4815i & -0.1428 + 0.4838i & -0.1430 - 0.1006i & -0.3957 - 0.4036i \\ -0.1311 - 0.6387i & -0.1927 + 0.1626i & -0.0874 + 0.0678i & -0.6478 + 0.2818i \\ -0.0541 + 0.2473i & -0.3638 - 0.2714i & 0.3209 + 0.7763i & -0.1557 - 0.0019i \end{pmatrix}$$

$V4(:, :, 37) =$ $$\begin{array}{llll}
0.3841 + 0.3851i & 0.1371 + 0.7838i & 0.2479 + 0.0123i & -0.0008 - 0.0975i \\
-0.2285 - 0.6580i & -0.0956 + 0.3657i & 0.2440 + 0.3447i & -0.4391 - 0.0271i \\
0.3448 + 0.0735i & -0.1099 - 0.0181i & -0.2141 + 0.1937i & -0.2988 + 0.8311i \\
-0.0056 + 0.3076i & 0.3423 - 0.3074i & 0.2247 + 0.7913i & -0.0349 - 0.1254i
\end{array}$$

$V4(:, :, 38) =$ $$\begin{array}{llll}
0.4422 + 0.0928i & -0.0860 - 0.2241i & 0.5338 - 0.0441i & -0.1033 + 0.6639i \\
-0.0137 - 0.2102i & -0.6015 + 0.2527i & -0.4372 + 0.3957i & -0.1471 + 0.4008i \\
0.2479 + 0.5606i & -0.4157 - 0.2206i & 0.0012 + 0.2819i & 0.4968 - 0.2768i \\
0.2479 + 0.5606i & 0.1543 + 0.5211i & -0.3515 - 0.4030i & -0.0551 + 0.1997i
\end{array}$$

$V4(:, :, 39) =$ $$\begin{array}{llll}
0.0337 + 0.6193i & -0.1081 + 0.4460i & 0.0435 - 0.3239i & -0.1491 + 0.5251i \\
-0.2280 - 0.1515i & -0.3567 - 0.5167i & -0.1969 - 0.3585i & 0.3858 + 0.4634i \\
0.2280 + 0.1515i & -0.2354 - 0.1914i & 0.2532 + 0.7745i & 0.0863 + 0.4020i \\
0.4621 + 0.5019i & -0.1985 - 0.5136i & 0.0895 - 0.2322i & -0.0884 - 0.4019i
\end{array}$$

$V4(:, :, 40) =$ $$\begin{array}{llll}
0.0918 + 0.3270i & -0.5060 + 0.1443i & 0.5534 - 0.3836i & -0.1155 - 0.3757i \\
0.4045 - 0.4815i & -0.4682 - 0.5571i & -0.1369 - 0.0572i & -0.2290 + 0.0234i \\
-0.1311 - 0.6387i & 0.4345 + 0.0089i & 0.5727 - 0.1978i & -0.1012 - 0.0932i \\
0.0541 - 0.2473i & -0.0309 + 0.0618i & -0.2903 - 0.2707i & 0.7177 - 0.5085i
\end{array}$$

$V4(:, :, 41) =$ $$\begin{array}{llll}
0.3841 + 0.3851i & 0.0427 + 0.4037i & 0.1038 + 0.3577i & 0.5172 + 0.3648i \\
0.6580 - 0.2285i & -0.3221 + 0.3130i & -0.3384 - 0.3674i & -0.2477 + 0.0474i \\
-0.3448 - 0.0735i & -0.0724 + 0.1313i & -0.0231 - 0.7092i & 0.5412 + 0.2385i \\
0.3076 + 0.0056i & 0.3259 - 0.7104i & -0.3205 - 0.0747i & 0.1184 + 0.4148i
\end{array}$$

$V4(:, :, 42) =$ $$\begin{array}{llll}
0.4422 + 0.1928i & -0.1512 + 0.0220i & -0.5578 + 0.0360i & -0.4803 + 0.4790i \\
0.2102 - 0.0137i & -0.5297 - 0.2125i & -0.4245 + 0.2405i & 0.3258 - 0.5345i \\
-0.2479 - 0.5606i & 0.3488 + 0.2574i & -0.5660 - 0.2718i & -0.0021 - 0.2051i \\
0.5606 - 0.2479i & 0.5345 - 0.4211i & 0.1552 + 0.1767i & -0.1657 - 0.2802i
\end{array}$$

$V4(:, :, 43) =$ $$\begin{array}{llll}
0.3841 + 0.3851i & 0.3899 + 0.5099i & 0.1239 + 0.3480i & -0.3212 + 0.2294i \\
0.0022 + 0.1690i & -0.2642 - 0.2730i & -0.0709 + 0.7215i & 0.4401 + 0.3283i \\
-0.3076 - 0.0056i & 0.0634 + 0.5454i & -0.0400 - 0.3119i & 0.5426 + 0.4590i \\
-0.7536 - 0.1140i & 0.3743 - 0.0464i & 0.3735 + 0.3156i & -0.1921 - 0.0291i
\end{array}$$

$V4(:, :, 44) =$ $$\begin{array}{llll}
-0.1560 + 0.4926i & 0.1996 + 0.3349i & 0.3567 - 0.6608i & 0.1085 + 0.0728i \\
0.0837 + 0.4175i & 0.1647 + 0.4478i & -0.0991 + 0.3844i & -0.5490 - 0.3633i \\
-0.4597 + 0.3989i & 0.0029 - 0.0825i & -0.4340 + 0.1941i & -0.0351 + 0.6288i \\
-0.4175 + 0.0837i & 0.6245 - 0.4727i & 0.1497 + 0.1732i & 0.1381 - 0.3657i
\end{array}$$

$V4(:, :, 45) =$ $$\begin{matrix} 0.3841 + 0.3851i & 0.4945 - 0.2660i & -0.4949 + 0.3789i & -0.0039 - 0.0184i \\ -0.1140 + 0.7536i & -0.4531 - 0.0810i & 0.2332 + 0.1714i & -0.0493 - 0.3478i \\ -0.3076 - 0.0056i & 0.2295 + 0.4493i & 0.2178 + 0.6234i & -0.4191 + 0.1977i \\ -0.1690 + 0.0022i & 0.0234 - 0.4666i & -0.0755 - 0.2931i & -0.8112 + 0.0581i \end{matrix}$$

$V4(:, :, 46) =$ $$\begin{matrix} 0.3396 + 0.1614i & -0.0891 - 0.1737i & -0.5874 + 0.0189i & 0.4181 + 0.5480i \\ -0.3400 - 0.3060i & -0.2160 + 0.0403i & -0.4608 - 0.5955i & 0.2155 - 0.3594i \\ 0.3493 - 0.5641i & 0.3530 + 0.5446i & -0.2058 - 0.0338i & -0.2629 + 0.1610i \\ -0.3060 + 0.3400i & 0.1657 + 0.6818i & 0.1876 - 0.0948i & 0.4723 + 0.1766i \end{matrix}$$

$V4(:, :, 47) =$ $$\begin{matrix} 0.3841 + 0.3851i & 0.3162 - 0.1330i & -0.5287 - 0.1679i & 0.1564 + 0.5043i \\ -0.1690 + 0.0022i & -0.2451 + 0.4651i & 0.2831 + 0.1482i & 0.4827 + 0.6000i \\ 0.3076 + 0.0056i & 0.1535 - 0.5047i & 0.7325 - 0.1862i & 0.0058 + 0.2362i \\ -0.1140 + 0.7536i & -0.4972 - 0.2836i & 0.0497 + 0.1282i & 0.1692 - 0.2094i \end{matrix}$$

$V4(:, :, 48) =$ $$\begin{matrix} -0.1560 + 0.4926i & 0.1157 + 0.3948i & 0.5787 - 0.3292i & 0.2943 - 0.1843i \\ -0.4175 + 0.0837i & 0.2814 - 0.3175i & 0.2525 - 0.2620i & -0.5641 + 0.4338i \\ 0.4597 - 0.3989i & 0.4393 + 0.0781i & 0.3512 + 0.0363i & 0.2819 + 0.4758i \\ 0.0837 + 0.4175i & 0.3704 - 0.5609i & 0.1336 + 0.5309i & 0.1521 - 0.2100i \end{matrix}$$

$V4(:, :, 49) =$ $$\begin{matrix} 0.3841 + 0.3851i & -0.6183 - 0.3893i & -0.3104 - 0.0769i & 0.2262 - 0.1301i \\ 0.1140 - 0.7536i & 0.0439 - 0.4301i & 0.0424 - 0.0174i & 0.4717 - 0.0872i \\ -0.3076 - 0.0056i & -0.3231 + 0.0445i & -0.0056 + 0.4980i & 0.2818 + 0.6867i \\ 0.1690 - 0.0022i & -0.2461 - 0.3351i & 0.7828 + 0.1865i & -0.3883 + 0.0121i \end{matrix}$$

$V4(:, :, 50) =$ $$\begin{matrix} 0.3396 + 0.1614i & 0.3566 - 0.2418i & 0.0169 - 0.4765i & -0.5447 - 0.3859i \\ 0.3060 - 0.3400i & -0.1924 + 0.0246i & -0.3480 + 0.4512i & 0.0113 - 0.6545i \\ -0.3493 + 0.5641i & -0.5527 + 0.1626i & -0.3128 - 0.0721i & -0.3061 - 0.1765i \\ 0.3400 + 0.3060i & -0.4030 - 0.5315i & 0.5097 + 0.2917i & 0.0150 + 0.0288i \end{matrix}$$

$V4(:, :, 51) =$ $$\begin{matrix} 0.3841 + 0.3851i & 0.0072 + 0.6080i & 0.0164 + 0.4489i & 0.2019 + 0.3032i \\ -0.0022 - 0.1690i & -0.1531 - 0.3405i & -0.1388 + 0.8192i & 0.0946 - 0.3643i \\ -0.3076 - 0.0056i & 0.4820 + 0.4643i & -0.2314 + 0.1231i & -0.4842 + 0.3928i \\ 0.7536 + 0.1140i & -0.1738 - 0.1132i & -0.1247 - 0.1538i & -0.4937 - 0.3051i \end{matrix}$$

$V4(:, :, 52) =$ $$\begin{matrix} -0.1560 + 0.4926i & -0.4387 - 0.0343i & 0.5100 - 0.0764i & 0.2952 + 0.4317i \\ 0.4175 - 0.0837i & 0.5062 - 0.5972i & 0.2808 - 0.2160i & 0.1570 + 0.2361i \\ 0.4597 - 0.3989i & -0.2611 + 0.2853i & -0.1195 + 0.0730i & -0.1784 + 0.6546i \\ -0.0837 - 0.4175i & -0.0591 + 0.2011i & 0.7066 - 0.2995i & -0.3568 - 0.2417i \end{matrix}$$

$V4(:,:,53) =$ $$\begin{array}{llll} 0.3841 + 0.3851i & -0.0757 - 0.5813i & 0.1457 - 0.0933i & -0.5106 + 0.2643i \\ 0.7536 + 0.1140i & 0.1019 + 0.2454i & 0.3241 + 0.2186i & 0.2092 - 0.3897i \\ 0.3076 + 0.0056i & 0.5989 + 0.2606i & -0.5728 - 0.0137i & -0.1198 + 0.3689i \\ -0.0022 - 0.1690i & -0.3284 + 0.2264i & -0.1976 + 0.6708i & -0.5620 - 0.0868i \end{array}$$

$V4(:,:,54) =$ $$\begin{array}{llll} 0.3396 + 0.1614i & 0.2711 - 0.7070i & -0.2911 + 0.2527i & -0.1768 + 0.3248i \\ 0.3400 + 0.3060i & -0.4123 - 0.1234i & 0.0110 - 0.0641i & -0.4612 - 0.6234i \\ 0.3493 - 0.5641i & 0.4714 - 0.0224i & 0.3098 + 0.2417i & 0.0189 - 0.4271i \\ 0.3060 - 0.3400i & -0.0617 - 0.1224i & -0.4468 - 0.7023i & 0.2720 - 0.0718i \end{array}$$

5. Fifth Scheme to Design a 6-Bit Codebook

According to an exemplary embodiment, a 4-bit codebook and a 6-bit codebook may be provided in an integrated form.

(1) Operation 1:

16 matrices may be given as follows:

$$W(:,:,1) = \begin{array}{llll} 0.5000 & 0.5000 & 0.5000 & 0.5000 \\ 0.5000 & 0.0000 + 0.5000i & -0.5000 + 0.0000i & -0.0000 - 0.5000i \\ 0.5000 & -0.5000 + 0.0000i & 0.5000 - 0.0000i & -0.5000 + 0.0000i \\ 0.5000 & -0.0000 - 0.5000i & -0.5000 + 0.0000i & 0.0000 + 0.5000i \end{array}$$

$W(:,:,2) =$ $$\begin{array}{llll} 0.5000 & 0.5000 & 0.5000 & 0.5000 \\ 0.3536 + 0.3536i & -0.3536 + 0.3536i & -0.3536 - 0.3536i & 0.3536 - 0.3536i \\ 0.0000 + 0.5000i & -0.0000 - 0.5000i & 0.0000 + 0.5000i & -0.0000 - 0.5000i \\ -0.3536 + 0.3536i & 0.3536 + 0.3536i & 0.3536 - 0.3536i & -0.3536 - 0.3536i \end{array}$$

$W(:,:,3) =$ $$\begin{array}{llll} 0.4619 + 0.1913i & -0.1913 + 0.4619i & -0.4619 - 0.1913i & 0.1913 - 0.4619i \\ 0.4455 - 0.2270i & 0.4455 - 0.2270i & 0.4455 - 0.2270i & 0.4455 - 0.2270i \\ -0.1167 + 0.4862i & 0.4862 + 0.1167i & 0.1167 - 0.4862i & -0.4862 - 0.1167i \\ 0.2939 + 0.4045i & -0.2939 - 0.4045i & 0.2939 + 0.4045i & -0.2939 - 0.4045i \end{array}$$

$W(:,:,4) =$ $$\begin{array}{llll} -0.5000 & -0.5000 & -0.5000 & -0.5000 \\ -0.4985 - 0.0392i & 0.0392 + 0.4985i & -0.4985 + 0.0392i & -0.0392 - 0.4985i \\ 0.4938 - 0.0782i & -0.4938 + 0.0782i & 0.4938 - 0.0782i & -0.4938 + 0.0782i \\ -0.4862 + 0.1167i & 0.1167 + 0.4862i & 0.4862 - 0.1167i & -0.1167 - 0.4862i \end{array}$$

$W(:,:,5) =$ $$\begin{array}{llll} 0.5000 & 0.5000 & 0.5000 & 0.5000 \\ 0.4619 + 0.1913i & -0.1913 + 0.4619i & -0.4619 - 0.1913i & 0.1913 - 0.4619i \\ 0.3536 + 0.3536i & -0.3536 - 0.3536i & 0.3536 + 0.3536i & -0.3536 - 0.3536i \\ 0.1913 + 0.4619i & 0.4619 - 0.1913i & -0.1913 - 0.4619i & -0.4619 + 0.1913i \end{array}$$

$W(:,:,6) =$ $$\begin{array}{llll} 0.5000 & 0.5000 & 0.5000 & 0.5000 \\ 0.1913 + 0.4619i & -0.4619 + 0.1913i & -0.1913 - 0.4619i & 0.4619 - 0.1913i \\ -0.3536 + 0.3536i & 0.3536 - 0.3536i & -0.3536 + 0.3536i & 0.3536 - 0.3536i \\ -0.4619 - 0.1913i & -0.1913 + 0.4619i & 0.4619 + 0.1913i & 0.1913 - 0.4619i \end{array}$$

-continued $W(:,:,7) =$

|  |  |  |  |
|---|---|---|---|
| 0.2437 + 0.4837$i$ | 0.4258 + 0.0076$i$ | 0.5210 − 0.4265$i$ | −0.2364 − 0.1268$i$ |
| 0.5740 − 0.3102$i$ | 0.0596 + 0.3222$i$ | 0.2922 + 0.0454$i$ | 0.6147 + 0.0409$i$ |
| 0.2823 − 0.3783$i$ | −0.4186 + 0.1136$i$ | 0.3628 + 0.1522$i$ | −0.6500 − 0.1085$i$ |
| 0.2062 + 0.1248$i$ | 0.1513 + 0.7073$i$ | −0.5498 − 0.0464$i$ | −0.2340 − 0.2440$i$ |

$W(:,:,8) =$

|  |  |  |  |
|---|---|---|---|
| 0.0591 − 0.4953$i$ | 0.0742 + 0.2714$i$ | 0.3370 + 0.2000$i$ | −0.1041 − 0.7125$i$ |
| 0.5545 + 0.3908$i$ | −0.0591 − 0.0963$i$ | 0.2158 + 0.4089$i$ | −0.5589 + 0.0299$i$ |
| 0.2593 − 0.0234$i$ | −0.5800 − 0.1645$i$ | −0.2363 − 0.5965$i$ | −0.2149 − 0.3331$i$ |
| 0.3300 + 0.3380$i$ | 0.4619 + 0.5755$i$ | 0.0175 − 0.4698$i$ | 0.0748 − 0.0748$i$ |

$W(:,:,9) =$

|  |  |  |  |
|---|---|---|---|
| 0.5019 − 0.2171$i$ | 0.2121 − 0.4391$i$ | 0.4649 + 0.1545$i$ | −0.4709 + 0.0383$i$ |
| 0.0570 + 0.3132$i$ | 0.3637 + 0.1907$i$ | 0.5971 − 0.5122$i$ | 0.3285 + 0.0569$i$ |
| 0.2569 − 0.1797$i$ | 0.0539 − 0.3157$i$ | −0.0025 + 0.3671$i$ | 0.8042 + 0.1327$i$ |
| 0.6949 + 0.1358$i$ | −0.5835 + 0.3879$i$ | 0.0058 − 0.0797$i$ | 0.0341 + 0.0124$i$ |

$W(:,:,10) =$

|  |  |  |  |
|---|---|---|---|
| 0.2199 + 0.3199$i$ | 0.6305 − 0.4345$i$ | −0.0525 + 0.2357$i$ | −0.3110 − 0.3286$i$ |
| 0.5983 + 0.1264$i$ | −0.0683 + 0.2985$i$ | 0.5833 + 0.2614$i$ | 0.2969 − 0.1888$i$ |
| −0.5576 − 0.2903$i$ | −0.0495 − 0.3235$i$ | 0.3552 + 0.3750$i$ | 0.2888 − 0.3841$i$ |
| −0.0940 − 0.2672$i$ | −0.0481 + 0.4588$i$ | 0.0118 + 0.5160$i$ | −0.6633 − 0.0260$i$ |

$W(:,:,11) =$

|  |  |  |  |
|---|---|---|---|
| 0.4534 + 0.1075$i$ | 0.2632 + 0.4348$i$ | 0.1838 + 0.6429$i$ | 0.2307 + 0.1558$i$ |
| −0.0163 + 0.7556$i$ | 0.3698 − 0.0222$i$ | 0.0055 − 0.3112$i$ | 0.3467 − 0.2728$i$ |
| 0.0681 + 0.3202$i$ | −0.4066 − 0.6110$i$ | 0.3882 + 0.2198$i$ | 0.1705 + 0.3551$i$ |
| 0.1259 + 0.2977$i$ | 0.0347 + 0.2542$i$ | 0.4482 − 0.2369$i$ | −0.7319 + 0.1924$i$ |

$W(:,:,12) =$

|  |  |  |  |
|---|---|---|---|
| 0.0534 − 0.5633$i$ | −0.4493 + 0.3172$i$ | −0.3346 + 0.1479$i$ | −0.4868 − 0.0811$i$ |
| −0.1472 − 0.1184$i$ | −0.5422 + 0.3203$i$ | 0.2302 − 0.4770$i$ | 0.4913 + 0.2140$i$ |
| −0.7445 + 0.0533$i$ | −0.1168 − 0.4073$i$ | −0.1288 − 0.3642$i$ | −0.2957 − 0.1634$i$ |
| 0.2881 − 0.0638$i$ | 0.3438 + 0.0562$i$ | −0.1358 − 0.6465$i$ | −0.3579 + 0.4766$i$ |

$W(:,:,13) =$

|  |  |  |  |
|---|---|---|---|
| 0.4192 + 0.3317$i$ | 0.6462 − 0.3049$i$ | 0.1765 − 0.0924$i$ | 0.3680 + 0.1691$i$ |
| −0.2340 + 0.0529$i$ | −0.0388 − 0.4789$i$ | 0.6212 − 0.0425$i$ | −0.5223 + 0.2262$i$ |
| 0.0491 − 0.2199$i$ | −0.2962 + 0.1142$i$ | 0.5130 + 0.5000$i$ | 0.5366 + 0.2175$i$ |
| −0.7746 + 0.0772$i$ | 0.1089 − 0.3821$i$ | −0.2395 + 0.0459$i$ | 0.4196 + 0.0255$i$ |

$W(:,:,14) =$

|  |  |  |  |
|---|---|---|---|
| 0.0848 + 0.2248$i$ | 0.5883 + 0.1906$i$ | −0.4550 − 0.1147$i$ | −0.5202 + 0.2628$i$ |
| −0.2010 + 0.7357$i$ | −0.0481 − 0.2343$i$ | −0.3923 + 0.0511$i$ | 0.3107 − 0.3288$i$ |
| 0.3862 + 0.2270$i$ | 0.2323 + 0.5375$i$ | 0.1654 − 0.1078$i$ | 0.6089 + 0.2161$i$ |
| −0.3114 + 0.2509$i$ | 0.4661 + 0.0138$i$ | 0.6358 + 0.4245$i$ | −0.1325 − 0.1438$i$ |

-continued $W(:,:,15) =$ $$\begin{bmatrix} 0.3968 - 0.0671i & 0.3110 + 0.1356i & -0.2168 - 0.4540i & -0.6008 - 0.3299i \\ -0.8289 - 0.0667i & -0.2015 + 0.0416i & 0.1102 - 0.2871i & -0.4011 - 0.1031i \\ 0.1770 - 0.1687i & -0.3325 - 0.1370i & 0.0567 - 0.7634i & 0.2785 + 0.3837i \\ -0.2814 + 0.0866i & 0.7347 - 0.4165i & -0.0390 - 0.2544i & 0.3519 - 0.1000i \end{bmatrix}$$

$W(:,:,16) =$ $$\begin{bmatrix} 0.0743 - 0.7846i & -0.4063 + 0.3394i & -0.2621 + 0.0798i & 0.1421 + 0.0583i \\ 0.1307 - 0.3436i & 0.2466 + 0.0922i & 0.4783 - 0.5634i & -0.0799 - 0.4928i \\ -0.3387 - 0.2385i & -0.4080 - 0.5055i & 0.5212 + 0.1951i & -0.2917 + 0.1078i \\ -0.0962 + 0.2508i & -0.4767 - 0.0347i & -0.2418 + 0.1026i & -0.0231 - 0.7937i \end{bmatrix}$$

(2) Operation 2:

According to an exemplary embodiment, a 4-bit rank 1 codebook, a rank 2 codebook, a rank 3 codebook, and a rank 4 codebook, and a 6-bit rank 1 codebook, a rank 2 codebook, a rank 3 codebook, and a rank 4 codebook may be generated as given by the following Table 15 and Table 16, using column subsets of the aforementioned 16 matrices. The following Table 15 shows 6 bits of codebooks:

| Codebook Index | Transmission Rank 1 | Transmission Rank 2 | Transmission Rank 3 | Transmission Rank 4 |
|---|---|---|---|---|
| 1  | W(:,1,1)  | W(:,[1,2],1)  | W(:,[1,2,3],1)  | W(:,:,1)  |
| 2  | W(:,2,1)  | W(:,[1,3],1)  | W(:,[1,2,4],1)  | W(:,:,2)  |
| 3  | W(:,3,1)  | W(:,[1,4],1)  | W(:,[1,3,4],1)  | W(:,:,3)  |
| 4  | W(:,4,1)  | W(:,[2,3],1)  | W(:,[2,3,4],1)  | W(:,:,4)  |
| 5  | W(:,1,2)  | W(:,[2,4],1)  | W(:,[1,2,3],2)  | W(:,:,5)  |
| 6  | W(:,2,2)  | W(:,[3,4],1)  | W(:,[1,2,4],2)  | W(:,:,6)  |
| 7  | W(:,3,2)  | W(:,[1,2],2)  | W(:,[1,3,4],2)  | W(:,:,7)  |
| 8  | W(:,4,2)  | W(:,[1,3],2)  | W(:,[2,3,4],2)  | W(:,:,8)  |
| 9  | W(:,1,3)  | W(:,[1,4],2)  | W(:,[1,2,3],3)  | W(:,:,9)  |
| 10 | W(:,2,3)  | W(:,[2,3],2)  | W(:,[1,2,4],3)  | W(:,:,10) |
| 11 | W(:,3,3)  | W(:,[2,4],2)  | W(:,[1,3,4],3)  | W(:,:,11) |
| 12 | W(:,4,3)  | W(:,[3,4],2)  | W(:,[2,3,4],3)  | W(:,:,12) |
| 13 | W(:,1,4)  | W(:,[1,4],3)  | W(:,[1,2,3],4)  | W(:,:,13) |
| 14 | W(:,2,4)  | W(:,[2,3],3)  | W(:,[1,2,4],4)  | W(:,:,14) |
| 15 | W(:,3,4)  | W(:,[1,2],4)  | W(:,[1,3,4],4)  | W(:,:,15) |
| 16 | W(:,4,4)  | W(:,[1,4],4)  | W(:,[2,3,4],4)  | W(:,:,16) |
| 17 | W(:,1,5)  | W(:,[1,2],5)  | W(:,[1,2,3],5)  |  |
| 18 | W(:,2,5)  | W(:,[1,3],6)  | W(:,[1,2,4],5)  |  |
| 19 | W(:,3,5)  | W(:,[2,3],6)  | W(:,[1,3,4],5)  |  |
| 20 | W(:,4,5)  | W(:,[2,4],6)  | W(:,[2,3,4],5)  |  |
| 21 | W(:,1,6)  | W(:,[1,2],7)  | W(:,[1,2,3],6)  |  |
| 22 | W(:,2,6)  | W(:,[1,3],7)  | W(:,[1,2,4],6)  |  |
| 23 | W(:,3,6)  | W(:,[1,4],7)  | W(:,[1,3,4],6)  |  |
| 24 | W(:,4,6)  | W(:,[2,3],7)  | W(:,[2,3,4],6)  |  |
| 25 | W(:,1,7)  | W(:,[2,4],7)  | W(:,[1,2,3],7)  |  |
| 26 | W(:,2,7)  | W(:,[3,4],7)  | W(:,[1,2,4],7)  |  |
| 27 | W(:,3,7)  | W(:,[1,2],8)  | W(:,[1,3,4],7)  |  |
| 28 | W(:,4,7)  | W(:,[1,3],8)  | W(:,[2,3,4],7)  |  |
| 29 | W(:,1,8)  | W(:,[1,4],8)  | W(:,[1,2,3],8)  |  |
| 30 | W(:,2,8)  | W(:,[2,3],8)  | W(:,[1,2,4],8)  |  |
| 31 | W(:,3,8)  | W(:,[2,4],8)  | W(:,[1,3,4],8)  |  |
| 32 | W(:,4,8)  | W(:,[3,4],8)  | W(:,[2,3,4],8)  |  |
| 32 | W(:,1,9)  | W(:,[1,2],9)  | W(:,[1,2,3],9)  |  |
| 34 | W(:,2,9)  | W(:,[1,3],9)  | W(:,[1,2,4],9)  |  |
| 35 | W(:,3,9)  | W(:,[2,3],9)  | W(:,[1,3,4],9)  |  |
| 36 | W(:,4,9)  | W(:,[2,4],9)  | W(:,[2,3,4],9)  |  |
| 37 | W(:,1,10) | W(:,[1,3],10) | W(:,[1,2,3],10) |  |
| 38 | W(:,2,10) | W(:,[2,4],10) | W(:,[1,2,4],10) |  |
| 39 | W(:,3,10) | W(:,[3,4],10) | W(:,[1,3,4],10) |  |
| 40 | W(:,4,10) | W(:,[1,2],11) | W(:,[2,3,4],10) |  |
| 41 | W(:,1,11) | W(:,[1,3],11) | W(:,[1,2,3],11) |  |
| 42 | W(:,2,11) | W(:,[1,4],11) | W(:,[1,2,4],11) |  |
| 43 | W(:,3,11) | W(:,[2,3],11) | W(:,[1,3,4],11) |  |
| 44 | W(:,4,11) | W(:,[2,4],11) | W(:,[2,3,4],11) |  |
| 45 | W(:,1,12) | W(:,[3,4],11) | W(:,[1,2,3],12) |  |
| 46 | W(:,2,12) | W(:,[1,2],12) | W(:,[1,2,4],12) |  |
| 47 | W(:,3,12) | W(:,[1,3],12) | W(:,[1,3,4],12) |  |
| 48 | W(:,4,12) | W(:,[2,3],12) | W(:,[2,3,4],12) |  |
| 49 | W(:,1,13) | W(:,[1,2],13) | W(:,[1,2,3],13) |  |
| 50 | W(:,2,13) | W(:,[1,4],13) | W(:,[1,2,4],13) |  |
| 51 | W(:,3,13) | W(:,[2,4],13) | W(:,[1,3,4],13) |  |
| 52 | W(:,4,13) | W(:,[3,4],13) | W(:,[2,3,4],13) |  |
| 53 | W(:,1,14) | W(:,[1,2],14) | W(:,[1,2,3],14) |  |
| 54 | W(:,2,14) | W(:,[1,3],14) | W(:,[1,2,4],14) |  |
| 55 | W(:,3,14) | W(:,[1,4],14) | W(:,[1,3,4],14) |  |
| 56 | W(:,4,14) | W(:,[2,3],14) | W(:,[2,3,4],14) |  |
| 57 | W(:,1,15) | W(:,[2,4],14) | W(:,[1,2,3],15) |  |
| 58 | W(:,2,15) | W(:,[3,4],14) | W(:,[1,2,4],15) |  |
| 59 | W(:,3,15) | W(:,[1,4],15) | W(:,[1,3,4],15) |  |
| 60 | W(:,4,15) | W(:,[2,3],15) | W(:,[2,3,4],15) |  |
| 61 | W(:,1,16) | W(:,[1,3],16) | W(:,[1,2,3],16) |  |
| 62 | W(:,2,16) | W(:,[2,3],16) | W(:,[1,2,4],16) |  |
| 63 | W(:,3,16) | W(:,[2,4],16) | W(:,[1,3,4],16) |  |
| 64 | W(:,4,16) | W(:,[3,4],16) | W(:,[2,3,4],16) |  |

The following Table 16 shows 4 bits of codebooks:

| Codebook Index | Transmission Rank 1 | Transmission Rank 2 | Transmission Rank 3 | Transmission Rank 4 |
|---|---|---|---|---|
| 1  | W(:,1,1) | W(:,[1,2],1) | W(:,[1,2,3],1) | W(:,:,1) |
| 2  | W(:,2,1) | W(:,[1,3],1) | W(:,[1,2,4],1) | W(:,:,2) |
| 3  | W(:,3,1) | W(:,[1,4],1) | W(:,[1,3,4],1) | W(:,:,3) |
| 4  | W(:,4,1) | W(:,[2,3],1) | W(:,[2,3,4],1) | W(:,:,4) |
| 5  | W(:,1,2) | W(:,[2,4],1) | W(:,[1,2,3],2) |  |
| 6  | W(:,2,2) | W(:,[3,4],1) | W(:,[1,2,4],2) |  |
| 7  | W(:,3,2) | W(:,[1,2],2) | W(:,[1,3,4],2) |  |
| 8  | W(:,4,2) | W(:,[1,3],2) | W(:,[2,3,4],2) |  |
| 9  | W(:,1,3) | W(:,[1,4],2) | W(:,[1,2,3],3) |  |
| 10 | W(:,2,3) | W(:,[2,3],2) | W(:,[1,2,4],3) |  |
| 11 | W(:,3,3) | W(:,[2,4],2) | W(:,[1,3,4],3) |  |
| 12 | W(:,4,3) | W(:,[3,4],2) | W(:,[2,3,4],3) |  |
| 13 | W(:,1,4) | W(:,[1,4],3) | W(:,[1,2,3],4) |  |
| 14 | W(:,2,4) | W(:,[2,3],3) | W(:,[1,2,4],4) |  |
| 15 | W(:,3,4) | W(:,[1,2],4) | W(:,[1,3,4],4) |  |
| 16 | W(:,4,4) | W(:,[1,4],4) | W(:,[2,3,4],4) |  |

Codes according to a MATLAB® program for obtaining the 6-bit codebooks disclosed in the above Table 15 may follow as:

6-Bit Rank 1 Codebook:

```
Codebook{1}(:,1,1:4)=W(:,[1:4],1);
Codebook{1}(:,1,5:8)=W(:,[1:4],2);
```

-continued

```
Codebook{1}(:,1,9:12)=W(:,[1:4],3);
Codebook{1}(:,1,13:16)=W(:,[1:4],4);
Codebook{1}(:,1,17:20)=W(:,[1:4],5);
Codebook{1}(:,1,21:24)=W(:,[1:4],6);
Codebook{1}(:,1,25:28)=W(:,[1:4],7);
Codebook{1}(:,1,29:32)=W(:,[1:4],8);
Codebook{1}(:,1,33:36)=W(:,[1:4],9);
Codebook{1}(:,1,37:40)=W(:,[1:4],10);
Codebook{1}(:,1,41:44)=W(:,[1:4],11);
Codebook{1}(:,1,45:48)=W(:,[1:4],12);
Codebook{1}(:,1,49:52)=W(:,[1:4],13);
Codebook{1}(:,1,53:56)=W(:,[1:4],14);
Codebook{1}(:,1,57:60)=W(:,[1:4],15);
Codebook{1}(:,1,61:64)=W(:,[1:4],16);
```

6-Bit Rank 2 Codebook:

```
Codebook{2}(:,1:2,1)=W(:,[1,2],1);
Codebook{2}(:,1:2,2)=W(:,[1,3],1);
Codebook{2}(:,1:2,3)=W(:,[1,4],1);
Codebook{2}(:,1:2,4)=W(:,[2,3],1);
Codebook{2}(:,1:2,5)=W(:,[2,4],1);
Codebook{2}(:,1:2,6)=W(:,[3,4],1);
Codebook{2}(:,1:2,7)=W(:,[1,2],2);
Codebook{2}(:,1:2,8)=W(:,[1,3],2);
Codebook{2}(:,1:2,9)=W(:,[1,4],2);
Codebook{2}(:,1:2,10)=W(:,[2,3],2);
Codebook{2}(:,1:2,11)=W(:,[2,4],2);
Codebook{2}(:,1:2,12)=W(:,[3,4],2);
Codebook{2}(:,1:2,13)=W(:,[1,4],3);
Codebook{2}(:,1:2,14)=W(:,[2,3],3);
Codebook{2}(:,1:2,15)=W(:,[1,2],4);
Codebook{2}(:,1:2,16)=W(:,[1,4],4);
Codebook{2}(:,1:2,17)=W(:,[1,2],5);
Codebook{2}(:,1:2,18)=W(:,[1,3],6);
Codebook{2}(:,1:2,19)=W(:,[2,3],6);
Codebook{2}(:,1:2,20)=W(:,[2,4],6);
Codebook{2}(:,1:2,21)=W(:,[1,2],7);
Codebook{2}(:,1:2,22)=W(:,[1,3],7);
Codebook{2}(:,1:2,23)=W(:,[1,4],7);
Codebook{2}(:,1:2,24)=W(:,[2,3],7);
Codebook{2}(:,1:2,25)=W(:,[2,4],7);
Codebook{2}(:,1:2,26)=W(:,[3,4],7);
Codebook{2}(:,1:2,27)=W(:,[1,2],8);
Codebook{2}(:,1:2,28)=W(:,[1,3],8);
Codebook{2}(:,1:2,29)=W(:,[1,4],8);
Codebook{2}(:,1:2,30)=W(:,[2,3],8);
Codebook{2}(:,1:2,31)=W(:,[2,4],8);
Codebook{2}(:,1:2,32)=W(:,[3,4],8);
Codebook{2}(:,1:2,33)=W(:,[1,2],9);
Codebook{2}(:,1:2,34)=W(:,[1,3],9);
Codebook{2}(:,1:2,35)=W(:,[2,3],9);
Codebook{2}(:,1:2,36)=W(:,[2,4],9);
Codebook{2}(:,1:2,37)=W(:,[1,3],10);
Codebook{2}(:,1:2,38)=W(:,[2,4],10);
Codebook{2}(:,1:2,39)=W(:,[3,4],10);
Codebook{2}(:,1:2,40)=W(:,[1,2],11);
Codebook{2}(:,1:2,41)=W(:,[1,3],11);
Codebook{2}(:,1:2,42)=W(:,[1,4],11);
Codebook{2}(:,1:2,43)=W(:,[2,3],11);
Codebook{2}(:,1:2,44)=W(:,[2,4],11);
Codebook{2}(:,1:2,45)=W(:,[3,4],11);
Codebook{2}(:,1:2,46)=W(:,[1,2],12);
Codebook{2}(:,1:2,47)=W(:,[1,3],12);
Codebook{2}(:,1:2,48)=W(:,[2,3],12);
Codebook{2}(:,1:2,49)=W(:,[1,2],13);
Codebook{2}(:,1:2,50)=W(:,[1,4],13);
Codebook{2}(:,1:2,51)=W(:,[2,4],13);
Codebook{2}(:,1:2,52)=W(:,[3,4],13);
Codebook{2}(:,1:2,53)=W(:,[1,2],14);
Codebook{2}(:,1:2,54)=W(:,[1,3],14);
Codebook{2}(:,1:2,55)=W(:,[1,4],14);
Codebook{2}(:,1:2,56)=W(:,[2,3],14);
Codebook{2}(:,1:2,57)=W(:,[2,4],14);
Codebook{2}(:,1:2,58)=W(:,[3,4],14);
Codebook{2}(:,1:2,59)=W(:,[1,4],15);
Codebook{2}(:,1:2,60)=W(:,[2,3],15);
Codebook{2}(:,1:2,61)=W(:,[1,3],16);
Codebook{2}(:,1:2,62)=W(:,[2,3],16);
Codebook{2}(:,1:2,63)=W(:,[2,4],16);
Codebook{2}(:,1:2,64)=W(:,[3,4],16);
```

6-Bit Rank 3 Codebook:

```
Codebook{3}(:,1:3,1)=W(:,[1,2,3],1);
Codebook{3}(:,1:3,2)=W(:,[1,2,4],1);
Codebook{3}(:,1:3,3)=W(:,[1,3,4],1);
Codebook{3}(:,1:3,4)=W(:,[2,3,4],1);
Codebook{3}(:,1:3,5)=W(:,[1,2,3],2);
Codebook{3}(:,1:3,6)=W(:,[1,2,4],2);
Codebook{3}(:,1:3,7)=W(:,[1,3,4],2);
Codebook{3}(:,1:3,8)=W(:,[2,3,4],2);
Codebook{3}(:,1:3,9)=W(:,[1,2,3],3);
Codebook{3}(:,1:3,10)=W(:,[1,2,4],3);
Codebook{3}(:,1:3,11)=W(:,[1,3,4],3);
Codebook{3}(:,1:3,12)=W(:,[2,3,4],3);
Codebook{3}(:,1:3,13)=W(:,[1,2,3],4);
Codebook{3}(:,1:3,14)=W(:,[1,2,4],4);
Codebook{3}(:,1:3,15)=W(:,[1,3,4],4);
Codebook{3}(:,1:3,16)=W(:,[2,3,4],4);
Codebook{3}(:,1:3,17)=W(:,[1,2,3],5);
Codebook{3}(:,1:3,18)=W(:,[1,2,4],5);
Codebook{3}(:,1:3,19)=W(:,[1,3,4],5);
Codebook{3}(:,1:3,20)=W(:,[2,3,4],5);
Codebook{3}(:,1:3,21)=W(:,[1,2,3],6);
Codebook{3}(:,1:3,22)=W(:,[1,2,4],6);
Codebook{3}(:,1:3,23)=W(:,[1,3,4],6);
Codebook{3}(:,1:3,24)=W(:,[2,3,4],6);
Codebook{3}(:,1:3,25)=W(:,[1,2,3],7);
Codebook{3}(:,1:3,26)=W(:,[1,2,4],7);
Codebook{3}(:,1:3,27)=W(:,[1,3,4],7);
Codebook{3}(:,1:3,28)=W(:,[2,3,4],7);
Codebook{3}(:,1:3,29)=W(:,[1,2,3],8);
Codebook{3}(:,1:3,30)=W(:,[1,2,4],8);
Codebook{3}(:,1:3,31)=W(:,[1,3,4],8);
Codebook{3}(:,1:3,32)=W(:,[2,3,4],8);
Codebook{3}(:,1:3,33)=W(:,[1,2,3],9);
Codebook{3}(:,1:3,34)=W(:,[1,2,4],9);
Codebook{3}(:,1:3,35)=W(:,[1,3,4],9);
Codebook{3}(:,1:3,36)=W(:,[2,3,4],9);
Codebook{3}(:,1:3,37)=W(:,[1,2,3],10);
Codebook{3}(:,1:3,38)=W(:,[1,2,4],10);
Codebook{3}(:,1:3,39)=W(:,[1,3,4],10);
Codebook{3}(:,1:3,40)=W(:,[2,3,4],10);
Codebook{3}(:,1:3,41)=W(:,[1,2,3],11);
Codebook{3}(:,1:3,42)=W(:,[1,2,4],11);
Codebook{3}(:,1:3,43)=W(:,[1,3,4],11);
Codebook{3}(:,1:3,44)=W(:,[2,3,4],11);
Codebook{3}(:,1:3,45)=W(:,[1,2,3],12);
Codebook{3}(:,1:3,46)=W(:,[1,2,4],12);
Codebook{3}(:,1:3,47)=W(:,[1,3,4],12);
Codebook{3}(:,1:3,48)=W(:,[2,3,4],12);
Codebook{3}(:,1:3,49)=W(:,[1,2,3],13);
Codebook{3}(:,1:3,50)=W(:,[1,2,4],13);
Codebook{3}(:,1:3,51)=W(:,[1,3,4],13);
Codebook{3}(:,1:3,52)=W(:,[2,3,4],13);
Codebook{3}(:,1:3,53)=W(:,[1,2,3],14);
Codebook{3}(:,1:3,54)=W(:,[1,2,4],14);
Codebook{3}(:,1:3,55)=W(:,[1,3,4],14);
Codebook{3}(:,1:3,56)=W(:,[2,3,4],14);
Codebook{3}(:,1:3,57)=W(:,[1,2,3],15);
Codebook{3}(:,1:3,58)=W(:,[1,2,4],15);
Codebook{3}(:,1:3,59)=W(:,[1,3,4],15);
Codebook{3}(:,1:3,60)=W(:,[2,3,4],15);
Codebook{3}(:,1:3,61)=W(:,[1,2,3],16);
Codebook{3}(:,1:3,62)=W(:,[1,2,4],16);
Codebook{3}(:,1:3,63)=W(:,[1,3,4],16);
Codebook{3}(:,1:3,64)=W(:,[2,3,4],16);
```

6-Bit Rank 4 Codebook:

```
Codebook{4}(:,1:4,1)=W(:,[1,2,3,4],1);
Codebook{4}(:,1:4,2)=W(:,[1,2,3,4],2);
Codebook{4}(:,1:4,3)=W(:,[1,2,3,4],3);
Codebook{4}(:,1:4,4)=W(:,[1,2,3,4],4);
Codebook{4}(:,1:4,5)=W(:,[1,2,3,4],5);
Codebook{4}(:,1:4,6)=W(:,[1,2,3,4],6);
Codebook{4}(:,1:4,7)=W(:,[1,2,3,4],7);
Codebook{4}(:,1:4,8)=W(:,[1,2,3,4],8);
Codebook{4}(:,1:4,9)=W(:,[1,2,3,4],9);
Codebook{4}(:,1:4,10)=W(:,[1,2,3,4],10);
Codebook{4}(:,1:4,11)=W(:,[1,2,3,4],11);
Codebook{4}(:,1:4,12)=W(:,[1,2,3,4],12);
Codebook{4}(:,1:4,13)=W(:,[1,2,3,4],13);
Codebook{4}(:,1:4,14)=W(:,[1,2,3,4],14);
Codebook{4}(:,1:4,15)=W(:,[1,2,3,4],15);
Codebook{4}(:,1:4,16)=W(:,[1,2,3,4],16);
```

Codes according to the MATLAB® program for obtaining the 4-bit codebooks disclosed in the above Table 16 may follow as:

4-Bit Rank 1 Codebook:

```
Codebook{1}(:,1,1:4)=W(:,[1:4],1);
Codebook{1}(:,1,5:8)=W(:,[1:4],2);
Codebook{1}(:,1,9:12)=W(:,[1:4],3);
Codebook{1}(:,1,13:16)=W(:,[1:4],4);
```

4-Bit Rank 2 Codebook:

```
Codebook{2}(:,1:2,1)=W(:,[1,2],1);
Codebook{2}(:,1:2,2)=W(:,[1,3],1);
Codebook{2}(:,1:2,3)=W(:,[1,4],1);
Codebook{2}(:,1:2,4)=W(:,[2,3],1);
Codebook{2}(:,1:2,5)=W(:,[2,4],1);
Codebook{2}(:,1:2,6)=W(:,[3,4],1);
Codebook{2}(:,1:2,7)=W(:,[1,2],2);
Codebook{2}(:,1:2,8)=W(:,[1,3],2);
Codebook{2}(:,1:2,9)=W(:,[1,4],2);
Codebook{2}(:,1:2,10)=W(:,[2,3],2);
Codebook{2}(:,1:2,11)=W(:,[2,4],2);
Codebook{2}(:,1:2,12)=W(:,[3,4],2);
Codebook{2}(:,1:2,13)=W(:,[1,4],3);
Codebook{2}(:,1:2,14)=W(:,[2,3],3);
Codebook{2}(:,1:2,15)=W(:,[1,2],4);
Codebook{2}(:,1:2,16)=W(:,[1,4],4);
```

4-Bit Rank 3 Codebook:

```
Codebook{3}(:,1:3,1)=W(:,[1,2,3],1);
Codebook{3}(:,1:3,2)=W(:,[1,2,4],1);
Codebook{3}(:,1:3,3)=W(:,[1,3,4],1);
Codebook{3}(:,1:3,4)=W(:,[2,3,4],1);
Codebook{3}(:,1:3,5)=W(:,[1,2,3],2);
Codebook{3}(:,1:3,6)=W(:,[1,2,4],2);
Codebook{3}(:,1:3,7)=W(:,[1,3,4],2);
Codebook{3}(:,1:3,8)=W(:,[2,3,4],2);
Codebook{3}(:,1:3,9)=W(:,[1,2,3],3);
Codebook{3}(:,1:3,10)=W(:,[1,2,4],3);
Codebook{3}(:,1:3,11)=W(:,[1,3,4],3);
Codebook{3}(:,1:3,12)=W(:,[2,3,4],3);
Codebook{3}(:,1:3,13)=W(:,[1,2,3],4);
Codebook{3}(:,1:3,14)=W(:,[1,2,4],4);
Codebook{3}(:,1:3,15)=W(:,[1,3,4],4);
Codebook{3}(:,1:3,16)=W(:,[2,3,4],4);
```

4-Bit Rank Codebook:

```
Codebook{4}(:,1:4,1)=W(:,[1,2,3,4],1);
Codebook{4}(:,1:4,2)=W(:,[1,2,3,4],2);
Codebook{4}(:,1:4,3)=W(:,[1,2,3,4],3);
Codebook{4}(:,1:4,4)=W(:,[1,2,3,4],4);
```

Specific numerical values of the 4-bit codebooks and the 6-bit codebooks disclosed in the above Table 15 and Table 16 may follow as (in this example ans(:,:,x) denotes the xth codeword):

1. 6-bit Codebooks (1) 6-bit Rank 1 Codebook:

$$ans(:,:,1) = \begin{matrix} 0.5000 \\ 0.5000 \\ 0.5000 \\ 0.5000 \end{matrix}$$

$$ans(:,:,2) = \begin{matrix} 0.5000 \\ 0.0000 + 0.5000i \\ -0.5000 + 0.0000i \\ -0.0000 - 0.5000i \end{matrix}$$

$$ans(:,:,3) = \begin{matrix} 0.5000 \\ -0.5000 + 0.0000i \\ 0.5000 - 0.0000i \\ -0.5000 + 0.0000i \end{matrix}$$

$$ans(:,:,4) = \begin{matrix} 0.5000 \\ -0.0000 - 0.5000i \\ -0.5000 + 0.0000i \\ 0.0000 + 0.5000i \end{matrix}$$

$$ans(:,:,5) = \begin{matrix} 0.5000 \\ 0.3536 + 0.3536i \\ 0.0000 + 0.5000i \\ -0.3536 + 0.3536i \end{matrix}$$

$$ans(:,:,6) = \begin{matrix} 0.5000 \\ -0.3536 + 0.3536i \\ -0.0000 - 0.5000i \\ 0.3536 + 0.3536i \end{matrix}$$

$$ans(:,:,7) = \begin{matrix} 0.5000 \\ -0.3536 - 0.3536i \\ 0.0000 + 0.5000i \\ 0.3536 - 0.3536i \end{matrix}$$

$$ans(:,:,8) = \begin{matrix} 0.5000 \\ 0.3536 - 0.3536i \\ -0.0000 - 0.5000i \\ -0.3536 - 0.3536i \end{matrix}$$

$$ans(:,:,9) = \begin{matrix} 0.4619 + 0.1913i \\ 0.4455 - 0.2270i \\ -0.1167 + 0.4862i \\ 0.2939 + 0.4045i \end{matrix}$$

$$ans(:,:,10) = \begin{matrix} -0.1913 + 0.4619i \\ 0.4455 - 0.2270i \\ 0.4862 + 0.1167i \\ -0.2939 - 0.4045i \end{matrix}$$

$$ans(:,:,11) = \begin{matrix} -0.4619 - 0.1913i \\ 0.4455 - 0.2270i \\ 0.1167 - 0.4862i \\ 0.2939 + 0.4045i \end{matrix}$$

$$ans(:,:,12) = \begin{matrix} 0.1913 - 0.4619i \\ 0.4455 - 0.2270i \\ -0.4862 - 0.1167i \\ -0.2939 - 0.4045i \end{matrix}$$

$$ans(:,:,13) = \begin{matrix} -0.5000 \\ 0.4985 - 0.0392i \\ 0.4938 - 0.0782i \\ -0.4862 + 0.1167i \end{matrix}$$

$$ans(:,:,14) = \begin{matrix} -0.5000 \\ 0.0392 + 0.4985i \\ -0.4938 + 0.0782i \\ 0.1167 + 0.4862i \end{matrix}$$

$$ans(:,:,15) = \begin{matrix} -0.5000 \\ -0.4985 + 0.0392i \\ 0.4938 - 0.0782i \\ 0.4862 - 0.1167i \end{matrix}$$

$$ans(:,:,16) = \begin{matrix} -0.5000 \\ -0.0392 - 0.4985i \\ -0.4938 + 0.0782i \\ -0.1167 - 0.4862i \end{matrix}$$

$$ans(:,:,17) = \begin{matrix} 0.5000 \\ 0.4619 + 0.1913i \\ 0.3536 + 0.3536i \\ 0.1913 + 0.4619i \end{matrix}$$

$$ans(:,:,18) = \begin{matrix} 0.5000 \\ -0.1913 + 0.4619i \\ -0.3536 - 0.3536i \\ 0.4619 - 0.1913i \end{matrix}$$

$$ans(:,:,19) = \begin{matrix} 0.5000 \\ -0.4619 - 0.1913i \\ 0.3536 + 0.3536i \\ -0.1913 - 0.4619i \end{matrix}$$

$$ans(:,:,20) = \begin{matrix} 0.5000 \\ 0.1913 - 0.4619i \\ -0.3536 - 0.3536i \\ -0.4619 + 0.1913i \end{matrix}$$

$$ans(:,:,21) = \begin{matrix} 0.5000 \\ 0.1913 + 0.4619i \\ -0.3536 + 0.3536i \\ -0.4619 - 0.1913i \end{matrix}$$

$$ans(:,:,22) = \begin{matrix} 0.5000 \\ -0.4619 + 0.1913i \\ 0.3536 - 0.3536i \\ -0.1913 + 0.4619i \end{matrix}$$

$$ans(:,:,23) = \begin{matrix} 0.5000 \\ -0.1913 - 0.4619i \\ -0.3536 + 0.3536i \\ 0.4619 + 0.1913i \end{matrix}$$

$$ans(:,:,24) = \begin{matrix} 0.5000 \\ 0.4619 - 0.1913i \\ 0.3536 - 0.3536i \\ 0.1913 - 0.4619i \end{matrix}$$

$$ans(:,:,25) = \begin{matrix} 0.2437 + 0.4837i \\ 0.5740 - 0.3102i \\ 0.2823 - 0.3783i \\ 0.2062 + 0.1248i \end{matrix}$$

$$ans(:,:,26) = \begin{matrix} 0.4258 + 0.0076i \\ 0.0596 + 0.3222i \\ -0.4186 + 0.1136i \\ 0.1513 + 0.7073i \end{matrix}$$

$$ans(:,:,27) = \begin{matrix} 0.5210 - 0.4265i \\ 0.2922 + 0.0454i \\ 0.3628 + 0.1522i \\ -0.5498 - 0.0464i \end{matrix}$$

$$ans(:,:,28) = \begin{matrix} -0.2364 - 0.1268i \\ 0.6147 + 0.0409i \\ -0.6500 - 0.1085i \\ -0.2340 - 0.2440i \end{matrix}$$

$$ans(:,:,29) = \begin{matrix} 0.0591 - 0.4953i \\ 0.5545 + 0.3908i \\ 0.2593 - 0.0234i \\ 0.3300 + 0.3380i \end{matrix}$$

$$ans(:,:,30) = \begin{matrix} 0.0742 + 0.2714i \\ -0.0591 - 0.0963i \\ -0.5800 - 0.1645i \\ 0.4619 + 0.5755i \end{matrix}$$

$$ans(:,:,31) = \begin{matrix} 0.3370 + 0.2000i \\ 0.2158 + 0.4089i \\ -0.2363 - 0.5965i \\ 0.0175 - 0.4698i \end{matrix}$$

$$ans(:,:,32) = \begin{matrix} -0.1041 - 0.7125i \\ -0.5589 + 0.0299i \\ -0.2149 - 0.3331i \\ 0.0748 - 0.0748i \end{matrix}$$

$$ans(:,:,33) = \begin{matrix} 0.5019 - 0.2171i \\ 0.0570 + 0.3132i \\ 0.2569 - 0.1797i \\ 0.6949 + 0.1358i \end{matrix}$$

$$ans(:,:,34) = \begin{matrix} 0.2121 - 0.4391i \\ 0.3637 + 0.1907i \\ 0.0539 - 0.3157i \\ -0.5835 + 0.3879i \end{matrix}$$

$$ans(:,:,35) = \begin{matrix} 0.4649 + 0.1545i \\ 0.5971 - 0.5122i \\ -0.0025 + 0.3671i \\ 0.0058 - 0.0797i \end{matrix}$$

$$ans(:,:,36) = \begin{matrix} -0.4709 + 0.0383i \\ 0.3285 + 0.0569i \\ 0.8042 + 0.1327i \\ 0.0341 + 0.0124i \end{matrix}$$

$$ans(:,:,37) = \begin{matrix} 0.2199 + 0.3199i \\ 0.5983 + 0.1264i \\ -0.5576 - 0.2903i \\ -0.0940 - 0.2672i \end{matrix}$$

$$ans(:,:,38) = \begin{matrix} 0.6305 - 0.4345i \\ -0.0683 + 0.2985i \\ -0.0495 - 0.3235i \\ -0.0481 + 0.4588i \end{matrix}$$

$$ans(:,:,39) = \begin{matrix} -0.0525 + 0.2357i \\ 0.5833 + 0.2614i \\ 0.3552 + 0.3750i \\ 0.0118 + 0.5160i \end{matrix}$$

$$ans(:,:,40) = \begin{matrix} -0.3110 - 0.3286i \\ 0.2969 - 0.1888i \\ 0.2888 - 0.3841i \\ -0.6633 - 0.0260i \end{matrix}$$

$$ans(:,:,41) = \begin{matrix} 0.4534 + 0.1075i \\ -0.0163 + 0.7556i \\ 0.0681 + 0.3202i \\ 0.1259 + 0.2977i \end{matrix}$$

$$ans(:,:,42) = \begin{matrix} 0.2632 + 0.4348i \\ 0.3698 - 0.0222i \\ -0.4066 - 0.6110i \\ 0.0347 + 0.2542i \end{matrix}$$

$$ans(:,:,43) = \begin{matrix} 0.1838 + 0.6429i \\ 0.0055 - 0.3112i \\ 0.3882 + 0.2198i \\ 0.4482 - 0.2369i \end{matrix}$$

$$ans(:,:,44) = \begin{matrix} 0.2307 + 0.1558i \\ 0.3467 - 0.2728i \\ 0.1705 + 0.3551i \\ -0.7319 + 0.1924i \end{matrix}$$

$$ans(:,:,45) = \begin{matrix} 0.0534 - 0.5633i \\ -0.1472 - 0.1184i \\ -0.7445 + 0.0533i \\ 0.2881 - 0.0638i \end{matrix}$$

$$ans(:,:,46) = \begin{matrix} -0.4493 + 0.3172i \\ -0.5422 + 0.3203i \\ -0.1168 - 0.4073i \\ 0.3438 + 0.0562i \end{matrix}$$

$$ans(:,:,47) = \begin{matrix} -0.3346 + 0.1479i \\ 0.2302 - 0.4770i \\ -0.1288 - 0.3642i \\ -0.1358 - 0.6465i \end{matrix}$$

$$ans(:,:,48) = \begin{matrix} -0.4868 - 0.0811i \\ 0.4913 + 0.2140i \\ -0.2957 - 0.1634i \\ -0.3579 + 0.4766i \end{matrix}$$

$$ans(:,:,49) = \begin{matrix} 0.4192 + 0.3317i \\ -0.2340 + 0.0529i \\ 0.0491 - 0.2199i \\ -0.7746 + 0.0772i \end{matrix}$$

$$ans(:,:,50) = \begin{matrix} 0.6462 - 0.3049i \\ -0.0388 - 0.4789i \\ -0.2962 + 0.1142i \\ 0.1089 - 0.3821i \end{matrix}$$

$$ans(:,:,51) = \begin{matrix} 0.1765 - 0.0924i \\ 0.6212 - 0.0425i \\ 0.5130 + 0.5000i \\ -0.2395 + 0.0459i \end{matrix}$$

$$ans(:,:,52) = \begin{matrix} 0.3680 + 0.1691i \\ -0.5223 + 0.2262i \\ 0.5366 + 0.2175i \\ 0.4196 + 0.0255i \end{matrix}$$

$$ans(:,:,53) = \begin{matrix} 0.0848 + 0.2248i \\ -0.2010 + 0.7357i \\ 0.3862 + 0.2270i \\ -0.3114 + 0.2509i \end{matrix}$$

$$ans(:,:,54) = \begin{matrix} 0.5883 + 0.1906i \\ -0.0481 - 0.2343i \\ 0.2323 + 0.5375i \\ 0.4661 + 0.0138i \end{matrix}$$

$$ans(:,:,55) = \begin{matrix} -0.4550 - 0.1147i \\ -0.3923 + 0.0511i \\ 0.1654 - 0.1078i \\ 0.6358 + 0.4245i \end{matrix}$$

$$ans(:,:,56) = \begin{matrix} -0.5202 + 0.2628i \\ 0.3107 - 0.3288i \\ 0.6089 + 0.2161i \\ -0.1325 - 0.1438i \end{matrix}$$

$$ans(:,:,57) = \begin{matrix} 0.3968 - 0.0671i \\ -0.8289 - 0.0667i \\ 0.1770 - 0.1687i \\ -0.2814 + 0.0866i \end{matrix}$$

$$ans(:,:,58) = \begin{matrix} 0.3110 + 0.1356i \\ -0.2015 + 0.0416i \\ -0.3325 - 0.1370i \\ 0.7347 - 0.4165i \end{matrix}$$

$$ans(:,:,59) = \begin{matrix} -0.2168 - 0.4540i \\ 0.1102 - 0.2871i \\ 0.0567 - 0.7634i \\ -0.0390 - 0.2544i \end{matrix}$$

$$ans(:,:,60) = \begin{matrix} -0.6008 - 0.3299i \\ -0.4011 - 0.1031i \\ 0.2785 + 0.3837i \\ 0.3519 - 0.1000i \end{matrix}$$

$$ans(:,:,61) = \begin{matrix} 0.0743 - 0.7846i \\ 0.1307 - 0.3436i \\ -0.3387 - 0.2385i \\ -0.0962 + 0.2508i \end{matrix}$$

$$ans(:,:,62) = \begin{matrix} -0.4063 + 0.3394i \\ 0.2466 + 0.0922i \\ -0.4080 - 0.5055i \\ -0.4767 - 0.0347i \end{matrix}$$

$$ans(:,:,63) = \begin{matrix} -0.2621 + 0.0798i \\ 0.4783 - 0.5634i \\ 0.5212 + 0.1951i \\ -0.2418 + 0.1026i \end{matrix}$$

$$ans(:,:,64) = \begin{matrix} 0.1421 + 0.0583i \\ -0.0799 - 0.4928i \\ -0.2917 + 0.1078i \\ -0.0231 - 0.7937i \end{matrix}$$

(2) 6-Bit Rank 2 Codebook:

$$ans(:,:,1) = \begin{matrix} 0.5000 & 0.5000 \\ 0.5000 & 0.0000 + 0.5000i \\ 0.5000 & -0.5000 + 0.0000i \\ 0.5000 & -0.0000 - 0.5000i \end{matrix}$$

$$ans(:,:,2) = \begin{matrix} 0.5000 & 0.5000 \\ 0.5000 & -0.5000 + 0.0000i \\ 0.5000 & 0.5000 - 0.0000i \\ 0.5000 & -0.5000 + 0.0000i \end{matrix}$$

$$ans(:,:,3) = \begin{matrix} 0.5000 & 0.5000 \\ 0.5000 & -0.0000 - 0.5000i \\ 0.5000 & -0.5000 + 0.0000i \\ 0.5000 & 0.0000 + 0.5000i \end{matrix}$$

$$ans(:,:,4) = \begin{matrix} 0.5000 & 0.5000 \\ 0.0000 + 0.5000i & -0.5000 + 0.0000i \\ -0.5000 + 0.0000i & 0.5000 - 0.0000i \\ -0.0000 - 0.5000i & -0.5000 + 0.0000i \end{matrix}$$

$$ans(:,:,5) = \begin{matrix} 0.5000 & 0.5000 \\ 0.0000 + 0.5000i & -0.0000 - 0.5000i \\ -0.5000 + 0.0000i & -0.5000 + 0.0000i \\ -0.0000 - 0.5000i & 0.0000 + 0.5000i \end{matrix}$$

$$ans(:,:,6) = \begin{matrix} 0.5000 & 0.5000 \\ -0.5000 + 0.0000i & -0.0000 - 0.5000i \\ 0.5000 - 0.0000i & -0.5000 + 0.0000i \\ -0.5000 + 0.0000i & 0.0000 + 0.5000i \end{matrix}$$

$$ans(:,:,7) = \begin{matrix} 0.5000 & 0.5000 \\ 0.3536 + 0.3536i & -0.3536 + 0.3536i \\ 0.0000 + 0.5000i & -0.0000 - 0.5000i \\ -0.3536 + 0.3536i & 0.3536 + 0.3536i \end{matrix}$$

$$ans(:,:,8) = \begin{matrix} 0.5000 & 0.5000 \\ 0.3536 + 0.3536i & -0.3536 - 0.3536i \\ 0.0000 + 0.5000i & 0.0000 + 0.5000i \\ -0.3536 + 0.3536i & 0.3536 - 0.3536i \end{matrix}$$

$$ans(:,:,9) = \begin{matrix} 0.5000 & 0.5000 \\ 0.3536 + 0.3536i & 0.3536 - 0.3536i \\ 0.0000 + 0.5000i & -0.0000 - 0.5000i \\ -0.3536 + 0.3536i & -0.3536 - 0.3536i \end{matrix}$$

$$ans(:,:,10) = \begin{matrix} 0.5000 & 0.5000 \\ -0.3536 + 0.3536i & -0.3536 - 0.3536i \\ -0.0000 - 0.5000i & 0.0000 + 0.5000i \\ 0.3536 + 0.3536i & 0.3536 - 0.3536i \end{matrix}$$

$$ans(:,:,11) = \begin{matrix} 0.5000 & 0.5000 \\ -0.3536 + 0.3536i & 0.3536 - 0.3536i \\ -0.0000 - 0.5000i & -0.0000 - 0.5000i \\ 0.3536 + 0.3536i & -0.3536 - 0.3536i \end{matrix}$$

$$ans(:,:,12) = \begin{matrix} 0.5000 & 0.5000 \\ -0.3536 - 0.3536i & 0.3536 - 0.3536i \\ 0.0000 + 0.5000i & -0.0000 - 0.5000i \\ 0.3536 - 0.3536i & -0.3536 - 0.3536i \end{matrix}$$

$$ans(:,:,13) = \begin{matrix} 0.4619 + 0.1913i & 0.1913 - 0.4619i \\ 0.4455 - 0.2270i & 0.4455 - 0.2270i \\ -0.1167 + 0.4862i & -0.4862 - 0.1167i \\ 0.2939 + 0.4045i & -0.2939 - 0.4045i \end{matrix}$$

$$ans(:,:,14) = \begin{matrix} -0.1913 + 0.4619i & -0.4619 - 0.1913i \\ 0.4455 - 0.2270i & 0.4455 - 0.2270i \\ 0.4862 + 0.1167i & 0.1167 - 0.4862i \\ -0.2939 - 0.4045i & 0.2939 + 0.4045i \end{matrix}$$

$$ans(:,:,15) = \begin{matrix} -0.5000 & -0.5000 \\ 0.4985 - 0.0392i & 0.0392 + 0.4985i \\ 0.4938 - 0.0782i & -0.4938 + 0.0782i \\ -0.4862 + 0.1167i & 0.1167 + 0.4862i \end{matrix}$$

$$ans(:,:,16) = \begin{matrix} -0.5000 & -0.5000 \\ 0.4985 - 0.0392i & -0.0392 - 0.4985i \\ 0.4938 - 0.0782i & -0.4938 + 0.0782i \\ -0.4862 + 0.1167i & -0.1167 - 0.4862i \end{matrix}$$

$$ans(:,:,17) = \begin{matrix} 0.5000 & 0.5000 \\ 0.4619 + 0.1913i & -0.1913 + 0.4619i \\ 0.3536 + 0.3536i & -0.3536 - 0.3536i \\ 0.1913 + 0.4619i & 0.4619 - 0.1913i \end{matrix}$$

$$ans(:,:,18) = \begin{matrix} 0.5000 & 0.5000 \\ 0.1913 + 0.4619i & -0.1913 - 0.4619i \\ -0.3536 + 0.3536i & -0.3536 + 0.3536i \\ -0.4619 - 0.1913i & 0.4619 + 0.1913i \end{matrix}$$

$$ans(:,:,19) = \begin{matrix} 0.5000 & 0.5000 \\ -0.4619 + 0.1913i & -0.1913 - 0.4619i \\ 0.3536 - 0.3536i & -0.3536 + 0.3536i \\ -0.1913 + 0.4619i & 0.4619 + 0.1913i \end{matrix}$$

$$ans(:,:,20) = \begin{matrix} 0.5000 & 0.5000 \\ -0.4619 + 0.1913i & 0.4619 - 0.1913i \\ 0.3536 - 0.3536i & 0.3536 - 0.3536i \\ -0.1913 + 0.4619i & 0.1913 - 0.4619i \end{matrix}$$

$$ans(:,:,21) = \begin{matrix} 0.2437 + 0.4837i & 0.4258 + 0.0076i \\ 0.5740 - 0.3102i & 0.0596 + 0.3222i \\ 0.2823 - 0.3783i & -0.4186 + 0.1136i \\ 0.2062 + 0.1248i & 0.1513 + 0.7073i \end{matrix}$$

$$ans(:,:,22) = \begin{matrix} 0.2437 + 0.4837i & 0.5210 - 0.4265i \\ 0.5740 - 0.3102i & 0.2922 + 0.0454i \\ 0.2823 - 0.3783i & 0.3826 + 0.1522i \\ 0.2062 + 0.1248i & -0.5498 - 0.0464i \end{matrix}$$

$$ans(:,:,23) = \begin{matrix} 0.2437 + 0.4837i & -0.2364 - 0.1268i \\ 0.5740 - 0.3102i & 0.6147 + 0.0409i \\ 0.2823 - 0.3783i & -0.6500 - 0.1085i \\ 0.2062 + 0.1248i & -0.2340 - 0.2440i \end{matrix}$$

$$ans(:,:,24) = \begin{matrix} 0.4258 + 0.0076i & 0.5210 - 0.4265i \\ 0.0596 + 0.3222i & 0.2922 + 0.0454i \\ -0.4186 + 0.1136i & 0.3628 + 0.1522i \\ 0.1513 + 0.7073i & -0.5498 - 0.0464i \end{matrix}$$

$$ans(:,:,25) = \begin{matrix} 0.4258 + 0.0076i & -0.2364 - 0.1268i \\ 0.0596 + 0.3222i & 0.6147 + 0.0409i \\ -0.4186 + 0.1136i & -0.6500 - 0.1085i \\ 0.1513 + 0.7073i & -0.2340 - 0.2440i \end{matrix}$$

$$ans(:,:,26) = \begin{matrix} 0.5210 - 0.4265i & -0.2364 - 0.1268i \\ 0.2922 + 0.0454i & 0.6147 + 0.0409i \\ 0.3628 + 0.1522i & -0.6500 - 0.1085i \\ -0.5498 - 0.0464i & -0.2340 - 0.2440i \end{matrix}$$

$$ans(:,:,27) = \begin{matrix} 0.0591 - 0.4953i & 0.0742 + 0.2714i \\ 0.5545 + 0.3908i & -0.0591 - 0.0963i \\ 0.2593 - 0.0234i & -0.5800 - 0.1645i \\ 0.3300 + 0.3380i & 0.4619 + 0.5755i \end{matrix}$$

$$ans(:,:,28) = \begin{matrix} 0.0591 - 0.4953i & 0.3370 + 0.2000i \\ 0.5545 + 0.3908i & 0.2158 + 0.4089i \\ 0.2593 - 0.0234i & -0.2363 - 0.5965i \\ 0.3300 + 0.3380i & 0.0175 - 0.4698i \end{matrix}$$

$$ans(:,:,29) = \begin{matrix} 0.0591 - 0.4953i & -0.1041 - 0.7125i \\ 0.5545 + 0.3908i & -0.5589 + 0.0299i \\ 0.2593 - 0.0234i & -0.2149 - 0.3331i \\ 0.3300 + 0.3380i & 0.0748 - 0.0748i \end{matrix}$$

$$ans(:,:,30) = \begin{matrix} 0.0742 + 0.2714i & 0.3370 + 0.2000i \\ -0.0591 - 0.0963i & 0.2158 + 0.4089i \\ -0.5800 - 0.1645i & -0.2363 - 0.5965i \\ 0.4619 + 0.5755i & 0.0175 - 0.4698i \end{matrix}$$

$$ans(:,:,31) = \begin{matrix} 0.0742 + 0.2714i & -0.1041 - 0.7125i \\ -0.0591 - 0.0963i & -0.5589 + 0.0299i \\ -0.5800 - 0.1645i & -0.2149 - 0.3331i \\ 0.4619 + 0.5755i & 0.0748 - 0.0748i \end{matrix}$$

$$ans(:,:,32) = \begin{matrix} 0.3370 + 0.2000i & -0.1041 - 0.7125i \\ 0.2158 + 0.4089i & -0.5589 + 0.0299i \\ -0.2363 - 0.5965i & -0.2149 - 0.3331i \\ 0.0175 - 0.4698i & 0.0748 - 0.0748i \end{matrix}$$

$$ans(:,:,33) = \begin{matrix} 0.5019 - 0.2171i & 0.2121 - 0.4391i \\ 0.0570 + 0.3132i & 0.3637 + 0.1907i \\ 0.2569 - 0.1797i & 0.0539 - 0.3157i \\ 0.6949 + 0.1358i & -0.5835 + 0.3879i \end{matrix}$$

$$ans(:,:,34) = \begin{matrix} 0.5019 - 0.2171i & 0.4649 + 0.1545i \\ 0.0570 + 0.3132i & 0.5971 - 0.5122i \\ 0.2569 - 0.1797i & -0.0025 + 0.3671i \\ 0.6949 + 0.1358i & 0.0058 - 0.0797i \end{matrix}$$

$$ans(:,:,35) = \begin{matrix} 0.2121 - 0.4391i & 0.4649 + 0.1545i \\ 0.3637 + 0.1907i & 0.5971 - 0.5122i \\ 0.0539 - 0.3157i & -0.0025 + 0.3671i \\ -0.5835 + 0.3879i & 0.0058 - 0.0797i \end{matrix}$$

$$ans(:,:,36) = \begin{matrix} 0.2121 - 0.4391i & -0.4709 + 0.0383i \\ 0.3637 + 0.1907i & 0.3285 + 0.0569i \\ 0.0539 - 0.3157i & 0.8042 + 0.1327i \\ -0.5835 + 0.3879i & 0.0341 + 0.0124i \end{matrix}$$

$$ans(:,:,37) = \begin{matrix} 0.2199 + 0.3199i & -0.0525 + 0.2357i \\ 0.5983 + 0.1264i & 0.5833 + 0.2614i \\ -0.5576 - 0.2903i & 0.3552 + 0.3750i \\ -0.0940 - 0.2672i & 0.0118 + 0.5160i \end{matrix}$$

$$ans(:,:,38) = \begin{matrix} 0.6305 - 0.4345i & -0.3110 - 0.3286i \\ -0.0683 + 0.2985i & 0.2969 - 0.1888i \\ -0.0495 - 0.3235i & 0.2888 - 0.3841i \\ -0.0481 + 0.4588i & -0.6633 - 0.0260i \end{matrix}$$

$$ans(:,:,39) = \begin{matrix} -0.0525 + 0.2357i & -0.3110 - 0.3286i \\ 0.5833 + 0.2614i & 0.2969 - 0.1888i \\ 0.3552 + 0.3750i & 0.2888 - 0.3841i \\ 0.0118 + 0.5160i & -0.6633 - 0.0260i \end{matrix}$$

$$ans(:,:,40) = \begin{matrix} 0.4534 + 0.1075i & 0.2632 + 0.4348i \\ -0.0163 + 0.7556i & 0.3698 - 0.0222i \\ 0.0681 + 0.3202i & -0.4066 - 0.6110i \\ 0.1259 + 0.2977i & 0.0347 + 0.2542i \end{matrix}$$

$$ans(:,:,41) = \begin{matrix} 0.4534 + 0.1075i & 0.1838 + 0.6429i \\ -0.0163 + 0.7556i & 0.0055 - 0.3112i \\ 0.0681 + 0.3202i & 0.3882 + 0.2198i \\ 0.1259 + 0.2977i & 0.4482 - 0.2369i \end{matrix}$$

$$ans(:,:,42) = \begin{matrix} 0.4534 + 0.1075i & 0.2307 + 0.1558i \\ -0.0163 + 0.7556i & 0.3467 - 0.2728i \\ 0.0681 + 0.3202i & 0.1705 + 0.3551i \\ 0.1259 + 0.2977i & -0.7319 + 0.1924i \end{matrix}$$

$$ans(:,:,43) = \begin{matrix} 0.2632 + 0.4348i & 0.1838 + 0.6429i \\ 0.3698 - 0.0222i & 0.0055 - 0.3112i \\ -0.4066 - 0.6110i & 0.3882 + 0.2198i \\ 0.0347 + 0.2542i & 0.4482 - 0.2369i \end{matrix}$$

$$ans(:,:,44) = \begin{matrix} 0.2632 + 0.4348i & 0.2307 + 0.1558i \\ 0.3698 - 0.0222i & 0.3467 - 0.2728i \\ -0.4066 - 0.6110i & 0.1705 + 0.3551i \\ 0.0347 + 0.2542i & 0.7319 + 0.1924i \end{matrix}$$

$$ans(:,:,45) = \begin{matrix} 0.1838 + 0.6429i & 0.2307 + 0.1558i \\ 0.0055 - 0.3112i & 0.3467 - 0.2728i \\ 0.3882 + 0.2198i & 0.1705 + 03551i \\ 0.4482 - 0.2369i & -0.7319 + 0.1924i \end{matrix}$$

$$ans(:,:,46) = \begin{matrix} 0.0534 - 0.5633i & -0.4493 + 0.3172i \\ -0.1472 - 0.1184i & -0.5422 + 0.3203i \\ -0.7445 + 0.0533i & -0.1168 - 0.4073i \\ 0.2281 - 0.0638i & 0.3438 + 0.0562i \end{matrix}$$

$$ans(:,:,47) = \begin{matrix} 0.0534 - 0.5633i & -0.3346 + 0.1479i \\ -0.1472 - 0.1184i & 0.2302 - 0.4770i \\ -0.7445 + 0.0533i & -0.1288 - 0.3642i \\ 0.2881 - 0.0638i & -0.1358 - 0.6465i \end{matrix}$$

$$ans(:,:,48) = \begin{matrix} -0.4493 + 0.3172i & -0.3346 + 0.1479i \\ -0.5422 + 0.3203i & 0.2302 - 0.4770i \\ -0.1168 - 0.4073i & -0.1288 - 0.3642i \\ 0.3438 + 0.0562i & -0.1358 - 0.6465i \end{matrix}$$

$$ans(:,:,49) = \begin{matrix} 0.4192 + 0.3317i & 0.6462 - 0.3049i \\ -0.2340 + 0.0529i & -0.0388 - 0.4789i \\ 0.0491 - 0.2199i & -0.2962 + 0.1142i \\ -0.7746 + 0.0772i & 0.1089 - 0.3821i \end{matrix}$$

$$ans(:,:,50) = \begin{matrix} 0.4192 + 0.3317i & 0.3680 + 0.1691i \\ -0.2340 + 0.0529i & -0.5223 + 0.2262i \\ 0.0491 - 0.2199i & 0.5366 + 0.2175i \\ -0.7746 + 0.0772i & 0.4196 + 0.0255i \end{matrix}$$

$$ans(:,:,51) = \begin{matrix} 0.6462 - 0.3049i & 0.3680 + 0.1691i \\ -0.0388 - 0.4789i & -0.5223 + 0.2262i \\ -0.2962 + 0.1142i & 0.5366 + 0.2175i \\ 0.1089 - 0.3821i & 0.4196 + 0.0255i \end{matrix}$$

-continued $$ans(:,:,52) = \begin{matrix} 0.1765 - 0.0924i & 0.3680 + 0.1691i \\ 0.6212 - 0.0425i & -0.5223 + 0.2262i \\ 0.5130 + 0.5000i & 0.5366 + 0.2175i \\ -0.2395 + 0.0459i & 0.4196 + 0.0255i \end{matrix}$$

$$ans(:,:,53) = \begin{matrix} 0.0848 + 0.2248i & 0.5883 + 0.1906i \\ -0.2010 + 0.7357i & -0.0481 - 0.2343i \\ 0.3862 + 0.2270i & 0.2323 + 0.5375i \\ -0.3114 + 0.2509i & 0.4661 + 0.0138i \end{matrix}$$

$$ans(:,:,54) = \begin{matrix} 0.0848 + 0.2248i & -0.4550 - 0.1147i \\ -0.2010 + 0.7357i & -0.3923 + 0.0511i \\ 0.3862 + 0.2270i & 0.1654 - 0.1078i \\ -0.3114 + 0.2509i & 0.6358 + 0.4245i \end{matrix}$$

$$ans(:,:,55) = \begin{matrix} 0.0848 + 0.2248i & -0.5202 + 0.2628i \\ -0.2010 + 0.7357i & 0.3107 - 0.3288i \\ 0.3862 + 0.2270i & 0.6089 + 0.2161i \\ -0.3114 + 0.2509i & -0.1325 - 0.1438i \end{matrix}$$

$$ans(:,:,56) = \begin{matrix} 0.5883 + 0.1906i & -0.4550 - 0.1147i \\ -0.0481 - 0.2343i & -0.3923 + 0.0511i \\ 0.2323 + 0.5375i & 0.1654 - 0.1078i \\ 0.4661 + 0.0138i & 0.6358 + 0.4245i \end{matrix}$$

$$ans(:,:,57) = \begin{matrix} 0.5883 + 0.1906i & -0.5202 + 0.2628i \\ -0.0481 - 0.2343i & 0.3107 - 0.3288i \\ 0.2323 + 0.5375i & 0.6089 + 0.2161i \\ 0.4661 + 0.0138i & -0.1325 - 0.1438i \end{matrix}$$

$$ans(:,:,58) = \begin{matrix} -0.4550 - 0.1147i & -0.5202 + 0.2628i \\ -0.3923 + 0.0511i & 0.3107 - 0.3288i \\ 0.1654 - 0.1078i & 0.6089 + 0.2161i \\ 0.6358 + 0.4245i & -0.1325 - 0.1438i \end{matrix}$$

$$ans(:,:,59) = \begin{matrix} 0.3968 - 0.0671i & -0.6008 - 0.3299i \\ -0.8289 - 0.0667i & -0.4011 - 0.1031i \\ 0.1770 - 0.1687i & 0.2785 + 0.3837i \\ -0.2814 + 0.0866i & 0.3519 - 0.1000i \end{matrix}$$

$$ans(:,:,60) = \begin{matrix} 0.3110 + 0.1356i & -0.2168 - 0.4540i \\ -0.2015 + 0.0416i & 0.1102 - 0.2871i \\ -0.3325 - 0.1370i & 0.0567 - 0.7634i \\ 0.7347 - 0.4165i & -0.0390 - 0.2544i \end{matrix}$$

$$ans(:,:,61) = \begin{matrix} 0.0743 - 0.7846i & -0.2621 + 0.0798i \\ 0.1307 - 0.3436i & 0.4783 - 0.5634i \\ -0.3387 - 0.2385i & 0.5212 + 0.1951i \\ -0.0962 + 0.2508i & -0.2418 + 0.1026i \end{matrix}$$

$$ans(:,:,62) = \begin{matrix} -0.4063 + 0.3394i & -0.2621 + 0.0798i \\ 0.2466 + 0.0922i & 0.4783 - 0.5634i \\ -0.4080 - 0.5055i & 0.5212 + 0.1951i \\ -0.4767 - 0.0347i & -0.2418 + 0.1026i \end{matrix}$$

$$ans(:,:,63) = \begin{matrix} -0.4063 + 0.3394i & 0.1421 + 0.0583i \\ 0.2466 + 0.0922i & -0.0799 - 0.4928i \\ -0.4080 - 0.5055i & -0.2917 + 0.1078i \\ -0.4767 - 0.0347i & -0.0231 - 0.7937i \end{matrix}$$

$$ans(:,:,64) = \begin{matrix} -0.2621 + 0.0798i & 0.1421 + 0.0583i \\ 0.4783 - 0.5634i & -0.0799 - 0.4928i \\ 0.5212 + 0.1951i & -0.2917 + 0.1078i \\ -0.2418 + 0.1026i & -0.0231 - 0.7937i \end{matrix}$$

(3) 6-Bit Rank 3 Codebook:

$$ans(:,:,1) = \begin{matrix} 0.5000 & 0.5000 & 0.5000 \\ 0.5000 & 0.0000 + 0.5000i & -0.5000 + 0.0000i \\ 0.5000 & -0.5000 + 0.0000i & 0.5000 - 0.0000i \\ 0.5000 & -0.0000 - 0.5000i & -0.5000 + 0.0000i \end{matrix}$$

$$ans(:,:,2) = \begin{matrix} 0.5000 & 0.5000 & 0.5000 \\ 0.5000 & 0.0000 + 0.5000i & -0.0000 - 0.5000i \\ 0.5000 & -0.5000 + 0.0000i & -0.5000 + 0.0000i \\ 0.5000 & -0.0000 - 0.5000i & 0.0000 + 0.5000i \end{matrix}$$

$$ans(:,:,3) = \begin{matrix} 0.5000 & 0.5000 & 0.5000 \\ 0.5000 & -0.5000 + 0.0000i & -0.0000 - 0.5000i \\ 0.5000 & 0.5000 - 0.0000i & -0.5000 + 0.0000i \\ 0.5000 & -0.5000 + 0.0000i & 0.0000 + 0.5000i \end{matrix}$$

$$ans(:,:,4) = \begin{matrix} 0.5000 & 0.5000 & 0.5000 \\ 0.0000 + 0.5000i & -0.5000 + 0.0000i & -0.0000 - 0.5000i \\ -0.5000 + 0.0000i & 0.5000 - 0.0000i & -0.5000 + 0.0000i \\ -0.0000 - 0.5000i & -0.5000 + 0.0000i & 0.0000 + 0.5000i \end{matrix}$$

$ans(:,:,5) =$ $$\begin{matrix} 0.5000 & 0.5000 & 0.5000 \\ 0.3536 + 0.3536i & -0.3536 + 0.3536i & -0.3536 - 0.3536i \\ 0.0000 + 0.5000i & -0.0000 - 0.5000i & 0.0000 + 0.5000i \\ -0.3536 + 0.3536i & 0.3536 + 0.3536i & 0.3536 - 0.3536i \end{matrix}$$

$ans(:,:,6) =$ $$\begin{matrix} 0.5000 & 0.5000 & 0.5000 \\ 0.3536 + 0.3536i & -0.3536 + 0.3536i & 0.3536 - 0.3536i \\ 0.0000 + 0.5000i & -0.0000 - 0.5000i & -0.0000 - 0.5000i \\ -0.3536 + 0.3536i & 0.3536 + 0.3536i & -0.3536 - 0.3536i \end{matrix}$$

$ans(:,:,7) =$ $$\begin{matrix} 0.5000 & 0.5000 & 0.5000 \\ 0.3536 + 0.3536i & -0.3536 - 0.3536i & 0.3536 - 0.3536i \\ 0.0000 + 0.5000i & 0.0000 + 0.5000i & -0.0000 - 0.5000i \\ -0.3536 + 0.3536i & 0.3536 - 0.3536i & -0.3536 - 0.3536i \end{matrix}$$

$$ans(:, :, 8) = \begin{pmatrix} 0.5000 & 0.5000 & 0.5000 \\ -0.3536 + 0.3536i & -0.3536 - 0.3536i & 0.3536 - 0.3536i \\ -0.0000 - 0.5000i & 0.0000 + 0.5000i & -0.0000 - 0.5000i \\ 0.3536 + 0.3536i & 0.3536 - 0.3536i & -0.3536 - 0.3536i \end{pmatrix}$$

$$ans(:, :, 9) = \begin{pmatrix} 0.4619 + 0.1913i & -0.1913 + 0.4619i & -0.4619 - 0.1913i \\ 0.4455 - 0.2270i & 0.4455 - 0.2270i & 0.4455 - 0.2270i \\ -0.1167 + 0.4862i & 0.4862 + 0.1167i & 0.1167 - 0.4862i \\ 0.2939 + 0.4045i & -0.2939 - 0.4045i & 0.2939 + 0.4045i \end{pmatrix}$$

$$ans(:, :, 10) = \begin{pmatrix} 0.4619 + 0.1913i & -0.1913 + 0.4619i & 0.1913 - 0.4619i \\ 0.4455 - 0.2270i & 0.4455 - 0.2270i & 0.4455 - 0.2270i \\ -0.1167 + 0.4862i & 0.4862 + 0.1167i & -0.4862 - 0.1167i \\ 0.2939 + 0.4045i & -0.2939 - 0.4045i & -0.2939 - 0.4045i \end{pmatrix}$$

$$ans(:, :, 11) = \begin{pmatrix} 0.4619 + 0.1913i & -0.4619 - 0.1913i & 0.1913 - 0.4619i \\ 0.4455 - 0.2270i & 0.4455 - 0.2270i & 0.4455 - 0.2270i \\ -0.1167 + 0.4862i & 0.1167 - 0.4862i & -0.4862 - 0.1167i \\ 0.2939 + 0.4045i & 0.2939 + 0.4045i & -0.2939 - 0.4045i \end{pmatrix}$$

$$ans(:, :, 12) = \begin{pmatrix} -0.1913 + 0.4619i & -0.4619 - 0.1913i & 0.1913 - 0.4619i \\ 0.4455 - 0.2270i & 0.4455 - 0.2270i & 0.4455 - 0.2270i \\ 0.4862 + 0.1167i & 0.1167 - 0.4862i & -0.4862 - 0.1167i \\ -0.2939 - 0.4045i & 0.2939 + 0.4045i & -0.2939 - 0.4045i \end{pmatrix}$$

$$ans(:, :, 13) = \begin{pmatrix} -0.5000 & -0.5000 & -0.5000 \\ 0.4985 - 0.0392i & 0.0392 + 0.4985i & -0.4985 + 0.0392i \\ 0.4938 - 0.0782i & -0.4938 + 0.0782i & 0.4938 - 0.0782i \\ -0.4862 + 0.1167i & 0.1167 + 0.4862i & 0.4862 - 0.1167i \end{pmatrix}$$

$$ans(:, :, 14) = \begin{pmatrix} -0.5000 & -0.5000 & -0.5000 \\ 0.4985 - 0.0392i & 0.0392 + 0.4985i & -0.0392 - 0.4985i \\ 0.4938 - 0.0782i & -0.4938 + 0.0782i & -0.4938 - 0.0782i \\ -0.4862 + 0.1167i & 0.1167 + 0.4862i & -0.1167 - 0.4862i \end{pmatrix}$$

$$ans(:, :, 15) = \begin{pmatrix} -0.5000 & -0.5000 & -0.5000 \\ 0.4985 - 0.0392i & -0.4985 + 0.0392i & -0.0392 - 0.4985i \\ 0.4938 - 0.0782i & 0.4938 - 0.0782i & -0.4938 - 0.0782i \\ -0.4862 + 0.1167i & 0.4862 - 0.1167i & -0.1167 - 0.4862i \end{pmatrix}$$

$$ans(:, :, 16) = \begin{pmatrix} -0.5000 & -0.5000 & -0.5000 \\ 0.0392 + 0.4985i & -0.4985 + 0.0392i & -0.0392 - 0.4985i \\ -0.4938 + 0.0782i & 0.4938 - 0.0782i & -0.4938 - 0.0782i \\ 0.1167 + 0.4862i & 0.4862 - 0.1167i & -0.1167 - 0.4862i \end{pmatrix}$$

$$ans(:, :, 17) = \begin{pmatrix} 0.5000 & 0.5000 & 0.5000 \\ 0.4619 + 0.1913i & -0.1913 + 0.4619i & -0.4619 - 0.1913i \\ 0.3536 + 0.3536i & -0.3536 - 0.3536i & 0.3536 + 0.3536i \\ 0.1913 + 0.4619i & 0.4619 - 0.1913i & -0.1913 - 0.4619i \end{pmatrix}$$

$$ans(:, :, 18) = \begin{pmatrix} 0.5000 & 0.5000 & 0.5000 \\ 0.4619 + 0.1913i & -0.1913 + 0.4619i & 0.1913 - 0.4619i \\ 0.3536 + 0.3536i & -0.3536 - 0.3536i & -0.3536 - 0.3536i \\ 0.1913 + 0.4619i & 0.4619 - 0.1913i & -0.4619 + 0.1913i \end{pmatrix}$$

$$ans(:, :, 19) = \begin{pmatrix} 0.5000 & 0.5000 & 0.5000 \\ 0.4619 + 0.1913i & -0.4619 - 0.1913i & 0.1913 - 0.4619i \\ 0.3536 + 0.3536i & 0.3536 + 0.3536i & -0.3536 - 0.3536i \\ 0.1913 + 0.4619i & -0.1913 - 0.4619i & -0.4619 + 0.1913i \end{pmatrix}$$

$$ans(:, :, 20) = \begin{pmatrix} 0.5000 & 0.5000 & 0.5000 \\ -0.1913 + 0.4619i & -0.4619 - 0.1913i & 0.1913 - 0.4619i \\ -0.3536 - 0.3536i & 0.3536 + 0.3536i & -0.3536 - 0.3536i \\ 0.4619 - 0.1913i & -0.1913 - 0.4619i & -0.4619 + 0.1913i \end{pmatrix}$$

$$ans(:, :, 21) = \begin{pmatrix} 0.5000 & 0.5000 & 0.5000 \\ 0.1913 + 0.4619i & -0.4619 + 0.1913i & -0.1913 - 0.4619i \\ -0.3536 + 0.3536i & 0.3536 - 0.3536i & -0.3536 + 0.3536i \\ -0.4619 - 0.1913i & -0.1913 + 0.4619i & 0.4619 + 0.1913i \end{pmatrix}$$

$$ans(:, :, 22) = \begin{pmatrix} 0.5000 & 0.5000 & 0.5000 \\ 0.1913 + 0.4619i & -0.4619 + 0.1913i & 0.4619 - 0.1913i \\ -0.3536 + 0.3536i & 0.3536 - 0.3536i & 0.3536 - 0.3536i \\ -0.4619 - 0.1913i & -0.1913 + 0.4619i & 0.1913 - 0.4619i \end{pmatrix}$$

$$ans(:, :, 23) = \begin{pmatrix} 0.5000 & 0.5000 & 0.5000 \\ 0.1913 + 0.4619i & -0.1913 - 0.4619i & 0.4619 - 0.1913i \\ -0.3536 + 0.3536i & -0.3536 + 0.3536i & 0.3536 - 0.3536i \\ -0.4619 - 0.1913i & 0.4619 + 0.1913i & 0.1913 - 0.4619i \end{pmatrix}$$

$$ans(:, :, 24) = \begin{pmatrix} 0.5000 & 0.5000 & 0.5000 \\ -0.4619 + 0.1913i & -0.1913 - 0.4619i & 0.4619 - 0.1913i \\ 0.3536 - 0.3536i & -0.3536 + 0.3536i & 0.3536 - 0.3536i \\ -0.1913 + 0.4619i & 0.4619 + 0.1913i & 0.1913 - 0.4619i \end{pmatrix}$$

$$ans(:, :, 25) = \begin{pmatrix} 0.2437 + 0.4837i & 0.4258 + 0.0076i & 0.5210 - 0.4265i \\ 0.5740 - 0.3102i & 0.0596 + 0.3222i & 0.2922 + 0.0454i \\ 0.2823 - 0.3783i & -0.4186 + 0.1136i & 0.3628 + 0.1522i \\ 0.2062 + 0.1248i & 0.1513 + 0.7073i & -0.5498 - 0.0464i \end{pmatrix}$$

$$ans(:, :, 26) = \begin{pmatrix} 0.2437 + 0.4837i & 0.4258 + 0.0076i & -0.2364 - 0.1268i \\ 0.5740 - 0.3102i & 0.0596 + 0.3222i & 0.6147 + 0.0409i \\ 0.2823 - 0.3783i & -0.4186 + 0.1136i & -0.6500 - 0.1085i \\ 0.2062 + 0.1248i & 0.1513 + 0.7073i & -0.2340 - 0.2440i \end{pmatrix}$$

$$ans(:, :, 27) = \begin{pmatrix} 0.2437 + 0.4837i & 0.5210 - 0.4265i & -0.2364 - 0.1268i \\ 0.5740 - 0.3102i & 0.2922 + 0.0454i & 0.6147 + 0.0409i \\ 0.2823 - 0.3783i & 0.3628 + 0.1522i & -0.6500 - 0.1085i \\ 0.2062 + 0.1248i & -0.5498 - 0.0464i & -0.2340 - 0.2440i \end{pmatrix}$$

$$ans(:,:,28) = \begin{bmatrix} 0.4258 + 0.0076i & 0.5210 - 0.4265i & -0.2364 - 0.1268i \\ 0.0596 + 0.3222i & 0.2922 + 0.0454i & 0.6147 + 0.0409i \\ -0.4186 + 0.1136i & 0.3628 + 0.1522i & -0.6500 - 0.1085i \\ 0.1513 + 0.7073i & -0.5498 - 0.0464i & -0.2340 - 0.2440i \end{bmatrix}$$

$$ans(:,:,29) = \begin{bmatrix} 0.0591 - 0.4953i & 0.0742 + 0.2714i & 0.3370 + 0.2000i \\ 0.5545 + 0.3908i & -0.0591 - 0.0963i & 0.2158 + 0.4089i \\ 0.2593 - 0.0234i & -0.5800 - 0.1645i & -0.2363 - 0.5965i \\ 0.3300 + 0.3380i & 0.4619 + 0.5755i & 0.0175 - 0.4698i \end{bmatrix}$$

$$ans(:,:,30) = \begin{bmatrix} 0.0591 - 0.4953i & 0.0742 + 0.2714i & -0.1041 - 0.7125i \\ 0.5545 + 0.3908i & -0.0591 - 0.0963i & -0.5589 + 0.0299i \\ 0.2593 - 0.0234i & -0.5800 - 0.1645i & -0.2149 - 0.3331i \\ 0.3300 + 0.3380i & 0.4619 + 0.5755i & 0.0748 - 0.0748i \end{bmatrix}$$

$$ans(:,:,31) = \begin{bmatrix} 0.0591 - 0.4953i & 0.3370 + 0.2000i & -0.1041 - 0.7125i \\ 0.5545 + 0.3908i & 0.2158 + 0.4089i & -0.5589 + 0.0299i \\ 0.2593 - 0.0234i & -0.2363 - 0.5965i & -0.2149 - 0.3331i \\ 0.3300 + 0.3380i & 0.0175 - 0.4698i & 0.0748 - 0.0748i \end{bmatrix}$$

$$ans(:,:,32) = \begin{bmatrix} 0.0742 + 0.2714i & 0.3370 + 0.2000i & -0.1041 - 0.7125i \\ -0.0591 - 0.0963i & 0.2158 + 0.4089i & -0.5589 + 0.0299i \\ -0.5800 - 0.1645i & -0.2363 - 0.5965i & -0.2149 - 0.3331i \\ 0.4619 + 0.5755i & 0.0175 - 0.4698i & 0.0748 - 0.0748i \end{bmatrix}$$

$$ans(:,:,33) = \begin{bmatrix} 0.5019 - 0.2171i & 0.2121 - 0.4391i & 0.4649 + 0.1545i \\ 0.0570 + 0.3132i & 0.3637 + 0.1907i & 0.5971 - 0.5122i \\ 0.2569 - 0.1797i & 0.0539 - 0.3157i & -0.0025 + 0.3671i \\ 0.6949 + 0.1358i & -0.5835 + 0.3879i & 0.0058 - 0.0797i \end{bmatrix}$$

$$ans(:,:,34) = \begin{bmatrix} 0.5019 - 0.2171i & 0.2121 - 0.4391i & -0.4709 + 0.0383i \\ 0.0570 + 0.3132i & 0.3637 + 0.1907i & 0.3285 + 0.0569i \\ 0.2569 - 0.1797i & 0.0539 - 0.3157i & 0.8042 + 0.1327i \\ 0.6949 + 0.1358i & -0.5835 + 0.3879i & 0.0341 + 0.0124i \end{bmatrix}$$

$$ans(:,:,35) = \begin{bmatrix} 0.5019 - 0.2171i & 0.4649 + 0.1545i & -0.4709 + 0.0383i \\ 0.0570 + 0.3132i & 0.5971 - 0.5122i & 0.3285 + 0.0569i \\ 0.2569 - 0.1797i & -0.0025 + 0.3671i & 0.8042 + 0.1327i \\ 0.6949 + 0.1358i & 0.0058 - 0.0797i & 0.0341 + 0.0124i \end{bmatrix}$$

$$ans(:,:,36) = \begin{bmatrix} 0.2121 - 0.4391i & 0.4649 + 0.1545i & -0.4709 + 0.0383i \\ 0.3637 + 0.1907i & 0.5971 - 0.5122i & 0.3285 + 0.0569i \\ 0.0539 - 0.3157i & -0.0025 + 0.3671i & 0.8042 + 0.1327i \\ -0.5835 + 0.3879i & 0.0058 - 0.0797i & 0.0341 + 0.0124i \end{bmatrix}$$

$$ans(:,:,37) = \begin{bmatrix} 0.2199 + 0.3199i & 0.6305 - 0.4345i & -0.0525 + 0.2357i \\ 0.5983 + 0.1264i & -0.0683 + 0.2985i & 0.5833 + 0.2614i \\ -0.5576 - 0.2903i & -0.0495 - 0.3235i & 0.3552 + 0.3750i \\ -0.0940 - 0.2672i & -0.0481 + 0.4588i & 0.0118 + 0.5160i \end{bmatrix}$$

$$ans(:,:,38) = \begin{bmatrix} 0.2199 + 0.3199i & 0.6305 - 0.4345i & -0.3110 - 0.3286i \\ 0.5983 + 0.1264i & -0.0683 + 0.2985i & 0.2969 - 0.1888i \\ -0.5576 - 0.2903i & -0.0495 - 0.3235i & 0.2888 - 0.3841i \\ -0.0940 - 0.2672i & -0.0481 + 0.4588i & -0.6633 - 0.0260i \end{bmatrix}$$

$$ans(:,:,39) = \begin{bmatrix} 0.2199 + 0.3199i & -0.0525 + 0.2357i & -0.3110 - 0.3286i \\ 0.5983 + 0.1264i & 0.5833 + 0.2614i & 0.2969 - 0.1888i \\ -0.5576 - 0.2903i & 0.3552 + 0.3750i & 0.2888 - 0.3841i \\ -0.0940 - 0.2672i & 0.0118 + 0.5160i & -0.6633 - 0.0260i \end{bmatrix}$$

$$ans(:,:,40) = \begin{bmatrix} 0.6305 - 0.4345i & -0.0525 + 0.2357i & -0.3110 - 0.3286i \\ -0.0683 + 0.2985i & 0.5833 + 0.2614i & 0.2969 - 0.1888i \\ -0.0495 - 0.3235i & 0.3552 + 0.3750i & 0.2888 - 0.3841i \\ -0.0481 + 0.4588i & 0.0118 + 0.5160i & -0.6633 - 0.0260i \end{bmatrix}$$

$$ans(:,:,41) = \begin{bmatrix} 0.4534 + 0.1075i & 0.2632 + 0.4348i & 0.1838 + 0.6429i \\ -0.0163 + 0.7556i & 0.3698 - 0.0222i & 0.0055 - 0.3112i \\ 0.0681 + 0.3202i & -0.4066 - 0.6110i & 0.3882 + 0.2198i \\ 0.1259 + 0.2977i & 0.0347 + 0.2542i & 0.4482 - 0.2369i \end{bmatrix}$$

$$ans(:,:,42) = \begin{bmatrix} 0.4534 + 0.1075i & 0.2632 + 0.4348i & 0.2307 + 0.1558i \\ -0.0163 + 0.7556i & 0.3698 - 0.0222i & 0.3467 - 0.2728i \\ 0.0681 + 0.3202i & -0.4066 - 0.6110i & 0.1705 + 0.3551i \\ 0.1259 + 0.2977i & 0.0347 + 0.2542i & -0.7319 + 0.1924i \end{bmatrix}$$

$$ans(:,:,43) = \begin{bmatrix} 0.4534 + 0.1075i & 0.1838 + 0.6429i & 0.2307 + 0.1558i \\ -0.0163 + 0.7556i & 0.0055 - 0.3112i & 0.3467 - 0.2728i \\ 0.0681 + 0.3202i & 0.3882 + 0.2198i & 0.1705 + 0.3551i \\ 0.1259 + 0.2977i & 0.4482 - 0.2369i & -0.7319 + 0.1924i \end{bmatrix}$$

$$ans(:,:,44) = \begin{bmatrix} 0.2632 + 0.4348i & 0.1838 + 0.6429i & 0.2307 + 0.1558i \\ 0.3698 - 0.0222i & 0.0055 - 0.3112i & 0.3467 - 0.2728i \\ -0.4066 - 0.6110i & 0.3882 + 0.2198i & 0.1705 + 0.3551i \\ 0.0347 + 0.2542i & 0.4482 - 0.2369i & -0.7319 + 0.1924i \end{bmatrix}$$

$$ans(:,:,45) = \begin{bmatrix} 0.0534 - 0.5633i & -0.4493 + 0.3172i & -0.3346 + 0.1479i \\ -0.1472 - 0.1184i & -0.5422 + 0.3203i & 0.2302 - 0.4770i \\ -0.7445 + 0.0533i & -0.1168 - 0.4073i & -0.1288 - 0.3642i \\ 0.2881 - 0.0638i & 0.3438 + 0.0562i & -0.1358 - 0.6465i \end{bmatrix}$$

$$ans(:,:,46) = \begin{bmatrix} 0.0534 - 0.5633i & -0.4493 + 0.3172i & -0.4868 - 0.0811i \\ -0.1472 - 0.1184i & -0.5422 + 0.3203i & 0.4913 + 0.2140i \\ -0.7445 + 0.0533i & -0.1168 - 0.4073i & -0.2957 - 0.1634i \\ 0.2881 - 0.0638i & 0.3438 + 0.0562i & -0.3579 + 0.4766i \end{bmatrix}$$

$$ans(:,:,47) = \begin{bmatrix} 0.0534 - 0.5633i & -0.3346 + 0.1479i & -0.4868 - 0.0811i \\ -0.1472 - 0.1184i & 0.2302 - 0.4770i & 0.4913 + 0.2140i \\ -0.7445 + 0.0533i & -0.1288 - 0.3642i & -0.2957 - 0.1634i \\ 0.2881 - 0.0638i & -0.1358 - 0.6465i & -0.3579 + 0.4766i \end{bmatrix}$$

$$ans(:,:,48) = \begin{bmatrix} -0.4493 + 0.3172i & -0.3346 + 0.1479i & -0.4868 - 0.0811i \\ -0.5422 + 0.3203i & 0.2302 - 0.4770i & 0.4913 + 0.2140i \\ -0.1168 - 0.4073i & -0.1288 - 0.3642i & -0.2957 - 0.1634i \\ 0.3438 + 0.0562i & -0.1358 - 0.6465i & -0.3579 + 0.4766i \end{bmatrix}$$

$$ans(:,:,49) = \begin{bmatrix} 0.4192 + 0.3317i & 0.6462 - 0.3049i & 0.1765 - 0.0924i \\ -0.2340 + 0.0529i & -0.0388 - 0.4789i & 0.6212 - 0.0425i \\ 0.0491 - 0.2199i & -0.2962 + 0.1142i & 0.5130 + 0.5000i \\ -0.7746 + 0.0772i & 0.1089 - 0.3821i & -0.2395 + 0.0459i \end{bmatrix}$$

$$ans(:,:,50) = \begin{bmatrix} 0.4192 + 0.3317i & 0.6462 - 0.3049i & 0.3680 + 0.1691i \\ -0.2340 + 0.0529i & -0.0388 - 0.4789i & -0.5223 + 0.2262i \\ 0.0491 - 0.2199i & -0.2962 + 0.1142i & 0.5366 + 0.2175i \\ -0.7746 + 0.0772i & 0.1089 - 0.3821i & 0.4196 + 0.0255i \end{bmatrix}$$

$$ans(:,:,51) = \begin{bmatrix} 0.4192 + 0.3317i & 0.1765 - 0.0924i & 0.3680 + 0.1691i \\ -0.2340 + 0.0529i & 0.6212 - 0.0425i & -0.5223 + 0.2262i \\ 0.0491 - 0.2199i & 0.5130 + 0.5000i & 0.5366 + 0.2175i \\ -0.7746 + 0.0772i & -0.2395 + 0.0459i & 0.4196 + 0.0255i \end{bmatrix}$$

$$ans(:,:,52) = \begin{bmatrix} 0.6462 - 0.3049i & 0.1765 - 0.0924i & 0.3680 + 0.1691i \\ -0.0388 - 0.4789i & 0.6212 - 0.0425i & -0.5223 + 0.2262i \\ -0.2962 + 0.1142i & 0.5130 + 0.5000i & 0.5366 + 0.2175i \\ 0.1089 - 0.3821i & -0.2395 + 0.0459i & 0.4196 + 0.0255i \end{bmatrix}$$

$$ans(:,:,53) = \begin{bmatrix} 0.0848 + 0.2248i & 0.5883 + 0.1906i & -0.4550 - 0.1147i \\ -0.2010 + 0.7357i & -0.0481 - 0.2343i & -0.3923 + 0.0511i \\ 0.3862 + 0.2270i & 0.2323 + 0.5375i & 0.1654 - 0.1078i \\ -0.3114 + 0.2509i & 0.4661 + 0.0138i & 0.6358 + 0.4245i \end{bmatrix}$$

$$ans(:,:,54) = \begin{bmatrix} 0.0848 + 0.2248i & 0.5883 + 0.1906i & -0.5202 + 0.2628i \\ -0.2010 + 0.7357i & -0.0481 - 0.2343i & 0.3107 - 0.3288i \\ 0.3862 + 0.2270i & 0.2323 + 0.5375i & 0.6089 + 0.2161i \\ -0.3114 + 0.2509i & 0.4661 + 0.0138i & -0.1325 - 0.1438i \end{bmatrix}$$

$$ans(:,:,55) = \begin{bmatrix} 0.0848 + 0.2248i & -0.4550 - 0.1147i & -0.5202 + 0.2628i \\ -0.2010 + 0.7357i & -0.3923 + 0.0511i & 0.3107 - 0.3288i \\ 0.3862 + 0.2270i & 0.1654 - 0.1078i & 0.6089 + 0.2161i \\ -0.3114 + 0.2509i & 0.6358 + 0.4245i & -0.1325 - 0.1438i \end{bmatrix}$$

$$ans(:,:,56) = \begin{bmatrix} 0.5883 + 0.1906i & -0.4550 - 0.1147i & -0.5202 + 0.2628i \\ -0.0481 - 0.2343i & -0.3923 + 0.0511i & 0.3107 - 0.3288i \\ 0.2323 + 0.5375i & 0.1654 - 0.1078i & 0.6089 + 0.2161i \\ 0.4661 + 0.0138i & 0.6358 + 0.4245i & -0.1325 - 0.1438i \end{bmatrix}$$

$$ans(:,:,57) = \begin{bmatrix} 0.3968 - 0.0671i & 0.3110 + 0.1356i & -0.2168 - 0.4540i \\ -0.8289 - 0.0667i & -0.2015 + 0.0416i & 0.1102 - 0.2871i \\ 0.1770 - 0.1687i & -0.3325 - 0.1370i & 0.0567 - 0.7634i \\ -0.2814 + 0.0866i & 0.7347 - 0.4165i & -0.0390 - 0.2544i \end{bmatrix}$$

$$ans(:,:,58) = \begin{bmatrix} 0.3968 - 0.0671i & 0.3110 + 0.1356i & -0.6008 - 0.3299i \\ -0.8289 - 0.0667i & -0.2015 + 0.0416i & -0.4011 - 0.1031i \\ 0.1770 - 0.1687i & -0.3325 - 0.1370i & 0.2785 + 0.3837i \\ -0.2814 + 0.0866i & 0.7347 - 0.4165i & 0.3519 - 0.1000i \end{bmatrix}$$

$$ans(:,:,59) = \begin{bmatrix} 0.3968 - 0.0671i & -0.2168 - 0.4540i & -0.6008 - 0.3299i \\ -0.8289 - 0.0667i & 0.1102 - 0.2871i & -0.4011 - 0.1031i \\ 0.1770 - 0.1687i & 0.0567 - 0.7634i & 0.2785 + 0.3837i \\ -0.2814 + 0.0866i & -0.0390 - 0.2544i & 0.3519 - 0.1000i \end{bmatrix}$$

$$ans(:,:,60) = \begin{bmatrix} 0.3110 + 0.1356i & -0.2168 - 0.4540i & -0.6008 - 0.3299i \\ -0.2015 + 0.0416i & 0.1102 - 0.2871i & -0.4011 - 0.1031i \\ -0.3325 - 0.1370i & 0.0567 - 0.7634i & 0.2785 + 0.3837i \\ 0.7347 - 0.4165i & -0.0390 - 0.2544i & 0.3519 - 0.1000i \end{bmatrix}$$

$$ans(:,:,61) = \begin{bmatrix} 0.0743 - 0.7846i & -0.4063 + 0.3394i & -0.2621 + 0.0798i \\ 0.1307 - 0.3436i & 0.2466 + 0.0922i & 0.4783 - 0.5634i \\ -0.3387 - 0.2385i & -0.4080 - 0.5055i & 0.5212 + 0.1951i \\ -0.0962 + 0.2508i & -0.4767 - 0.0347i & -0.2418 + 0.1026i \end{bmatrix}$$

$$ans(:,:,62) = \begin{bmatrix} 0.0743 - 0.7846i & -0.4063 + 0.3394i & 0.1421 + 0.0583i \\ 0.1307 - 0.3436i & 0.2466 + 0.0922i & -0.0799 - 0.4928i \\ -0.3387 - 0.2385i & -0.4080 - 0.5055i & -0.2917 + 0.1078i \\ -0.0962 + 0.2508i & -0.4767 - 0.0347i & -0.0231 - 0.7937i \end{bmatrix}$$

$$ans(:,:,63) = \begin{bmatrix} 0.0743 - 0.7846i & -0.2621 + 0.0798i & 0.1421 + 0.0583i \\ 0.1307 - 0.3436i & 0.4783 - 0.5634i & -0.0799 - 0.4928i \\ -0.3387 - 0.2385i & 0.5212 + 0.1951i & -0.2917 + 0.1078i \\ -0.0962 + 0.2508i & -0.2418 + 0.1026i & -0.0231 - 0.7937i \end{bmatrix}$$

$$ans(:,:,64) = \begin{bmatrix} -0.4063 + 0.3394i & -0.2621 + 0.0798i & 0.1421 + 0.0583i \\ 0.2466 + 0.0922i & 0.4783 - 0.5634i & -0.0799 - 0.4928i \\ -0.4080 - 0.5055i & 0.5212 + 0.1951i & -0.2917 + 0.1078i \\ -0.4767 - 0.0347i & -0.2418 + 0.1026i & -0.0231 - 0.7937i \end{bmatrix}$$

(4) 6-Bit Rank 4 Codebook:

$$ans(:,:,1) = \begin{matrix} 0.5000 & 0.5000 & 0.5000 & 0.5000 \\ 0.5000 & 0.0000 + 0.5000i & -0.5000 + 0.0000i & -0.0000 - 0.5000i \\ 0.5000 & -0.5000 + 0.0000i & 0.5000 - 0.0000i & -0.5000 + 0.0000i \\ 0.5000 & -0.0000 - 0.5000i & -0.5000 + 0.0000i & 0.0000 + 0.5000i \end{matrix}$$

$ans(:,:,2) =$ $$\begin{matrix} 0.5000 & 0.5000 & 0.5000 & 0.5000 \\ 0.3536 + 0.3536i & -0.3536 + 0.3536i & -0.3536 - 0.3536i & 0.3536 - 0.3536i \\ 0.0000 + 0.5000i & -0.0000 - 0.5000i & 0.0000 + 0.5000i & -0.0000 - 0.5000i \\ -0.3536 + 0.3536i & 0.3536 + 0.3536i & 0.3536 - 0.3536i & -0.3536 - 0.3536i \end{matrix}$$

$ans(:,:,3) =$ $$\begin{matrix} 0.4619 + 0.1913i & -0.1913 + 0.4619i & -0.4619 - 0.1913i & 0.1913 - 0.4619i \\ 0.4455 - 0.2270i & 0.4455 - 0.2270i & 0.4455 - 0.2270i & 0.4455 - 0.2270i \\ -0.1167 + 0.4862i & 0.4862 + 0.1167i & 0.1167 - 0.4862i & -0.4862 - 0.1167i \\ 0.2939 + 0.4045i & -0.2939 - 0.4045i & 0.2939 + 0.4045i & -0.2939 - 0.4045i \end{matrix}$$

$ans(:,:,4) =$ $$\begin{matrix} -0.5000 & -0.5000 & -0.5000 & -0.5000 \\ 0.4985 - 0.0392i & 0.0392 + 0.4985i & -0.4985 + 0.0392i & -0.0392 - 0.4985i \\ 0.4938 - 0.0782i & -0.4938 + 0.0782i & 0.4938 - 0.0782i & -0.4938 + 0.0782i \\ -0.4862 + 0.1167i & 0.1167 + 0.4862i & 0.4862 - 0.1167i & -0.1167 - 0.4862i \end{matrix}$$

$ans(:,:,5) =$ $$\begin{matrix} 0.5000 & 0.5000 & 0.5000 & 0.5000 \\ 0.4619 + 0.1913i & -0.1913 + 0.4619i & -0.4619 - 0.1913i & 0.1913 - 0.4619i \\ 0.3536 + 0.3536i & -0.3536 - 0.3536i & 0.3536 + 0.3536i & -0.3536 - 0.3536i \\ 0.1913 + 0.4619i & 0.4619 - 0.1913i & -0.1913 - 0.4619i & -0.4619 + 0.1913i \end{matrix}$$

$ans(:,:,6) =$ $$\begin{matrix} 0.5000 & 0.5000 & 0.5000 & 0.5000 \\ 0.1913 + 0.4619i & -0.4619 + 0.1913i & -0.1913 - 0.4619i & 0.4619 - 0.1913i \\ -0.3536 + 0.3536i & 0.3536 - 0.3536i & -0.3536 + 0.3536i & 0.3536 - 0.3536i \\ -0.4619 - 0.1913i & -0.1913 + 0.4619i & 0.4619 + 0.1913i & 0.1913 - 0.4619i \end{matrix}$$

$ans(:,:,7) =$ $$\begin{matrix} 0.2437 + 0.4837i & 0.4258 + 0.0076i & 0.5210 - 0.4265i & -0.2364 - 0.1268i \\ 0.5740 - 0.3102i & 0.0596 + 0.3222i & 0.2922 + 0.0454i & 0.6147 + 0.0409i \\ 0.2823 - 0.3783i & -0.4186 + 0.1136i & 0.3628 + 0.1522i & -0.6500 - 0.1085i \\ 0.2062 + 0.1248i & 0.1513 + 0.7073i & -0.5498 - 0.0464i & -0.2340 - 0.2440i \end{matrix}$$

$ans(:,:,8) =$ $$\begin{matrix} 0.0591 - 0.4953i & 0.0742 + 0.2714i & 0.3370 + 0.2000i & -0.1041 - 0.7125i \\ 0.5545 + 0.3908i & -0.0591 - 0.0963i & 0.2158 + 0.4089i & -0.5589 + 0.0299i \\ 0.2593 - 0.0234i & -0.5800 - 0.1645i & -0.2363 - 0.5965i & -0.2149 - 0.3331i \\ 0.3300 + 0.3380i & 0.4619 + 0.5755i & 0.0175 - 0.4698i & 0.0748 - 0.0748i \end{matrix}$$

$ans(:, :, 9) =$ $$\begin{array}{cccc}
0.5019 - 0.2171i & 0.2121 - 0.4391i & 0.4649 + 0.1545i & -0.4709 + 0.0383i \\
0.0570 + 0.3132i & 0.3637 + 0.1907i & 0.5971 - 0.5122i & 0.3285 + 0.0569i \\
0.2569 - 0.1797i & 0.0539 - 0.3157i & -0.0025 + 0.3671i & 0.8042 + 0.1327i \\
0.6949 + 0.1358i & -0.5835 + 0.3879i & 0.0058 - 0.0797i & 0.0341 + 0.0124i
\end{array}$$

$ans(:, :, 10) =$ $$\begin{array}{cccc}
0.2199 + 0.3199i & 0.6305 - 0.4345i & -0.0525 + 0.2357i & -0.3110 - 0.3286i \\
0.5983 + 0.1264i & -0.0683 + 0.2985i & 0.5833 + 0.2614i & 0.2969 - 0.1888i \\
-0.5576 - 0.2903i & -0.0495 - 0.3235i & 0.3552 + 0.3750i & 0.2888 - 0.3841i \\
-0.0940 - 0.2672i & -0.0481 + 0.4588i & 0.0118 + 0.5160i & -0.6633 - 0.0260i
\end{array}$$

$ans(:, :, 11) =$ $$\begin{array}{cccc}
0.4534 + 0.1075i & 0.2632 + 0.4348i & 0.1838 + 0.6429i & 0.2307 + 0.1558i \\
-0.0163 + 0.7556i & 0.3698 - 0.0222i & 0.0055 - 0.3112i & 0.3467 - 0.2728i \\
0.0681 + 0.3202i & -0.4066 - 0.6110i & 0.3882 + 0.2198i & 0.1705 + 0.3551i \\
0.1259 + 0.2977i & 0.0347 + 0.2542i & 0.4482 - 0.2369i & -0.7319 + 0.1924i
\end{array}$$

$ans(:, :, 12) =$ $$\begin{array}{cccc}
0.0534 - 0.5633i & -0.4493 + 0.3172i & -0.3346 + 0.1479i & -0.4868 - 0.0811i \\
-0.1472 - 0.1184i & -0.5422 + 0.3203i & 0.2302 - 0.4770i & 0.4913 + 0.2140i \\
-0.7445 + 0.0533i & -0.1168 - 0.4073i & -0.1288 - 0.3642i & -0.2957 - 0.1634i \\
0.2881 - 0.0638i & 0.3438 + 0.0562i & -0.1358 - 0.6465i & -0.3579 + 0.4766i
\end{array}$$

$ans(:, :, 13) =$ $$\begin{array}{cccc}
0.4192 + 0.3317i & 0.6462 - 0.3049i & 0.1765 - 0.0924i & 0.3680 + 0.1691i \\
-0.2340 + 0.0529i & -0.0388 - 0.4789i & 0.6212 - 0.0425i & -0.5223 + 0.2262i \\
0.0491 - 0.2199i & -0.2962 + 0.1142i & 0.5130 + 0.5000i & 0.5366 + 0.2175i \\
-0.7746 + 0.0772i & 0.1089 - 0.3821i & -0.2395 + 0.0459i & 0.4196 + 0.0255i
\end{array}$$

$ans(:, :, 14) =$ $$\begin{array}{cccc}
0.0848 + 0.2248i & 0.5883 + 0.1906i & -0.4550 - 0.1147i & -0.5202 + 0.2628i \\
-0.2010 + 0.7357i & -0.0481 - 0.2343i & -0.3923 + 0.0511i & 0.3107 - 0.3288i \\
0.3862 + 0.2270i & 0.2323 + 0.5375i & 0.1654 - 0.1078i & 0.6089 + 0.2161i \\
-0.3114 + 0.2509i & 0.4661 + 0.0138i & 0.6358 + 0.4245i & -0.1325 - 0.1438i
\end{array}$$

$ans(:, :, 15) =$ $$\begin{array}{cccc}
0.3968 - 0.0671i & 0.3110 + 0.1356i & -0.2168 - 0.4540i & -0.6008 - 0.3299i \\
-0.8289 - 0.0667i & -0.2015 + 0.0416i & 0.1102 - 0.2871i & -0.4011 - 0.1031i \\
0.1770 - 0.1687i & -0.3325 - 0.1370i & 0.0567 - 0.7634i & 0.2785 + 0.3837i \\
-0.2814 + 0.0866i & 0.7347 - 0.4165i & -0.0390 - 0.2544i & 0.3519 - 0.1000i
\end{array}$$

$ans(:, :, 16) =$ $$\begin{array}{cccc}
0.0743 - 0.7846i & -0.4063 + 0.3394i & -0.2621 + 0.0798i & 0.1421 + 0.1583i \\
0.1307 - 0.3436i & 0.2466 + 0.0922i & 0.4783 - 0.5634i & -0.0799 - 0.4928i \\
-0.3387 - 0.2385i & -0.4080 - 0.5055i & 0.5212 + 0.1951i & -0.2917 + 0.1078i \\
-0.0962 + 0.2508i & -0.4767 - 0.0347i & -0.2418 + 0.1026i & -0.0231 - 0.7937i
\end{array}$$

2. 4-Bit Codebook
(1) 4-bit Rank 1 Codebook:

$$ans(:,:,1) = \begin{matrix} 0.5000 \\ 0.5000 \\ 0.5000 \\ 0.5000 \end{matrix}$$

$$ans(:,:,2) = \begin{matrix} 0.5000 \\ 0.0000 + 0.5000i \\ -0.5000 + 0.0000i \\ -0.0000 - 0.5000i \end{matrix}$$

$$ans(:,:,3) = \begin{matrix} 0.5000 \\ -0.5000 + 0.0000i \\ 0.5000 - 0.0000i \\ -0.5000 + 0.0000i \end{matrix}$$

$$ans(:,:,4) = \begin{matrix} 0.5000 \\ -0.0000 - 0.5000i \\ -0.5000 + 0.0000i \\ 0.0000 + 0.5000i \end{matrix}$$

$$ans(:,:,5) = \begin{matrix} 0.5000 \\ 0.3536 + 0.3536i \\ 0.0000 + 0.5000i \\ -0.3536 + 0.3536i \end{matrix}$$

$$ans(:,:,6) = \begin{matrix} 0.5000 \\ -0.3536 + 0.3536i \\ -0.0000 - 0.5000i \\ 0.3536 + 0.3536i \end{matrix}$$

$$ans(:,:,7) = \begin{matrix} 0.5000 \\ -0.3536 - 0.3536i \\ 0.0000 + 0.5000i \\ 0.3536 - 0.3536i \end{matrix}$$

$$ans(:,:,8) = \begin{matrix} 0.5000 \\ 0.3536 - 0.3536i \\ -0.0000 - 0.5000i \\ -0.3536 - 0.3536i \end{matrix}$$

$$ans(:,:,9) = \begin{matrix} 0.4619 + 0.1913i \\ 0.4455 - 0.2270i \\ -0.1167 + 0.4862i \\ 0.2939 + 0.4045i \end{matrix}$$

$$ans(:,:,10) = \begin{matrix} -0.1913 + 0.4619i \\ 0.4455 - 0.2270i \\ 0.4862 + 0.1167i \\ -0.2939 - 0.4045i \end{matrix}$$

$$ans(:,:,11) = \begin{matrix} -0.4619 - 0.1913i \\ 0.4455 - 0.2270i \\ 0.1167 - 0.4862i \\ 0.2939 + 0.4045i \end{matrix}$$

$$ans(:,:,12) = \begin{matrix} 0.1913 - 0.4619i \\ 0.4455 - 0.2270i \\ -0.4862 - 0.1167i \\ -0.2939 - 0.4045i \end{matrix}$$

$$ans(:,:,13) = \begin{matrix} -0.5000 \\ 0.4985 - 0.0392i \\ 0.4938 - 0.0782i \\ -0.4862 + 0.1167i \end{matrix}$$

$$ans(:,:,14) = \begin{matrix} -0.5000 \\ 0.0392 + 0.4985i \\ -0.4938 + 0.0782i \\ 0.1167 + 0.4862i \end{matrix}$$

$$ans(:,:,15) = \begin{matrix} -0.5000 \\ -0.4985 + 0.0392i \\ 0.4938 - 0.0782i \\ 0.4862 - 0.1167i \end{matrix}$$

$$ans(:,:,16) = \begin{matrix} -0.5000 \\ -0.0392 - 0.4985i \\ -0.4938 + 0.0782i \\ -0.1167 - 0.4862i \end{matrix}$$

(2) 4-Bit Rank 2 Codebook:

$$ans(:,:,1) = \begin{matrix} 0.5000 & 0.5000 \\ 0.5000 & 0.0000 + 0.5000i \\ 0.5000 & -0.5000 + 0.0000i \\ 0.5000 & -0.0000 - 0.5000i \end{matrix}$$

$$ans(:,:,2) = \begin{matrix} 0.5000 & 0.5000 \\ 0.5000 & -0.5000 + 0.0000i \\ 0.5000 & 0.5000 - 0.0000i \\ 0.5000 & -0.5000 + 0.0000i \end{matrix}$$

$$ans(:,:,3) = \begin{matrix} 0.5000 & 0.5000 \\ 0.5000 & -0.0000 - 0.5000i \\ 0.5000 & -0.5000 + 0.0000i \\ 0.5000 & 0.0000 + 0.5000i \end{matrix}$$

$$ans(:,:,4) = \begin{matrix} 0.5000 & 0.5000 \\ 0.0000 + 0.5000i & -0.5000 + 0.0000i \\ -0.5000 + 0.0000i & 0.5000 - 0.0000i \\ -0.0000 - 0.5000i & -0.5000 + 0.0000i \end{matrix}$$

$$ans(:,:,5) = \begin{bmatrix} 0.5000 & 0.5000 \\ 0.0000 + 0.5000i & -0.0000 - 0.5000i \\ -0.5000 + 0.0000i & -0.5000 + 0.0000i \\ -0.0000 - 0.5000i & 0.0000 + 0.5000i \end{bmatrix}$$

$$ans(:,:,6) = \begin{bmatrix} 0.5000 & 0.5000 \\ -0.5000 + 0.0000i & -0.0000 - 0.5000i \\ 0.5000 - 0.0000i & -0.5000 + 0.0000i \\ -0.5000 + 0.0000i & 0.0000 + 0.5000i \end{bmatrix}$$

$$ans(:,:,7) = \begin{bmatrix} 0.5000 & 0.5000 \\ 0.3536 + 0.3536i & -0.3536 + 0.3536i \\ 0.0000 + 0.5000i & -0.0000 - 0.5000i \\ -0.3536 + 0.3536i & 0.3536 + 0.3536i \end{bmatrix}$$

$$ans(:,:,8) = \begin{bmatrix} 0.5000 & 0.5000 \\ 0.3536 + 0.3536i & -0.3536 - 0.3536i \\ 0.0000 + 0.5000i & 0.0000 + 0.5000i \\ -0.3536 + 0.3536i & 0.3536 - 0.3536i \end{bmatrix}$$

$$ans(:,:,9) = \begin{bmatrix} 0.5000 & 0.5000 \\ 0.3536 + 0.3536i & 0.3536 - 0.3536i \\ 0.0000 + 0.5000i & -0.0000 - 0.5000i \\ -0.3536 + 0.3536i & -0.3536 - 0.3536i \end{bmatrix}$$

$$ans(:,:,10) = \begin{bmatrix} 0.5000 & 0.5000 \\ -0.3536 + 0.3536i & -0.3536 - 0.3536i \\ -0.0000 - 0.5000i & 0.0000 + 0.5000i \\ 0.3536 + 0.3536i & 0.3536 - 0.3536i \end{bmatrix}$$

$$ans(:,:,11) = \begin{bmatrix} 0.5000 & 0.5000 \\ -0.3536 + 0.3536i & 0.3536 - 0.3536i \\ -0.0000 - 0.5000i & -0.0000 - 0.5000i \\ 0.3536 + 0.3536i & -0.3536 - 0.3536i \end{bmatrix}$$

$$ans(:,:,12) = \begin{bmatrix} 0.5000 & 0.5000 \\ -0.3536 - 0.3536i & 0.3536 - 0.3536i \\ 0.0000 + 0.5000i & -0.0000 + 0.5000i \\ 0.3536 - 0.3536i & -0.3536 - 0.3536i \end{bmatrix}$$

$$ans(:,:,13) = \begin{bmatrix} 0.4619 + 0.1913i & 0.1913 - 0.4619i \\ 0.4455 - 0.2270i & 0.4455 - 0.2270i \\ -0.1167 + 0.4862i & -0.4862 - 0.1167i \\ 0.2939 + 0.4045i & -0.2939 - 0.4045i \end{bmatrix}$$

$$ans(:,:,14) = \begin{bmatrix} -0.1913 + 0.4619i & -0.4619 - 0.1913i \\ 0.4455 - 0.2270i & 0.4455 - 0.2270i \\ 0.4862 + 0.1167i & 0.1167 - 0.4862i \\ -0.2939 - 0.4045i & 0.2939 + 0.4045i \end{bmatrix}$$

$$ans(:,:,15) = \begin{bmatrix} -0.5000 & -0.5000 \\ 0.4985 - 0.0392i & 0.0392 + 0.4985i \\ 0.4938 - 0.0782i & -0.4938 + 0.0782i \\ -0.4862 + 0.1167i & 0.1167 + 0.4862i \end{bmatrix}$$

$$ans(:,:,16) = \begin{bmatrix} -0.5000 & -0.5000 \\ 0.4985 - 0.0392i & -0.0392 - 0.4985i \\ 0.4938 - 0.0782i & -0.4938 + 0.0782i \\ -0.4862 + 0.1167i & -0.1167 - 0.4862i \end{bmatrix}$$

(3) 4-Bit Rank 3 Codebook:

$$ans(:,:,1) = \begin{bmatrix} 0.5000 & 0.5000 & 0.5000 \\ 0.5000 & 0.0000 + 0.5000i & -0.5000 + 0.0000i \\ 0.5000 & -0.5000 + 0.0000i & 0.5000 - 0.0000i \\ 0.5000 & -0.0000 - 0.5000i & -0.5000 + 0.0000i \end{bmatrix}$$

$$ans(:,:,2) = \begin{bmatrix} 0.5000 & 0.5000 & 0.5000 \\ 0.5000 & 0.0000 + 0.5000i & -0.0000 - 0.5000i \\ 0.5000 & -0.5000 + 0.0000i & -0.5000 + 0.0000i \\ 0.5000 & -0.0000 - 0.5000i & 0.0000 + 0.5000i \end{bmatrix}$$

$$ans(:,:,3) = \begin{bmatrix} 0.5000 & 0.5000 & 0.5000 \\ 0.5000 & -0.5000 + 0.0000i & -0.0000 - 0.5000i \\ 0.5000 & 0.5000 - 0.0000i & -0.5000 + 0.0000i \\ 0.5000 & -0.5000 + 0.0000i & 0.0000 + 0.5000i \end{bmatrix}$$

$$ans(:,:,4) = \begin{bmatrix} 0.5000 & 0.5000 & 0.5000 \\ 0.0000 + 0.5000i & -0.5000 + 0.0000i & -0.0000 - 0.5000i \\ -0.5000 + 0.0000i & 0.5000 - 0.0000i & -0.5000 + 0.0000i \\ -0.0000 - 0.5000i & -0.5000 + 0.0000i & 0.0000 + 0.5000i \end{bmatrix}$$

$ans(:,:,5) =$ $$\begin{bmatrix} 0.5000 & 0.5000 & 0.5000 \\ 0.3536 + 0.3536i & -0.3536 + 0.3536i & -0.3536 - 0.3536i \\ 0.0000 + 0.5000i & -0.0000 - 0.5000i & 0.0000 + 0.5000i \\ -0.3536 + 0.3536i & 0.3536 + 0.3536i & 0.3536 - 0.3536i \end{bmatrix}$$

$ans(:,:,6) =$ $$\begin{bmatrix} 0.5000 & 0.5000 & 0.5000 \\ 0.3536 + 0.3536i & -0.3536 + 0.3536i & 0.3536 - 0.3536i \\ 0.0000 + 0.5000i & -0.0000 - 0.5000i & -0.0000 - 0.5000i \\ -0.3536 + 0.3536i & 0.3536 + 0.3536i & -0.3536 - 0.3536i \end{bmatrix}$$

$ans(:,:,7) =$ $$\begin{bmatrix} 0.5000 & 0.5000 & 0.5000 \\ 0.3536 + 0.3536i & -0.3536 - 0.3536i & 0.3536 - 0.3536i \\ 0.0000 + 0.5000i & 0.0000 + 0.5000i & -0.0000 - 0.5000i \\ -0.3536 + 0.3536i & 0.3536 - 0.3536i & -0.3536 - 0.3536i \end{bmatrix}$$

$ans(:,:,8) =$ $$\begin{bmatrix} 0.5000 & 0.5000 & 0.5000 \\ -0.3536 + 0.3536i & -0.3536 - 0.3536i & 0.3536 - 0.3536i \\ -0.0000 - 0.5000i & 0.0000 + 0.5000i & -0.0000 - 0.5000i \\ 0.3536 + 0.3536i & 0.3536 - 0.3536i & -0.3536 - 0.3536i \end{bmatrix}$$

$ans(:, :, 9) =$ $$\begin{bmatrix} 0.4619 + 0.1913i & -0.1913 + 0.4619i & -0.4619 - 0.1913i \\ 0.4455 - 0.2270i & 0.4455 - 0.2270i & 0.4455 - 0.2270i \\ -0.1167 + 0.4862i & 0.4862 + 0.1167i & 0.1167 - 0.4862i \\ 0.2939 + 0.4045i & -0.2939 - 0.4045i & 0.2939 + 0.4045i \end{bmatrix}$$

$ans(:, :, 10) =$ $$\begin{bmatrix} 0.4619 + 0.1913i & -0.1913 + 0.4619i & 0.1913 - 0.4619i \\ 0.4455 - 0.2270i & 0.4455 - 0.2270i & 0.4455 - 0.2270i \\ -0.1167 + 0.4862i & 0.4862 + 0.1167i & -0.4862 - 0.1167i \\ 0.2939 + 0.4045i & -0.2939 - 0.4045i & -0.2939 - 0.4045i \end{bmatrix}$$

$ans(:, :, 11) =$ $$\begin{bmatrix} 0.4619 + 0.1913i & -0.4619 - 0.1913i & 0.1913 - 0.4619i \\ 0.4455 - 0.2270i & 0.4455 - 0.2270i & 0.4455 - 0.2270i \\ -0.1167 + 0.4862i & 0.1167 - 0.4862i & -0.4862 - 0.1167i \\ 0.2939 + 0.4045i & 0.2939 + 0.4045i & -0.2939 - 0.4045i \end{bmatrix}$$

$ans(:, :, 12) =$ $$\begin{bmatrix} -0.1913 + 0.4619i & -0.4619 - 0.1913i & 0.1913 - 0.4619i \\ 0.4455 - 0.2270i & 0.4455 - 0.2270i & 0.4455 - 0.2270i \\ 0.4862 + 0.1167i & 0.1167 - 0.4862i & -0.4862 - 0.1167i \\ -0.2939 - 0.4045i & 0.2939 + 0.4045i & -0.2939 - 0.4045i \end{bmatrix}$$

$ans(:, :, 13) =$ $$\begin{bmatrix} -0.5000 & -0.5000 & -0.5000 \\ 0.4985 - 0.0392i & 0.0392 + 0.4985i & -0.4985 + 0.0392i \\ 0.4938 - 0.0782i & -0.4938 + 0.0782i & 0.4938 - 0.0782i \\ -0.4862 + 0.1167i & 0.1167 + 0.4862i & 0.4862 - 0.1167i \end{bmatrix}$$

$ans(:, :, 14) =$ $$\begin{bmatrix} -0.5000 & -0.5000 & -0.5000 \\ 0.4985 - 0.0392i & 0.0392 + 0.4985i & -0.0392 - 0.4985i \\ 0.4938 - 0.0782i & -0.4938 + 0.0782i & -0.4938 + 0.0782i \\ -0.4862 + 0.1167i & 0.1167 + 0.4862i & -0.1167 - 0.4862i \end{bmatrix}$$

$ans(:, :, 15) =$ $$\begin{bmatrix} -0.5000 & -0.5000 & -0.5000 \\ 0.4985 - 0.0392i & -0.4985 + 0.0392i & -0.0392 - 0.4985i \\ 0.4938 - 0.0782i & 0.4938 - 0.0782i & -0.4938 + 0.0782i \\ -0.4862 + 0.1167i & 0.4862 - 0.1167i & -0.1167 - 0.4862i \end{bmatrix}$$

$ans(:, :, 16) =$ $$\begin{bmatrix} -0.5000 & -0.5000 & -0.5000 \\ 0.0392 + 0.4985i & -0.4985 + 0.0392i & -0.0392 - 0.4985i \\ -0.4938 - 0.0782i & 0.4938 - 0.0782i & -0.4938 + 0.0782i \\ 0.1167 + 0.4862i & 0.4862 - 0.1167i & -0.1167 - 0.4862i \end{bmatrix}$$

(4) 4-Bit Rank 4 Codebook:

$$ans(:, :, 1) = \begin{bmatrix} 0.5000 & 0.5000 & 0.5000 & 0.5000 \\ 0.5000 & 0.0000 + 0.5000i & -0.5000 + 0.0000i & -0.0000 - 0.5000i \\ 0.5000 & -0.5000 + 0.0000i & 0.5000 - 0.0000i & -0.5000 + 0.0000i \\ 0.5000 & -0.0000 - 0.5000i & -0.5000 + 0.0000i & 0.0000 + 0.5000i \end{bmatrix}$$

$ans(:, :, 2) =$ $$\begin{bmatrix} 0.5000 & 0.5000 & 0.5000 & 0.5000 \\ 0.3536 + 0.3536i & -0.3536 + 0.3536i & -0.3536 - 0.3536i & 0.3536 - 0.3536i \\ 0.0000 + 0.5000i & -0.0000 - 0.5000i & 0.0000 + 0.5000i & -0.0000 - 0.5000i \\ -0.3536 + 0.3536i & 0.3536 + 0.3536i & 0.3536 - 0.3536i & -0.3536 - 0.3536i \end{bmatrix}$$

$ans(:, :, 3) =$ $$\begin{bmatrix} 0.4619 + 0.1913i & -0.1913 + 0.4619i & -0.4619 - 0.1913i & 0.1913 - 0.4619i \\ 0.4455 - 0.2270i & 0.4455 - 0.2270i & 0.4455 - 0.2270i & 0.4455 - 0.2270i \\ -0.1167 + 0.4862i & 0.4862 + 0.1167i & 0.1167 - 0.4862i & -0.4862 - 0.1167i \\ 0.2939 + 0.4045i & -0.2939 - 0.4045i & 0.2939 + 0.4045i & -0.2939 - 0.4045i \end{bmatrix}$$

$ans(:, :, 4) =$ $$\begin{bmatrix} -0.5000 & -0.5000 & -0.5000 & -0.5000 \\ 0.4985 - 0.0392i & 0.0392 + 0.4985i & -0.4985 + 0.0392i & -0.0392 - 0.4985i \\ 0.4938 - 0.0782i & -0.4938 + 0.0782i & 0.4938 - 0.0782i & -0.4938 + 0.0782i \\ -0.4862 + 0.1167i & 0.1167 + 0.4862i & 0.4862 - 0.1167i & -0.1167 - 0.4862i \end{bmatrix}$$

Figure 3:
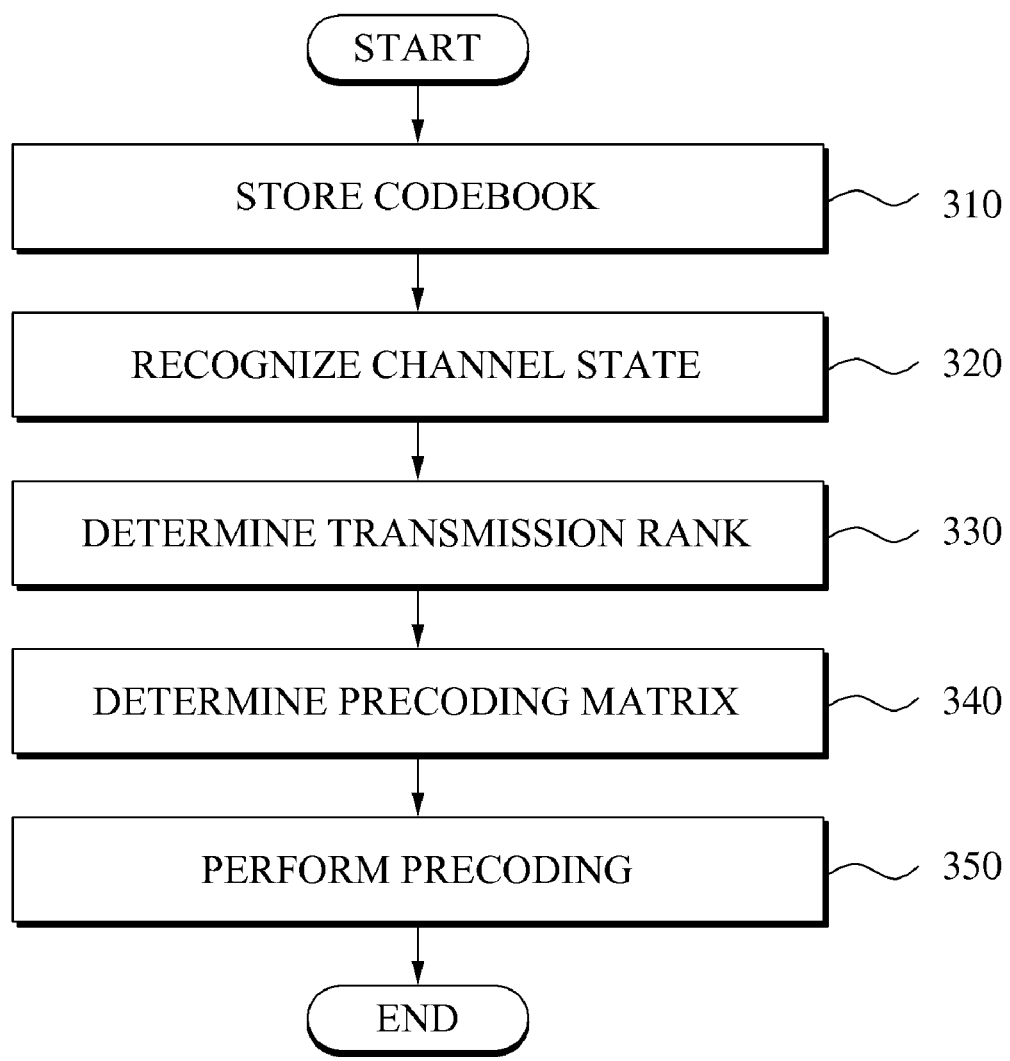
FIG. 3 is a flowchart illustrating an exemplary MIMO communication method.

FIG. 3 is a flowchart illustrating an exemplary MIMO communication method. The exemplary method may be performed by a base station and/or a terminal in a MIMO communication network. In 310, the method comprises storing a codebook in memory. In 320, the method recognizes a channel state of the MIMO communication network. In 330, the method determines a transmission rank. In 340, the method comprises determining a precoding matrix. And in 350, the method comprises performing precoding.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable instructions or codes may be stored and executed in a decentralized manner.

Figure 4:
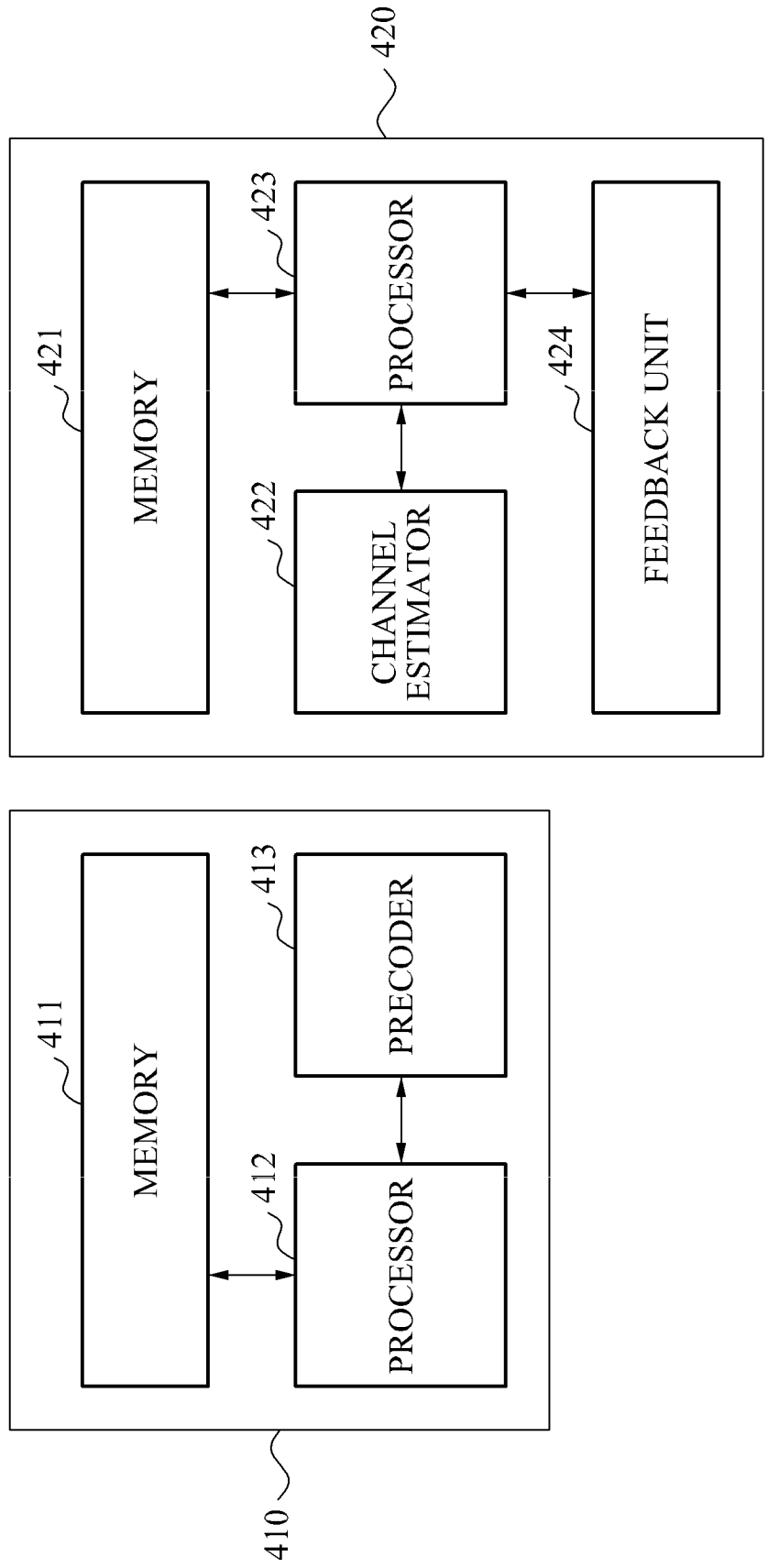
FIG. 4 is a block diagram illustrating an exemplary base station and an exemplary terminal.

FIG. 4 illustrates a configuration of a base station 410 and a terminal 420.

The base station 410 includes a memory 411, a processor 412, and a precoder 413. The terminal 420 includes a memory 421, a channel estimator 422, a processor 423, and a feedback unit 424.

The aforementioned codebooks may be stored in the memory 411 of the base station 410 and/or the memory 421 of the terminal 420. For example, any of the codebooks described herein may be stored in the memory 411 of the base station 410 and/or the memory 421 of the terminal 420.

The channel estimator 422 may estimate a channel between the base station 410 and the terminal 420. The processor 423 may select a preferred codeword matrix from the codebook stored in the memory 421, based on the estimated channel, and generate feedback data associated with the preferred codeword matrix. The feedback unit 424 may feed back the feedback data to the base station 410.

The base station 410 may receive the feedback data. The processor 412 may verify the preferred codeword matrix using the codebook stored in the memory 411. The precoder 413 may precode at least one data stream using the determined precoding matrix.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal in a multiple input multiple output (MIMO) communication system, the terminal comprising:
   a memory configured to store a 6-bit codebook comprising 64 codeword matrices;
   a channel estimator configured to estimate a channel formed between a base station and the terminal;
   a processor configured to select a preferred codeword vector from the codebook stored in the memory; and
   a feedback unit configured to feed back feedback data associated with the preferred codeword vector to the base station, wherein the 6-bit codebook comprises columns 1 through 64:

| columns 1 through 4 | | |
|---|---|---|
| 0.5000 | 0.3260 + 0.6774i | 0.1499 + 0.0347i |
| 0.5000 | 0.3254 + 0.1709i | 0.5009 + 0.3071i |
| 0.5000 | 0.3254 + 0.1709i | 0.1505 + 0.5412i |
| 0.5000 | −0.0250 + 0.4051i | 0.1505 + 0.5412i |
| | 0.5000 | 0.0918 + 0.3270i |
| | 0.5000 | 0.1311 + 0.6387i |
| | 0.5000 | 0.2473 + 0.0541i |
| | 0.5000 | 0.4815 + 0.4045i |

| columns 5 through 8 | | |
|---|---|---|
| 0.5000 | 0.0918 + 0.3270i | 0.3841 + 0.3851i |
| −0.5000 | −0.1311 − 0.6387i | 0.0056 − 0.3076i |
| 0.5000 | 0.2473 + 0.0541i | 0.2285 + 0.6580i |
| −0.5000 | −0.4815 − 0.4045i | −0.3448 − 0.0735i |
| | 0.5000 | 0.3260 + 0.6774i |
| | −0.5000 | −0.3254 − 0.1709i |
| | 0.5000 | 0.3254 + 0.1709i |
| | −0.5000 | 0.0250 − 0.4051i |

| columns 9 through 12 | | |
|---|---|---|
| −0.5000 | −0.0918 − 0.3270i | −0.0337 − 0.6193i |
| −0.5000 | −0.2473 − 0.0541i | −0.4621 − 0.5019i |
| 0.5000 | 0.1311 + 0.6387i | 0.2280 + 0.1515i |
| 0.5000 | 0.4815 + 0.4045i | 0.2280 + 0.1515i |
| | −0.5000 | −0.4422 − 0.0928i |
| | −0.5000 | −0.2479 − 0.5606i |
| | 0.5000 | 0.2479 + 0.5606i |
| | 0.5000 | 0.0137 + 0.2102i |

| columns 13 through 16 | | |
|---|---|---|
| −0.5000 | −0.4422 − 0.0928i | −0.3841 − 0.3851i |
| 0.5000 | 0.2479 + 0.5606i | −0.0056 + 0.3076i |
| 0.5000 | 0.2479 + 0.5606i | 0.3448 + 0.0735i |
| −0.5000 | −0.0137 − 0.2102i | −0.2285 − 0.6580i |
| | −0.5000 | −0.0918 − 0.3270i |
| | 0.5000 | 0.2473 + 0.0541i |
| | 0.5000 | 0.1311 + 0.6387i |
| | −0.5000 | −0.4815 − 0.4045i |

| columns 17 through 20 | | |
|---|---|---|
| 0.5000 | 0.3841 + 0.3851i | 0.0918 + 0.3270i |
| 0 + 0.5000i | −0.3076 − 0.0056i | −0.0541 + 0.2473i |
| 0.5000 | 0.3448 + 0.0735i | 0.1311 + 0.6387i |
| 0 + 0.5000i | −0.6580 + 0.2285i | −0.4045 + 0.4815i |

-continued

|  |  |
|---|---|
| 0.5000 | 0.0337 + 0.6193i |
| 0 + 0.5000i | −0.5019 + 0.4621i |
| 0.5000 | 0.2280 + 0.1515i |
| 0 + 0.5000i | −0.1515 + 0.2280i | columns 21 through 24

| 0.5000 | 0.0337 + 0.6193i | 0.4422 + 0.0928i |
|---|---|---|
| 0 − 0.5000i | 0.5019 − 0.4621i | 0.5606 − 0.2479i |
| 0.5000 | 0.2280 + 0.1515i | 0.2479 + 0.5606i |
| 0 − 0.5000i | 0.1515 − 0.2280i | 0.2102 − 0.0137i |

|  |  |
|---|---|
| 0.5000 | 0.3841 + 0.3851i |
| 0 − 0.5000i | 0.3076 + 0.0056i |
| 0.5000 | 0.3448 + 0.0735i |
| 0 − 0.5000i | 0.6580 − 0.2285i | columns 25 through 28

| −0.5000 | −0.3841 − 0.3851i | −0.3260 − 0.6774i |
|---|---|---|
| 0 − 0.5000i | 0.3076 + 0.0056i | 0.1709 − 0.3254i |
| 0.5000 | 0.2285 + 0.6580i | 0.3254 + 0.1709i |
| 0 + 0.5000i | −0.0735 + 0.3448i | −0.4051 − 0.0250i |

|  |  |
|---|---|
| −0.5000 | −0.1499 − 0.0347i |
| 0 − 0.5000i | 0.3071 − 0.5009i |
| 0.5000 | 0.1505 + 0.5412i |
| 0 + 0.5000i | −0.5412 + 0.1505i | columns 29 through 32

| −0.5000 | −0.1499 − 0.0347i | −0.0918 − 0.3270i |
|---|---|---|
| 0 + 0.5000i | −0.3071 + 0.5009i | −0.6387 + 0.1311i |
| 0.5000 | 0.1505 + 0.5412i | 0.2473 + 0.0541i |
| 0 − 0.5000i | 0.5412 − 0.1505i | 0.4045 − 0.4815i |

|  |  |
|---|---|
| −0.5000 | −0.3841 − 0.3851i |
| 0 + 0.5000i | −0.3076 − 0.0056i |
| 0.5000 | 0.2285 + 0.6580i |
| 0 − 0.5000i | 0.0735 − 0.3448i | columns 33 through 36

| 0.5000 | 0.0337 + 0.6193i | 0.0918 + 0.3270i |
|---|---|---|
| 0.5000 | 0.2280 + 0.1515i | 0.4815 + 0.4045i |
| 0.5000 | 0.2280 + 0.1515i | 0.1311 + 0.6387i |
| −0.5000 | −0.4621 − 0.5019i | −0.2473 − 0.0541i |

|  |  |
|---|---|
| 0.5000 | 0.3841 + 0.3851i |
| 0.5000 | 0.2285 + 0.6580i |
| 0.5000 | 0.3448 + 0.0735i |
| −0.5000 | 0.0056 − 0.3076i | columns 37 through 40

| 0.5000 | 0.4422 + 0.0928i | 0.0337 + 0.6193i |
|---|---|---|
| 0 + 0.5000i | −0.2102 + 0.0137i | −0.1515 + 0.2280i |
| −0.5000 | −0.2479 − 0.5606i | −0.2280 − 0.1515i |
| 0 + 0.5000i | −0.5606 + 0.2479i | −0.5019 + 0.4621i |

|  |  |
|---|---|
| 0.5000 | 0.0918 + 0.3270i |
| 0 + 0.5000i | −0.4045 + 0.4815i |
| −0.5000 | −0.1311 − 0.6387i |
| 0 + 0.5000i | −0.0541 + 0.2473i | columns 41 through 44

| 0.5000 | 0.3841 + 0.3851i | 0.4422 + 0.0928i |
|---|---|---|
| −0.5000 | −0.2285 − 0.6580i | −0.0137 − 0.2102i |
| 0.5000 | 0.3448 + 0.0735i | 0.2479 + 0.5606i |
| 0.5000 | −0.0056 + 0.3076i | 0.2479 + 0.5606i |

|  |  |
|---|---|
| 0.5000 | 0.0337 + 0.6193i |
| −0.5000 | −0.2280 − 0.1515i |

|  |  |
|---|---|
| 0.5000 | 0.2280 + 0.1515i |
| 0.5000 | 0.4621 + 0.5019i | columns 45 through 48

| 0.5000 | 0.0918 + 0.3270i | 0.3841 + 0.3851i |
|---|---|---|
| 0 − 0.5000i | 0.4045 − 0.4815i | 0.6580 − 0.2285i |
| −0.5000 | −0.1311 − 0.6387i | −0.3448 − 0.0735i |
| 0 − 0.5000i | 0.0541 − 0.2473i | 0.3076 + 0.0056i |

|  |  |
|---|---|
| 0.5000 | 0.4422 + 0.0928i |
| 0 − 0.5000i | 0.2102 − 0.0137i |
| −0.5000 | −0.2479 − 0.5606i |
| 0 − 0.5000i | 0.5606 − 0.2479i | columns 49 through 52

| 0.5000 | 0.3841 + 0.3851i | −0.1560 + 0.4926i |
|---|---|---|
| 0.3536 + 0.3536i | 0.0022 + 0.1690i | 0.0837 + 0.4175i |
| 0 + 0.5000i | −0.3076 − 0.0056i | −0.4597 + 0.3989i |
| −0.3536 + 0.3536i | −0.7536 − 0.1140i | −0.4175 + 0.0837i |

|  |  |
|---|---|
| 0.5000 | 0.3841 + 0.3851i |
| 0.3536 + 0.3536i | −0.1140 + 0.7536i |
| 0 + 0.5000i | −0.3076 − 0.0056i |
| −0.3536 + 0.3536i | −0.1690 + 0.0022i | columns 53 through 56

| 0.5000 | 0.3396 + 0.1614i | 0.3841 + 0.3851i |
|---|---|---|
| −0.3536 + 0.3536i | −0.3400 − 0.3060i | −0.1690 + 0.0022i |
| 0 − 0.5000i | 0.3493 − 0.5641i | 0.3076 + 0.0056i |
| 0.3536 + 0.3536i | −0.3060 + 0.3400i | −0.1140 + 0.7536i |

|  |  |
|---|---|
| 0.5000 | −0.1560 + 0.4926i |
| −0.3536 + 0.3536i | −0.4175 + 0.0837i |
| 0 − 0.5000i | 0.4597 − 0.3989i |
| 0.3536 + 0.3536i | 0.0837 + 0.4175i | columns 57 through 60

| 0.5000 | 0.3841 + 0.3851i | 0.3396 + 0.1614i |
|---|---|---|
| −0.3536 − 0.3536i | 0.1140 − 0.7536i | 0.3060 − 0.3400i |
| 0 + 0.5000i | −0.3076 − 0.0056i | −0.3493 + 0.5641i |
| 0.3536 − 0.3536i | 0.1690 − 0.0022i | 0.3400 + 0.3060i |

|  |  |
|---|---|
| 0.5000 | 0.3841 + 0.3851i |
| −0.3536 − 0.3536i | −0.0022 − 0.1690i |
| 0 + 0.5000i | −0.3076 − 0.0056i |
| 0.3536 − 0.3536i | 0.7536 + 0.1140i | columns 61 through 64

| 0.5000 | −0.1560 + 0.4926i | 0.3841 + 0.3851i |
|---|---|---|
| 0.3536 − 0.3536i | 0.4175 − 0.0837i | 0.7536 + 0.1140i |
| 0 − 0.5000i | 0.4597 − 0.3989i | 0.3076 + 0.0056i |
| −0.3536 − 0.3536i | −0.0837 − 0.4175i | −0.0022 − 0.1690i |

|  |  |
|---|---|
| 0.5000 | 0.3396 + 0.1614i |
| 0.3536 − 0.3536i | 0.3400 + 0.3060i |
| 0 − 0.5000i | 0.3493 − 0.5641i |
| −0.3536 − 0.3536i | 0.3060 − 0.3400i. |

2. A terminal in a multiple input multiple output (MIMO) communication system, the terminal comprising:

a memory configured to store a 6-bit codebook comprising 64 codeword matrices;

a channel estimator configured to estimate a channel formed between a base station and the terminal;

a processor configured to select a preferred codeword vector from the codebook stored in the memory; and a feedback unit configured to feed back feedback data associated with the preferred codeword vector to the base station, wherein the 6-bit codebook comprises columns 1 through 64:

| columns 1 through 4 | | | |
|---|---|---|---|
| 0.5000 | 0.3049 + 0.6229i | 0.1779 + 0.0995i | 0.0191 + 0.3371i |
| 0.5000 | 0.2626 + 0.1626i | 0.5060 + 0.2740i | 0.1673 + 0.6390i |
| 0.5000 | 0.4213 + 0.2108i | 0.0614 + 0.5116i | 0.3261 + 0.1156i |
| 0.5000 | −0.0232 + 0.4484i | 0.2202 + 0.5598i | 0.4531 + 0.3532i |
| columns 5 through 8 | | | |
| 0.5000 | 0.0191 + 0.3371i | 0.4637 + 0.3853i | 0.3049 + 0.6229i |
| −0.5000 | −0.1673 − 0.6390i | −0.0297 − 0.3692i | −0.2626 − 0.1626i |
| 0.5000 | 0.3261 + 0.1156i | 0.1567 + 0.6069i | 0.4213 + 0.2108i |
| −0.5000 | −0.4531 − 0.3532i | −0.3155 − 0.0834i | 0.0232 − 0.4484i |
| columns 9 through 12 | | | |
| −0.5000 | −0.1779 − 0.3853i | −0.0191 − 0.6229i | −0.4637 − 0.0995i |
| −0.5000 | −0.2202 − 0.0834i | −0.4531 − 0.4484i | −0.3155 − 0.5598i |
| 0.5000 | 0.0614 + 0.6069i | 0.3261 + 0.2108i | 0.1567 + 0.5116i |
| 0.5000 | 0.5060 + 0.3692i | 0.1673 + 0.1626i | 0.0297 + 0.2740i |
| columns 13 through 16 | | | |
| −0.5000 | −0.4637 − 0.0995i | −0.3049 − 0.3371i | −0.1779 − 0.3853i |
| 0.5000 | 0.3155 + 0.5598i | −0.0232 + 0.3532i | 0.2202 + 0.0834i |
| 0.5000 | 0.1567 + 0.5116i | 0.4213 + 0.1156i | 0.0614 + 0.6069i |
| −0.5000 | −0.0297 − 0.2740i | −0.2626 − 0.6390i | −0.5060 − 0.3692i |
| columns 17 through 20 | | | |
| 0.5000 | 0.3049 + 0.3371i | 0.1779 + 0.3853i | 0.0191 + 0.6229i |
| 0 + 0.5000i | −0.3532 − 0.0232i | −0.0834 + 0.2202i | −0.4484 + 0.4531i |
| 0.5000 | 0.4213 + 0.1156i | 0.0614 + 0.6069i | 0.3261 + 0.2108i |
| 0 + 0.5000i | −0.6390 + 0.2626i | −0.3692 − 0.5060i | −0.1626 + 0.1673i |
| columns 21 through 24 | | | |
| 0.5000 | 0.0191 + 0.6229i | 0.4637 + 0.0995i | 0.3049 + 0.3371i |
| 0 − 0.5000i | 0.4484 − 0.4531i | 0.5598 − 0.3155i | 0.3532 + 0.0232i |
| 0.5000 | 0.3261 + 0.2108i | 0.1567 + 0.5116i | 0.4213 + 0.1156i |
| 0 − 0.5000i | 0.1626 − 0.1673i | 0.2740 − 0.0297i | 0.6390 − 0.2626i |
| columns 25 through 28 | | | |
| −0.5000 | −0.4637 − 0.3853i | −0.3049 − 0.6229i | −0.1779 − 0.0995i |
| 0 − 0.5000i | 0.3692 − 0.0297i | 0.1626 − 0.2626i | 0.2740 − 0.5060i |
| 0.5000 | 0.1567 + 0.6069i | 0.4213 + 0.2108i | 0.0614 + 0.5116i |
| 0 + 0.5000i | −0.0834 + 0.3155i | −0.4484 − 0.0232i | −0.5598 + 0.2202i |
| columns 29 through 32 | | | |
| −0.5000 | −0.1779 − 0.0995i | −0.0191 − 0.3371i | −0.4637 − 0.3853i |
| 0 + 0.5000i | −0.2740 + 0.5060i | −0.6390 + 0.1673i | −0.3692 + 0.0297i |
| 0.5000 | 0.0614 + 0.5116i | 0.3261 + 0.1156i | 0.1567 + 0.6069i |
| 0 − 0.5000i | 0.5598 − 0.2202i | 0.3532 − 0.4531i | 0.0834 − 0.3155i |
| columns 33 through 36 | | | |
| 0.5000 | 0.0191 + 0.6229i | 0.1779 + 0.3853i | 0.3049 + 0.3371i |
| 0.5000 | 0.1673 + 0.1626i | 0.5060 + 0.3692i | 0.2626 + 0.6390i |
| 0.5000 | 0.3261 + 0.2108i | 0.0614 + 0.6069i | 0.4213 + 0.1156i |
| −0.5000 | −0.4531 − 0.4484i | −0.2202 − 0.0834i | 0.0232 − 0.3532i |
| columns 37 through 40 | | | |
| 0.5000 | 0.4637 + 0.0995i | 0.0191 + 0.6229i | 0.1779 + 0.3853i |
| 0 + 0.5000i | −0.2740 + 0.0297i | −0.1626 + 0.1673i | −0.3692 + 0.5060i |
| −0.5000 | −0.1567 − 0.5116i | −0.3261 − 0.2108i | −0.0614 − 0.6069i |
| 0 + 0.5000i | −0.5598 + 0.3155i | −0.4484 + 0.4531i | −0.0834 + 0.2202i |
| columns 41 through 44 | | | |
| 0.5000 | 0.3049 + 0.3371i | 0.4637 + 0.0995i | 0.0191 + 0.6229i |
| −0.5000 | −0.2626 − 0.6390i | −0.0297 − 0.2740i | −0.1673 − 0.1626i |
| 0.5000 | 0.4213 + 0.1156i | 0.1567 + 0.5116i | 0.3261 + 0.2108i |
| 0.5000 | −0.0232 + 0.3532i | 0.3155 + 0.5598i | 0.4531 + 0.4484i |
| columns 45 through 48 | | | |
| 0.5000 | 0.1779 + 0.3853i | 0.3049 + 0.3371i | 0.4637 + 0.0995i |
| 0 − 0.5000i | 0.3692 − 0.5060i | 0.6390 − 0.2626i | 0.2740 − 0.0297i |
| −0.5000 | −0.0614 − 0.6069i | −0.4213 − 0.1156i | −0.1567 − 0.5116i |
| 0 − 0.5000i | 0.0834 − 0.2202i | 0.3532 + 0.0232i | 0.5598 − 0.3155i |
| columns 49 through 52 | | | |
| 0.5000 | 0.3602 + 0.4406i | −0.0795 + 0.4839i | 0.3602 + 0.4406i |
| 0.3536 + 0.3536i | −0.0754 + 0.1870i | 0.0965 + 0.3794i | −0.0754 + 0.7586i |
| 0 + 0.5000i | −0.2289 + 0.0434i | −0.5609 + 0.3720i | −0.2289 + 0.0434i |
| −0.3536 + 0.3536i | −0.7586 − 0.0754i | −0.3794 + 0.0965i | −0.1870 − 0.0754i |

-continued

| columns 53 through 56 | | | |
|---|---|---|---|
| 0.5000 | 0.3247 + 0.0797i | 0.3602 + 0.4406i | −0.0795 + 0.4839i |
| −0.3536 + 0.3536i | −0.3794 − 0.2846i | −0.1870 − 0.0754i | −0.3794 + 0.0965i |
| 0 − 0.5000i | 0.4262 − 0.5068i | 0.2289 − 0.0434i | 0.5609 − 0.3720i |
| 0.3536 + 0.3536i | −0.2846 + 0.3794i | −0.0754 + 0.7586i | 0.0965 + 0.3794i |
| columns 57 through 60 | | | |
| 0.5000 | 0.3602 + 0.4406i | 0.3247 + 0.0797i | 0.3602 + 0.4406i |
| −0.3536 − 0.3536i | 0.0754 − 0.7586i | 0.2846 − 0.3794i | 0.0754 − 0.1870i |
| 0 + 0.5000i | −0.2289 + 0.0434i | −0.4262 + 0.5068i | −0.2289 + 0.0434i |
| 0.3536 − 0.3536i | 0.1870 + 0.0754i | 0.3794 + 0.2846i | 0.7586 + 0.0754i |
| columns 61 through 64 | | | |
| 0.5000 | −0.0795 + 0.4839i | 0.3602 + 0.4406i | 0.3247 + 0.0797i |
| 0.3536 − 0.3536i | 0.3794 − 0.0965i | 0.7586 + 0.0754i | 0.3794 + 0.2846i |
| 0 − 0.5000i | 0.5609 − 0.3720i | 0.2289 − 0.0434i | 0.4262 − 0.5068i |
| −0.3536 − 0.3536i | −0.0965 − 0.3794i | 0.0754 − 0.1870i | 0.2846 − 0.3794i. |

3. A base station in a multiple input multiple output (MIMO) communication system, the base station comprising:

a memory configured to store a 6-bit codebook comprising 64 codeword matrices;

a processor configured to verify a preferred codeword vector of a terminal from the codebook stored in the memory; and a precoder configured to precode at least one data stream using a precoding matrix corresponding to the preferred codeword vector, wherein the 6-bit codebook comprises columns 1 through 64:

| columns 1 through 4 | | | |
|---|---|---|---|
| 0.5000 | 0.3260 + 0.6774i | 0.1499 + 0.0347i | 0.0918 + 0.3270i |
| 0.5000 | 0.3254 + 0.1709i | 0.5009 + 0.3071i | 0.1311 + 0.6387i |
| 0.5000 | 0.3254 + 0.1709i | 0.1505 + 0.5412i | 0.2473 + 0.0541i |
| 0.5000 | −0.0250 + 0.4051i | 0.1505 + 0.5412i | 0.4815 + 0.4045i |
| columns 5 through 8 | | | |
| 0.5000 | 0.0918 + 0.3270i | 0.3841 + 0.3851i | 0.3260 + 0.6774i |
| −0.5000 | −0.1311 − 0.6387i | 0.0056 − 0.3076i | −0.3254 − 0.1709i |
| 0.5000 | 0.2473 + 0.0541i | 0.2285 + 0.6580i | 0.3254 + 0.1709i |
| −0.5000 | −0.4815 − 0.4045i | −0.3448 − 0.0735i | 0.0250 − 0.4051i |
| columns 9 through 12 | | | |
| −0.5000 | −0.0918 − 0.3270i | −0.0337 − 0.6193i | −0.4422 − 0.0928i |
| −0.5000 | −0.2473 − 0.0541i | −0.4621 − 0.5019i | −0.2479 − 0.5606i |
| 0.5000 | 0.1311 + 0.6387i | 0.2280 + 0.1515i | 0.2479 + 0.5606i |
| 0.5000 | 0.4815 + 0.4045i | 0.2280 + 0.1515i | 0.0137 + 0.2102i |
| columns 13 through 16 | | | |
| −0.5000 | −0.4422 − 0.0928i | −0.3841 − 0.3851i | −0.0918 − 0.3270i |
| 0.5000 | 0.2479 + 0.5606i | −0.0056 + 0.3076i | 0.2473 + 0.0541i |
| 0.5000 | 0.2479 + 0.5606i | 0.3448 + 0.0735i | 0.1311 + 0.6387i |
| −0.5000 | −0.0137 − 0.2102i | −0.2285 − 0.6580i | −0.4815 − 0.4045i |
| columns 17 through 20 | | | |
| 0.5000 | 0.3841 + 0.3851i | 0.0918 + 0.3270i | 0.0337 + 0.6193i |
| 0 + 0.5000i | −0.3076 − 0.0056i | −0.0541 + 0.2473i | −0.5019 + 0.4621i |
| 0.5000 | 0.3448 + 0.0735i | 0.1311 + 0.6387i | 0.2280 + 0.1515i |
| 0 + 0.5000i | −0.6580 + 0.2285i | −0.4045 + 0.4815i | −0.1515 + 0.2280i |
| columns 21 through 24 | | | |
| 0.5000 | 0.0337 + 0.6193i | 0.4422 + 0.0928i | 0.3841 + 0.3851i |
| 0 − 0.5000i | 0.5019 − 0.4621i | 0.5606 − 0.2479i | 0.3076 + 0.0056i |
| 0.5000 | 0.2280 + 0.1515i | 0.2479 + 0.5606i | 0.3448 + 0.0735i |
| 0 − 0.5000i | 0.1515 − 0.2280i | 0.2102 − 0.0137i | 0.6580 − 0.2285i |
| columns 25 through 28 | | | |
| −0.5000 | −0.3841 − 0.3851i | − 0.3260 − 0.6774i | −0.1499 − 0.0347i |
| 0 − 0.5000i | 0.3076 + 0.0056i | 0.1709 − 0.3254i | 0.3071 − 0.5009i |
| 0.5000 | 0.2285 + 0.6580i | 0.3254 + 0.1709i | 0.1505 + 0.5412i |
| 0 + 0.5000i | −0.0735 + 0.3448i | −0.4051 − 0.0250i | −0.5412 + 0.1505i |

| columns 29 through 32 | | | |
|---|---|---|---|
| −0.5000 | −0.1499 − 0.0347i | −0.0918 − 0.3270i | −0.3841 − 0.3851i |
| 0 + 0.5000i | −0.3071 + 0.5009i | −0.6387 + 0.1311i | −0.3076 − 0.0056i |
| 0.5000 | 0.1505 + 0.5412i | 0.2473 + 0.0541i | 0.2285 + 0.6580i |
| 0 − 0.5000i | 0.5412 − 0.1505i | 0.4045 − 0.4815i | 0.0735 − 0.3448i |
| columns 33 through 36 | | | |
| 0.5000 | 0.0337 + 0.6193i | 0.0918 + 0.3270i | 0.3841 + 0.3851i |
| 0.5000 | 0.2280 + 0.1515i | 0.4815 + 0.4045i | 0.2285 + 0.6580i |
| 0.5000 | 0.2280 + 0.1515i | 0.1311 + 0.6387i | 0.3448 + 0.0735i |
| −0.5000 | −0.4621 − 0.5019i | −0.2473 − 0.0541i | 0.0056 − 0.3076i |
| columns 37 through 40 | | | |
| 0.5000 | 0.4422 + 0.0928i | 0.0337 + 0.6193i | 0.0918 + 0.3270i |
| 0 + 0.5000i | −0.2102 + 0.0137i | −0.1515 + 0.2280i | −0.4045 + 0.4815i |
| −0.5000 | −0.2479 − 0.5606i | −0.2280 − 0.1515i | −0.1311 − 0.6387i |
| 0 + 0.5000i | −0.5606 + 0.2479i | −0.5019 + 0.4621i | −0.0541 + 0.2473i |
| columns 41 through 44 | | | |
| 0.5000 | 0.3841 + 0.3851i | 0.4422 + 0.0928i | 0.0337 + 0.6193i |
| −0.5000 | −0.2285 − 0.6580i | −0.0137 − 0.2102i | −0.2280 − 0.1515i |
| 0.5000 | 0.3448 + 0.0735i | 0.2479 + 0.5606i | 0.2280 + 0.1515i |
| 0.5000 | −0.0056 + 0.3076i | 0.2479 + 0.5606i | 0.4621 + 0.5019i |
| columns 45 through 48 | | | |
| 0.5000 | 0.0918 + 0.3270i | 0.3841 + 0.3851i | 0.4422 + 0.0928i |
| 0 − 0.5000i | 0.4045 − 0.4815i | 0.6580 − 0.2285i | 0.2102 − 0.0137i |
| −0.5000 | −0.1311 − 0.6387i | −0.3448 − 0.0735i | −0.2479 − 0.5606i |
| 0 − 0.5000i | 0.0541 − 0.2473i | 0.3076 + 0.0056i | 0.5606 − 0.2479i |
| columns 49 through 52 | | | |
| 0.5000 | 0.3841 + 0.3851i | −0.1560 + 0.4926i | 0.3841 + 0.3851i |
| 0.3536 + 0.3536i | 0.0022 + 0.1690i | 0.0837 + 0.4175i | −0.1140 + 0.7536i |
| 0 + 0.5000i | −0.3076 − 0.0056i | −0.4597 + 0.3989i | −0.3076 − 0.0056i |
| −0.3536 + 0.3536i | −0.7536 − 0.1140i | −0.4175 + 0.0837i | −0.1690 + 0.0022i |
| columns 53 through 56 | | | |
| 0.5000 | 0.3396 + 0.1614i | 0.3841 + 0.3851i | −0.1560 + 0.4926i |
| −0.3536 + 0.3536i | −0.3400 − 0.3060i | −0.1690 + 0.0022i | −0.4175 + 0.0837i |
| 0 − 0.5000i | 0.3493 − 0.5641i | 0.3076 + 0.0056i | 0.4597 − 0.3989i |
| 0.3536 + 0.3536i | −0.3060 + 0.3400i | −0.1140 + 0.7536i | 0.0837 + 0.4175i |
| columns 57 through 60 | | | |
| 0.5000 | 0.3841 + 0.3851i | 0.3396 + 0.1614i | 0.3841 + 0.3851i |
| −0.3536 − 0.3536i | 0.1140 − 0.7536i | 0.3060 − 0.3400i | −0.0022 − 0.1690i |
| 0 + 0.5000i | −0.3076 − 0.0056i | −0.3493 + 0.5641i | −0.3076 − 0.0056i |
| 0.3536 − 0.3536i | 0.1690 − 0.0022i | 0.3400 + 0.3060i | 0.7536 + 0.1140i |
| columns 61 through 64 | | | |
| 0.5000 | −0.1560 + 0.4926i | 0.3841 + 0.3851i | 0.3396 + 0.1614i |
| 0.3536 − 0.3536i | 0.4175 − 0.0837i | 0.7536 + 0.1140i | 0.3400 + 0.3060i |
| 0 − 0.5000i | 0.4597 − 0.3989i | 0.3076 + 0.0056i | 0.3493 − 0.5641i |
| −0.3536 − 0.3536i | −0.0837 − 0.4175i | −0.0022 − 0.1690i | 0.3060 − 0.3400i. |

4. A base station in a multiple input multiple output (MIMO) communication system, the base station comprising:

a memory configured to store a 6-bit codebook comprising 64 codeword matrices;

a processor configured to verify a preferred codeword vector of a terminal from the codebook stored in the memory; and a precoder configured to precode at least one data stream using a precoding matrix corresponding to the preferred codeword vector, wherein the 6-bit codebook comprises columns 1 through 64:

| columns 1 through 4 | | | |
|---|---|---|---|
| 0.5000 | 0.3049 + 0.6229i | 0.1779 + 0.0995i | 0.0191 + 0.3371i |
| 0.5000 | 0.2626 + 0.1626i | 0.5060 + 0.2740i | 0.1673 + 0.6390i |
| 0.5000 | 0.4213 + 0.2108i | 0.0614 + 0.5116i | 0.3261 + 0.1156i |
| 0.5000 | −0.0232 + 0.4484i | 0.2202 + 0.5598i | 0.4531 + 0.3532i |
| columns 5 through 8 | | | |
| 0.5000 | 0.0191 + 0.3371i | 0.4637 + 0.3853i | 0.3049 + 0.6229i |
| −0.5000 | −0.1673 − 0.6390i | −0.0297 − 0.3692i | −0.2626 − 0.1626i |
| 0.5000 | 0.3261 + 0.1156i | 0.1567 + 0.6069i | 0.4213 + 0.2108i |
| −0.5000 | −0.4531 − 0.3532i | −0.3155 − 0.0834i | 0.0232 − 0.4484i |

-continued columns 9 through 12

| | | | |
|---|---|---|---|
| −0.5000 | −0.1779 − 0.3853i | −0.0191 − 0.6229i | −0.4637 − 0.0995i |
| −0.5000 | −0.2202 − 0.0834i | −0.4531 − 0.4484i | −0.3155 − 0.5598i |
| 0.5000 | 0.0614 + 0.6069i | 0.3261 + 0.2108i | 0.1567 + 0.5116i |
| 0.5000 | 0.5060 + 0.3692i | 0.1673 + 0.1626i | 0.0297 + 0.2740i | columns 13 through 16

| | | | |
|---|---|---|---|
| −0.5000 | −0.4637 − 0.0995i | −0.3049 − 0.3371i | −0.1779 − 0.3853i |
| 0.5000 | 0.3155 + 0.5598i | −0.0232 + 0.3532i | 0.2202 + 0.0834i |
| 0.5000 | 0.1567 + 0.5116i | 0.4213 + 0.1156i | 0.0614 + 0.6069i |
| −0.5000 | −0.0297 − 0.2740i | −0.2626 − 0.6390i | −0.5060 − 0.3692i | columns 17 through 20

| | | | |
|---|---|---|---|
| 0.5000 | 0.3049 + 0.3371i | 0.1779 + 0.3853i | 0.0191 + 0.6229i |
| 0 + 0.5000i | −0.3532 − 0.0232i | −0.0834 + 0.2202i | −0.4484 + 0.4531i |
| 0.5000 | 0.4213 + 0.1156i | 0.0614 + 0.6069i | 0.3261 + 0.2108i |
| 0 + 0.5000i | −0.6390 + 0.2626i | −0.3692 + 0.5060i | −0.1626 + 0.1673i | columns 21 through 24

| | | | |
|---|---|---|---|
| 0.5000 | 0.0191 + 0.6229i | 0.4637 + 0.0995i | 0.3049 + 0.3371i |
| 0 − 0.5000i | 0.4484 − 0.4531i | 0.5598 − 0.3155i | 0.3532 + 0.0232i |
| 0.5000 | 0.3261 + 0.2108i | 0.1567 + 0.5116i | 0.4213 + 0.1156i |
| 0 − 0.5000i | 0.1626 − 0.1673i | 0.2740 − 0.0297i | 0.6390 − 0.2626i | columns 25 through 28

| | | | |
|---|---|---|---|
| −0.5000 | −0.4637 − 0.3853i | −0.3049 − 0.6229i | −0.1779 − 0.0995i |
| 0 − 0.5000i | 0.3692 − 0.0297i | 0.1626 − 0.2626i | 0.2740 − 0.5060i |
| 0.5000 | 0.1567 + 0.6069i | 0.4213 + 0.2108i | 0.0614 + 0.5116i |
| 0 + 0.5000i | −0.0834 − 0.3155i | −0.4484 − 0.0232i | −0.5598 + 0.2202i | columns 29 through 32

| | | | |
|---|---|---|---|
| −0.5000 | −0.1779 − 0.0995i | −0.0191 − 0.3371i | −0.4637 − 0.3853i |
| 0 + 0.5000i | −0.2740 + 0.5060i | −0.6390 + 0.1673i | −0.3692 + 0.0297i |
| 0.5000 | 0.0614 + 0.5116i | 0.3261 + 0.1156i | 0.1567 + 0.6069i |
| 0 − 0.5000i | 0.5598 − 0.2202i | 0.3532 − 0.4531i | 0.0834 − 0.3155i | columns 33 through 36

| | | | |
|---|---|---|---|
| 0.5000 | 0.0191 + 0.6229i | 0.1779 + 0.3853i | 0.3049 + 0.3371i |
| 0.5000 | 0.1673 + 0.1626i | 0.5060 + 0.3692i | 0.2626 + 0.6390i |
| 0.5000 | 0.3261 + 0.2108i | 0.0614 + 0.6069i | 0.4213 + 0.1156i |
| −0.5000 | −0.4531 − 0.4484i | −0.2202 − 0.0834i | 0.0232 − 0.3532i | columns 37 through 40

| | | | |
|---|---|---|---|
| 0.5000 | 0.4637 + 0.0995i | 0.0191 + 0.6229i | 0.1779 + 0.3853i |
| 0 + 0.5000i | −0.2740 + 0.0297i | −0.1626 + 0.1673i | −0.3692 + 0.5060i |
| −0.5000 | −0.1567 − 0.5116i | −0.3261 − 0.2108i | −0.0614 − 0.6069i |
| 0 + 0.5000i | −0.5598 + 0.3155i | −0.4484 + 0.4531i | −0.0834 + 0.2202i | columns 41 through 44

| | | | |
|---|---|---|---|
| 0.5000 | 0.3049 + 0.3371i | 0.4637 + 0.0995i | 0.0191 + 0.6229i |
| −0.5000 | −0.2626 − 0.6390i | −0.0297 − 0.2740i | −0.1673 − 0.1626i |
| 0.5000 | 0.4213 + 0.1156i | 0.1567 + 0.5116i | 0.3261 + 0.2108i |
| 0.5000 | −0.0232 + 0.3532i | 0.3155 + 0.5598i | 0.4531 + 0.4484i | columns 45 through 48

| | | | |
|---|---|---|---|
| 0.5000 | 0.1779 + 0.3853i | 0.3049 + 0.3371i | 0.4637 + 0.0995i |
| 0 − 0.5000i | 0.3692 − 0.5060i | 0.6390 − 0.2626i | 0.2740 − 0.0297i |
| −0.5000 | −0.0614 − 0.6069i | −0.4213 − 0.1156i | −0.1567 − 0.5116i |
| 0 − 0.5000i | 0.0834 − 0.2202i | 0.3532 + 0.0232i | 0.5598 − 0.3155i | columns 49 through 52

| | | | |
|---|---|---|---|
| 0.5000 | 0.3602 + 0.4406i | −0.0795 + 0.4839i | 0.3602 + 0.4406i |
| 0.3536 + 0.3536i | −0.0754 + 0.1870i | 0.0965 + 0.3794i | −0.0754 + 0.7586i |
| 0 + 0.5000i | −0.2289 + 0.0434i | −0.5609 + 0.3720i | −0.2289 + 0.0434i |
| −0.3536 + 0.3536i | −0.7586 − 0.0754i | −0.3794 + 0.0965i | −0.1870 − 0.0754i | columns 53 through 56

| | | | |
|---|---|---|---|
| 0.5000 | 0.3247 + 0.0797i | 0.3602 + 0.4406i | −0.0795 + 0.4839i |
| −0.3536 + 0.3536i | −0.3794 − 0.2846i | −0.1870 − 0.0754i | −0.3794 + 0.0965i |
| 0 − 0.5000i | 0.4262 − 0.5068i | 0.2289 − 0.0434i | 0.5609 − 0.3720i |
| 0.3536 + 0.3536i | −0.2846 + 0.3794i | −0.0754 + 0.7586i | 0.0965 + 0.3794i | columns 57 through 60

| | | | |
|---|---|---|---|
| 0.5000 | 0.3602 + 0.4406i | 0.3247 + 0.0797i | 0.3602 + 0.4406i |
| −0.3536 − 0.3536i | 0.0754 − 0.7586i | 0.2846 − 0.3794i | 0.0754 − 0.1870i |
| 0 + 0.5000i | −0.2289 + 0.0434i | −0.4262 + 0.5068i | −0.2289 + 0.0434i |
| 0.3536 − 0.3536i | 0.1870 + 0.0754i | 0.3794 + 0.2846i | 0.7586 + 0.0754i |

-continued

| columns 61 through 64 | | | |
|---|---|---|---|
| 0.5000 | −0.0795 + 0.4839i | 0.3602 + 0.4406i | 0.3247 + 0.0797i |
| 0.3536 − 0.3536i | 0.3794 − 0.0965i | 0.7586 + 0.0754i | 0.3794 + 0.2846i |
| 0 − 0.5000i | 0.5609 − 0.3720i | 0.2289 − 0.0434i | 0.4262 − 0.5068i |
| −0.3536 − 0.3536i | −0.0965 − 0.3794i | 0.0754 − 0.1870i | 0.2846 − 0.3794i. |

\* \* \* \* \*